(12) United States Patent
Agee et al.

(10) Patent No.: US 9,654,323 B2
(45) Date of Patent: May 16, 2017

(54) DATA ROUTING FOR OFDM TRANSMISSION BASED ON OBSERVED NODE CAPACITIES

(71) Applicant: Comcast Cable Communications, LLC, Philadelphia, PA (US)

(72) Inventors: Brian G. Agee, San Jose, CA (US); Matthew C. Bromberg, Leominster, MA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/369,393

(22) Filed: Dec. 5, 2016

(65) Prior Publication Data

US 2017/0085407 A1 Mar. 23, 2017

Related U.S. Application Data

(63) Continuation of application No. 14/961,445, filed on Dec. 7, 2015, now Pat. No. 9,515,788, which is a
(Continued)

(51) Int. Cl.
*H04L 27/26* (2006.01)
*H04W 72/04* (2009.01)
(Continued)

(52) U.S. Cl.
CPC ....... *H04L 27/2627* (2013.01); *H04B 7/0413* (2013.01); *H04L 5/0007* (2013.01); *H04L 27/2602* (2013.01); *H04W 72/04* (2013.01)

(58) Field of Classification Search
CPC ............... H04L 27/2627; H04L 5/0007; H04L 27/2602; H04L 45/22; H04L 2001/0097;
(Continued)

(56) References Cited

U.S. PATENT DOCUMENTS 3,717,814 A 2/1973 Gans
3,986,124 A 10/1976 Mitchell, Jr.
(Continued)

FOREIGN PATENT DOCUMENTS

CN 1310894 A 8/2001
CN 1841953 A 10/2006
(Continued)

OTHER PUBLICATIONS

Agee, B., "Introduction of Smart Antennas Into the Metricom Wireless Data; Network Overview, Players, and Application," Aug. 6, 1999.
(Continued)

*Primary Examiner* — Curtis Odom
(74) *Attorney, Agent, or Firm* — Banner & Witcoff, Ltd.

(57) ABSTRACT

Methods and systems are described for causing orthogonal frequency division multiplexing (OFDM) transmission of various portions of data via various nodes. For example, a first portion of the data may be transmitted, via a first node and using OFDM, to at least a second node. Based on one or more observed capacities associated with one or more nodes (such as the first node and/or another node), it may be determined that a second portion of the data is to be routed via a different node (such as a third node) for transmission. The second portion of the data may be transmitted, via the third node and using OFDM, to at least the second node.

20 Claims, 57 Drawing Sheets

Related U.S. Application Data continuation of application No. 14/480,542, filed on Sep. 8, 2014, now Pat. No. 9,209,871, which is a continuation of application No. 14/309,332, filed on Jun. 19, 2014, now Pat. No. 9,106,286, which is a continuation of application No. 13/010,629, filed on Jan. 20, 2011, now abandoned, which is a continuation of application No. 11/880,825, filed on Jul. 23, 2007, now Pat. No. 8,363,744, which is a continuation-in-part of application No. 09/878,789, filed on Jun. 10, 2001, now Pat. No. 7,248,841.

(60) Provisional application No. 60/243,831, filed on Oct. 27, 2000, provisional application No. 60/211,462, filed on Jun. 13, 2000.

(51) Int. Cl.
*H04L 5/00* (2006.01)
*H04B 7/0413* (2017.01)

(58) Field of Classification Search
CPC .... H04B 7/0413; H04W 72/04; H04W 40/02; H04W 40/12; H04W 36/22
See application file for complete search history.

(56) References Cited

U.S. PATENT DOCUMENTS

| | | |
|---|---|---|
| 4,210,871 A | 7/1980 | Hill et al. |
| 4,328,585 A | 5/1982 | Monsen |
| 4,337,376 A | 6/1982 | Gruenberg |
| 4,347,498 A | 8/1982 | Lee et al. |
| 4,369,520 A | 1/1983 | Cerny, Jr. et al. |
| 4,481,670 A | 11/1984 | Freeburg |
| 4,517,669 A | 5/1985 | Freeburg et al. |
| 4,519,096 A | 5/1985 | Cerny, Jr. |
| 4,532,626 A | 7/1985 | Flores et al. |
| 4,550,443 A | 10/1985 | Freeburg |
| 4,587,651 A | 5/1986 | Nelson et al. |
| 4,596,986 A | 6/1986 | Andrews et al. |
| 4,599,720 A | 7/1986 | Kunzinger |
| 4,670,906 A | 6/1987 | Thro |
| 4,710,944 A | 12/1987 | Nossen |
| 4,714,923 A | 12/1987 | Tassle et al. |
| 4,719,591 A | 1/1988 | Hopfield et al. |
| 4,780,885 A | 10/1988 | Paul et al. |
| 4,789,983 A | 12/1988 | Acampora et al. |
| 4,829,554 A | 5/1989 | Barnes et al. |
| 4,870,657 A | 9/1989 | Bergmans et al. |
| 4,891,802 A | 1/1990 | Jasmer et al. |
| 4,920,529 A | 4/1990 | Sasaki et al. |
| 4,965,732 A | 10/1990 | Roy, III et al. |
| 4,983,988 A | 1/1991 | Franke |
| 4,998,078 A | 3/1991 | Hulkko |
| 5,014,219 A | 5/1991 | White |
| 5,063,351 A | 11/1991 | Goldthorp et al. |
| 5,093,781 A | 3/1992 | Castelaz |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,134,685 A | 7/1992 | Rosenbluth |
| 5,134,715 A | 7/1992 | Parl et al. |
| 5,202,699 A | 4/1993 | Hemmie et al. |
| 5,203,029 A | 4/1993 | Betzl et al. |
| 5,228,025 A | 7/1993 | Le Floch et al. |
| 5,228,113 A | 7/1993 | Shelton |
| 5,229,782 A | 7/1993 | Hemmie et al. |
| 5,237,318 A | 8/1993 | Auclair et al. |
| 5,237,586 A | 8/1993 | Bottomley |
| 5,239,673 A | 8/1993 | Natarajan |
| 5,253,327 A | 10/1993 | Yoshihara |
| 5,255,210 A | 10/1993 | Gardner et al. |
| 5,260,968 A | 11/1993 | Gardner et al. |
| 5,262,789 A | 11/1993 | Silverstein |
| 5,267,261 A | 11/1993 | Blakeney, II et al. |
| 5,271,038 A | 12/1993 | Cai |
| 5,274,841 A | 12/1993 | Natarajan et al. |
| 5,274,844 A | 12/1993 | Harrison et al. |
| 5,282,222 A | 1/1994 | Fattouche et al. |
| 5,293,175 A | 3/1994 | Hemmie et al. |
| 5,295,159 A | 3/1994 | Kerpez |
| 5,299,148 A | 3/1994 | Gardner et al. |
| 5,300,941 A | 4/1994 | Hemmie et al. |
| 5,307,376 A | 4/1994 | Castelain et al. |
| 5,307,459 A | 4/1994 | Petersen et al. |
| 5,313,220 A | 5/1994 | Hemmie et al. |
| 5,315,584 A | 5/1994 | Savary et al. |
| 5,317,439 A | 5/1994 | Fatehi et al. |
| 5,321,727 A | 6/1994 | Bonnet et al. |
| 5,325,403 A | 6/1994 | Siwiak et al. |
| 5,345,599 A | 9/1994 | Paulraj et al. |
| 5,371,733 A | 12/1994 | Denneau et al. |
| 5,371,734 A | 12/1994 | Fischer |
| 5,377,230 A | 12/1994 | Golden |
| 5,387,885 A | 2/1995 | Chi |
| 5,388,097 A | 2/1995 | Baugher et al. |
| 5,394,559 A | 2/1995 | Hemmie et al. |
| 5,396,256 A | 3/1995 | Chiba et al. |
| 5,402,138 A | 3/1995 | Hulett et al. |
| 5,416,468 A | 5/1995 | Baumann |
| 5,437,052 A | 7/1995 | Hemmie et al. |
| 5,440,319 A | 8/1995 | Raymond et al. |
| 5,446,736 A | 8/1995 | Gleeson et al. |
| 5,448,255 A | 9/1995 | Hulett et al. |
| 5,459,725 A | 10/1995 | Bodner et al. |
| 5,459,873 A | 10/1995 | Moore et al. |
| 5,461,627 A | 10/1995 | Rypinski |
| 5,471,647 A | 11/1995 | Gerlach et al. |
| 5,479,444 A | 12/1995 | Malkamaki et al. |
| 5,479,447 A | 12/1995 | Chow et al. |
| 5,493,695 A | 2/1996 | Aitkenhead et al. |
| 5,495,479 A | 2/1996 | Galaand et al. |
| 5,504,936 A | 4/1996 | Lee |
| 5,510,799 A | 4/1996 | Wishart |
| 5,515,378 A | 5/1996 | Roy, III et al. |
| 5,519,731 A | 5/1996 | Cioffi |
| 5,523,768 A | 6/1996 | Hemmie et al. |
| 5,537,435 A | 7/1996 | Carney et al. |
| 5,539,832 A | 7/1996 | Weinstein et al. |
| 5,546,090 A | 8/1996 | Roy, III et al. |
| 5,548,819 A | 8/1996 | Robb |
| 5,550,810 A | 8/1996 | Monogioudis et al. |
| 5,553,062 A | 9/1996 | Schilling et al. |
| 5,553,094 A | 9/1996 | Johnson et al. |
| 5,561,841 A | 10/1996 | Markus |
| 5,564,070 A | 10/1996 | Want et al. |
| 5,566,209 A | 10/1996 | Forssen et al. |
| 5,574,979 A | 11/1996 | West |
| 5,579,341 A | 11/1996 | Smith et al. |
| 5,588,038 A | 12/1996 | Snyder |
| 5,592,471 A | 1/1997 | Briskman |
| 5,592,490 A | 1/1997 | Barratt et al. |
| 5,594,731 A | 1/1997 | Reissner |
| 5,610,617 A | 3/1997 | Gans et al. |
| 5,614,914 A | 3/1997 | Bolgiano et al. |
| 5,615,211 A | 3/1997 | Santore et al. |
| 5,615,409 A | 3/1997 | Forssen et al. |
| 5,621,769 A | 4/1997 | Wan et al. |
| 5,621,786 A | 4/1997 | Fischer et al. |
| 5,625,880 A | 4/1997 | Goldburg et al. |
| 5,627,829 A | 5/1997 | Gleeson et al. |
| 5,627,863 A | 5/1997 | Aslanis et al. |
| 5,627,878 A | 5/1997 | Strauch et al. |
| 5,627,879 A | 5/1997 | Russell et al. |
| 5,634,004 A | 5/1997 | Gopinath et al. |
| 5,634,199 A | 5/1997 | Gerlach et al. |
| 5,636,242 A | 6/1997 | Tsujimoto |
| 5,640,414 A | 6/1997 | Blakeney, II et al. |
| 5,642,353 A | 6/1997 | Roy, III et al. |
| 5,642,405 A | 6/1997 | Fischer et al. |
| 5,644,622 A | 7/1997 | Russell et al. |
| 5,649,286 A | 7/1997 | Frerking |
| 5,649,287 A | 7/1997 | Forssen et al. |

(56) References Cited

U.S. PATENT DOCUMENTS

| | | |
|---|---|---|
| 5,654,959 A | 8/1997 | Baker et al. |
| 5,655,019 A | 8/1997 | McKernan et al. |
| 5,657,142 A | 8/1997 | Fahim |
| 5,657,374 A | 8/1997 | Russell et al. |
| 5,666,126 A | 9/1997 | Lange |
| 5,668,562 A | 9/1997 | Cutrer et al. |
| 5,668,610 A | 9/1997 | Bossard et al. |
| 5,668,717 A | 9/1997 | Spall |
| 5,668,802 A | 9/1997 | Chalmers et al. |
| 5,673,252 A | 9/1997 | Johnson et al. |
| 5,673,290 A | 9/1997 | Cioffi |
| 5,691,727 A | 11/1997 | Cyzs |
| 5,696,766 A | 12/1997 | Yeung et al. |
| 5,703,938 A | 12/1997 | Lucas et al. |
| 5,710,758 A | 1/1998 | Soliman et al. |
| 5,712,641 A | 1/1998 | Casabona et al. |
| 5,719,583 A | 2/1998 | Kanai |
| 5,721,725 A | 2/1998 | Want et al. |
| 5,721,733 A | 2/1998 | Wang et al. |
| 5,724,666 A | 3/1998 | Dent |
| 5,729,825 A | 3/1998 | Kostreski et al. |
| 5,732,075 A | 3/1998 | Tangemann et al. |
| 5,732,113 A | 3/1998 | Schmidl et al. |
| 5,737,327 A | 4/1998 | Ling et al. |
| 5,742,911 A | 4/1998 | Dumbrill et al. |
| 5,745,551 A | 4/1998 | Strauch et al. |
| 5,748,683 A | 5/1998 | Smith et al. |
| 5,752,173 A | 5/1998 | Tsujimoto |
| 5,771,352 A | 6/1998 | Nakamura et al. |
| 5,790,516 A | 8/1998 | Gudmundson et al. |
| 5,790,784 A | 8/1998 | Beale et al. |
| 5,790,959 A | 8/1998 | Scherer |
| 5,793,258 A | 8/1998 | Lange |
| 5,794,119 A | 8/1998 | Evans et al. |
| 5,796,922 A | 8/1998 | Smith |
| 5,809,019 A | 9/1998 | Ichihara et al. |
| 5,809,020 A | 9/1998 | Bruckert et al. |
| 5,809,133 A | 9/1998 | Bartkowiak et al. |
| 5,809,282 A | 9/1998 | Cooper et al. |
| 5,809,431 A | 9/1998 | Bustamante et al. |
| 5,812,542 A | 9/1998 | Bruckert et al. |
| 5,815,488 A | 9/1998 | Williams et al. |
| 5,815,810 A | 9/1998 | Gallant et al. |
| 5,815,811 A | 9/1998 | Pinard et al. |
| 5,818,830 A | 10/1998 | Daane et al. |
| 5,818,832 A | 10/1998 | McCallister |
| 5,825,645 A | 10/1998 | Konar et al. |
| 5,828,658 A | 10/1998 | Ottersten et al. |
| 5,841,971 A | 11/1998 | Longginou et al. |
| 5,844,886 A | 12/1998 | Szentesi |
| 5,844,939 A | 12/1998 | Scherer et al. |
| 5,852,633 A | 12/1998 | Levin et al. |
| 5,852,651 A | 12/1998 | Fischer et al. |
| 5,854,903 A | 12/1998 | Morrison et al. |
| 5,857,142 A | 1/1999 | Lin et al. |
| 5,861,844 A | 1/1999 | Gilmore et al. |
| 5,864,543 A | 1/1999 | Hoole |
| 5,864,550 A | 1/1999 | Posti |
| 5,867,478 A | 2/1999 | Baum et al. |
| 5,867,485 A | 2/1999 | Chambers et al. |
| 5,870,385 A | 2/1999 | Ahmadi et al. |
| 5,873,048 A | 2/1999 | Yun |
| 5,875,186 A | 2/1999 | Belanger et al. |
| 5,875,396 A | 2/1999 | Stockton et al. |
| 5,878,036 A | 3/1999 | Spartz et al. |
| 5,884,181 A | 3/1999 | Arnold et al. |
| 5,886,988 A | 3/1999 | Yun et al. |
| 5,887,156 A | 3/1999 | Subramanian et al. |
| 5,890,055 A | 3/1999 | Chu et al. |
| 5,890,064 A | 3/1999 | Widergen et al. |
| 5,892,796 A | 4/1999 | Rypinski |
| 5,894,590 A | 4/1999 | Vatt et al. |
| 5,896,391 A | 4/1999 | Solheim et al. |
| 5,898,455 A | 4/1999 | Barakat et al. |
| 5,898,904 A | 4/1999 | Wang |
| 5,901,180 A | 5/1999 | Aslanis et al. |
| 5,903,844 A | 5/1999 | Bruckert et al. |
| 5,905,721 A | 5/1999 | Liu et al. |
| 5,907,544 A | 5/1999 | Rypinski |
| 5,907,816 A | 5/1999 | Newman et al. |
| 5,909,429 A | 6/1999 | Satyanarayana et al. |
| 5,909,470 A | 6/1999 | Barratt et al. |
| 5,909,471 A | 6/1999 | Yun |
| 5,911,120 A | 6/1999 | Jarett et al. |
| 5,912,921 A | 6/1999 | Warren et al. |
| 5,920,818 A | 7/1999 | Frodigh et al. |
| 5,920,865 A | 7/1999 | Ariga |
| 5,923,700 A | 7/1999 | Zhang |
| 5,924,039 A | 7/1999 | Hugenberg et al. |
| 5,925,097 A | 7/1999 | Gopinath et al. |
| 5,930,243 A | 7/1999 | Parish et al. |
| 5,933,420 A | 8/1999 | Jaszewski et al. |
| 5,933,421 A | 8/1999 | Alamouti et al. |
| 5,936,578 A | 8/1999 | Driessen et al. |
| 5,936,949 A | 8/1999 | Pasternak et al. |
| 5,937,042 A | 8/1999 | Sofman |
| 5,940,755 A | 8/1999 | Scott |
| 5,943,023 A | 8/1999 | Sanford |
| 5,946,631 A | 8/1999 | Melnik |
| 5,949,758 A | 9/1999 | Kober |
| 5,949,769 A | 9/1999 | Davidson et al. |
| 5,952,896 A | 9/1999 | Mett et al. |
| 5,953,311 A | 9/1999 | Davies et al. |
| 5,953,325 A | 9/1999 | Willars |
| 5,958,018 A | 9/1999 | Eng et al. |
| 5,960,039 A | 9/1999 | Martin et al. |
| 5,960,344 A | 9/1999 | Mahany |
| 5,963,863 A | 10/1999 | Berggren |
| 5,966,094 A | 10/1999 | Ward et al. |
| 5,970,092 A | 10/1999 | Currivan |
| 5,973,642 A | 10/1999 | Li et al. |
| 5,974,322 A | 10/1999 | Carlsson et al. |
| 5,978,117 A | 11/1999 | Koonen |
| 5,978,364 A | 11/1999 | Melnik |
| 5,978,365 A | 11/1999 | Yi |
| 5,978,650 A | 11/1999 | Fischer et al. |
| 5,982,327 A | 11/1999 | Vook et al. |
| 5,987,328 A | 11/1999 | Ephremides et al. |
| 5,991,628 A | 11/1999 | Pedziwiatr et al. |
| 5,999,826 A | 12/1999 | Whinnett |
| 6,005,853 A | 12/1999 | Wang et al. |
| 6,006,069 A | 12/1999 | Langston |
| 6,006,110 A | 12/1999 | Raleigh |
| 6,008,923 A | 12/1999 | Samdahl et al. |
| 6,009,124 A | 12/1999 | Smith et al. |
| 6,012,084 A | 1/2000 | Fielding et al. |
| 6,014,089 A | 1/2000 | Tracy et al. |
| 6,016,313 A | 1/2000 | Foster, Jr. et al. |
| 6,018,659 A | 1/2000 | Ayyagari et al. |
| 6,018,660 A | 1/2000 | Alperovich et al. |
| 6,021,158 A | 2/2000 | Schurr et al. |
| 6,021,309 A | 2/2000 | Sherman et al. |
| 6,023,203 A | 2/2000 | Parish |
| 6,023,616 A | 2/2000 | Briskman |
| 6,031,833 A | 2/2000 | Fickes et al. |
| 6,034,966 A | 3/2000 | Ota |
| 6,035,000 A | 3/2000 | Bingham |
| 6,037,898 A | 3/2000 | Parish et al. |
| 6,038,251 A | 3/2000 | Chen |
| 6,038,430 A | 3/2000 | Thomson et al. |
| 6,040,851 A | 3/2000 | Cheng et al. |
| 6,041,088 A | 3/2000 | McCallister |
| 6,044,062 A | 3/2000 | Brownrigg et al. |
| 6,046,978 A | 4/2000 | Melnik |
| 6,047,023 A | 4/2000 | Arnstein |
| 6,047,189 A | 4/2000 | Yun et al. |
| 6,047,331 A | 4/2000 | Medard et al. |
| 6,049,307 A | 4/2000 | Lim |
| 6,058,105 A | 5/2000 | Hochwald et al. |
| 6,058,106 A | 5/2000 | Cudak et al. |
| 6,061,327 A | 5/2000 | Demoulin et al. |
| 6,061,389 A | 5/2000 | Ishifuji et al. |
| 6,061,441 A | 5/2000 | Krenn |
| 6,061,562 A | 5/2000 | Martin et al. |

(56) References Cited

U.S. PATENT DOCUMENTS

| | | | |
|---|---|---|---|
| 6,064,662 A | 5/2000 | Gitlin et al. |
| 6,064,692 A | 5/2000 | Chow |
| 6,064,882 A | 5/2000 | Coyne et al. |
| 6,067,290 A | 5/2000 | Paulraj et al. |
| 6,067,291 A | 5/2000 | Kamerman et al. |
| 6,069,887 A | 5/2000 | Geiger et al. |
| 6,069,894 A * | 5/2000 | Holender ......... H04Q 11/0478 370/397 |
| 6,072,769 A | 6/2000 | Ho |
| 6,072,770 A | 6/2000 | Ho et al. |
| 6,072,990 A | 6/2000 | Agrawal et al. |
| 6,073,235 A | 6/2000 | Foladare et al. |
| 6,075,812 A | 6/2000 | Cafarella et al. |
| 6,078,566 A | 6/2000 | Kikinis |
| 6,078,611 A | 6/2000 | La Rosa et al. |
| 6,081,601 A | 6/2000 | Raivisto |
| 6,088,327 A | 7/2000 | Muschallik et al. |
| 6,088,408 A | 7/2000 | Calderbank et al. |
| 6,088,431 A | 7/2000 | LaDue |
| 6,088,572 A | 7/2000 | Vatt et al. |
| 6,088,588 A | 7/2000 | Osborne |
| 6,091,932 A | 7/2000 | Langlais |
| 6,092,096 A | 7/2000 | Lewis |
| 6,094,427 A | 7/2000 | Yi |
| 6,097,703 A | 8/2000 | Larsen et al. |
| 6,097,707 A | 8/2000 | Hodzic et al. |
| 6,097,771 A | 8/2000 | Foschini |
| 6,097,951 A | 8/2000 | Ernam et al. |
| 6,101,174 A | 8/2000 | Langston |
| 6,101,399 A | 8/2000 | Raleigh et al. |
| 6,104,712 A | 8/2000 | Robert et al. |
| 6,108,565 A | 8/2000 | Scherzer |
| 6,111,857 A | 8/2000 | Soliman et al. |
| 6,112,056 A | 8/2000 | Langston |
| 6,115,406 A | 9/2000 | Mesecher |
| 6,115,409 A | 9/2000 | Upadhyay et al. |
| 6,115,411 A | 9/2000 | van Driest |
| 6,115,427 A | 9/2000 | Calderbank et al. |
| 6,115,580 A | 9/2000 | Chuprun et al. |
| 6,118,976 A | 9/2000 | Arias et al. |
| 6,118,987 A | 9/2000 | Hiramatsu et al. |
| 6,125,149 A | 9/2000 | Jafarkhani et al. |
| 6,128,276 A | 10/2000 | Agee |
| 6,131,016 A | 10/2000 | Greenstein et al. |
| 6,141,335 A | 10/2000 | Kuwahara et al. |
| 6,141,393 A | 10/2000 | Thomas et al. |
| 6,141,567 A | 10/2000 | Youssefmir et al. |
| 6,144,711 A | 11/2000 | Raleigh et al. |
| 6,154,659 A | 11/2000 | Jalali et al. |
| 6,154,661 A | 11/2000 | Goldburg |
| 6,167,099 A | 12/2000 | Rader et al. |
| 6,175,550 B1 | 1/2001 | van Nee |
| 6,177,906 B1 | 1/2001 | Petrus |
| 6,185,258 B1 | 2/2001 | Alamouti et al. |
| 6,185,440 B1 | 2/2001 | Barratt et al. |
| 6,188,736 B1 | 2/2001 | Lo et al. |
| 6,208,683 B1 | 3/2001 | Mizuguchi et al. |
| 6,219,341 B1 | 4/2001 | Varanasi |
| 6,243,369 B1 | 6/2001 | Grimwood et al. |
| 6,249,250 B1 | 6/2001 | Namekata et al. |
| 6,266,528 B1 | 7/2001 | Farzaneh |
| 6,275,543 B1 | 8/2001 | Petrus et al. |
| 6,292,135 B1 | 9/2001 | Takatori et al. |
| 6,292,559 B1 | 9/2001 | Gaikwad et al. |
| 6,300,881 B1 | 10/2001 | Yee et al. |
| 6,317,411 B1 | 11/2001 | Whinnett et al. |
| 6,317,466 B1 | 11/2001 | Foschini et al. |
| 6,351,499 B1 | 2/2002 | Paulraj et al. |
| 6,353,604 B2 | 3/2002 | Grimwood et al. |
| 6,359,923 B1 | 3/2002 | Agee et al. |
| 6,362,781 B1 | 3/2002 | Thomas et al. |
| 6,363,107 B1 | 3/2002 | Scott |
| 6,373,432 B1 | 4/2002 | Rabinowitz et al. |
| 6,377,631 B1 | 4/2002 | Raleigh |
| 6,377,636 B1 | 4/2002 | Paulraj et al. |
| 6,385,264 B1 | 5/2002 | Terasawa et al. |
| 6,393,073 B1 | 5/2002 | Eilts |
| 6,400,780 B1 | 6/2002 | Rashid-Farrokhi et al. |
| 6,411,799 B1 | 6/2002 | Padovani |
| RE37,802 E | 7/2002 | Fattouche et al. |
| 6,418,299 B1 | 7/2002 | Ramanathan |
| 6,441,784 B1 | 8/2002 | Flore et al. |
| 6,452,981 B1 | 9/2002 | Raleigh et al. |
| 6,459,171 B1 | 10/2002 | Leifer |
| 6,463,295 B1 | 10/2002 | Yun |
| 6,466,557 B1 | 10/2002 | Doi |
| 6,473,467 B1 | 10/2002 | Wallace et al. |
| 6,493,331 B1 | 12/2002 | Walton et al. |
| 6,493,335 B1 | 12/2002 | Darcie et al. |
| 6,504,506 B1 | 1/2003 | Thomas et al. |
| 6,512,737 B1 | 1/2003 | Agee |
| 6,542,556 B1 | 4/2003 | Kuchi et al. |
| 6,546,055 B1 | 4/2003 | Schmidl et al. |
| 6,549,581 B1 | 4/2003 | Izumi |
| 6,564,036 B1 | 5/2003 | Kasapi |
| 6,570,527 B1 | 5/2003 | Lindskog et al. |
| 6,590,532 B1 | 7/2003 | Ogawa et al. |
| 6,594,473 B1 | 7/2003 | Dabak et al. |
| 6,597,678 B1 | 7/2003 | Kuwahara et al. |
| 6,600,914 B2 | 7/2003 | Uhlik et al. |
| 6,615,024 B1 | 9/2003 | Boros et al. |
| 6,621,851 B1 | 9/2003 | Agee et al. |
| 6,633,616 B2 | 10/2003 | Crawford |
| 6,636,493 B1 | 10/2003 | Doi et al. |
| 6,647,078 B1 | 11/2003 | Thomas et al. |
| 6,650,714 B2 | 11/2003 | Dogan et al. |
| 6,650,881 B1 | 11/2003 | Dogan |
| 6,651,210 B1 | 11/2003 | Trott et al. |
| 6,654,590 B2 | 11/2003 | Boros et al. |
| 6,665,545 B1 | 12/2003 | Raleigh et al. |
| 6,668,161 B2 | 12/2003 | Boros et al. |
| 6,678,253 B1 | 1/2004 | Heath, Jr. et al. |
| 6,683,915 B1 | 1/2004 | Trott et al. |
| 6,684,366 B1 | 1/2004 | Trott et al. |
| 6,687,492 B1 | 2/2004 | Sugar et al. |
| 6,690,747 B2 | 2/2004 | Petrus et al. |
| 6,693,982 B1 | 2/2004 | Naguib et al. |
| 6,711,412 B1 | 3/2004 | Tellado et al. |
| 6,714,585 B1 | 3/2004 | Wang et al. |
| 6,731,689 B2 | 5/2004 | Dogan |
| 6,731,705 B2 | 5/2004 | Kasapi et al. |
| 6,735,258 B1 | 5/2004 | Trott et al. |
| 6,738,020 B1 | 5/2004 | Lindskog et al. |
| 6,744,823 B1 | 6/2004 | Kamemura et al. |
| 6,747,594 B2 | 6/2004 | Lindskog et al. |
| 6,751,187 B2 | 6/2004 | Walton et al. |
| 6,757,265 B1 | 6/2004 | Sebastian et al. |
| 6,760,599 B1 | 7/2004 | Uhlik |
| 6,768,747 B1 | 7/2004 | Dogan |
| 6,771,706 B2 | 8/2004 | Ling et al. |
| 6,775,519 B1 | 8/2004 | Wiedeman et al. |
| 6,778,513 B2 | 8/2004 | Kasapi et al. |
| 6,785,341 B2 | 8/2004 | Walton et al. |
| 6,785,520 B2 | 8/2004 | Sugar et al. |
| 6,788,948 B2 | 9/2004 | Lindskog et al. |
| 6,795,409 B1 | 9/2004 | Youssefmir et al. |
| 6,795,413 B1 | 9/2004 | Uhlik |
| 6,801,589 B1 | 10/2004 | Dogan |
| 6,802,038 B1 | 10/2004 | Yu |
| 6,826,240 B1 | 11/2004 | Thomas et al. |
| 6,834,249 B2 | 12/2004 | Orchard |
| 6,836,469 B1 | 12/2004 | Wu |
| 6,836,673 B1 | 12/2004 | Trott |
| 6,839,573 B1 | 1/2005 | Youssefmir et al. |
| 6,839,574 B2 | 1/2005 | Petrus et al. |
| 6,842,487 B1 | 1/2005 | Larsson |
| 6,865,237 B1 | 3/2005 | Boariu et al. |
| 6,865,377 B1 | 3/2005 | Lindskog et al. |
| 6,888,809 B1 | 5/2005 | Foschini et al. |
| 6,888,882 B1 | 5/2005 | Dogan |
| 6,888,899 B2 | 5/2005 | Raleigh et al. |
| 6,894,993 B2 | 5/2005 | Yu et al. |
| 6,915,438 B2 | 7/2005 | Boros |
| 6,928,287 B2 | 8/2005 | Trott et al. |

(56) References Cited

U.S. PATENT DOCUMENTS

| | | |
|---|---|---|
| 6,931,030 B1 | 8/2005 | Dogan |
| 6,931,262 B2 | 8/2005 | Steele |
| 6,931,583 B2 | 8/2005 | Trott et al. |
| 6,937,665 B1 | 8/2005 | Vandenameele |
| 6,950,630 B2 | 9/2005 | Chauvin et al. |
| 6,950,979 B2 | 9/2005 | Zhang et al. |
| 6,952,454 B1 | 10/2005 | Jalali et al. |
| 6,954,643 B2 | 10/2005 | Petrus |
| 6,957,042 B2 | 10/2005 | Williams |
| 6,961,388 B2 | 11/2005 | Ling et al. |
| 6,963,742 B2 | 11/2005 | Boros et al. |
| 6,965,774 B1 | 11/2005 | Kasapi et al. |
| 6,965,788 B1 | 11/2005 | Barratt et al. |
| 6,970,682 B2 | 11/2005 | Crilly, Jr. et al. |
| 6,973,314 B2 | 12/2005 | Wilson et al. |
| 6,975,666 B2 | 12/2005 | Affes et al. |
| 6,982,968 B1 | 1/2006 | Barratt et al. |
| 6,983,127 B1 | 1/2006 | Da Torre et al. |
| 6,985,466 B1 | 1/2006 | Yun et al. |
| 6,987,819 B2 | 1/2006 | Thomas et al. |
| 6,996,060 B1 | 2/2006 | Dahlby et al. |
| 6,996,163 B2 | 2/2006 | Bhora et al. |
| 6,999,771 B1 | 2/2006 | Kasapi et al. |
| 6,999,794 B1 | 2/2006 | Lindskog et al. |
| 7,003,310 B1 | 2/2006 | Youssefmir et al. |
| 7,006,579 B2 | 2/2006 | Kuchi et al. |
| 7,016,429 B1 | 3/2006 | Dogan et al. |
| 7,020,072 B1 | 3/2006 | Li et al. |
| 7,020,107 B2 | 3/2006 | Kasapi et al. |
| 7,020,110 B2 | 3/2006 | Walton et al. |
| 7,020,490 B2 | 3/2006 | Khatri |
| 7,024,163 B1 | 4/2006 | Barratt et al. |
| 7,027,415 B1 | 4/2006 | Dahlby et al. |
| 7,027,523 B2 | 4/2006 | Jalali et al. |
| 7,027,837 B1 | 4/2006 | Uhlik et al. |
| 7,031,679 B2 | 4/2006 | Persson et al. |
| 7,035,358 B1 | 4/2006 | Sankaran et al. |
| 7,035,661 B1 | 4/2006 | Yun |
| 7,036,067 B2 | 4/2006 | Roy et al. |
| 7,039,016 B1 | 5/2006 | Lindskog et al. |
| 7,039,363 B1 | 5/2006 | Kasapi et al. |
| 7,039,441 B1 | 5/2006 | Reudink et al. |
| 7,042,856 B2 | 5/2006 | Walton et al. |
| 7,043,259 B1 | 5/2006 | Trott |
| 7,047,045 B2 | 5/2006 | Steele et al. |
| 7,050,832 B2 | 5/2006 | Kasapi |
| 7,054,301 B1 | 5/2006 | Sousa et al. |
| 7,054,397 B1 | 5/2006 | Kawanabe |
| 7,062,294 B1 | 6/2006 | Rogard et al. |
| 7,068,628 B2 | 6/2006 | Li et al. |
| 7,072,413 B2 | 7/2006 | Walton et al. |
| 7,079,480 B2 | 7/2006 | Agee |
| 7,106,781 B2 | 9/2006 | Agee et al. |
| 7,110,349 B2 | 9/2006 | Branlund et al. |
| 7,110,381 B1 | 9/2006 | O'Sullivan et al. |
| 7,111,223 B2 | 9/2006 | Roy et al. |
| 7,116,722 B2 | 10/2006 | Foschini et al. |
| 7,133,459 B2 | 11/2006 | Onggosanusi et al. |
| 7,139,592 B2 | 11/2006 | Leifer et al. |
| 7,149,238 B2 | 12/2006 | Agee et al. |
| 7,149,239 B2 | 12/2006 | Hudson |
| 7,151,795 B1 | 12/2006 | Goldburg |
| 7,158,493 B1 | 1/2007 | Uhlik et al. |
| 7,164,669 B2 | 1/2007 | Li et al. |
| 7,164,725 B2 | 1/2007 | Frank |
| 7,164,726 B1 | 1/2007 | Trott |
| 7,164,739 B1 | 1/2007 | Trott |
| 7,206,293 B2 | 4/2007 | Kasapi et al. |
| 7,206,554 B1 | 4/2007 | Lindskog |
| 7,221,699 B1 | 5/2007 | Lindskog |
| 7,227,855 B1 | 6/2007 | Barratt et al. |
| 7,242,720 B2 | 7/2007 | Sugiyama et al. |
| 7,248,841 B2 | 7/2007 | Agee et al. |
| 7,257,101 B2 | 8/2007 | Petrus et al. |
| 7,263,082 B1 | 8/2007 | Lindskog |
| 7,266,685 B1 | 9/2007 | Meandzija et al. |
| 7,269,224 B2 | 9/2007 | Stuber et al. |
| 7,269,389 B2 | 9/2007 | Petrus et al. |
| 7,277,679 B1 | 10/2007 | Barratt et al. |
| 7,299,071 B1 | 11/2007 | Barratt et al. |
| 7,299,073 B2 | 11/2007 | Wilson et al. |
| 7,302,565 B2 | 11/2007 | Meandzija et al. |
| 7,310,538 B2 | 12/2007 | Steele et al. |
| 7,336,626 B1 | 2/2008 | Barratt et al. |
| 7,336,719 B2 | 2/2008 | Gore et al. |
| 7,339,906 B1 | 3/2008 | Dahlby et al. |
| 7,339,908 B2 | 3/2008 | Uhlik et al. |
| 7,339,981 B2 | 3/2008 | Dogan |
| 7,342,912 B1 | 3/2008 | Kerr et al. |
| 7,349,371 B2 | 3/2008 | Schein et al. |
| 7,352,774 B2 | 4/2008 | Uhlik et al. |
| 7,362,799 B1 | 4/2008 | Petrus |
| 7,363,376 B2 | 4/2008 | Uhlik et al. |
| 7,366,223 B1 | 4/2008 | Chen et al. |
| 7,372,911 B1 | 5/2008 | Lindskog et al. |
| 7,386,043 B2 | 6/2008 | Goldburg |
| 7,386,781 B2 | 6/2008 | Persson et al. |
| 7,389,111 B2 | 6/2008 | Petrus |
| 7,397,804 B2 | 7/2008 | Dulin et al. |
| 7,406,261 B2 | 7/2008 | Shattil |
| 7,406,315 B2 | 7/2008 | Uhlik et al. |
| 7,411,977 B1 | 8/2008 | Chen et al. |
| 7,418,043 B2 | 8/2008 | Shattil |
| 7,420,984 B2 | 9/2008 | Chen et al. |
| 7,424,002 B2 | 9/2008 | Barratt et al. |
| 7,430,197 B1 | 9/2008 | Uhlik |
| 7,430,246 B1 | 9/2008 | Trott |
| 7,430,606 B1 | 9/2008 | Meandzija et al. |
| 7,433,347 B1 | 10/2008 | Trott et al. |
| 7,433,418 B1 | 10/2008 | Dogan et al. |
| 7,460,835 B1 | 12/2008 | Petrus |
| 7,594,010 B2 | 9/2009 | Dohler et al. |
| 7,606,204 B2 | 10/2009 | Sebastian et al. |
| 7,688,710 B2 | 3/2010 | Wu et al. |
| 7,760,814 B2 | 7/2010 | Jungnickel et al. |
| 7,801,247 B2 | 9/2010 | Onggosanusi et al. |
| 7,813,441 B2 | 10/2010 | Jalali et al. |
| 7,817,597 B2 | 10/2010 | Usuda et al. |
| 7,920,501 B2 | 4/2011 | Larsson et al. |
| 7,934,036 B2 | 4/2011 | Conti et al. |
| 7,986,742 B2 | 7/2011 | Ketchum et al. |
| 8,055,828 B2 | 11/2011 | Conti et al. |
| 8,081,595 B2 | 12/2011 | Zhang et al. |
| 8,098,568 B2 | 1/2012 | Laroia et al. |
| 8,108,641 B2 | 1/2012 | Goss et al. |
| 8,117,367 B2 | 2/2012 | Conti et al. |
| 8,121,101 B2 | 2/2012 | Kalogridis et al. |
| 8,131,297 B2 | 3/2012 | Lee et al. |
| 8,189,612 B2 | 5/2012 | Lemaire et al. |
| 8,447,306 B2 | 5/2013 | Lee et al. |
| 2001/0031019 A1 | 10/2001 | Jafarkhani et al. |
| 2001/0033622 A1 | 10/2001 | Jongren et al. |
| 2001/0036843 A1 | 11/2001 | Thompson |
| 2001/0038356 A1 | 11/2001 | Frank |
| 2001/0050964 A1 | 12/2001 | Foschini et al. |
| 2001/0053143 A1 | 12/2001 | Li et al. |
| 2002/0003774 A1 | 1/2002 | Wang et al. |
| 2002/0041635 A1 | 4/2002 | Ma et al. |
| 2002/0044524 A1 | 4/2002 | Laroia et al. |
| 2002/0062472 A1 | 5/2002 | Medlock et al. |
| 2002/0102937 A1 | 8/2002 | Dapper et al. |
| 2002/0111142 A1 | 8/2002 | Klimovitch |
| 2002/0111144 A1 | 8/2002 | Schiff |
| 2002/0122381 A1 | 9/2002 | Wu et al. |
| 2002/0122465 A1 | 9/2002 | Agee et al. |
| 2002/0150109 A1 | 10/2002 | Agee |
| 2002/0154705 A1 | 10/2002 | Walton et al. |
| 2002/0155818 A1 | 10/2002 | Boros et al. |
| 2002/0159506 A1 | 10/2002 | Alamouti et al. |
| 2002/0181390 A1 | 12/2002 | Mody et al. |
| 2002/0181509 A1 | 12/2002 | Mody et al. |
| 2002/0193146 A1 | 12/2002 | Wallace et al. |
| 2003/0032423 A1 | 2/2003 | Boros et al. |
| 2003/0050020 A1 | 3/2003 | Erceg et al. |

(56) References Cited

U.S. PATENT DOCUMENTS

| | | |
|---|---|---|
| 2003/0072382 A1 | 4/2003 | Raleigh et al. |
| 2003/0086366 A1 | 5/2003 | Branlund et al. |
| 2003/0087673 A1 | 5/2003 | Walton et al. |
| 2003/0123384 A1 | 7/2003 | Agee |
| 2003/0123425 A1 | 7/2003 | Walton et al. |
| 2003/0124976 A1 | 7/2003 | Tamaki et al. |
| 2003/0169720 A1 | 9/2003 | Sebastian et al. |
| 2004/0012387 A1 | 1/2004 | Shattil |
| 2004/0095907 A1 | 5/2004 | Agee et al. |
| 2004/0100897 A1 | 5/2004 | Shattil |
| 2004/0131025 A1 | 7/2004 | Dohler et al. |
| 2004/0180625 A1 | 9/2004 | Steele et al. |
| 2004/0193982 A1 | 9/2004 | Bhora et al. |
| 2005/0047480 A1 | 3/2005 | Carbonari |
| 2005/0147076 A1 | 7/2005 | Sadowsky et al. |
| 2005/0197748 A1 | 9/2005 | Holst et al. |
| 2006/0078059 A1 | 4/2006 | Ok et al. |
| 2006/0193373 A1 | 8/2006 | Agee et al. |
| 2006/0268983 A1 | 11/2006 | Kwon et al. |
| 2007/0009012 A1 | 1/2007 | Carrivan et al. |
| 2007/0042753 A1 | 2/2007 | Uhlik et al. |
| 2007/0133496 A1 | 6/2007 | Barratt et al. |
| 2007/0140374 A1 | 6/2007 | Raleigh et al. |
| 2007/0153731 A1 | 7/2007 | Fine |
| 2007/0165552 A1 | 7/2007 | Kasapi et al. |
| 2007/0202890 A1 | 8/2007 | Feher |
| 2007/0217439 A1 | 9/2007 | Lemaire et al. |
| 2007/0258540 A1 | 11/2007 | Ratasuk et al. |
| 2007/0268980 A1 | 11/2007 | Brannstorm et al. |
| 2007/0283230 A1 | 12/2007 | Brannstrom et al. |
| 2007/0294494 A1 | 12/2007 | Conti et al. |
| 2007/0294496 A1 | 12/2007 | Goss et al. |
| 2008/0075033 A1 | 3/2008 | Shattil |
| 2008/0076370 A1 | 3/2008 | Kotecha et al. |
| 2008/0088517 A1 | 4/2008 | Ansari et al. |
| 2008/0090575 A1 | 4/2008 | Barak et al. |
| 2008/0101502 A1 | 5/2008 | Navidpour et al. |
| 2008/0130611 A1 | 6/2008 | Branlund et al. |
| 2008/0162770 A1 | 7/2008 | Titiano et al. |
| 2008/0181170 A1 | 7/2008 | Branlund et al. |
| 2008/0232238 A1 | 9/2008 | Agee |
| 2008/0232492 A1 | 9/2008 | Xiao et al. |
| 2009/0011755 A1 | 1/2009 | Hadad |
| 2009/0046681 A1 | 2/2009 | Kalogridis et al. |
| 2009/0049220 A1 | 2/2009 | Conti et al. |
| 2009/0116541 A1 | 5/2009 | Farrokhi et al. |
| 2009/0213731 A1 | 8/2009 | Bhasin et al. |
| 2009/0268662 A1 | 10/2009 | Larsson et al. |
| 2009/0298504 A1 | 12/2009 | Lee et al. |
| 2010/0020907 A1 | 1/2010 | Rezvani et al. |
| 2010/0046413 A1 | 2/2010 | Jin et al. |
| 2010/0067362 A1 | 3/2010 | Sakaguchi et al. |
| 2010/0080317 A1 | 4/2010 | Narasimhan et al. |
| 2010/0111141 A1 | 5/2010 | Currivan et al. |
| 2010/0113023 A1 | 5/2010 | Huang et al. |
| 2010/0162075 A1 | 6/2010 | Brannstrom et al. |
| 2010/0174599 A1 | 7/2010 | Rosenblatt et al. |
| 2010/0214145 A1 | 8/2010 | Narasimhan et al. |
| 2010/0246454 A1 | 9/2010 | Ansari et al. |
| 2010/0254325 A1 | 10/2010 | Narasimhan et al. |
| 2010/0303052 A1 | 12/2010 | Visuri et al. |
| 2010/0303160 A1 | 12/2010 | Rezvani et al. |
| 2011/0019608 A1 | 1/2011 | Dohler et al. |
| 2011/0145459 A1 | 6/2011 | Conti et al. |
| 2011/0145460 A1 | 6/2011 | Conti et al. |
| 2011/0173363 A1 | 7/2011 | Conti et al. |
| 2011/0258049 A1 | 10/2011 | Ramer et al. |
| 2012/0020329 A1 | 1/2012 | Lee et al. |
| 2012/0147937 A1 | 6/2012 | Goss et al. |
| 2013/0176968 A1 | 7/2013 | Heath, Jr. et al. |

FOREIGN PATENT DOCUMENTS

| | | |
|---|---|---|
| CN | 101860391 A | 10/2010 |
| EP | 0253465 A1 | 1/1988 |
| EP | 0253465 B1 | 10/1991 |
| EP | 0881782 A2 | 12/1998 |
| EP | 0940934 A2 | 9/1999 |
| EP | 0940937 A2 | 9/1999 |
| EP | 0949769 A1 | 10/1999 |
| EP | 0999717 A2 | 5/2000 |
| EP | 1059737 A1 | 12/2000 |
| EP | 1527641 A2 | 5/2005 |
| EP | 1744575 A2 | 1/2007 |
| EP | 2239990 A1 | 10/2010 |
| EP | 2264965 A2 | 12/2010 |
| EP | 2317664 A2 | 5/2011 |
| JP | H05327612 A | 12/1993 |
| JP | H09139704 A | 5/1997 |
| WO | 9120135 A1 | 12/1991 |
| WO | 9522873 A2 | 8/1995 |
| WO | 9630964 A1 | 10/1996 |
| WO | 9700543 A1 | 1/1997 |
| WO | 9809381 A | 3/1998 |
| WO | 9809385 A2 | 3/1998 |
| WO | 9809395 A1 | 3/1998 |
| WO | 9827669 A1 | 6/1998 |
| WO | 9834351 A2 | 8/1998 |
| WO | 9834424 A2 | 8/1998 |
| WO | 9837638 A2 | 8/1998 |
| WO | 9908451 A2 | 2/1999 |
| WO | 9837638 A3 | 3/1999 |
| WO | 908451 A3 | 4/1999 |
| WO | 9940689 A1 | 8/1999 |
| WO | 0011823 A1 | 3/2000 |
| WO | 0025485 A1 | 5/2000 |

OTHER PUBLICATIONS

Agee, B., "4G Airlink Enhancements to the Metricom Ricochet System," 4G; Airlink/Technology Concepts, Dec. 21, 1999.

Stutzman, W., Barts, M., "The Stub Loaded Helix Antenna," 1999.

Agee, B., "Performance of the Multitarget Modulus Restoral Algorithm Against the Keystroke Data Set," Apr. 6, 1990.

Agee, B., Young, D., "Blind Capture and Geolocation of General Spatially Self-Coherent Waveforms Using Multiplatform Score," Maple Press, 1990.

Biedka, T., Agee, B., "Subinterval Cyclic Music- Robust DF with Error in Cycle Frequency Knowledge," 1991.

Bromberg, M., Agee, B., "The LEGO Approach for Achieving Max-Min Capacity in Reciprocal Multipoint Networks," 2001.

Mendoza, R., Reed, J., Hsia, T., Agee, B., "Interference Rejection Using Time-Dependent Constant Modulus Algorithms," 1989.

Schell, S., Calabretta, R., Gardner, W., Agee, B., "Cyclic Music Algorithms for Signal-Selective Direction Estimation,"1989.

Agee, B., Protean Radio Networks, "WLAN Reconnaissance," Jan. 13, 2003.

Agee, B., Protean Radio Networks, "The PHY-IASM MIMO Network Capable Transceiver: Concept and IP Overview," May 20, 2004.

Agee, B., "ORION Phase A Algorithms," Final Design Review, Algorithms; Overview; Jul. 17-18, 1996 (FDR Date), Jul. 19, 1996.

Bromberg, M., Agee, B., "Using Channel Reciprocity to Optimize Network Capacity," May 11, 2000.

Bromberg, M., Agee, B., "An Analysis of the LEGO Algorithm for Optimizing the Performance of Wireless Networks," Thirty Fourth Asilomar Conf Signals, Systems, and Computers, Oct. 2000, and in Proceedings of the Thirty Fifth Asilomar Conf Signals, Systems, and Computers, Nov. 2001.

Bromberg, M. Agee, B., "The LEGO Technique for Optimizing the Performance of Wireless, MultiUser, MIMO Channel, TDD Networks," Dec. 28, 2000.

Bromberg, M. Agee, B., "The LEGO Technique for Locally Enabled Global Optimization of Reciprocal Multinode communication Networks," Feb. 5, 2001.

Agee, B., "OFDM-Based SSICS Capabilities Demonstration," Aug. 11, 2000.

Agee, B., Young, D., "Blind Capture and Geolocation of General Spatially Coherent Waveforms Using Multiplatform Score," Pre-

(56) References Cited

OTHER PUBLICATIONS sented in Proc. Twenty- Fourth Asilomar Conf. on Signals, Systems, and Computers, 1990. Maple Press.
Agee, B., Young, D., "Blind Capture and TDOA Estimation of Stationary Waveforms Using Multiplatform Temporal cross Coherence Restoral," Nov. 4, 1990.
IEEE Std 802.16e™-2005 and IEEE Std 802.16™-2004/Corl-2005 (Amendment and Corrigendum to IEEE Std 802.16/2004), "IEEE Standard for Local and metropolitan area networks, Part 16: Air Interface for Fixed and Mobile Broadband Wireless Access Systems, Amendment 2: Physical and Medium Access control Layers for Combined Fixed and Mobile Operation in Licensed Bands and Corrigendum 1," Feb. 28, 2006.
IEEE Std 802.11a-1999 (R2003) (Supplement to IEEE Std 802.11-1999); [Adopted by ISO/IEC and redesignated as ISO/IEC 8802-11:1999/Amd; 1:2000(E)], "Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-speed Physical Layer in the 5 GHz Band," Reaffirmed Jun. 12, 2003.
IEEE Std 802.11b-1999 (R2003) (Supplement to ANSI/IEEE Std 802.11, 1999 Edition) "Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, Higher-Speed Physical Layer Extension in the 2.4 GHz Band," Reaffirmation Jun. 12, 2003, Approved Sep. 16, 1999.
IEEE Std 802.11g™-2003, (Amendment to IEEE Std 802.11™, 1999 Edition (Reaff 2003) as amended by IEEE Stds 802.11a™-1999, 802.11b™-1999, 802.11b™-1999/Cor Jan. 2001, and 802.11d™-2001), "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 4: Further Higher Data Rate Extension in the 2.4 GHz Band," Jun. 27, 2003.
IEEE Std 802.11n™-2009 , (Amendment to IEEE Std 802.11™-2007, as amended by IEEE Std 802.11k™-2008, IEEE Std 802.11r™-2008, IEEE Std 802.11y™-2008, and IEEE Std 802.11w™-2009), "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput," Oct. 29, 2009.
IEEE Std 802.16 1m-2009 (Revision of IEEE Std 802.16/2004), "IEEE Standard for Local and metropolitan area networks, Part 16: Air Interface for Broadband Wireless Access Systems," May 29, 2009.
IEEE Std 802.11 e/D4.3, May 2003 (Draft Supplement to IEEE Std 802.11, 1999 Edition), "Draft Supplement to Standard for Telecommunications and Information Exchange Between Systems—LAN/MAN Specific Requirements-Part 11: Wireless Medium Access Control (MAC) and Physical Layer (PHY) specifications: Medium Access Control (MAC) Enhancements for Quality of Service (QoS)," Copyright 2003.
3GPP TS 36.101 V8.0.0 (Dec. 2007) Technical Specification, "3rd Generation Partnership Project; Technical Specification Group Radio Access Network; Evolved Universal Terrestrial Radio Access (E-UTRA); User Equipment (UE) radio transmission and reception (Release 8)," Copyright 2007.
3GPP TS 36.101 V9.5.0 (Oct. 2010) Technical Specification, 3rd Generation Partnership Project; Technical Specification Group Radio Access Network; Evolved Universal Terrestrial Radio Access (E-UTRA); User Equipment (UE) radio transmission and reception (Release 9), Copyright 2010.
Agee, B., "LMS/Part 15 Internetwork Interference Study Results-to-Date," Feb. 23, 2001.
G. Foschini, "Layered Space-Time Architecture for Wireless Communication in a Fading Environment When Using Vlulti-Element Antennas," Bell Labs Technical Journal, 41-59, 1996.
Bahadori, M. And Psounis, K, "On the Performance of Multiuser MIMO Mesh Networks," University of Southern Califomia, pp. 1-12, Aug. 2010.
Hieu, Nguyen Trung, et al. "FPGA Design and Implementation of MIMO-OFDM SDM Systems for High Speed Wireless Communications Networks." International Journal of Research in Wireless Systems, vol. 2, No. 2, pp. 26-33, Jun. 2013.
Pascual-Iserte, Antonio, Ana I. Pérez-Neira, and Miguel Ángel Lagunas. "An approach to optimum joint beamforming design in a MIMO-OFDM multiuser system." EURASIP Journal on Wireless Communications and Networking 2004.2, pp. 210-221, 2004.
Xiang, Weidong, et al. "A high-speed four-transmitter four-receiver MIMO OFDM testbed: Experimental results and analyses." EURASIP Journal on Applied Signal Processing, vol. 2006, pp. 1-10, 2006.
S.M. Alamouti, "A simple transmit diversity technique for wireless communications," IEEE Journal on Selected Areas in communications (JSAC), pp. 1451-1458, vol. 16, No. 8, Oct. 1998.
Chunlong Guo, et al., "Low power distributed MAC for ad hoc sensor radio networks," Dept. of Electr. Eng. & Comput. Sci., California Univ., Berkeley, CA, Global Telecommunications Conference, 2001. Globecom '01. IEEE vol. 5.
R. Pabst, "Relay-based deployment concepts for wireless and mobile broadband radio," IEEE Communications Magazine, 2004,10 pages.
I. Akyildiz, "A Survey on Wireless Mesh Networks," Communications Magazine, IEEE, 2005, p. S23-S30.
B. Xu, "The role of ad hoc networking in future wireless communications," Technology Proceedings, 2003, p. 1353-1358.
J. Chuang, "Beyond 3G: Wideband wireless data access based on OFDM and dynamic packet assignment," Communications Magazine, IEEE, 2000, pp. 78-87.
Y. Li, "Transmitter diversity for OFDM systems and its impact on high-rate data wireless networks," IEEE Journal on Selected Areas in Communications, 1999, pp. 1233-1243.
R. Becher, "Broadband wireless access and future communication networks," Proceedings of the IEEE, 2001, pp. 58-75.
R. Grunheid, "Self-organised beamforming and opportunistic scheduling in an OFDM-based cellular network," IEEE 2006, pp. 813-817.
K. Aretz, "The future of wireless communications beyond the third generation," Computer Networks, Elsevier Science, 2001, pp. 83-92.
A. Dowler, "Performance evaluation of channel estimation techniques for a mobile fourth generation wide area OFDM system," IEEE 56th, 2002, 5 pages.
M. Flament, "Propagation and Interference Issues in a 60 GHz Mobile Network," Proc. of the 2nd Personal Computing and Communications Workshop, 1999, 5 pages.
Whu, Enrique Ulffe. "MIMO-OFDM Systems for High Data Rate Wireless Networks." Proj. Report for EE360 Advanced wireless Networks: MIMO-OFDM Wireless Networks, 2003, pp. 1-7.
Gkelias, Athanasios, and Kin K. Leung. "Multiple antenna techniques for wireless mesh networks." Wireless Mesh Networks. Springer US, 2007, pp. 1-33.
Stuber, Gordon L., et al. "Broadband MIMO-OFDM wireless communications." Proceedings of the IEEE 92.2 (2004): 271-294.
Kim, Chan Kyu, Kwangchun Lee, and Yong Soo Cho. "Adaptive beamforming algorithm for OFDM systems with antenna arrays." Consumer Electronics, IEEE Transactions on 46.4 (2000): 1052-1058.
Kapoor, Samir, Daniel J. Marchok, and Yih-Fang Huang. "Adaptive interference suppression in multiuser wireless OFDM systems using antenna arrays." Signal Processing, IEEE Transactions on 47.12 (1999): 3381-3391.
Kim, Chan Kyu, Songin Choi, and Yong Soo Cho. "Adaptive beamforming for an OFDM system." Vehicular Technology Conference, 1999 IEEE 49th. vol. 1. IEEE, 1999.

(56) References Cited

OTHER PUBLICATIONS

Yoshino, Hitoshi, and Andreas Czylwik. "Adaptive co-channel interference (CCI) cancellation for OFDM communication systems." Broadband Communications, 2000. Proceedings. 2000 International Zurich Seminar on. IEEE, 2000.
Fujii, Takeo, and Masao Nakagawa. "Indoor multi-base stations system with simultaneous transmission using OFDM adaptive array antenna." Personal, Indoor and Mobile Radio Communications, 2000. PIMRC 2000. The 11th IEEE International Symposium on. vol. 2. IEEE, 2000.
Morinaga, Norihiko, Masao Nakagawa, and Ryuji Kohno. "New concepts and technologies for achieving highly reliable and high-capacity multimedia wireless communications systems." Communications Magazine, IEEE 35.1 (1997): 34-40.
Kohno, Ryuji. "Evolution and demands of SoC in ITS and mobile communication systems." Semiconductor Manufacturing, 2000. Proceedings of ISSM 2000. The Ninth International Symposium on. IEEE, 2000.
Steiner, Bernd. "Uplink performance of a multicarrier-CDMA mobile radio system concept." Vehicular Technology Conference, 1997, IEEE 47th. vol. 3. IEEE, 1997.
Matsumoto, Tadashi. "A Technical Survey and Future Prospects of Adaptive Array Antennas in Mobile Communications." NTT Docomo Technical Journal 5.4 (1998): p. 25-36.
Paulraj et al., "Space-Time Processing for Wireless Communications", Nov. 1997, IEEE Signal Processing Magazine.
Paulraj et al., "Taxonomy of space-time processing for wireless networks", Feb. 1, 1998, IEE Proceedings: Radar, Sonar & Navigation, GB, Institution of Electrical Engineers, vol. 145, No. 1.
B. Widrow et al., "Adaptive Antenna Systems," Proc. IEEE, vol. 55, No. 12, pp. 2143-2159 (Dec. 1967).
S.P. Applebaum, "Adaptive Arrays," IEEE Trans. Antennas & Propag., vol. AP-24, No. 5, pp. 585-598 (Sep. 1976).
R. T. Compton, Jr., "Adaptive Antennas-Concepts and Performance," Prentice-Hall, Englewood Cliffs (1988). pp. 6-11.
Ye (Geoffrey) Li, Senior Member, IEEE, Nambirajan Seshadri, Senior Member, IEEE, and Sirikiat Ariyavisitakul, Senior Member, IEEE; "Channel Estimation for OFDM Systems with Transmitter Diversity in Mobile Wireless Channels"; IEEE Journal on Selected Areas in Communications, vol. 17, No. 3, Mar. 1999, pp. 461-471.
Georgios B. Giannakis, Fellow, IEEE, and Cihan Tepedelenlioglu: "Basis Expansion Models and Diversity Techniques for Blind Identification and Equalization of Time-Varying Channels"; Proceedings of the IEEE, vol. 86, No. 10, Oct. 1998, pp. 1969-1986.
Ove Edfors, Magnus Sandell, Jan-Jaap van de Beek, Sarah Kate Wilson, Per Ola Borjesson; "Analysis of DFT-based channel estimators for OFDM*", presented in part at the 1995 Vehicular Technology Conference (VTC'96) in Chicago, IL, Jul. 25-28, 1995, pp. 815-819.
A.J. Paulraj and Boon Chong Ng; "Space-Time Modems for Wireless Personal Communications"; IEEE Personal Communications; Feb. 1998, pp. 36-48.
H. Sari, G. Karam, and I. Jeanclaude; "Transmission Techniques for Digital Terrestrial TV Broadcasting"; IEEE Communications Magazine, Feb. 1995; pp. 100-109.
Martin V Clark, Senior Member, IEEE; "Adaptive Frequency-Domain Equalization and Diversity Combining from Broadband Wireless Communications"; IEEE Journal on Selected Areas in Communications, vol. 16, No. 8, Oct. 1998; pp. 1385-1395.
Friedlander "Direction Finding Using an Interpolated Array", 1990 IEEE Publication, pp. 2951-2954.
Friedlander et al. "Direction Finding for Wideband Signals Using an Interpolated Array", 1991, IEEE Publication, pp. 583-587.
Search Report for International Application No. PCT/US98/27154 mailed Apr. 29, 1999.
Carbonelli et al., "Evaluation of Near-End Crosstalk Noise Affecting ADSL Systems," Singapore ICCS Conference, Nov. 1994, pp. 630-634.
Sendonaris et al., "Joint Signaling Strategies for Approaching the Capacity of Twisted Pair Channels," IEEE Transactions on Communications, vol. 46, No. 5, May 1998, pp. 673-685.
Bingham, "Multicarrier Modulation for Data Transmission: An Idea Whose Time Has Come," IEEE Communications Magazine, May 1990, pp. 5-14.
Barton et al., "Optimization of Discrete Multitone to Maintain Spectrum Compatibility with Other Transmission Systems on Twisted Copper Pairs," IEEE Journal on Selected Areas in Communications, vol. 13, No. 9, Dec. 1995, pp. 1558-1563.
Kerpez, "Near-End Crosstalk is Almost Gaussian," IEEE Transactions on Communications, vol. 41, No. 1, Jan. 1993, pp. 670-672.
Kalet, "The Multitone Channel," IEEE Transactions on Communications, vol. 37, No. 2, Feb. 1989, pp. 119-124.
Aslanis, Jr. et al., "Achievable Information Rates on Digital Subscriber Loops: Limiting Information Rates with Crosstalk Noise," IEEE Transactions on Communications, vol. 40, No. 2, Feb. 1992, pp. 361-372.
Chow et al., "A Practical Discrete Multitone Transceiver Loading Algorithm for Data Transmission over Spectrally Shaped Channels," IEEE Transactions on Communications, vol. 43, No. 2/3/4, Feb./Mar./Apr. 1995, pp. 773-775.
Kalet et al., "On the Capacity of a Twisted-Wire Pair: Gaussian Model," IEEE Transactions on Communications, vol. 38, No. 3, Mar. 1990, pp. 379-383.
Werner, "The HDSL Environment," IEEE Journal on Selected Areas in Communications, vol. 9, No. 6, Aug. 1991, pp. 185-800.
Andrew Sendonaris, "Joint Signaling Strategies for Maximizing the Capacity of Twisted Pair Loops", (13 pp.), Oct. 1995.
J. Hirono, M. Saito and C. Kamise, "Digital Terrestrial Television Broadcasting with OFDM—A Study on the Performance of Single Frequency Networks—International Broadcasting Convention," p. 178-183 (Sep. 1996).
P.A. Voois, "Two-dimensional Signal Processing for Magnetic Storage Systems," Ph.D. Thesis, Stanford University, Stanford, CA, pp. 1-136 (Dec. 1993).
Ohkawa, Kouichi, "Performance of Multicarrier Trellis-Coded 8PSK Using Frequency Hopping in Rayleigh Fading Channels," National Conference Publication—Institution of Engineers, Australia, National Conference, vol. 1, p. 145-149, Nov. 20-24, 1994.
Sourour, Essam A., "Performance of Orthogonal Multicarrier CDMA in a Multipath Fading Channel," IEEE Transactions on Communications, vol. 44, No. 3, p. 356-367, Mar. 1996.
Ichikawa, Hirofumi, "Frequency Diversity Effects in Multicarrier Digital Radio Systems," Electronics and Communications in Japan, Part 1, vol. 74, No. 8, p. 70-77, Aug. 1991.
Gudmundson, Mikael, "Spectral Efficiency of a Multitone Frequency Hopping System for Personal Communication Systems," IEEE Vehicular Technology Conference, Part 3 (of 3) Stockholm, vol. 3, p. 1650-1654, Jun. 8-10, 1994.
Gulliver, T. Aaron, "Order Statistics Diversity combining in Worst Case Noise and Multitone Jamming," IEEE Vehicular Technology Conference, vol. 2, p. 804-809, Jul. 25-28, 1995.
Monnier, R., "Digital Television Broadcasting with High Spectral Efficiency," IEEE Conference Publication No. 358, p. 380-384, Jul. 1992.
Del Re, Enrico, "Digital Multicarrier Demodulator for Regenerative Communication Satellites," Alta Frequenza, vol. 57, No. 10, p. 545-559, Dec. 1988.
Omori, Youko, "Multicarrier 16QAM System in Land Mobile Communications," IEICE Transactions on Communications, vol. E77-B, No. 5, p. 634-640, May 1994.
Ananasso, Fulvio, "Clock Synchronous Multicarrier Demodulator for Multi-Frequency TDMA Communications Satellites," IEEE International Conference on Communications, vol. 3, p. 1059-1063, 1990.
Friese, M., "Multicarrier Modulation with Low Peak-to-Average Power Ratio," Electronics Letters, vol. 32, No. 8, p. 713-714, Apr. 11, 1996.
Benyassine, Adil, "Optimal Subchannel Structuring and Basis Selection for Discrete Multicarrier Modulation," IEEE Communication Theory Mini-Conference, Proceedings, CTMC, p. 97-101, 1995.

(56) References Cited

OTHER PUBLICATIONS

Sawahashi, M., "Multicarrier 16QAM Transmission with Diversity Reception," Electronics Letters, vol. 32, No. 6, p. 522-523, Mar. 14, 1996.
Daffara, Flavio, "A New Frequency Detector for Orthogonal Multicarrier Transmission Techniques," IEEE 45th Vehicular Technology Conference, p. 804-809, Jul. 25-28, 1995.
C.E. Shannon, "Mathematical Theory of Communications: Part 1 and Part II," The Bell System Technical Journal, pp. 379-423, 623-656, 1948.
Vaidyanathan, Palghat P., and Bojan Vrcelj. "Fast and robust blind-equalization based on cyclic prefix." IEEE International Conference on Communications. vol. 1., 2002, 5 pages.
Vaidyanathan, Palghat P., and Bojan Vrcelj. "On power allocation for generalized cyclic-prefix based channel equalizers." Circuits and Systems, 2002. ISCAS 2002. IEEE International Symposium on. vol. 1. IEEE, 2002, 4 pages.
Vaidyanathan, P. P., and Bojan Vrcelj. "Theory of fractionally spaced cyclic-prefix equalizers." Acoustics, Speech, and Signal Processing (ICASSP), 2002 IEEE International Conference on. vol. 2. IEEE, 2002, 4 pages.
Visotsky, et al., "Optimum Beamforming Using Transmit Antenna Arrays, "Vehicular Technology Conference, 1999 IEEE 4th, vol. 1, pp. 851-856.
Furukawa, Hiroshi, Kojiro Hamage, and Akihisa Ushirokawa. "SSDT-site selection diversity transmission power control for CDMA forward link." Selected Areas in Communications, IEEE Journal on 18.8, Aug. 2000, pp. 1546-1554.
Rashid-Farrokhi, F., L. Tassiulas, and K. J. R. Liu. "Joint power control and beamforming for capacity improvement in wireless networks with antenna arrays." Global Telecommunications Conference, 1996, Globecom'96, Communications: The Key to Global Prosperity. vol. 1. IEEE, 1996, pp. 555-559.
Office Action from U.S. Appl. No. 13/840,949 mailed Jun. 16, 2014.
Office Action from U.S. Appl. No. 13/840,630 mailed Aug. 21, 2014.
Notice of Allowance from U.S. Appl. No. 13/010,629 mailed Aug. 27, 2014.
Office Action from U.S. Appl. No. 14/309,332, mailed Aug. 27, 2014.
Office Action from U.S. Appl. No. 14/480,535 mailed Nov. 4, 2014.
Office Action from U.S. Appl. No. 14/480,542 mailed Dec. 8, 2014.
Notice of Allowance from U.S. Appl. No. 14/253,593 mailed Dec. 15, 2014.
Office Action from U.S. Appl. No. 14/253,616, mailed Jan. 20, 2015.
Yu, Wei, et al. "Iterative water-filling for Gaussian vector multiple-access channels." Information Theory, IEEE Transactions on 50.1 (2004): 145-152.
Liejun, Wang. "An improved water-filling power allocation method in MIMO OFDM systems." Information technology ourna 10.3 (2011): 639-647.
Palomar, Daniel Pérez, and Javier Rodriguez Fonollosa. "Practical algorithms for a family of waterfilling solutions." Signal Processing, IEEE Transactions on 53.2 (2005): 686-695.
Cioffi, John M. "Chapter 4: Multi-Channel Modulation." Lectures on Digital Communications, Stanford University, Available from http://www. stanford. edu/class/ee379c (2001): 288-421.
Tehrani, Ardavan Maleki, et al. "An implementation of discrete multi-tone over slowly time-varying multiple-input/multiple-output channels." Global Telecommunications Conference, 1998. Globecom 1998. The Bridge to Global Integration. IEEE. vol. 5. IEEE, 1998.
Wong, Cheong Yui, et al. "Multiuser OFDM with adaptive subcarrier, bit, and power allocation." Selected Areas in Communications, IEEE Journal on 17.10 (1999): 1747-1758.
Shen, Zukang. "Multiuser OFDM Capacity Analysis with Partial Channel Information." Multiuser Wireless Communications Course Project, Fall (2002), 11 pages.

Y. Li, H. Murata, S. Yoshida, "Near Capacity Multiple Access Scheme for Interference Channel Using Complex—Valued Signals," Electronics Letters, Oct. 29, 1998, vol. 34, No. 22.
B. Agee, M. Bromberg, D. Gerlach, M. Ho, M. Jesse, D. Stephenson, R. Mechaley, T. Golden, D. Nix, R. Naish, D. Gibbons, R. Maxwell, E. Hoole, and D. Ryan, "Highly bandwidth-efficient communications," US Patent, Aug. 27, 1998.
N.R. Goodman, "Statistical analysis based on a certain multivariate complex Gaussian distribution (an introduction)," Annals of Mathematical Statistics, vol. 34, No. 1, pp. 152-177, Mar. 1963.
C. Johnson, R. Horn, "Matrix Analysis", Cambridge University Press, 1985.
M. Hata, "Empirical formula for propagation loss in land mobile radio services," IEEE Transactions on Vehicular Technology, vo. VT-29, pp. 317-325, Aug. 1980.
Hara, Shinsuke, S. Hane, and Y. Nara. "Adaptive antenna array for reliable OFDM transmission." Proc. 6th Int. OFDM Workshop. 2000.
S. A. Fechtel and H. Meyr, "Optimal Feedforward Estimation of Frequency-Selective Fading Radio Channels using Statistical Channel Information," in Proc. Supercomm/ICC '92, vol. 2, (Chicago, IL), pp. 677-681,1 1992.
L.H. Brandenburg and A.D. Wyner, "Capacity of the Gaussian channel with Memory: The Multivariate Case," Bell Syst. Tech. Journ., vol. 53(5), pp. 745-778, May-Jun. 1974.
J. Salz, Digital Transmission Over Cross-Coupled Linear Channels, AT & T Tech. Journ., vol. 64(6), pp. 1147-1159, Jul.-Aug. 1985.
A. Duel-Hallen, "Equalizers for Multiple Input Multiple Output Channels and PAM Systems with Cyclostationary Input Sequences," IEEE Journ. on Sel. Areas in Comm., vol. 10(3), pp. 630-639, Apr. 1992.
J. Yang and S. Roy, "On Joint Transmitter and Receiver Optimization for Multiple-input Multiple-output (MIMO) Transmission Systems," IEEE Trans. Commun, vol. 42-(12), pp. 3221-3231, Dec. 1994.
J. Yang and S. Roy, "Joint Transmitter-Receiver Optimization for Multi-Input Multi-Output Systems with Decision Feedback," IEEE Trans. Information Theory, vol. 40(5), pp. 1334-1347, Sep. 1994.
D.C. Cox and R.P. Leck, "Distributions of Multipath Delay Spread and Average Excess Delay for 910 Mhz Urban Mobile Radio Paths," IEEE Trans. Antennas and Prop., vol. AP-23, pp. 206-213, Mar. 1975.
S.B. Weinstein and P.M. Ebert, "Data Transmission by Frequency-Division Multiplexing Using the Discrete Fourier Transform," IEEE Transactions on Communications, vol. 19(5), pp. 628-634, Oct. 1971.
A. Ruiz, J.M. Cioffi, and S. Kasturia, "Discrete Multiple Tone Modulation with Coset Coding for the Spectrally Shaped—Channel," IEEE Trans. Commun, vol. 40(6), pp. 1012-1029, Jun. 1992.
R.M. Gray, "On the Asymptotic Eigenvalue Distribution of Toeplitz Matrices," IEEE Trans. Information Theory, vol. vol. 18, pp. 725-730, Jun. 1972.
G. Forney, "Maximum-Likelihood Sequence Estimation of Digital Sequences in the Presence of Intersymbol Interference," IEEE Trans. Inform. Theory, vol. IT-18(3), pp. 363-378, May 1972.
J.L. Holsinger, "Digital Communications Over Fixed Time-Continuous Channels With Memory, with Special Application to Telephone Channels," M.I.T. Research Laboratory Electronics Report, vol. 430, 1964.
R.J. Muirhead, "Aspects of Multivariate Statistical Theory", New York: John Wiley, chapters 4 and 5, 1982.
W.C. Jakes, "Microwave Mobile Communications", New York: John Wiley, chapters 1, 5 and 6, 1974.
W. R. Braun and U. Dersch, "A Physical Mobile Radio Channel Model," IEEE Trans. Vehicular Technology, vol. 40, pp. 472-482, May 1991.
A.E. Bryson and T.C. Ho, "Applied Optimal Control", Washington D.C. Hemisphere Publishing, pp. 24-29, 1968.
S. Kasturia, J. Aslanis, and J.M. Cioffi, "Vector Coding for Partial-Response Channels," IEEE Transactions on Information Theory, vol. 36(4), pp. 741-762, Jul. 1990.

(56) References Cited

OTHER PUBLICATIONS

E. Biglieri, D. Divsalar, P.J. Mclane, and M.K. Simon, "Introduction to Trellis Coded Modulation with Applications", New York: Macmillan Publishing, 1991.

P. Lancaster, "Theory of Matrices", New York: Academic Press, chapter 2, 1969.

Justin C.-I. Chuang, "Burst Coherent Demodulation with Combined Symbol Timing, Frequency Offset Estimation, and Diversity Selection," IEEE Transactions on Communications, vol. 39, No. 7, pp. 1157-1164, Jul. 1991.

Leonard J. Cimini, Jr., "Analysis and Simulation of a Digital Mobile Channel Using Orthogonal Frequency Division Multiplexing," IEEE Transactions on Communications, ol. Co. 33, No. 7, pp. 665-675, Jul. 1985.

Notice of Allowance from U.S. Appl. No. 14/253,593 mailed Apr. 16, 2015.

Notice of Allowance from U.S. Appl. No. 14/309,332 mailed Apr. 10, 2015.

I. Delaney, B. Agee, M. Buckner, R. Buehrer, J. Cafarella, P. Dickenson, J. Freebersyer, R. Gonzales, A. Ivers, Kind, G. Minden, J. Mitola, R. Nowak, G. Roussos, R. Tingley, C. Ford, N. Haller, Toward a Universal Radio Frequency System for Special Operations Forces, National Research Council, 2009, Washington, DC: The National Academies Press.

T. Rappaport, B. Woerner, J. Reed, "Wireless Personal Communications: Trends and Challenges," pp. 69-80, 1994.

G. Raleigh et al., "A Blind Adaptive Transmit Antenna Algorithm for Wireless Communication," in IEEE International Communications Conference on Communications, Jun. 1995.

D. Gerlach, A. Paulraj, "Spectrum Reuse Using Transmitting Antenna Arrays with Feedback," in Proc. International Conference on Acoustics, Speech, and Signal Processing, pp. 97-100, Apr. 1994.

D. Gerlach, A. Paulraj, "Adaptive Transmitting Antenna Arrays with Feedback," in IEEE Signal Processing Letters, vol. 1, No. 10, pp. 150-152, Oct. 1994.

D. Gerlach, A. Paulraj, "Adaptive Transmitting Antenna Methods for Multipath Environments," Global Tele Conf., 1994.

G. Raleigh, V. Jones, "Multivariate Modulation and Coding for Wireless Communication," in IEEE Journal on Selected Areas in Communications, vol. 17, No. 5, May 1999.

S. Swales, M. Beach, D. Edwards, J. McGeehan, "The performance enhancement of multibeam adaptive base station for antennas for cellular land mobile radio systems," IEEE Trans. Vehic. Tech., vol. VT-39, pp. 56-67, Feb. 1990.

P. Chow, J. Tu, J. Cioffi, "Performance Evaluation of a Multichannel Transceiver System for ADSL and VHDSL Services," IEEE Journal on Selected Areas in Comm., vol. 8, No. 4, Aug. 1991.

B. Agee, P. Kelly, D. Gerlach, "The backtalk airlink for full exploitation of spectral and spatial diversity in Wireless Communication Systems," Proc. Fourth Workshop on Smart Antennas in Wireless Mobile Communications, Jul. 1997.

R. Cheng, S. Verdu, "Gaussian Multiaccess Channels with ISI: Capacity Region and Multiuser Water-Filling," IEEE Transactions on Information Theory, vol. 39, No. 3, May 1993.

J. Litva, T. Lo, "Digital Beamforming in Wireless Communications," 1996.

F. Rashid-Farrokhi, L. Tassiulas, K.J. Liu, "Joint optimal power control and beamforming in wireless networks using antenna rays," IEEE Transactions on Communications, vol. 46, No. 10, pp. 1313-1324, Oct. 1998.

G. Raleigh, J. Cioffi, "Spatio-Temporal Coding for Wireless Communications," IEEE Trans. Comm., Mar. 1998, vol. 16, No. 3, pp. 357-366.

G. Raleigh, J. Cioffi, "Spatio-Temporal Coding for Wireless Communications," Proc. 1996 Global Telecommunications Conf., pp. 1809-1814, Nov. 1996.

G. Foschini, M. Gans, "On Limits of Wireless Communication in a Fading Environment When Using Multiple Antennas," Wireless Personal Comm., vol. 6, No. 3, pp. 311-335, Mar. 1998.

T.M. Cover, J.A. Thomas, "Elements of Information Theory," 1991.

K. Boulle, G. Femenias, R. Augsti, "An Overview of Trellis Coded Modulation Research in COST 231," in IEEE PIMRC 94, pp. 105-109, Sep. 1994.

W. Gardner, "Multiplication of Cellular Radio Capacity by Blind Adaptive Spatial Filtering," Proc. IEEE International Conference on Selected Topics in Wireless Communication, Jun. 1992, pp. 102-106.

R.S. Cheng, S. Verdu, "On Limiting Characterizations of Memoryless Multiuser Capacity Regions," IEEE Transactions on Information Theory, vol. 39, No. 2, Mar. 1993.

S. Verdu, "The Capacity Region of the Symbol-Asynchronous Gaussian Multiple-Access Channel," IEEE Transactions on Information Theory, vol. 35, No. 4, Jul. 1989.

B. Suard, G. Xu, H. Liu, T. Kailath, "Uplink Channel Capacity of Space-Division-Multiple-Access Schemes," IEEE Transactions on Information Theory, vol. 44, No. 4, Jul. 1998.

B. Suard, G. Xu, H. Liu, T. Kailath, "Channel Capacity of Spatial Division Multiple Access Schemes," 1994 Conference Record of the Twenty-Eighth Asilomar Conference on Signals, Systems, and Computers, vol. 2, pp. 1159-1163, 1994.

G. Raleigh, V. Jones, "Adaptive Antenna Transmission for Frequency Duplex Digital Wireless Communication," Proc. IEEE ICC, vol. 2, pp. 641-646, Jun. 1997.

Chunchang et al, "On the Performance of Eigen Based Beamforming in LTE-Advanced," Sep. 2009, 2009 IEEE 20th International Symposium on Personal, Indoor and Mobile Radio Communications (PIMRC).

Farrokh Rashid-Farrokhi, "Transmit Beamforming and Power Control for Cellular Wireless Systems," IEEE Journal on Selected Areas in Communications, vol. 16, No. 8, Oct. 1998.

J.H. Chang et al., "Joint Transmitter and Receiver Beamforming for Maximum Capacity in Spatial Division Vlultiaccess," Proc. 35th Annual Allerton Conf. on Communication, Control and Computing in Spatial Division Multiaccess, 1997.

Bromberg, M. Agee, B., "Optimization of Spatially Adaptive Reciprocal Multipoint Communication Networks," IEEE Transactions on Communications, vol. 51, No. 8, Aug. 2003.

B. Agee, R. Kleinman, J. Reed, "Soft Synchronization of Direct Sequence Spread Spectrum Signals," IEEE Trans. Comm., vol. COM-44, No. 11, pp. 1527-1536, Nov. 1996.

B. Agee, "Solving the Near-Far Problem: Exploitation of Spatial and Spectral Diversity in Wireless Personal Communication Networks," (1994).

R. Mendoza, J. Reed, T. Hsia, B. Agee, "Interference Rejection Using Time-Dependent Constant Modulus Algorithms and a Hybrid CMA/SCD," IEEE Trans. ASSP, Jul. 1991.

B. Agee, S. S Schell, W. Gardner, "Spectral Self-Coherence Restoral: A New Approach to Blind Adaptive Signal Extraction Using Antenna Arrays," IEEE Proceedings, vol. 78, No. 4, pp. 753-767, Apr. 1990.

3rd Generation Partnership Project 2, "Physical Layer Standard for cdma2000 Spread Spectrum Systems," Release 0, 3GPP2 C.S0002-02, Version 1.13, Apr. 24, 2001.

3rd Generation Partnership Project 2, "Medium Access Control (MAC) Standard for cdma 2000 Spread Spectrum Systems," Release 0—Addendum 2, 3GPP2 C.S0003-0-2, Version 1.0, Apr. 24, 2001.

3rd Generation Partnership Project 2, "Signaling Link Access Control (LAC) Standard for cdma 2000 Spread Spectrum Systems—Addendum 2," 3GPP2 C.S0004-0-2, Version 1.0, Apr. 24, 2001.

3rd Generation Partnership Project 2, "Upper Layer (Layer 3) Signaling Standard for cdma 2000 Spread Spectrum Systems," Release 0 Addendum 2, 3GPP2 C.S0005-0-2, Version 1.0, Apr. 24, 2001.

3rd Generation Partnership Project, Technical Specification Group GERAN, "Digital cellular telecommunications system (Phase 2+) Physical layer on the radio path; General description," Release 4, 3GPP TS 45.001, V4.0.1, Oct. 2000.

3rd Generation Partnership Project, Technical Specification Group GERAN, "Channel coding," Release 4, 3GPP TS 45.003, V4.0.0, Jan. 2001.

(56) References Cited

OTHER PUBLICATIONS

3rd Generation Partnership Project, Technical Specification Group GSM/EDGE "Radio Access Network; Digital cellular telecommunications system (Phase 2+) Multiplexing and multiple access on the radio path," Release 4, 3GPP TS 45.002, V4.3.1, Apr. 2001.
3rd Generation Partnership Project, Technical Specification Group GSM/EDGE "Radio Access Network, Digital cellular telecommunications system (Phase 2+) Modulation," Release 4, 3GPP TS 45.004, V4.0.0, Apr. 2001.
3rd Generation Partnership Project, Technical Specification Group GSM/EDGE Radio Access Network, "Digital cellular telecommunications system (Phase 2+) Radio transmission and reception," Release 4, 3GPP TS 45.005, V4.3.0, Apr. 2001.
3rd Generation Partnership Project, Technical Specification Group GSM/EDGE Radio Access Network, "Digital cellular telecommunications system (Phase 2+) Radio subsystem link control," Release 4, 3GPP TS 45.008, V4.3.0, Apr. 2001.
3rd Generation Partnership Project, Technical Specification Group GERAN, "Link Adaptation," Release 4, 3GPP TS 15.009, V4.0.0, Jan. 2001.
3rd Generation Partnership Project, Technical Specification Group GSM/EDGE Radio Access Network, "Digital cellular telecommunications system (Phase 2+) Radio subsystem synchronization," Release 4, 3GPP TS 45.010, V4.0.0, Apr. 2001.
3rd Generation Partnership Project, Technical Specification Group Radio Access Network, "Physical channels and mapping of transport channels onto physical channels (FDD)," Release 199, 3GPP TS 25.211, V3.6.0, Mar. 2001.
3rd Generation Partnership Project, Technical Specification Group Radio Access Network, "Multiplexing and channel coding (FDD)," Release 1999, 3GPP TS 25.212, V3.5.0, Dec. 2000.
3rd Generation Partnership Project, Technical Specification Group Radio Access Network, "Spreading and modulation (FDD)," Release 1999, 3GPP TS 25.213, V3.5.0, Mar. 2001.
3rd Generation Partnership Project, Technical Specification Group Radio Access Network, "Physical layer procedures (FDD)," Release 1999, 3GPP TS 25.214, V3.6.0, Mar. 2001.
3rd Generation Partnership Project, Technical Specification Group Radio Access Network, "Physical channels and mapping of transport channels onto physical channels (TDD)," Release 1999, 3GPP TS 25.221, V3.6.0, Mar. 2001.
3rd Generation Partnership Project, Technical Specification Group Radio Access Network, "Multiplexing and channel coding (TDD)," Release 1999, 3GPP TS 25.222, V3.6.0, Mar. 2001.
3rd Generation Partnership Project, Technical Specification Group Radio Access Network, "Spreading and modulation (TDD)," Release 1999, 3GPP TS 25.223, V3.5.0, Mar. 2001.
3rd Generation Partnership Project, Technical Specification Group Radio Access Network, "Physical Layer Procedures (TDD)," Release 1999, 3GPP TS 25.224, V3.6.0, Mar. 2001.
3rd Generation Partnership Project, Technical Specification Group Radio Access Network, "MAC protocol specification," Release 1999, 3GPP TS 25.321, V3/.0, Mar. 2001.
3rd Generation Partnership Project, Technical Specification Group Radio Access Network, "RLC protocol specification," Release 1999, 3GPP TS 25.322, V3.6.0, Mar. 2001.
3rd Generation Partnership Project, Technical Specification Group Radio Access Network, "Packet Data Convergence Protocol (PDCP) Specification," Release 1999, 3GPP TS 25.323, V3.4.0, Mar. 2001.
3rd Generation Partnership Project, Technical Specification Group Radio Access Network, "RRC Protocol Specification," Release 1999, 3GPP TS 25331, V3.6.0, Mar. 2001.
B. Agee, M. Bromberg, "Exploitation of MIMO Network Diversity in Multipoint Communication Networks," presented at the Thirty-Fifth Asilomar Conference Signals, Systems, and Computers, Nov. 2001.
M. Bromberg, B. Agee, "The LEGO Approach for Achieving Max-Min Capacity in Reciprocal Multipoint Networks," in Proc. Thirty Fourth Asilomar Conf Signals, Systems, and Computers, Oct. 2000.
B. Agee, "Exploitation of Internode MIMO Channel Diversity in Spatially Distributed Multipoint Networks," in Proc. Tenth Annual Virginia Tech Symposium on Wireless Personal Comm., Jun. 2000.
B. Agee, S. Bruzzone, M. Bromberg, "Exploitation of Signal Structure in Array-Based Blind Copy and Copy-Aided DF Systems," in Proc. 1998 Intl. Conf on Acoustics, Speech and Signal Proc., pp. 2489-2492, vol. 4, May 1998.
M. Bromberg, B. Agee, "Direction Finding for Unstructured Emitters in the Presence of Structured Interferers," in Proc. 1998 Intl. Conf on Acoustics, Speech and Signal Processing, pp. 2537-2540, vol. 4, May 13, 1998.
E. Krzysiak, D. Branlund, B. Agee, "New Copy-Aided Techniques for Superresolution Direction Finding and Geolocation," in Proc. Fourth Southwest Institute Conference on Direction Finding, Nov. 1997.
J. Treichler, B. Agee, "A New Approach to Multipath Correction of Constant Modulus Signals," IEEE Trans. Acoustics, Speech and Signal Processing, vol. ASSP-31, No. 2, Apr. 1983.
W. Gardner, B. Agee, "Two-Stage Adaptive Noise Cancellation for Intermittent- Signal Applications," IEEE Trans. Information Theory, vol. IT-26, No. 6, Nov. 1980.
B. Agee, "Blind Detection, Separation, and Location of Dense Co-Channel Emitters Using Multiplatform Spatial-Coherence Restoral," in Proc. 2006 IEEE Workshop on Sensor Array and Multichannel Processing, Jul. 2006.
J. Fite, S. Bruzzone, B. Agee, "Blind Separation of Voice Modulated Single-Side- Band Using the Multi-Target Variable Modulus Algorithm," in Proc. 1996 Conf on Acoustics, Speech and Signal Processing, pp. 2726-2729, vol. 5, May 1996.
B. Agee, S. Bruzzone, "Exploitation of Signal Structure in Array-Based Blind Copy and Copy-Aided DF Systems," in Proc. 1994 CRASP Conf on Co-Channel Demodulation, Jun. 1994.
B. Agee, "On the Performance Bounds Adhered to by Copy-Aided DF Algorithms," presented at Twenty-Seventh Asilomar Conference on Signals, Systems and Computers, Nov. 1993.
B. Agee, K. Cohen, J. Reed, T. Hsia, "Simulation Performance of a Blind Adaptive Array for a Realistic Mobile Channel," in Proc. 1993 Conf on Vehicular Technology, May 18, 1993.
B. Agee, J. Reed, "A Technique for Instantaneous Tracking of Frequency Agile Signals in the Presence of Spectrally Correlated Interference;" in Proc. Twenty-Sixth Asilomar Conference on Signals, Systems and Computers, Nov. 1992.
B. Agee, The Property Restoral Approach to Blind Adaptive Signal Extraction, Ph.D. Dissertation, Dept. of Electrical Engineenng, University of California, Davis, CA, Jun. 1989.
B. Agee, "Maximum-Likelihood Approaches to Blind Adaptive Signal Extraction Using Narrowband Antenna Arrays," in Proc. Twenty-Filth Asilomar Conference on Signals, Systems and Computers, Nov. 1991.
B. Agee, "The Copy/DF Approach to Signal-Specific Emitter Location," in Proc. Twenty-Fifth Asilomar Conference on Signals, Systems and Computers, Nov. 1991.
B. Agee, R. Calabretta, "ARMA-Like and ML-Like Copy/DF Approaches for Signal-Specific Emitter Location," in Proc. Fifth ASSP Workshop on Spectrum Estimation and Modelling, 1990.
B. Agee, S. Venkataraman, "Adaptive Demodulation of PCM Signals in the Frequency Domain," in Proc. Twenty-Third Asilomar Conference on Signals, Systems and Computers, Nov. 1989.
B. Agee, "The Baseband Modulus Restoral Approach to Blind Adaptive Signal Demodulation," 1988 Digital Signal rocessing; Workshop, Sep. 1988.
B. Agee, S. Schell, W. Gardner, "The Score Approach to Blind Adaptive Signal Extraction: An Application of the Theory of Spectral Correlation," in Proc. Fourth Assp Workshop on Spectrum Estimation and Modelling, p. 277, Aug. 1988.
B. Agee, "The Least-Squares CMA: A New Approach to Rapid Correction of Constant Modulus Signals," in Proc. 1986 International Conf on Acoustics, Speech and Signal Processing, vol. 2, p. 192.1, Apr. 1986, Tokyo, Japan.

(56) References Cited

OTHER PUBLICATIONS

M.C. Bromberg, B. Agee, "Transmit Beamforming for Optimizing Network Capacity", Jun. 26, 2001.
B. Agee, "Blind Separation and Capture of Communication Signals Using a Multitarget Constant Modulus Beamformer," Adapted from a paper published in Proc. 1989 IEEE Military Comm. Conference, Oct. 1989.
B. Agee, "Fast Acquisition of Burst and Transient Signals Using a Predictive Adaptive Beamformer," Adapted from a paper published in Proc. 1989 IEEE Military Communications Conference, Oct. 1989.
Swales, et. al., "The Performance Enhancement of Multibeam Adaptive Base-Station Antennas for Cellular Land Mobile Radio Systems," IEEE Trans. Veh. Technol. vol. 39 No. 1 Feb. 1990.
Agee, B., Reed, J., Kleinman, R., "Application of Eigenstructure Techniques to Blind Despreading of Direct-Sequence Spread Spectrum Signals," Dec. 3, 1990.
B. Agee, "Convergent Behavior of Modulus-Restoring Adaptive Arrays in Gaussian Interference Environments," in Proc. Twenty-Second Asilomar Conf Signals, Systems and Computers, Nov. 1988.
S. Schell, B. Agee, "Application of the Score Algorithm and Score Extensions to Sorting in the Rank-L Spectral Self-Coherence Environment," in Proc. Twenty-Second Asilomar Conf Signals, Systems, Comp., Nov. 1988.
Agee, B., "Array-Based Techniques for Wireless Telephony," 1995 IEEE Communications Theory Workshop, Apr. 25, 1995.
Kelly, P., Agee, B., Radix Technologies, Inc.,"The Backtalk Communications Airlink," Jan. 18, 1998.
B. Agee, C. Clark, Radix Technologies, "Technical Challenges to Network Based Commercial Geolocation, A Defense Technologist's Perspective," 1997 MPRG Symposium on Wireless Personal Communications, Jun. 12, 1997.
Agee, B., "Efficient Allocation of RF Transceiver Resources in Spatially Adaptable Communication Networks," Jun. 4, 2003.
Bromberg, M., "A Quick Primer on the LEGO Algorithm," 2002.
Radix Technologies, "Live Data MT-CMA Test," 1997.
Bromberg, M.C., "A Hilbert Space Algebra", Masters Thesis in Mathematics, May 1986.
Bromberg, M.C., Brown, D., "The Use of Programmable DSPs in Antenna Array Processing," May 28, 2008.
Bromberg, M.C., "Reliable, High Capacity, Multipoint, Wireless Information Networks," Date Unknown.
Bromberg, M.C., "Optimizing MIMO Multipoint Wireless Networks Assuming Gaussian Other-User Interference." IEEE Transactions on Information Theory, vol. 49, No. 10, Oct. 2003. (IEEE Proof).
Bromberg, M., Agee, B., "Using Channel Reciprocity to Optimize Network Capacity," Oct. 2, 2000.
Agee, B. "Full-Duplex LPI/AJ Communications Using Blindly-Adapted Retrodirective Antenna Arrays," Project "Backtalk" Final Report (Annotated Briefing), Mar. 31, 1994.
Agee, B., "Technical Evaluation of Wireless Broadband Issues & Equipment Alternatives EPRI," BWA Technical Evaluation Final Report Nov. 19, 1999.
Agee, B., "4G Network Enhancements Using the ETSI Digital Audio Broadcast Standard," DAB Application to 4G GWCom Network Jan. 4, 2001.
Agee, B., "Capacity Analysis of LMS Network Scenarios Operating in a Part 15; Network Environment," Apr. 25, 1999.
U.S. Appl. No. 13/840,949, filed Mar. 13, 2015.
U.S. Appl. No. 14/253,579, filed Apr. 15, 2014.
U.S. Appl. No. 13/840,630, filed Mar. 15, 2013.
U.S. Appl. No. 14/253,603, filed Apr. 15, 2014.
U.S. Appl. No. 14/253,616, filed Apr. 15, 2014.
U.S. Appl. No. 14/253,563, filed Apr. 14, 2014.
U.S. Appl. No. 13/022,622, filed Feb. 7, 2011.
U.S. Appl. No. 13/022,619, filed Feb. 11, 2007.
U.S. Appl. No. 13/022,623, filed Feb. 7, 2011.
U.S. Appl. No. 13/022,615, filed Feb. 7, 2011.
U.S. Appl. No. 13/010,629, filed Jan. 20, 2011.
U.S. Appl. No. 11/880,825, filed Jul. 23, 2007.
U.S. Appl. No. 09/878,789, filed Jun. 1, 2010.
U.S. Appl. No. 14/253,593, filed Apr. 14, 2015.
U.S. Appl. No. 10/039,521, filed Oct. 29, 2001.
U.S. Appl. No. 14/309,332, filed Jun. 19, 2014.
U.S. Appl. No. 14/480,535, filed Sep. 8, 2014.
U.S. Appl. No. 14/480,542, filed Sep. 8, 2014.
U.S. Appl. No. 14/734,667, filed Jun. 15, 2009.
U.S. Appl. No. 14/961,445, filed Dec. 15, 2007.
U.S. Appl. No. 14/961,542, filed Dec. 15, 2007.
U.S. Appl. No. 14/961,559, filed Dec. 7, 2015.
U.S. Appl. No. 15/042,280, filed Feb. 12, 2016.
U.S. Appl. No. 15/078,603, filed Mar. 23, 2016.
U.S. Appl. No. 15/076,770, filed Mar. 22, 2016.
Office Action from U.S. Appl. No. 09/878,789 mailed Oct. 12, 2005.
Notice of Allowance from U.S. Appl. No. 10/039,521 mailed Dec. 1, 2005.
Office Action from U.S. Appl. No. 09/878,789 mailed May 2, 2006.
Office Action from U.S. Appl. No. 09/878,789 mailed Oct. 19, 2006.
Notice of Allowance from U.S. Appl. No. 09/878,789 mailed Feb. 13, 2007.
Office Action from U.S. Appl. No. 11/880,825 mailed Jul. 16, 2010.
Office Action from U.S. Appl. No. 11/880,825 mailed Mar. 31, 2011.
Office Action from U.S. Appl. No. 13/022,623 mailed Oct. 6, 2011.
Office Action from U.S. Appl. No. 13/022,615 mailed Nov. 21, 2011.
Office Action from U.S. Appl. No. 13/022,622 mailed Dec. 15, 2011.
Office Action from U.S. Appl. No. 13/022,619 mailed Dec. 23, 2011.
Notice of Allowance from U.S. Appl. No. 11/880,825 mailed Apr. 3, 2012.
Notice of Allowance from U.S. Appl. No. 13/022,615 mailed Apr. 16, 2012.
Notice of Allowance from U.S. Appl. No. 13/022,619 mailed Apr. 27, 2012.
Notice of Allowance from U.S. Appl. No. 13/022,623 mailed Jul. 12, 2012.
Office Action from U.S. Appl. No. 13/010,629 mailed Aug. 14, 2012.
Notice of Allowance from U.S. Appl. No. 13/022,622 mailed Aug. 17, 2012.
Notice of Allowance from U.S. Appl. No. 11/880,825 mailed Sep. 21, 2012.
Notice of Allowance from U.S. Appl. No. 13/022,615 mailed Mar. 12, 2013.
Notice of Allowance from U.S. Appl. No. 13/022,619 mailed Apr. 1, 2013.
Office Action from U.S. Appl. No. 13/010,629 mailed May 21, 2013.
Office Action from U.S. Appl. No. 13/010,629 mailed Aug. 15, 2013.
Notice of Allowance from U.S. Appl. No. 13/010,629 mailed Dec. 23, 2013.
Notice of Allowance from U.S. Appl. No. 13/010,629 mailed Apr. 30, 2014.
Office Action from US. App. No. 13/840,949 mailed Jun. 16, 2014.
Office Action from US. App. No. 13/840,630 mailed Aug. 21, 2014.
Office Action from US. App. No. 14/309,332, mailed Aug. 27, 2014.
Notice of Allowance from US. App. No. 13/010,629 mailed Aug. 27, 2014.
Office Action from US. App. No. 14/480,535 mailed Nov. 4, 2014.
Office Action from US. App. No. 14/480,542 mailed Dec. 8, 2014.
Notice of Allowance from US. App. No. 14/253.593 mailed Dec. 15, 2014.
Office Action from US. App. No. 14/253,616, mailed Jan. 20, 2015.
Office Action from U.S. Appl. No. 14/309,332, mailed Feb. 17, 2015.
Office Action from U.S. Appl. No. 13/840,949, mailed Feb. 18, 2015.
Office Action from U.S. Appl. No. 13/010,629, mailed Mar. 12, 2015.

(56) References Cited

OTHER PUBLICATIONS

Office Action from U.S. Appl. No. 13/840,630, mailed Mar. 13, 2015.
Notice of Allowance from U.S. Appl. No. 14/253,563 mailed Mar. 31, 2015.
Notice of Allowance from U.S. Appl. No. 14/309,332, mailed Apr. 10, 2015.
Notice of Allowance from U.S. Appl. No. 14/253,593, mailed Apr. 16, 2015.
Office Action from U.S. Appl. No. 14/480,542, mailed Apr. 22, 2015.
Office Action from U.S. Appl. No. 14/480,535, mailed Apr. 23, 2015.
Notice of Allowance from U.S. Appl. No. 14/253,616, mailed Jun. 29, 2015.
Notice of Allowance from U.S. Appl. No. 14/480,535, mailed Jul. 13, 2015.
Office Action from U.S. Appl. No. 14/734,667, mailed Jul. 29, 2015.
Office Action from U.S. Appl. No. 13/010,629, mailed Aug. 6, 2015.
Office Action from U.S. Appl. No. 13/840,630, mailed Aug. 14, 2015.
Office Action from U.S. Appl. No. 13/840,949, mailed Aug. 18, 2015.
Notice of Allowance from U.S. Appl. No. 14/480,542, mailed Sep. 8, 2015.
Office Action from U.S. Appl. No. 14/961,542, mailed Jan. 22, 2016.
Office Action from U.S. Appl. No. 13/840,630 mailed Mar. 4, 2016.
Notice of Allowance from U.S. Appl. No. 14/961,542 mailed Mar. 21, 2016.
Notice of Allowance from U.S. Appl. No. 15/042,280 mailed Apr. 11, 2016.
Office Action from U.S. Appl. No. 14/734,667 mailed May 20, 2016.
Office Action from U.S. Appl. No. 15/078,603 mailed Jun. 23, 2016.
Office Action from U.S. Appl. No. 14/961,445 mailed Apr. 7, 2016.
Notice of Allowance from U.S. Appl. No. 14/961,445 mailed Aug. 8, 2016.
Notice of Allowance from U.S. Appl. No. 14/961,559 mailed Apr. 12, 2016.
Notice of Allowance from U.S. Appl. No. 15/076,770 mailed May 11, 2016.

\* cited by examiner

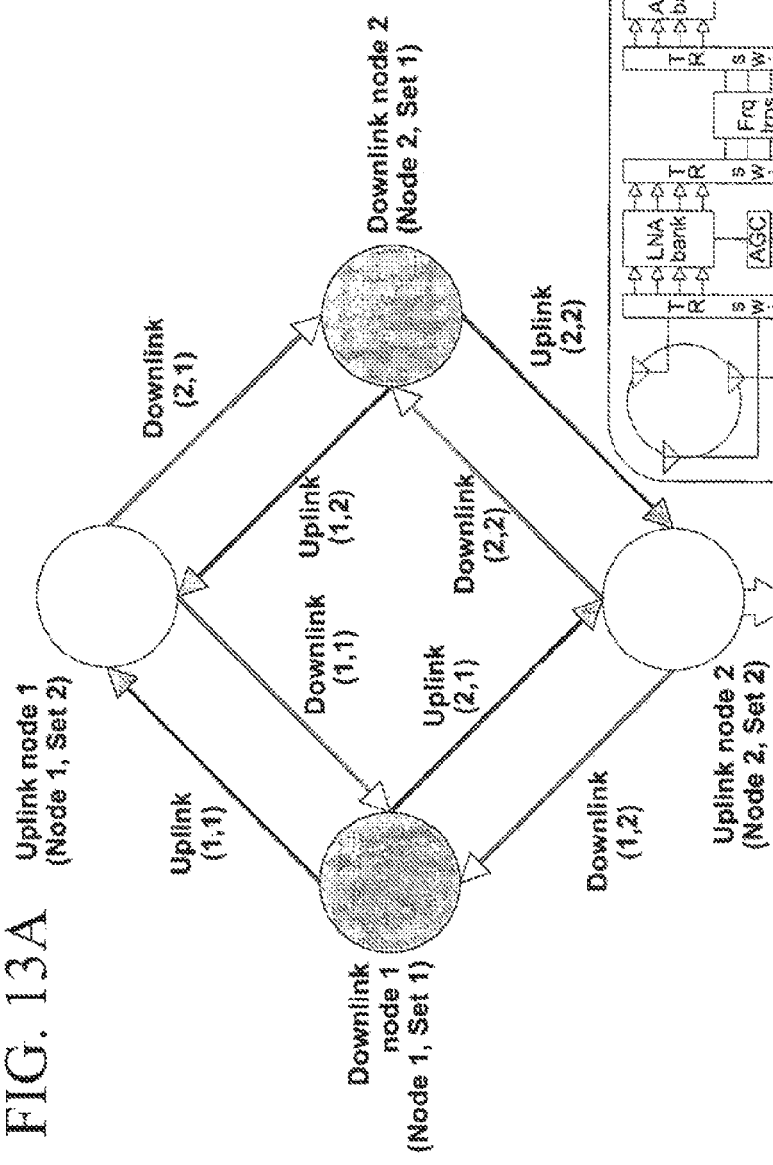
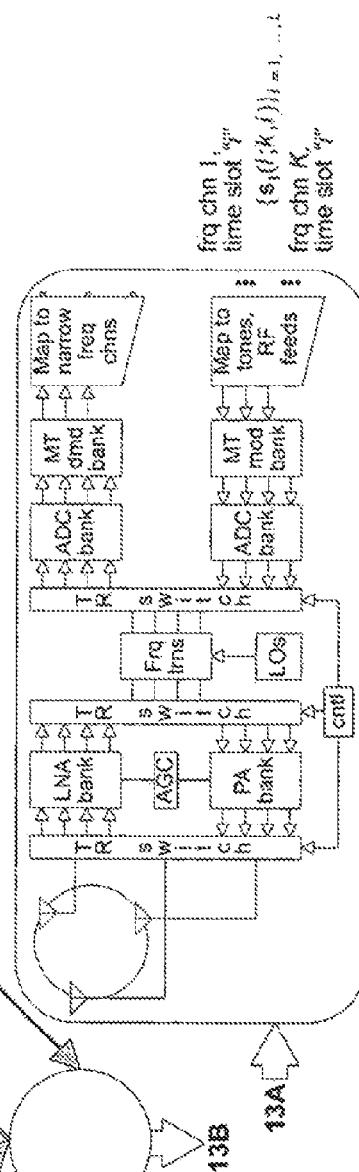
FIG. 13A
FIG. 13B

430 — Detect candidate pilots and spatially whitened adaptation weights $$\eta(m_{embed}; m_{sub}) = \|\mathbf{q}(m_{TNA}; m_{sub})\|^2$$

$$\gamma(m_{embed}; m_{sub}) = \frac{\eta(m_{embed}; m_{sub})}{1 - \eta(m_{embed}; m_{sub})}$$

$$c_{det}(m_{TNA}) = \frac{1}{M_{sub}} \sum_{m_{sub}=1}^{M_{sub}} \log_2\left(1 + \gamma(m_{embed}; m_{sub})\right)$$

$$\{m_{embed}(m)\}_{m=1}^{M_{det}} = m_{embed}(m) \ni \begin{cases} c_{det}(m_{embed}(m)) \geq c_{thresh}, \text{ and} \\ c_{det}(m_{embed}(m)) \geq c_{det}(m_{embed}(m+1)) \end{cases}$$

$$\mathbf{u}_{det}(m_{sub}) = \sqrt{M_{embed}} \left[\mathbf{q}(m_{embed}(1); m_{sub}) \ldots \mathbf{q}(m_{embed}(m_{det}); m_{sub})\right]$$

$$\mathbf{\eta}_{det}(m_{sub}) = \left[\eta(m_{embed}(1); m_{sub}) \ldots \eta(m_{embed}(m_{det}); m_{sub})\right]$$

$$\mathbf{\gamma}_{det}(m_{sub}) = \left[\gamma(m_{embed}(1); m_{sub}) \ldots \gamma(m_{embed}(m_{det}); m_{sub})\right]$$

DATA ROUTING FOR OFDM TRANSMISSION BASED ON OBSERVED NODE CAPACITIES

CROSS-REFERENCE TO RELATED APPLICATIONS

The present application is a continuation of and claims priority to U.S. patent application Ser. No. 14/961,445, filed Dec. 7, 2015, which is a continuation of and claims priority to U.S. patent application Ser. No. 14/480,542, filed Sep. 8, 2014, issues as U.S. Pat. No. 9,209,871, which is a continuation of and claims priority to U.S. patent application Ser. No. 14/309,332, filed Jun. 19, 2014, issued as U.S. Pat. No. 9,106,286, which is a continuation of and claims priority to U.S. patent application Ser. No. 13/010,629, filed Jan. 20, 2011, which is a continuation of and claims priority to U.S. patent application Ser. No. 11/880,825, filed Jul. 23, 2007, issued as U.S. Pat. No. 8,363,744 on Jan. 29, 2013, which is a continuation-in-part of and claims priority to U.S. patent application Ser. No. 09/878,789, filed Jun. 10, 2001, issued as U.S. Pat. No. 7,248,841 on Jul. 24, 2007, each of which is incorporated herein by reference in its entirety for all purposes. Also, U.S. patent application Ser. No. 09/878,789 is a non-provisional of and claims priority to U.S. Provisional Patent Application Ser. No. 60/211,462, filed Jun. 13, 2000, and to U.S. Provisional Patent Application Ser. No. 60/243,831, filed Oct. 27, 2000.

FIELD OF THE INVENTION

The present invention relates to MIMO devices, and more particularly to MIMO devices capable of being utilized in point-to-multipoint and mesh networks.

BACKGROUND

The field of wireless communication networks has challenged implementers with continuously discovered synergies, both positive and negative. The sea of signaling has long grown from scattered and isolated sparks of Morse code to the modern-day roar of intermingling transmissions. The simplicity of the directional link (Point to Point) was replaced by the broadcast (Point to Multipoint) and is being replaced by the mesh (Multipoint to Multipoint) and even the relaying, multi-hop, interactive mesh; also, the continuous-transmission format is being replaced by short and varying packets. The complexities of variations in real world conditions—constantly changing topography, overlapping wave signals, and unpredictable and intermittent faults or blockages—all challenge the existing methods and systems. Further description of some of these problems are discussed as follows.

Wireless electromagnetic communication networks both enable competitive access to fixed link networks, whether they employ fiber, optical, or even copper lines, and provide a competitive alternative (such as linking computers in a WAN, or multiple appliances in an infrared network). The demand for high signal content capacity (above 1 to 2 MB/second) has increased dramatically in the last few years due to both telecommunications deregulation and the new service opportunities presented by the Internet.

Originally, wireless communication was either single-station to single-station (also known as point-to-point, PTP), or single-station to multiple station (also known as point-to-multiple-point, or PMP). PTP communication generally presumed equal capabilities at each end of the link; PMP communication usually presumed greater capabilities at the single core point than at any of the penumbral multiple points it communicated with. The topology of any PTP network was a disconnected set of linear links (FIG. 1); the topology of a PMP network was a 'star' or 'hub and spoke' (FIG. 2).

As the price for more complex hardware has declined and capability increased, PMP is winning over PTP. For economic reasons, a wireless electromagnetic communication network's nodes, or transceivers, usually vary in capacity. Most such wireless electromagnetic communication networks have a core hierarchy of Base Stations (BS), each comprising a multiplicity of sector antennae spatially separated in a known configuration, and a penumbral cloud of individual subscriber units (SU). If each BS communicates over a different frequency, then each SU must either have a tuned receiver for each station to which the subscriber tunes or, more commonly, a tunable receiver capable of reaching the range of frequencies encompassing those BSs to which it subscribes. (FIG. 3 shows two BSs and six SUs, four of whom subscribe to each BS, with different frequencies indicated in 3A and 3B.)

To increase the coverage in a given geographical area, PMP networks are typically deployed in multiple cells over the total service area of the network, with each SU linked to a single BS at a time except (in some mobile communication instantiations) during handoff intervals when it is transitioning from one cell to another. Although these cells are nominally non-overlapping, in reality emissions contained within one cell easily and typically propagate to adjacent cells, creating new problems of interference, as one cell's signal became noise to all other surrounding cells (intercell interference).

A number of different topologies (driven somewhat by the technology, and somewhat by the geography of the area in which the network existed), have been developed, including ring networks, both open and closed, and mesh networks. These efforts tried to maximize the coverage and clarity for the network as a whole, while minimizing the number of BS locations, minimizing BS complexity (and thus cost), and minimizing SU complexity (and thus cost).

The inherently multipoint nature of wireless communication networks, i.e., their ability to arbitrarily and flexibly connect multiple origination and destination nodes, has spawned a growing demand for methods and apparatus that will enable each particular wireless electromagnetic communication network to exploit their particular part of the spectrum and geography in constantly-changing and unpredictable economic and financial environments. Efficient use of both capacity and available power for a network, for a particular constraint set of frequencies, power, and hardware, is more in demand than ever as the competitive field and available spectrum grows more and more crowded.

The prior art includes many schemes for maximizing signal clarity and minimizing interference between nodes in a complex, multipoint environment. These include differentiation by: (a) Frequency channels; (b) time slots; (c) code spreading; and (d) spatial separation.

First generation systems (e.g. AMPS, NORDIC) developed for cellular mobile radio systems (CMRS) provide frequency-division multiple access (FDMA) communication between a BS and multiple SUs, by allowing each SU to communicate with the BS on only one of several non-overlapping frequency channels covering the spectrum available to the system. This approach allows each SU to 'tune out' those frequencies that are not assigned, or not authorized, to send to it. Intercell interference is then mitigated by further restricting frequency channels available to adjacent BS's in the network, such that BS's and SU's reusing the same frequency channel are geographically removed from each other; factor-of −7 reductions in available channels ("reuse factors") are typically employed in first generation systems.

The total number of channels available at each BS is therefore a function of channel bandwidth employed by the system and/or economically usable at the SU. Hardware and regulatory limits on total spectrum available for such channels, and interference mitigation needs of the cellular network (cellular reuse factor), effectively constrain the divisibility of the spectrum and thus the geographical interacting complexity of current networks. (i.e. if the hardware requires a 200 kHz differentiation, and the network has 5 MHz of spectrum available, then 25 separate channels are available.) Channelization for most 1G cellular is 25-30 kHz (30 kHz in US, 25 kHz most other places; for 2G cellular is 30 kHz (FDMA-TDMA) for IS-136, 200 kHz for (FDMA-TDMA) GSM, 1.25 MHz for (FDMA-CDMA) IS-95; 2.5G maintains GSM time-frequency layout; and proposed and now-instantiated channelization for 3G cellular is FDMA-TDMA-CDMA with 5 MHz, 10 MHz, and 20 MHz frequency channels.

Most so-called second generation CMRS and Personal Communication Services (PCS) (e.g. GSM and IS-136), and '2.5 generation' mobility systems (e.g., EDGE), further divide each frequency channel into time slots allocated over time frames, to provide Time Division Multiple Access (TDMA) between a BS and SUs. (For example, if the hardware requires at least 1 ms of signal and the polling cycle is 10 ms, only 10 separate channels are available; the first from 0 to 1 ms, the second from 1 to 2 ms, and so on.) The combination of TDMA with FDMA nominally multiplies the number of channels available at a given BS for a given increase in hardware complexity. This increase hardware need comes from the fact that such an approach will require the system to employ a more complex modulation format, one that can support individual and combined FDMA-TDMA, e.g., FM (for FDMA AMPS) versus slotted root-Nyquist .pi./4-DQPSK (for IS-136 and EDGE) or GMSK (for GSM).

Some second generation mobility systems (e.g. IS95), and most third generation mobility systems, provide code division multiple access (CDMA) between a BS and multiple SUs (for example, IS-136 provides FDMA at 1.25 MHz), using different, fixed spreading codes for each link. The additional "degrees of freedom" (redundant time or frequency transmission) used by this or other spread spectrum modulation can (among other advantages) mitigate or even exploit channel distortion due to propagation between nodes over multiple paths, e.g., a direct and reflection path (FIG. 4), by allowing the communicator to operate in the presence of multipath frequency "nulls" our outages that may be significantly larger then the bandwidth of the prespread baseband signal (but less than the bandwidth of the spread signal).

Different spreading code techniques include direct-sequence spread spectrum (DSSS) and frequency hop multiple access (FMHA); for each implemented, the hardware at each end of a link has to be able to manage the frequency and/or time modulation to encode and decode the signal correctly. Spreading codes can also be made adaptive, based on user, interference, and channel conditions. But each increase in the complexity of spread spectrum modulation and spreading code techniques useable by a network increases the complexity of the constituent parts of the network, for either every BS and SU can handle every technique implemented in the network, or the risk arises that a BS will not be able to communicate to a particular SU should they lack common coding Finally, communication nodes may employ further spatial means to improve communications capability e.g. to allow BS's to link with larger numbers of SU's, e.g., using multiple antennae with azimuthally separated mainlobe gain responses, to communicate with SU's over multiple spatial sectors covering its service area. These antennae can provide space division multiple access (SDMA) between multiple SU's communicating with the BS over the same frequency channel, time slot, or spreading code, or to provide reuse enhancement by decreasing range between BS's allowed to use the same time slot or frequency channel (thereby reducing reuse factor required by the communication system). A BS may communicate with an intended SU using a fixed antenna aimed at a well-defined, fixed-angle sectors (e.g. Sector 1 being between 0 and 60 degrees, Sector 2 between 60 and 120 degrees, and so forth), or using an adaptive or "smart" antenna that combines multiple antennae feeds to optimize spatial response on each frequency channel and time slot. The latter approach can further limit or reduce interference received at BS or SU nodes, by directing selective 'nulls' in the direction of SU's during BS operations. (FIG. 5). This is straightforward at the BS receiver, more difficult at the BS transmitter (unless if the system is time-division duplex (TDD) or otherwise single-frequency (e.g., simplex, as commonly employed in private mobile radio systems)), or if the SU is based at "large" platforms such as planes, trains, or automobiles, or are used in other applications. This approach can provide additional benefits, by mitigating or even exploiting channel distortion due to propagation between nodes over multiple paths, e.g., a direct and reflection path. A further refinement that has been at least considered possible to adaptive SDMA signal management is the use of signal polarization, which can double degrees of freedom available to mitigate interference or multipath at BS or SU receivers, or to increase capacity available at individual links or nodes in the network. However, current implementations generally require antennae and transmissions with size or co-location requirements that are infeasible (measurable in meters) for high-mobility network units.

Various combinations of TDMA, CDMA, FDMA, and SDMA approaches have been envisioned or implemented for many other applications and services, including private mobile radio (PMR) services; location/monitoring services (LMS) and Telematics services; fixed wireless access (FWA) services; wireless local, municipal, and wide area networks (LANs, MANs, and WAN's), and wireless backhaul networks.

In other prior art implementations, a more-complex and capable BS assigns and manages the differentiation scheme or schemes among its SU's, using scheduling and assignment algorithms of varying power, complexity, and coordination to manage communications between the BS and its SU's, and between BS's in the overall wireless electromagnetic communications network. For all such networks, the key goal of these implementations are to provide a desired increase in capacity or performance (e.g., quality of service, power consumption, range, availability, or deployment advantage) in exchange for the increasing complexity and cost of the implementation. Everyone wants 'more bang for the buck', despite the limitations imposed by physics and hardware.

It is worth noting for the moment that none of the prior art contains means for managing power at the local level, that is, at each particular node, which benefits the wireless communications network as a whole. It is also worth noting that all encounter a real-world complexity: the more power that is poured into one particular signal, the more that signal becomes 'noise' to all other signals in the area it is sent to. (Even spatial differentiation only 'localizes' that problem to the given sector of the transmission; it does not resolve it.)

In two-way communication networks, the network must provide means to communicate in each link direction, i.e., from the BS to the SU, and from the SU back to the BS. Most PMP networks provide communication not only from the BS to the SU, and from the SU to the BS, but from one SU to a BS, thence to another BS, and eventually to another SU (FIG. 6A). This requires additional channels and fails to exploit possible diversity already present (FIG. 6B). Generally, each individual SU is less complex (in hardware and embedded software) than a BS to leverage the higher cost of the more complex BS over the many lesser SU nodes. Considerations affecting this provision in the prior art include: two-way communication protocols (so your signal is recognized as distinct from noise); traffic symmetry or asymmetry at the link or node, and user traffic models. Each of these is briefly discussed in turn.

Protocols are necessary to govern the transmission and reception process. Protocols that have been used to accomplish this in prior art include: (a) Simplex, (b) Frequency Division Duplex (FDD), and (c) Time Division Duplex (TDD) protocols.

A Simplex protocol, as the name suggests, enforces the simplest communication method: each communication is one-way, with the communication between two users occurring serially, rather than simultaneously. (E.g., the method still used by ham radio enthusiasts today, when a speaker signals the start of his message with his call sign or name, the end of one part of his message with 'over', and the end of his link to the recipient with, 'over and out'.) In this protocol, an originating node first transmits an entire message to a recipient node, after which the recipient node is provided with an opportunity to transmit back to the originating node. This retransmission can be a lengthy return message; a brief acknowledgement and possible request for retransmission of erroneous messages; or no message at all. Simplex protocols are commonly used in private mobile radio services; family radio networks; push-to-talk (PTT) radio links; and tactical military radios such as SINCGARS. Simplex protocols also form the basis of many ad hoc and random access radio systems such as Slotted ALOHA.

Two-way communication is much more complex (as anyone who has tried to speak and listen simultaneously can attest). Frequency Division Duplex (FDD) protocols divide the flow of communication between two widely separated frequency channels in FDMA networks, such that all "uplink" nodes (BS's) receive data from "downlink" nodes (SU's) over one block of uplink frequency channels, and transmit data back to the downlink nodes over a separate block of downlink frequency channels. The uplink and downlink blocks are separated at each end of the link using a "frequency diplexer" with sufficient isolation (out-of-block signal rejection) to allow the receive channel to be received without significant crosstalk from the (much stronger) transmit signal.

Time Division Duplex (TDD), though perceived by the users as being simultaneous, is technically serial; this protocol provides two-way communication in FDMA-TDMA networks by dividing each TDMA time frame into alternating uplink and downlink subframes in which data is passed to and from the uplink and downlink nodes (FIG. 8). The duration of the TDMA frame is short enough to be imperceptible to the network and user. It is both simpler to implement and uses less of the scarce bandwidth than FDD.

Traffic symmetry (and its reverse, asymmetry), refers to the relative uplink and downlink data rate, either on an individual link (uplink/downlink pair), or aggregated at an individual node in the network. For links, the question is whether the direction of the communication between one node and another makes a difference. If the uplink from the BS to the SU is substantively similar to the downlink from the SU to the BS, then the link communication is described as symmetric. On the other hand, if the downlink from the BS to the SU is substantially greater than any uplink from the SU to the BS, then the link communication is asymmetric. This can be envisioned as follows: does the communication link between node A and node B represent a pipe, or a funnel? It doesn't matter which way the pipe/funnel is pointing, it is the comparison between uplink and downlink capacity that determines the symmetry or asymmetry.

For nodes, the symmetry or asymmetry may refer to the relative capacity of one node to the others. When each BS has far more capacity than the individual SUs, the network's nodes are asymmetric (FIG. 9, where C and E>B and A>D). If, on the other hand, each node is reasonably alike in capacity, then they are symmetric. This is also known as a 'peer-to-peer' network. The former is the most common instantiation in the prior art for wireless electromagnetic communications networks.

A final consideration is the traffic model for the network as a whole. Just as a highway engineer has to consider more than the physics effecting each particular car at each point along the road when designing the interchanges and road system, those building a wireless multipoint electromagnetic communication network must consider how the communication traffic will be handled. The two dimensions, or differentiations, currently seen are (a) how individual communications are switched (i.e. how messages are passed along the links from the origination node to the recipient node and vice versa), and (b) how a particular communication is distributed amongst the set of nodes between the two end-points (i.e. whether a single path or diverse paths are used).

The two models for how communications are switched are the circuit-switched and packet-switched models. The former is best exemplified by the modern Public Switched Telephone Network (PSTN). When user A wants to communicate with user B, a definite and fixed circuit is established from A through any number of intervening points to user B, and that circuit is reserved for their use until the communication ends (A or B hangs up). Because the PSTN originated when all communication links had to be made by elements that shared the same capacity limit as the telephone users, that is, by human operators, they had no such excess capacity to exploit. (There was a point in time when economists extrapolated that the needed number of operators would exceed the number of human beings.) Fortunately automated circuit switching was developed.

The downside to the circuit-switched model is that the network's resources are used inefficiently; those parts comprising a given circuit are tied up during relatively long periods of dormancy, since the dedicated circuits are in place during active as well as inactive periods of conversations (roughly 40% in each link direction for voice telephony).

This inefficiency is even more pronounced in data transmission systems, due to the inherent burstiness of data transport protocols such as TCP/IP.

The second model, 'packet-switched', is embodied in the much-more modern Internet. In this approach, the communication is divided up into multiple fragments, or packets, each of which is sent off through the most accessible route.

Whether the 'circuit' is a physical land-line, a frequency channel, or a time slot, does not matter; the import for the network is how the overall capacity is constrained when handling individual communications: on a link-by-link basis, or on a packet-by-packet basis.

The other differentiation, how a particular communication is distributed amongst the set of nodes between the two end-points, is between connection-oriented vs. connectionless communications. Connection-oriented communications establish an agreed-to, single, link path joining the two endpoints which is maintained throughout the communication; connectionless communications can employ multiple available link paths simultaneously. (The Internet's TCP/IP protocol is an exemplar of this approach.) Though there is a surface similarity between this differentiation and that of circuit/packet switching, the connection-oriented communication does not necessitate dedication of the entire capacity of each sub-part of the connection to the particular communication being handled; i.e. the network could 'fill up' an intermediate stage to that stage's capacity as long as it can split off the joined communications before the end is reached and avoid overloading any of the shared link sub-parts.

Again, it is worth noting for the moment that none of the prior approaches or differentiations provide means for power management for the network as a whole or present a potential solution to the real-world complexity whereby the more power that was poured into one particular signal, the more that signal became 'noise' to all other signals in the area it was sent to.

Presently, most wireless multipoint electromagnetic communication networks are PMP implementations. The disadvantages of these prior art wireless PMP wireless electromagnetic communication networks include:

(1) Requiring a predetermined distinction between hardware and software implemented in BS's and SU's, and in topology used to communicate between BS, as opposed to that used to communicate between a BS and its assigned SU's.

(2) Creating a need to locate BS's in high locations to minimize pathloss to its SU, and maximize line-of-sight (LOS) coverage, thereby increasing the cost of the BS with the elevation. (In urban areas, higher elevations are more costly; in suburban areas, higher elevations require a more noticeable structure and create ill-will amongst those closest to the BS; in rural areas, higher elevations generally are further from the service lines for power and maintenance personnel).

(3) Creating problems with compensating for partial coverage, fading and 'shadowing' due to buildings, foliage penetration, and other obstruction, particularly in areas subject to change (growth, urban renewal, or short and long range changes in pathloss characteristics) or high-mobility systems (FIG. 4).

(4) Balancing the cost of system-wide capacity increase effected by BS upgrades over subscribers who may not wish to pay for others' additional benefit.

(5) Creating problems with reduction in existing subscriber capacity, when new subscribers are added to a particular sector nearing maximal capacity (FIGS. 7A & 7B; if each BS can handle only 3 channels, then E and C can readily substitute in a new BS D, but neither A nor B can accept D's unused 3d channel).

(6) Balancing power cost in a noisy environment when competing uses of the spectra occur, either amongst the subscribers or from external forces (e.g. weather).

(7) Limiting capacity of the network to the maximum capacity of the BS managing the set of channels and, (8) Losing network access for SU's if their BS fails.

Multipoint Networks

The tremendously increased efficiency of emplaced fiberoptic landlines, and the excess capacity of 'dark fiber' currently available, as well as the advent of new Low-Orbit Satellite (LOS) systems, pose a problem for any mobile, wireless, multipoint electromagnetic communication network. Furthermore, there is an ongoing 'hardware war' amongst the companies providing such networks. For with the increasing use of cellular wireless communications a 'race up the frequencies' has begun; no sooner does hardware come on the market enabling use of a new portion of the electromagnetic spectrum, than transmissions begin to crowd into it and fill both the geographic and frequency space. Both these dynamics acting together are further complicated by the potential merging of the single BS/multiple receiver (or 'broadcast') model of the radio fixed frequency range. Code division multiple access techniques, also referred to herein as CDMA, assign a signature to each subchannel which describes the pulse amplitude modulation, also referred to herein as PAM, to be used by the subchannel for communication. Well-known digital signal processing techniques may be applied to de-multiplex such multiplexed signals on the communication channel.

A variety of techniques have been applied to many of these known modulation methods to further improve the utilization of the channel bandwidth. It is a continuing problem to improve the bandwidth utilization of a channel so as to maximize the data throughput over the channel. In particular, it is a continuing problem to dynamically adapt the multiplexing techniques to maximize network performance over particular signaling patterns, usage, and power. As mobile transmitters and receivers are moved relative to one another, channel bandwidth utilization efficiency may change. It is a problem to adapt presently known multiplexing techniques to such dynamic environmental factors.

Problems identified in M. K. Varanasi's U.S. Pat. No. 6,219,341 include designing signature waveforms for a particular channel, multiplexing a plurality of digital data streams over a communications channel, and making a communications channel dynamically adaptable. That patent focuses on non-multipath environments where a single available channel with a fixed frequency range and multiple receiving devices exist; there are not a multiplicity of antennae at either receiver(s) or at the transmitter, and no network-effect adaptations and methodologies. That patent provides many references to work on the problem of multiple access communications problem is one where several autonomously operating users transmit information over a common communications channel, which do nor resolve problems such as:

"Multiple-Access (FDMA) techniques pre-assign time or frequency bands to all users . . . absurdly wasteful in time and bandwidth when used in applications where communications is bursty as in personal, mobile, and indoor communications. In such applications, some form of dynamic channel sharing is therefore necessary . . . "; and, and television fields with the linked pair-sets (two intercommunicating nodes) or 'dedicated channel' model of the plain old telephone system (PSTN).

The race is becoming even more frenetic as voice and data communications merge. This evolution must accommodate packet-switched, connectionless data protocols such as TCP/IP, which transmits data in multiple bursts over multiple communication channels. The topologies and capacities, of these channels may change during a communication session, requiring complex and burdensome routing and resource management to control and optimize the network Finally, future wireless electromagnetic communications networks may need to communicate with mobile platforms (e.g., automobiles in Telematics applications), peripherals (e.g., printers, PDAs, keyboards), and untethered 'smart' appliances, further increasing connectivity capacity, and quality of service (QoS) needs of the network. Nowadays, advanced wireless electromagnetic communications networks must routinely handle both voice and data communications, and communications amongst people, between people and devices, and between devices.

Prior art knows to use radio frequency communication channels to transfer digital data between devices, and to encode digital data on a channel such that a parameter of the communication channel is modulated in accordance with the values of the digital data bit sequence to be transferred. Many applications of such communication channels permit multiple, simultaneous access to the channel by a plurality of digital data streams, for example, a plurality of digitized voice data streams or a plurality of computer digital data streams. The plurality of digital data streams is multiplexed over the communication channel by subdividing the channel into a plurality of subchannels each characterized by unique communication parameters which may be de-multiplexed at the opposite end of the communication channel.

The communication techniques referred to above (CDMA, TDMA, FDMA), are also known to be useful for such subdivision of a communication channel. For example, time division multiple access, also referred to herein as TDMA, multiplexes the subchannels onto the channel by assigning each subchannel a period of time during which the subchannel uses the channel exclusively. Frequency division multiple access techniques, also referred to herein as FDMA, assign each subchannel a sub-range of the "While Random Multiple Access techniques such as ALOHA allow dynamic channel sharing [citation omitted] . . . they are, however, unsuitable for the aforementioned applications where there is usually more than one active transmitter at any given time."

Other techniques identified in Varanesi are Dynamic TDMA (which requires both a reservation and a feedback channel, cutting the channels available for content and increasing the network system overhead), adaptive timing enforcement rather than user-signal differentiation; differentiation between BS and SU signal management; use of linear PAM pre-assigned rather than dynamic adaptation; presuming transmissions are limited to the number of active simultaneous transmitters instead of allowing differentiated symbol (e.g. QAM) division of any particular channel into subchannels; assigning, statically, a signature waveform to every transmitter and not adapting to network flows. Reservation channels are also used in dynamic CDMA, which are also limited to pre-designed waveforms and BS units only. In the prior art, Varanesi in particular asserts:

" . . . when a carrier is not lightly loaded, so that the number of active users for that carrier is a sizeable fraction of the assigned spread factor, decorrelative and linear MMSE detectors . . . [citations omitted] . . . will not be satisfactory . . . ."

and,

" . . . the hardware costs of base-stations in FDMA are higher in that they must have as many transceivers as the maximum number of users allocated per carrier (see R. Steele supra) whereas dynamic SSMA only requires one transceiver per carrier."

Varanesi's BEMA approach suffers from a several significant defects in modern, high-mobility, rapidly-changing communication network environments: (1) "the signature waveforms are specifically designed for that receiver", and, (2) "they may be slowly re-allocated as the traffic conditions-such as the received power levels and number of active transmitters—change and evolve". In the dynamic, mobile, constantly-changing environment these constraints do not allow enough adaptivity and flexibility. As the number of common users grows, the risk develops of an electromagnetic repetition of Garrett Hardin's 'tragedy of the commons'; in short, that mutual signaling devolves to shared noise. Simply adding power, or additional frequencies, works only as a short-sighted or short term solution; the real need is for networks that make use of multipath and multiple user effects rather than ignore them. (FIGS. 10 and 11 respectively exemplify static and mobile multipath environments.)

Various approaches to treating other users of the communications channel (or frequency) briefly mentioned in Varanesi also include: "(a) treat mutual inter-user interference as additive noise; (b) treat uncancelled inter-user interference as additive noise; and, (c) decorrelate uncancelled interference." But the concept of using the signaling from multiple sources as a way of harmonizing and organizing the information, and identifying the channel diversity and environmental conditions to allow adaptation and optimization, is nowhere there suggested.

Beamforming is a particular concern for wireless electromagnetic communications networks, especially where a network is dense or where there are portable, low-mobility, or high-mobility SU. Within wireless mobile communication systems, four techniques have been developed for improving communication link performance using directive transmit antennas: (i) selection of a particular fixed beam from an available set of fixed beams, (ii) adaptive beam forming based on receive signal angle estimates, (iii) adaptive transmission based on feedback provided by the remote mobile SU, and (iv) adaptive transmit beam forming based upon the instantaneous receive beam pattern. Each of these prior art techniques is described briefly below.

In the first technique, one of several fixed BS antenna beam patterns is selected to provide a fixed beam steered in a particular direction. The fixed antenna beams are often of equal beam width, and are often uniformly offset in boresight angle so as to encompass all desired transmission angles. The antenna beam selected for transmission typically corresponds to the beam pattern through which the largest signal is received. The fixed beam approach offers the advantage of simple implementation, but provides no mechanism for reducing the signal interference power radiated to remote mobile SU(s) within the transmission beam of the BS. This arises because of the inability of the traditional fixed beam approach to sense the interference power delivered to undesired users.

The second approach involves "adapting" the beam pattern produced by a BS phase array in response to changing multipath conditions. In such beamforming antenna arrays, or "beamformers", the antenna beam pattern is generated so as to maximize signal energy transmitted to ("transmit beamforming"), and received from ("receive beamforming"), an intended recipient mobile SU.

While the process of transmit beamforming to a fixed location over a line-of-sight radio channel may be performed with relative ease, the task of transmitting to a mobile SU over a time-varying multipath communication channel is typically considerably more difficult. One adaptive transmit beamforming approach contemplates determining each angle of departure (AOD) at which energy is to be transmitted from the BS antenna array to a given remote mobile SU. Each AOD corresponds to one of the signal paths of the multipath channel, and is determined by estimating each angle of arrival (AOA) at the BS of signal energy from the given SU. A transmit beam pattern is then adaptively formed so as to maximize the radiation projected along each desired AOD (i.e., the AOD spectrum), while minimizing the radiation projected at all other angles. Several well known algorithms (e.g., MUSIC, ESPRIT, and WSF) may be used to estimate an AOA spectrum corresponding to a desired AOD spectrum.

Unfortunately, obtaining accurate estimates of the AOA spectrum for communications channels comprised of numerous multipath constituents has proven problematic. Resolving the AOA spectrum for multiple co-channel mobile SUs is further complicated if the average signal energy received at the BS from any of the mobile SUs is significantly less than the energy received from other mobile SUs. This is due to the fact that the components of the BS array response vector contributed by the lower-energy incident signals are comparatively small, thus making it difficult to ascertain the AOA spectrum corresponding to those mobile SUs. Moreover, near field obstructions proximate BS antenna arrays tend to corrupt the array calibration process, thereby decreasing the accuracy of the estimated AOA spectrum.

In the third technique mentioned above, feedback information is received at the BS from both the desired mobile SU, and from mobile SUs to which it is desired to minimize transmission power. This feedback permits the BS to "learn" the "optimum" transmit beam pattern, i.e., the beam pattern which maximizes transmission to the desired mobile SU and minimizes transmission to all other SUs. One disadvantage of the feedback approach in the prior art is the presumption that the mobile radio needs to be significantly more complex than would otherwise be required. Moreover, the information carrying capacity of each radio channel is reduced as a consequence of the bandwidth allocated for transmission of antenna training signals and mobile SU feedback information. The resultant capacity reduction may be significant when the remote mobile SU move at a high average velocity, as is the case in most cellular telephone systems.

The fourth conventional technique for improving communication link performance involves use of an optimum receive beam pattern as the preferred transmission beam pattern. After calibrating for differences between the antenna array and electronics used in the transmitter and receiver, it is assumed that the instantaneous estimate of the nature of the receive channel is equivalent to that of the transmit channel. Unfortunately, multipath propagation and other transient channel phenomenon have been considered to be problems, with the prior art considering that such substantially eliminate any significant equivalence between frequency-duplexed transmit and receive channels, or between time-division duplexed transmit and receive channels separated by a significant time interval. As a consequence, communication link performance fails to be improved.

At any given point the hardware, bandwidth, and user-determined constraints (Quality of Service, number of users simultaneously communicating, content density of communications) may demand the utmost from the system. Not only must a modern wireless electromagnetic communications network simultaneously provide the maximum capacity (measured by the number of bits that can be reliably transmitted both over the entire network and between any given pair of sending and receiving nodes in that network), but also, it must use the least amount of power (likewise measured over the entire network and at each particular node). Because, in any increasingly crowded electromagnetic spectrum, capacity and power are interactive constraints. To optimize the system over the sweep of potential circumstances, with minimal duplication or resource expenditure, designers must attain the greatest capacity and flexibility for any given set of hardware and signal space. In a wireless electromagnetic communication network, and more particularly in a cellular communication network, the greatest capacity and flexibility are offered by multipoint, or multiple-input and multiple-output (MIMO) systems.

Prior implementations of MIMO systems have been limited to point-to-point links exploiting propagation of signal energy over multiple communication paths, for example, a direct path and one or more reflection paths. In this environment, link capacity can be increased by employing an array of spatially separated antennas at each end of the link, and using these arrays to establish substantively orthogonal links that principally exploit each of these communication paths. Mathematically, the channel response between the multiple antennas employed at each end of the link has a multiple-input, multiple-output (MIMO) matrix representation, hence the term "MIMO link" for this case. (See FIG. 12, which exemplifies just such a physical PTP multipath, consisting of one direct and two reflective links, as shown graphically in FIG. 10; then contrast that to the data flow diagram of such a PTP link in FIG. 11.)

Using the tools of information theory disclosed in the referenced patent applications, Paulraj and Raleigh have shown that these links can approach the maximum capacity of the point-to-point communication channel (given appropriate power constraints and spatially and temporally "white" additive Gaussian background noise) by (1) dividing the channel into "substantively orthogonal frequency subchannels," or time-frequency subchannels, and then, on each subchannel (2) redundantly transmitting multiple data "modes" (spatial subchannels within each time-frequency subchannel) over multiple antennas using vector linear distribution weights that are proportional to the "right-hand" eigenvectors of the MIMO channel frequency response on that subchannel, and, next, (3) combining receive antenna array elements using vector linear combiner weights that are proportional to the "left-hand eigenvectors of the MIMO channel frequency response on that subchannel, to recover the data mode transmitted using the corresponding right-handed eigenvector of the MIMO channel response on that subchannel. The vector transmit weights are then (4) further scaled to provide a normalized response dictated by a "water filling" formula computed over the aggregate set of subchannels and data modes employed by the communication link, based on the eigenvalues of the MIMO channel frequency response on each subchannel, and a vector coding formula (sometimes referred to as a "space-time" or "space-frequency" code) is used to (5) transmit data over each subchannel and data mode at the maximum bits/symbol (or transmit efficiency) (or data rate) allowed by the received signal-to-noise ratio on that subchannel and data mode.

Raleigh has also shown that this capacity of a MIMO PTP link increases nearly linearly with the number of antennas employed at each end of the link, if the number of propagation paths is greater than or equal to the number of antennas at each end of the link, the pathloss over each path is nearly equal, and either (1) the spatial separation between paths is large in some sense (e.g., the propagation occurs over paths that impinge on the link transceivers at angles of transmission and reception that are greater than $1/10$ the "beamwidth of the array), (2) the antenna elements are separated widely enough to provide statistically independent channel response on each MIMO path (e.g., if the antennas are separated by greater than 10 times the wavelength of the transmission frequency in Raleigh fading channels).

Raleigh has also shown that a PTP MIMO channel response (allowing implementation of high capacity links exploiting this channel response) can also be induced by redundantly transmitting data over polarization diverse antennas using the procedure described above. In U.S. Pat. No. 6,128,276, Agee has also shown that a PTP MIMO channel response can be induced by redundantly transmitting data over multiple frequency channels or subchannels. In fact, MIMO channel responses can be induced by redundantly transmitting data over combinations of "diversity" paths, including independent spatial paths, independent polarization paths, independent, frequency channels, or independent time channels.

Paulraj, Raleigh, and Agee teach many additional advantages for MIMO PTP links, including improved range through exploitation of "array gain" provided by transmit and receive antennas; non-line-of-sight communication over reflections from buildings and ducting down streets; and reduced transmit power through ability to achieve desired capacities at lower power levels at each antenna in the arrays. Agee also teaches means for adjusting the array adaptively and blindly, based on receive exploitation of signal coding added during transmit operations; for nulling interference signals at each transceiver; and for exploiting reciprocity of the MIMO channel response to adapt transmit weights in TDD PTP links.

Agee, B. G. et. al. added some indication in the patent application Ser. No. 08/804,619, filed on Feb. 24, 1997, titled "Highly Bandwidth-Efficient Communications", since abandoned but pursued in part in Ser. No. 08/993,721 (now U.S. Pat. No. 6,359,923), to discrete spread-spectrum, non-orthogonal multitone approaches, and indicated that MIMO systems may have additional benefits in point-to-multipoint and cellular PMP networks.

In a MIMO system, the nodes at each end of a link will have multiple antennae, and establish between them one link per pair of antennae. (There can still be a BS/SU division; for example, a BS may have 20 pairs of antennae, while each SU have but 2 pair, or 4, antennae, thereby allowing a 1-10 BS/SU ratio without any overlap.) In "Wireless Personal Communications: Trends and Challenges", pp. 69-80, Rappaport, Woerner, and Reeds, Editors, Kluwer Academic Publishers, 1994, at p. 69 Agee notes: "the use of an M-element multiport antenna array at the BS of any communication network can increase the frequency reuse of the network by a factor of M and greatly broaden the range of input SINRs required for adequate demodulation . . . ".

Some of the mathematical background for MIMO generally can be found in E. Weinstein et. al.'s U.S. Pat. No. 5,539,832 for "Multi-channel signal separation using cross-polyspectra", which speaks specifically to a limited field of separating signals from received from plural sources. That considered linear time invariant (LTI) MIMO systems, noting that sample response matrices and frequency vectors, vector-valued time and frequency indices could be used.

In cellular wireless systems, a BS transceiver simultaneously communicates with several mobile users. In such systems, an antenna array at the central base can improve the quality of communication with the mobile users and increase the number of users supportable by the system, without the allocation of additional bandwidth. But a problem may arise when a SU can communicate with multiple BSs and cause unexpected diversity and interference. (This is one of the principal reasons cell phone use from airlines is restricted; the in-air SU is effectively equidistant to many BSs and that network suffers.)

To increase quality of the communication in a wireless system, an antenna array can provide diversity to combat fading. Fading of the base-mobile link is due to destructive interference of the various multipaths in the propagation medium, and at times can cause signal attenuation by as much as 30 dB. Time and frequency diversity are traditional techniques which are highly effective in preventing signal loss. An antenna array can be used to provide beampattern diversity, which is an additional technique that supplements time and frequency diversity.

To increase capacity in a wireless system, an antenna array can implement same cell frequency reuse, which recognizes that each signal typically has a different angle of arrival at the BS. Using this technique, the base sends signals to multiple receivers on the same time/frequency channel within the same sector, and uses a separate beam to minimize crosstalk and maximize desired signal for each receiver. Such beams provide a means of reusing the resources of time and bandwidth, and they overlay with the traditional means of multiplexing such as (T/F/CDMA). Same cell frequency reuse is also sometimes known as spatial division multiple access (SDMA).

There are two aspects to using antenna arrays at the base in mobile radio: receive antenna processing (reverse link) and transmit antenna processing (forward link). In the forward link approach, there are "open loop" and "closed loop" approaches. An "open loop" approach is explored by G. Raleigh et al. in "A Blind Adaptive Transmit Antenna Algorithm for Wireless Communication," International Communications Conference, 1995. This transmit beamforming method uses the reverse link information signals sent by the mobiles as a means of determining the transmit beampatterns. This "open loop" method, however, does not provide the transmitter with feedback information about the transmitted signals, and is consequently less robust to changes in the propagation medium than feedback methods.

In contrast to the "open loop" approach, the "closed loop" approach uses an additional feedback signal from the mobiles. The transmitting array has no a priori knowledge of the location of the mobiles or the scattering bodies, and an adaptive antenna array can use a feedback signal from the mobile receivers to give the transmitter a means of gauging its beampatterns. Because of multipath, an array that simply directs a mainlobe towards a mobile may result in a fade of the desired signal or crosstalk to other mobiles. So unless the base can also account for all of the scattering bodies in the environment, undesired crosstalk or fading is liable to occur. Since adaptive transmitting antennas do not possess built-in feedback, the receivers must provide a feedback signal to enable the transmitter to function effectively in this approach.

In U.S. Pat. No. 5,471,647, "Method for Minimizing Cross-Talk in Adaptive Transmission Antennas," which is hereby incorporated by reference, Gerlach et al. present a method of multiple signal transmission using an antenna array and probing signals together with feedback from the receivers back to the transmitter. This probing-feedback method allows the transmitter to estimate the instantaneous channel vector, from which the transmitting beamformer ensures signal separation even in the face of time-varying multipath in the propagation medium. This method is further described by Gerlach et al. in the following articles which are hereby incorporated by reference: "Spectrum Reuse Using Transmitting Antenna Arrays with Feedback," Proc. International Conference on Acoustics, Speech, and Signal Processing, pp. 97-100, April 1994; "Adaptive Transmitting Antenna Arrays with Feedback," IEEE Signal Processing Letters, vol. 1, pp. 150-2, October 1994; and "Adaptive Transmitting Antenna Arrays with Feedback," IEEE Transactions on Vehicular Technology, submitted October 1994.

While the method of D. Gerlach et al. In U.S. Pat. No. 5,471,647 purportedly minimizes crosstalk and eliminates fading, Gerlach identifies, in a later patent, a major problem therein: it is limited by the high feedback data rates that are required to track the instantaneous channel vector. High feedback data rates are undesirable because they require a large channel capacity on a link from the receivers back to the transmitter.

If the transmitter is located in an urban environment or other cluttered area, scattering from buildings and other bodies in the propagation medium creates an interference pattern. This interference pattern contains points of constructive and destructive interference, spaced as little as one-half wavelength apart. As the receiver moves through such an environment, the channel vector can change significantly when the receiver moves as little as one-tenth of a wavelength. Consequently, the transmitter must repeatedly estimate a new channel vector by sending probing signals and receiving feedback. The feedback rate needed is 19,200 bps for a receiver moving 30 mph receiving a 900 MHz carrier using a six element array with four bit accuracy. Gerlach concluded that (1) the need for such high feedback rates renders antenna arrays impractical for most applications; and (2) in addition to high feedback rates, the method of D. Gerlach et al. can be difficult to implement because the air interface standard would have to be changed to add in the feedback feature. The users would have to exchange their old handsets for new ones that are compatible with the new feedback standard. This is a costly and impractical modification.

Several alternative approaches to the limited problem of minimizing crosstalk in a wireless communications system were disclosed in D. Gerlach, et. al.'s later U.S. Pat. No. 5,634,199. These included the use of information weight vectors that minimized the time-average crosstalk, matrices (subcorrelation and autocorrelation), linear combination of diversity vectors, and dominant generalized eigenvectors. Furthermore, their approach presumed that multiple antennae only existed at the system's BS, rather than at each node. However, the methods disclosed therein still require significant network capacity be devoted to cross-system signal management rather than signal content.

Another approach is to design the network such that at every point multipath can be actively avoided and direct line of sight exists between each SU and a member of a subset of nodes, said subset members also having a line of sight amongst themselves in a mesh, as in Berger, J. et. al., PCT WO 00/25485, "Broadband Wireless Mesh Topology Network". That patent notes that its applicability is limited to the frequencies above 6 GHz, and specifically below 3 GHz, " . . . where multiple reflections via non line of sight reception interfere dramatically with the network performance and reduce the network capacity when subscriber count increases in the area."

However, the approaches suggested in the prior art, (Paulraj, Raleigh, Agee, et. al.) are not generally feasible or economical in many applications. For example, the 10-wavelength rule-of-thumb for statistically independent MIMO propagation path can be difficult to achieve in mobility applications, which typically require transmission of signal energy at well below 10 GHz (3 cm, or $\frac{1}{10}$ foot, wavelength) to avoid dynamic, stability, and weather affects prevailing above that frequency. A 10-wavelength antenna separation corresponds to 1-to-10 feet at frequencies of 1-to-10 GHz, achievable at BSs in mobility systems (for small numbers of antennas), but not practical in mobile SU's However advantageous the improvements might be from going to a MIMO system (e.g. reducing fading and co-channel interference), the human factor (namely, that people would not walk around with meter-plus wide antennae) militated against adoption of this approach. Even the tremendous capacity improvement of 400% suggested by Paulraj for a MIMO approach would not overcome this consideration. Additionally, much of the prior art presumes that any MIMO network necessarily must reduce the Signal-to-(Interference and) Noise Ratio (SINR) in the multipath channel to zero.

In U.S. Pat. No. 6,067,290, Spatial Multiplexing In A Cellular Network", A. J. Paulraj et. al. claim methods and apparatus for the purpose stated in that title, noting that:

"Since there are quite a few services (e.g. television, FM radio, private and public mobile communications, etc.) competing for a finite amount of available spectrum, the amount of spectrum which can be allocated to each channel is severely limited. Innovative means for using the available spectrum more efficiently are of great value. In current state of the art systems, such as cellular telephone or broadcast television, a suitably modulated signal is transmitted from a single base station centrally located in the service area or cell and propagated to receiving stations in the service area surrounding the transmitter. The information transmission rate achievable by such broadcast transmission is constrained by the allocated bandwidth. Due to attenuations suffered by signals in wireless propagation, the same frequency channel can be re-used in a different geographical service area or cell. Allowable interference levels determine the minimum separation between base stations using the same channels. What is needed is a way to improve data transfer speed in the multiple access environments currently utilized for wireless communications within the constraints of available bandwidth."

Paulraj et. al. also presumes a division between BS and SU, where the BS performs all of the adaptation, which either requires information or control signals from each of the SUs that adds significantly to the signaling overhead, or limits the adaptive process to that observable and attainable solely by the BS in response to control signals from the SUs. Paulraj also identifies the minimum spatial separation between antennae as ½ the carrier wavelength, i.e. ½.lamda. Furthermore, Paulraj lacks the concepts of adaptive reciprocity, network MIMO management, LEGO, power management, power optimization, capacity optimization or capacity management. Though Paulraj speaks to using multipath, there is at best limited implementation in situations where multipath is stable and guaranteed, rather than true opportunistic implementation in a dynamic and adaptive fashion.

In U.S. Pat. No. 6,006,110, G. G. Raleigh describes a time-varying vector channel equalization approach for adaptive spatial equalization. That patent's concern is with compensating for multipath effects, rather than exploiting them.

In his later U.S. Pat. No. 6,101,399, G. G. Raleigh et. al. made the concept of his 1995 paper, referenced above, the basis for that patent for "Adaptive Beam Forming. for transmitter operation in a wireless communication system". In that paper, all of the adaptation takes place at the BS (which has an adaptive antenna array), and none at the substantially different SU (which in the preferred embodiment does not). This patent uses no feedback from the receiver to the transmitter, with transmitter weights being variously generated through an estimated desired receive channel covariance matrix and an undesired interference covariance matrix, or from a pre-designed or predetermined transmit beam pattern weight vectors. It also has no local modeling, no network management aspects, and makes no effort to exploit opportunistic multipath; and its chief solution to a deteriorating signal capacity is to simply shift the most heavily impacted user away to a different frequency (which presumes one is available). Paulraj and Raleigh do not consider means for extending MIMO PTP links to applications containing multiple simultaneous links, e.g., multipoint networks (such as the PMP and cellular PMP mobility network described above). In addition, these approaches do not either adequately treat means for controlling such a network, or address several key conundra limiting MIMO application.

Diversity: The Interference Conundrum

Even assuming that a MIMO approach is desirable, or that the antenna size problem mentioned above could be ignored, the prior art faced a contradiction that argued against MIMO efforts. First, to any particular wireless link, signals generated on all other links are interference. Second, closely coincident signals can heterodyne to produce a resultant signal that is different than any of its constituent elements. Because MIMO increases the number of coincident signals, it was seen as increasing the resultant noise against which the information-carrying signal had to be detected. Multiple access and interference are seen by many as the single largest problem and system limitation.

Capacity as One Key Network Metric

The explosive demand for delivery of integrated voice and data communications over the 'last mile' amongst all possible nodes (humans, peripherals, appliances, desktops, or servers) has spurred increased research into means for providing such communications in wireless electromagnetic networks. Wireless, because the cost of either initially installing, or subsequently dynamically altering, the network more often represents irretrievably sunk capital in equipment which cannot keep up with the design-build-install product cycles. Wireless, because users are increasingly demanding that their communication provisioning be untethered from predetermined geographic point locations, to meet the mobility demands placed upon them. In all of these demands, a key metric affecting cost and quality of any wireless electromagnetic communications network is the capacity of the network for any given set of internode channel responses, receive interference levels, channel bandwidths, and allowable or attainable transmission powers.

Capacity is a problem that has been studied extensively for PTP approaches, where the well-known 'water filling' solution for the maximum capacity communication over channels with frequency selective noise and/or channel distortion. However, Paulraj and Raleigh do not consider means for extending MIMO PTP links to applications containing multiple simultaneous links, e.g., multipoint networks (such as the PMP and cellular PMP mobility network described above). In addition, these approaches do not adequately treat means for controlling such a network. In "Highly Bandwidth-Efficient Communications", U.S. patent application Ser. No. 08/804,619, abandoned and replaced by its continuation, Ser. No. 08/993,721, Agee, et. al., discloses a solution for extending MIMO diversity exploitation to PMP and cellular PMP networks and for controlling such a network using local operations at individual nodes, by exploiting channel reciprocity to optimize network-wide mean-squared error (MSE) of time-division duplex (TDD) multi-cell PMP networks. That application discloses a solution that is severely limited. The solution optimizes an "ad hoc" metric (sum of mean-square error at each node in the network) that does not directly address any true measure of network quality, hence it can be substantively suboptimum with respect to such a metric. For example, the solution cannot simultaneously control transmit power and combiner output signal-to-interference-and-noise ratio (SINR) at both end of the link, and generally provides a solution that controls power subject to a global SINR constraint that may be hugely overachieved (to detriment of overall network performance) at some nodes in the network. The solution does not address networks with significant non-network interference, if that interference is nonreciprocal, for example, if that interference is only observable at some nodes in the network, or non-TDD protocols in which internode channel responses may be reciprocal, e.g., single-frequency simplex networks. Most importantly, however, that solution only addresses cellular PMP networks, not general MIMO networks.

Capacity as a metric is complicated by one further factor: the network must use its own capacity to communicate about its messaging and traffics, which puts a complex constraint on the network. The more that it tries to communicate about how to manage itself well, the less capacity it has to carry other messages from the users, as opposed to the administrators, of the network.

Overhead Vs. Content Conundrum

Ongoing capacity control for a wireless electromagnetic communications network is the control of network overhead as much as the control of the network content. The more complex the environment and the system, the greater the following conundrum: detailed network control (which necessarily includes signals containing information about the network and the entire environment, separate from the signals containing the content being sent through the network operating in that same environment) steals capacity from the network. The more the message space becomes filled with messages managing that same space, the less room there is for messages using that space to convey content amongst the nodes. The increase in such top-level network overhead grows at a more-than-geometric rate with the growth of any network, for not only must the information about the network keep pace with its geometric growth, but also the information must come on top of the messages which actively manage the network. Feedback on top of control on top of signals, when grown globally, rapidly eat up advances in hardware or software.

Automation, or turning signal processing into hardware, cannot by itself resolve this conundrum. While hardware advances can rapidly overcome human limitations, they can never overcome their inherent limitations, process more signals, or process the extant signals more complexly, than the hardware is designed to do. Every element in the network, from the CODECs to the MUXs to the wireless transceivers, can only work at less than their optimum capacity. The approach that of necessity approaches, asymptotically, the optimal capacity for message content in a wireless electromagnetic communications network is that which manages the communications with the least overall network burden. For any given hardware and software of a network, that which manages best does so by managing least—at least as far as burdening the capacity is concerned.

In network management the content dynamics change over time, in such a fashion that there are always individual nodes that are operating at less than capacity and thus have potential capacity to spare. (If only because some node is processing a control command, which lessens the content it is sending out, which decreases the load on its neighbors, which then are free to change their control, and so forth.) Overhead control which depends on centralization can never take full advantage of such momentary and dynamic opportunities, because of the simple fact that the message informing the central controller of the opportunity itself reduces the overall capacity by the amount needed to transmit such a message (and to handle all the consequential operations ordered by the controller). Capacity control therefore becomes both a local and a global concern; the network must neither overload any particular node (requiring the repetition of lost or dropped messages, and thereby decreasing the total capacity since the sender's original signal becomes wasted), nor overload the entire system (with, for example, measurements of remaining global capacity, taking away signal space that otherwise could have been used for node-directed content.

One of the limitations of the prior art is that most systems block out a part of the network capacity as a network signaling preserve, which operates to communicate between the transmitters and receivers information concerning the external environment, such as the amount of external interference along any particular link or channel, and the perceived Signal to (Interference and) Noise Ratio (SINR) for a transmission. The more complex, or the more crowded, the network becomes the greater this drain of overhead on available capacity for a given infrastructure. Because the environment, the network, or (most frequently) both will change over time, network designers tend to allocate greater-than-necessary amounts to account for unforeseen future complications. These signal subspaces within the network, when they are used to measure the signal, path, multipath, or interference, are only actively needed part of the time, yet the loss of capacity continues all of the time. If, on the other hand, they are temporally divided, then they must come into existence and use when the network is at its busiest to best tune the system—and thereby impose additional overhead and reduce capacity precisely when it is most valuable to the network.

Another limitation of the prior art is the presumption that the signal space is uniformly shaped over time, wherein network averages or constraints, rather than network usage, guides the signaling process. This requires overdesign and overprovisioning to ensure a guaranteed minimal state regardless of both internal and external environmental factors.

Existing Capacity Management

Among the means used by the prior art to manage capacity are: (1) the use of signal compression and decompression to manage signal density, permitting point-to-point capacity maximization over a given set of links by handling multiple-access channels wherein signals sent at one higher, denser, frequency can be divided into a set of subordinate signals sent at a set of lower frequencies, i.e. where a 10 MHz signal becomes ten 1 MHz signals; (2) using multipath, multiple-antenna links between given pairs of nodes with prior channel capacity estimation or environmental mensuration and eigenvalue decompositions of the signals over the estimated channels; (3) using channel reciprocity in a point-to-multipoint network with a set of presumed directive transmit weights pre-established for each node in said network; (4) in such a channel-reciprocity, point-to-multipoint network, pointing a signal beam in the direction of the intended recipient and guiding nulls in the directions of unintended receivers, to reduce the unintended signal to the level of the background noise; (5) in such a null-guiding network, directing maximal energy at the intended receiver and ignoring other receivers in the environment; (6) in such a null-guiding network, using directive and retrodirective beam forming between said point-to-point connections; (7) using point-to-point reciprocity for a given link; (8) using interference-whitened reciprocity between two nodes in a point-to-point network; and, (9) using SINR maximization for each particular point-to-point link (10) using a training link in a dominant mode from one node to another to establish successive SINR maximization at each end of that link; (11).

None of the above, however, have been applied to general multipoint to multipoint, or to multiple-input, multiple-output (MIMO) network which is dynamically responsive to environmental conditions, both those within and external to the network, over all the nodes and potential links amongst them. Once the nodes become capable of general multiple-output and multiple-input signal processing, some particular further approaches have been considered to increasing network capacity. These include SDMA and Multitone Transmission, as well as combinatorial coding schemes.

Spatial Separation of Signals

Spatial filtering techniques (separation of signals based on their observed spatial separation at transceivers) can be used to boost network capacity in a variety of manners. Approaches used in prior art include reuse enhancement, in which fixed (e.g., sectorized antenna arrays) or adaptive (e.g., adaptive array processing) spatial filtering is used to reduce or control interference between centralized transceivers (e.g., BS's) and edge nodes (e.g., SU's) using the frequency or time resource (e.g., time slot or frequency channel) in different cells of cellular PMP networks, thereby reducing the geographical separation between those cells and therefore the frequency reuse factor employed by the network; and space diversity multiple access (SDMA), in which a centralized transceiver uses spatial filtering to establish simultaneous links with multiple edge transceivers operating on the same frequency or time resource in PMP or cellular PMP networks.

The SDMA transmission protocol involves the formation of directed beams of energy, whose radiation patterns do not overlap with each other, to communicate with users at different locations. Adaptive antennae arrays can be driven in phased patterns to simultaneously steer energy in the direction of selected receivers. With such a transmission technique, the other multiplexing schemes can be reused in each of the separately directed beams. For example, in FDMA systems, the same frequency channel can be used to link to two spatially separated nodes, using two different spatially separated beams. Accordingly, if the beams do not overlap each other, different users can be assigned the same frequency channel as long as they can be uniquely identified by a specific beam/channel combination.

The SDMA receive protocol involves the use of multi-element adaptive antennae arrays to direct the receiving sensitivity of the array toward selected transmitting sources. Digital beamforming is used to process the signals received by the adaptive antennae array and to separate interference and noise from genuine signals received from any given direction. For a receiving station, received RF signals at each antenna element in the array are sampled and digitized. The digital baseband signals then represent the amplitudes and phases of the RF signals received at each antenna element in the array. Digital signal processing (DSP) techniques are then applied to the digital stream from each antenna element in the array. The process of beamforming involves the application of weight values to the digital signals from each antenna element ('transmit weights'), thereby adjusting the numerical representation of their amplitudes and phases such that, when added together, they form the desired beam—i.e. the desired directional receive sensitivity. The beam thus formed is a digital representation within the computer of the physical RF signals received by the antennae array from any given direction. The process of null steering at the transmitter is used to position the spatial direction of null regions in the pattern of the transmitted RF energy. The process of null steering at the receiver is a DSP technique to control the effective direction of nulls in the receiver's gain or sensitivity. Both processes are intended to minimize inter-beam spatial interference. SDMA techniques using multi-element antennae arrays to form directed beams are disclosed in the context of mobile communications in Swales, et. al., IEEE Trans. Veh. Technol. Vol. 39 No. 1 February, 1990 and in U.S. Pat. No. 5,515,378, which also suggests combining various temporal and spectral multiple-access techniques with spatial multiple access techniques. The technical foundations for SDMA protocols using adaptive antennae arrays are discussed, for example, in the book by Litva and Lo entitled "Digital Beamforming in Wireless Communications", Artech House, 1996. And in U.S. Pat. No. 5,260,068, Gardner and Schell suggest conjoining "spectrally disjoint" and "spatially separable" electromagnetic signal patterns.

Also, in the work by Agee cited supra, at p. 72, he notes: "[s]patial diversity can be exploited for any networking approach and modulation format, by employing a multiport adaptive antenna array to separate the time-coincident subscriber signals prior to the demodulation operation."

In his above-referenced patents, Raleigh also mentions reuse enhancement methods that use adaptive spatial filtering to reduce reuse factor of 2G FDMA-TDMA networks. Fixed (sectorized) spatial filtering is also employed in 2G CDMA networks to increase the number of codes that can be used at BS's in the network.

When a transmitter communicates the transmit weights, the receiver can use them to compare against the received signals to eliminate erroneously received spatially separated signals (i.e., reflections of other spatial sector signals unintentionally received). The receiver can also generate a set of 'receive weights' which indicate that DSP formulation which best recreated, out of the universe of received signals from the multipath elements, the original signal as modified by the now-known transmit weights (as differentiated from the signal modified by the transmit path).

In U.S. Pat. No. 6,128,276, Agee disclosed that not only can multiple antennae be used in a diversity scheme from a single transmitting antenna, but also that the receiving antennae need only as much separation as is necessary "to vary different multipath interference amongst the group. A separation of nominally ten wavelengths is generally needed to observe independent signal fading." Although, as mobile wireless is moving up-frequency the wavelengths are shortening in direct inverse order, this ten-wavelength separation still imposed a practical limit. Most wireless communications networks today are still working in the 1-to-5 GHz range, where the single wavelengths measure between a meter and a decimeter. While a decimeter separation (3.937) could fit within the average size of a handheld cellular unit, a 10-decimeter, or even a 10-meter, separation, would not. And fitting multiple decimeter antennae requires, of course, even more separation space between the antennae.

Spatial separation techniques, and in particular techniques based on fixed spatial filtering approaches, suffer from what may be called 'dynamic' multipath. They can be substantively harmed by channel multipath. Signal reflections may impinge on the spatially sensitive transceiver from any and all directions, including directions opposite from the transceiver (e.g., due to structures on the far side of the transceiver). These reflections can cause signals expected on one sector to be injected into other sectors, causing undesired interference. Dealing with known and presumed multipath, and depending upon it, are not the same as opportunistically using the optimal subset of potential multipaths, which is not part of these or other prior art.

Additional Diversity Available in a MIMO Environment

With multiple antennae at the transmitting and receiving end, three further diversity schemes become accessible. The first two are mentioned in U.S. Pat. No. 6,128,276, those being angle-of-arrival and polarization diversity. The third is spectral diversity, obtained by redundantly transmitting the signal data over multiple frequency channels. In this approach, both the phase and amplitude of the carrier can be varied to represent the signal in multitone transmissions and M-ary digital modulation schemes. In an M-ary modulation scheme, two or more bits are grouped together to form symbols and one of the M possible signals is transmitted during each period. Examples of M-ary digital modulation schemes include Phase Shift Keying (PSK), Frequency Shift Keying (FSK), and higher order Quadrature Amplitude Modulation (QAM). In QAM a signal is represented by the phase and amplitude of a carrier wave. In high order QAM, a multitude of points can be distinguished on an amplitude/phase plot. For example, in 64-ary QAM, 64 such points can be distinguished. Since six bits of zeros and ones can take on 64 different combinations, a six-bit sequence of data symbols can, for example, be modulated onto a carrier in 64-ary QAM by transmitting only one value set of phase and amplitude out of the possible 64 such sets.

Varanesi cavalierly dismissed MIMO, his assessment being: "While mathematically elegant and sound, the critique of that general approach is that, in practical situations, one is usually not interested in over-achieving reception fidelity. It is sufficient to just meet a performance specification. So rather than achieving that performance without overkill, the leftover is used to make the system more bandwidth efficient." His patent also gives no consideration to either (a) network effects and how to attain them beneficially; and (b) using multi-user feedback decision receivers (or obviously, multi-user feedback) anywhere but at BSs.

Various methods for obtaining signal diversity are known. Frequency diversity is one of many diversity methods. The same modulation is carried by several carrier channels separated by nominally the coherence bandwidth of each respective channel. In time diversity, the same information is transmitted over different time slots.

Multiple antennas can be used in a spatial diversity scheme. Several receiving antennas can be used to receive the signals sent from a single transmitting antenna. For best effect, the receiving antennas are spaced enough apart to vary different multipath interference amongst the group. A separation of nominally ten wavelengths is generally needed to observe independent signal fading.

Signal diversity can be used when a signal has a bandwidth much greater than the coherence bandwidth of the channel, in a more sophisticated diversity scheme. Such a signal with a bandwidth W can resolve the multipath components and provide the receiver with several independently fading signal paths. When a bandwidth W much greater than the coherence bandwidth of each respective channel is available to a user, the channel can be subdivided into a number of frequency division multiplexed sub-channels having a mutual separation in center frequencies of at least the coherence bandwidth of each respective channel. The same signal can then be transmitted over the frequency-division multiplex sub-channels to establish frequency diversity operation. The same result can be achieved by using a wideband binary signal that covers the bandwidth W.

Other prior art diversity schemes have included angle-of-arrival or spatial diversity and polarization diversity. Many of these, and the prior art thereof, are referenced in U.S. Pat. No. 6,128,276, B. G. Agee, "Stacked-Carrier discrete multiple tone communication technology and combinations with code nulling, interference cancellation, retrodirective communication and adaptive antenna arrays". In that patent, one of its main objectives was to provide a simple equalization of linear channel multipath distortion; yet one of its principle limitations is that it concentrates on point-to-multipoint communication links: "But this technique is extended by the present invention to point-to-point and point-to-multipoint communications where the intended communicators, as well as the interferers, include stacked-carrier spread spectrum modulation formats." Although U.S. Pat. No. 6,128,276 mentions multipoint-to-multipoint and point-to-point alternatives, it does not provide a unified approach for network MIMO management which exploits advantageously the localization efforts of individual nodes. One key difference is that while in the present invention, any node may be a transceiver for multiple inputs and multiple outputs, in U.S. Pat. No. 6,128,276 "A difference between the base station and the remote unit is that the base station transceives signals from multiple nodes, e.g., multiple access. Each remote unit transceives only the single data stream intended for it. Channel equalization techniques and code nulling are limited methods for adapting the spreading and despreading weights." Furthermore, unlike the present invention where the transmit and receive weights are substantially the same and preferentially form a reciprocal, in U.S. Pat. No. 6,128,276: "In general, the despreading weights are adjusted to maximize the signal-to-interference-and-noise ratio (SINR) of the despread baseband signals, e.g., estimated data symbols. This typically results in a set of code nulling despreading weights that are significantly different than the spreading gains used to spread the baseband signals at the other ends of the link." Additionally, the preferred embodiment in U.S. Pat. No. 6,128,276 uses blind despreading as it presumes that "the transmit spreading gains and channel distortions are not known at the despreader", whereas the present invention embodies symbol signaling to allow the spreading gains and channel distortions to be known at each end of the link.

OFDM

With multitone transmission, Orthogonal Frequency Division Multiplexing OFDM) becomes more feasible from each node equipped with a multi-antennae array. There have been several problems in dynamic wireless electromagnetic communication networks implementing OFDM (which include both those designed with static and mobile nodes, and those designed with only static nodes that must adapt over time to environmental or network changes, additions, or removals). These problems include intertone interference, windowing time constraints (generally requiring short windows), and inapplicability to macrocellular, i.e. multi-cell, network deployment. One of the objects of the present embodiment of the invention is to overcome these and other current OFDM problems in a MIMO environment.

DS-CDMA Problems

P. N. Monogioudis and J. M. Edmonds, in U.S. Pat. No. 5,550,810, identified several problems in Direct-Sequence, Code Division Multiple Access approaches to resolving multipath and multiple transmitter conditions. n a DS-CDMA communication system a digital signal, for example digitized speech or data, is multiplied by a coding sequence comprising a pseudorandom sequence which spreads the energy in the modulating signal, which energy is transmitted as a spread spectrum signal. At the receiver, the antenna signal is multiplied by the same pseudorandom sequence which is synchronized to the spreading sequence in order to recover the modulating signal. Due to multipath effects which will cause intersymbol interference, Rake combining is used to overcome these effects and to produce a modulating signal which can be demodulated satisfactory.

In the case of a DS-CDMA communication system several different spread spectrum signals having the same or different chip rams and transmitted simultaneously at the same frequency by different users may be received at an antenna, each signal having been subject to different multipath effects, a method of equalization which attempts to determine the channel impulse response and invert it is not adequate. Amongst the problems is what is known as the near-far effect due to signals from transmitters being received at a BS at different power levels. This effect is overcome by the BSs having fast power control algorithms.

In order for a receiver to be able to adapt itself to different conditions which may be found in practice, it must be able to cope with multiple bit rates which are required by a multi-media service provision, variations in the loading of the system, bit error degradation that other users' interference causes and power control failure caused, for example, by near-far interference under severe fading conditions.

They identify the information-theory source for that patent's incorporated canceller for intersymbol interference, but note that:

"A problem with DS-CDMA is that there may be several different simultaneous transmissions on the same frequency channel, which transmissions may be asynchronous and at different bit rates. Accordingly in order to approach the performance of a single user it is not sufficient just to estimate the channel impulse response and perform combining."

Where they do consider MIMO it is only in the context of a single BS recovering signals from several users; and because of the problems they identified above, mostly dismissed the MIMO approach, stating:

"For dealing with multi-user interference in DS-CDMA transmissions, decision feedback equalizers are not good enough because they do not obtain, and make use of, tentative decisions obtained independently from the received transmissions."

None of the prior art resolved a basic problem with wireless communication, that the greater the power that goes into one transmission the less capacity other transmissions may experience, for one person's signal is another person's noise. By approaching all wireless multipoint electromagnetic communications networks solely from the individual unit level, this conundrum continually represented a barrier.

Power Vs. Capacity Conundrum

Ongoing power control for a wireless electromagnetic communications network is the control of radiated power, as the communication environment changes after initial communications between any two nodes is attained. The signal transmitted from one node to another becomes part of the environment, and thus part of the 'noise', for any other communication. Not only can such a signal interfere with other simultaneous conversations between other, unrelated pairs of nodes in the network, but it can also interfere with simultaneous conversations between other nodes and the receiving (or even sending) node. Two types of power control are necessary: initial power control (to establish a minimally acceptable communications channel or link between a transmitting and receiving node), and ongoing power control, to constantly adapt the minimum level of power usage as the environment changes.

Power Consumption as a Second, Orthogonal Network Metric

Initial Power Control

Several communications protocols are known for cellular systems. These range from the Personal Handiphone System (PHS) and the Global System for Mobile Communications (GSM), to the packet-switching TCP/IP protocol, the new 'BlueTooth' limited range protocol, and a host of pager-based protocols. All must manage the initialization between one node and another, a problem that has plagued communications since the day Alexander Graham Bell's proposed 'Hoi, Hoi!' fought with Thomas A. Edison's "Hello".

Similarly, the amount of power which must be used to establish the initial link between any two nodes is only known to the extent that the environment (external and internal) is identical to previously established conditions. If no record of such conditions exist, either because the cost of storing the same information is too high, or because no such link has ever been made, or because an environmental difference has already been detected, then the initial power allocation which must be made is uncertain. The higher the initial power used to establish a link, the greater that link's impact will be on other links and upon the reciprocal nodes at either end. At the high extreme the new link will drown out all existing links, thereby degrading network capacity; at the low extreme, the new link will not be discernible, thereby failing to establish new capacity. Moderating the initial power over time, as links are formed, broken, and reformed, currently requires good luck, insensitivity to environmental conditions and preference for ad-hoc assertions, complex record maintenance, or increased effort at ongoing power control. An approach of using power management and reciprocal transmit weights, while it provides some adaptivity, fails to attain the capacity and power management potential of full diversity utilization.

Ongoing Power Control

Ongoing power control is the control at the transmitter as the communication environment changes after the link amongst a set of nodes is achieved. for example, when radiated power at the sender is increased for the link between a sender and recipient(s), in order to achieve an acceptable quality for the received signal, such a change may degrade other signals at the same node(s) and in 'nearby' links. In addition, as connections are constantly altering (nodes adding and subtracting signals as content flows and halts), the power assignments may change, again affecting the environment of radiated signals. There is a range of 'acceptable' signal, with the two extremes of 'excess quality' (implying that excess RF power is being used by the transmitter), and 'unacceptable quality' (implying that inadequate RF power is being used by the transmitter. Variations in propagation characteristics, atmospherics, and man-made interference (e.g., respectively, transmission hardware operational fluctuations, lightning, and noisy spark plugs in vehicles around the node) can also require the adjustment of the RF power levels.

The environmental changes that must be adapted to, and may require power changes in the transmission, may be changes external to the network. These can come from broad, general changes in the weather, particular and local changes in the immediate environment of a node (such as human or animal interaction with an antenna or the electromagnetic signal), changes in background interference, or particular and transient changes in complex environments which contain mobile elements that can affect transmissions, such as moving vehicles or airplanes passing through the signal space.

Other environmental changes that must be adapted to, and may require power changes in the transmission, may be changes internal to the network. These can include the addition (or dropping) of other unrelated signals between disparate links which affect the capacity attainable by the sending and receiving link, the addition (or dropping) of other signals between the receiving node and other nodes, or the addition (or dropping) of other signals between the sending node and other nodes.

Objective of Power Control

The objective of power control, especially of ongoing power control, is to minimize the power transmitted at each node in the network, to allow each node to achieve a desired level of performance over each link in the network, e.g., to attain a 'target' signal-to-interference-plus-noise (SINR) ratio for every link in the network. Such a power control method is referred to herein as a globally optimizing power control method. If a method is designed solely to optimize the SINR ratio at some subset of the network (e.g. a particular node, or a sub-set of nodes), then it is referred to herein as a locally optimizing power control method.

The problem has been that any globally optimizing power control method requires either impractical availability of hardware at each node, or unacceptably high communication of overhead control data to manage the entire network. Solutions have been proposed for a number of particular sub-sets of communications protocols, hardware, or systems, but none have resolved both the overhead vs. content and power vs. capacity conundrums both locally and globally.

A method for power control is disclosed in "Power Control With Signal Quality Estimation For Smart Antenna Array Communication Systems", PCT International Application PCT/US/02339, which is a continuation-in-part of U.S. patent application Ser. No. 08/729,387. This application uses particularized power assignments for each link rather than a global power capacity target, and, in focusing entirely on managing the power vs. capacity conundrum, does not address the overhead vs. content conundrum.

Similarly, Farrokh Rashid-Farrokhi, Leandros Tassiulas, and K. J. Ray Liue proposed a theoretical approach to power management using link-by-link, or link-based, SINR performance metrics. (See, Farrokh Rashid-Farrokhi, Leandros Tassiulas, and K. J. Ray Liu, "Joint optimal power control and beamforming in wireless networks using antenna arrays," IEEE Transactions on Communications, vol. 46, pp. 1313-1324, 1998; Farrokh Rashid-Farrokhi, K. J. Ray Liu, and Leandros Tassiulas, "Transmit beamforming and power control for cellular wireless systems," IEEE Journal on Selected Areas in Communications, vol. 16, pp. 1437-1450, 1998. The prior art did not address either MIMO channels or multipoint networks, chiefly considered fixed SINR constraints rather than dynamically adaptive network constraints. And failed to address real-world QoS requirements for individual subscribers in the network. Since a user can generally be connected to the network over multiple channels, multipath modes, and even be connected to multiple nodes in the network, a more realistic requirement would be to consider the total information rate into or out of a given node. This fundamental issue can not be addressed by the prior art, but is addressed by the LEGO concept. The suite of LEGO techniques can also address other network optimization criterion that can be more appropriate for some networks. In particular the max-min capacity optimization criterion and its related offshoots permit the network to maximize its capacity performance based on current channel conditions and traffic conditions. This can be particularly important for high-speed networks, or networks that are required to provide high rate CBR services, since these networks can easily consume all the available capacity that the network can provide, subject to the transmitter power constraints. The prior art, on the other hand, requires fixed, link by link performance goals in their optimization criteria.

Because capacity and power interact with each other within a wireless communications network, any approach to network optimization must address the system-wide and dynamic interplay between these two, orthogonal, metrics. Optimization that focuses solely on the environment for each particular node in the network, just as much as optimization that focuses solely on the global internodal environment, creates the risk of unbalanced and less-than-optimal results, and weakens the dynamic stability of the network in changing environments.

Distributed Networks and Dynamic Channel Structures

Distributed networks, where any particular node may both receive and transmit data from any other node, pose many advantages over the PMP and cellular PMP networks designed around centralizing hubs. The Internet is one of the principal examples of a new distributed network, though a broad range of other application areas for such are opening out. There is an explosive demand for broadband, mobile, and portable data services via both wired and wireless networks to connect conventional untethered platforms (handsets, laptops, PDAs) with other untethered, or transient or transitory, platforms (cell phones, inventory or shipping tags, temporary service connections). In all of these applications, distributed networks can provide strong advantages over conventional systems, by exploiting the inherent advantages of connectionless data service, or by reducing the power required to communicate amongst untethered platforms, at data rates competitive with tethered devices.

Distributed networks also provide multiple advantages in military applications, including collection, analysis, and collation/dissemination of reconnaissance data from beyond the front line of troops (FLOT); intruder detection and location behind the FLOT and rear echelons. By allowing data transfer through nearby nodes and over 'flat' network topologies, particularly dynamic networks where the channels change according to the context and presence or absence of particular nodes, distributed networks can reduce an adversary's ability to identify, target, incapacitate, or even detect high priority nodes in the network greatly enhancing the security and survivability relative to conventional point-to-multipoint networks.

Analogous advantages accrue to security applications or to logistical management systems, where opposition may be either criminal activity or natural disasters (blizzards, floods, warehouse or other fires). One key element of any multipoint to multipoint approach is that channels of communication between any particular pair of nodes may change over time in response to the environment, said environment including both the external natural environment and the internal environment of the same network's continually shifting functions and data streams.

Moreover, this invention is concerned with the problems described below.

Problems Forming the Opportunity for the Invention

The primary problem solved through the invention is communication of short, intermittent packets, in particular Voice over IP (VoIP) communication signals, over communication networks subject to significant time-and-frequency co-incident ("co-channel") interference from other network users and external emissions. A secondary problem solved through the invention is efficient physical routing of packets over multiple network nodes. e.g., using multihop relay techniques, in order to improve rate, robustness (immunity to interference and information warfare measures), reliability, and availability of communications between Source and Destination nodes in the network. A tertiary problem solved through the invention is means for rapid configuration and scalability of transceiver capabilities in highly dynamic environments where the density and severity of interferers, numbers and capabilities/requirements of communication nodes, and nature of channel propagation may change rapidly and dynamically between communication opportunities and/or over the course of a single communication opportunity.

Advantages of the Invention

The invention provides the following capabilities and advantages:
  Common, scalable transceiver blocks that can be implemented at individual nodes in the communication network (allowing phased addition of hardware and software without immediately rendering obsolete the previous infrastructure).
  Integration into a signal's waveform structure ("overhead structure") of overhead bits associated with point-to-point links in the network. e.g., Transmit and Receive Node Addresses (TNA's and RNA's), and then use of the resulting unified waveform structure both to securely identify nodes attempting to communicate with a receiver, and to develop linear combiner weights that can extract those signals from co-channel interference incident on that receiver (including interference from other nodes attempting to communicate with that receiver). This approach thereby eliminates bits needed for transmission of TNA and RNA in headers attached to data packets transmitted over each link in the network, as well as overhead needed for transmission of pilot tones/sequences, training signals, preambles/midambles, Unique Words, etc., typically used to train receivers in the network; thus reducing the transmission overhead and improving information-transmission efficiency.

Ability to further exploit overhead structure to increase transmit power and data rate, or to allow same-rate communication at reduced power to nodes in the network, thereby regaining link capacity lost by that overhead structure, with the most capacity regained at low receive signal-to-interference-and-noise-ratio (SINR).

Optional integration of overhead bits associated with multipoint routes in the network, e.g., Source and Destination Node Addresses (SNA's and DNA's) into the waveform structure used for adaptation of the communication transceivers ("overhead structure"), further reducing bits needed for transmission of SNA and DNA in headers attached to data packets transmitted in multihop networks, and allowing the use of macrodiverse relay networks in which data is coherently transmitted over multiple geographically separated nodes in a network.

Rapid (single packet) node detection/discovery and join/leave algorithms, allowing individual transceivers to enter or exit the network quickly to exchange traffic, update security codes, etc. . . . and to allow rapid and/or ad hoc configuration of the network as users encounter dynamic changes in multipath, fading, or interference.

Information assurance (IA) measures, e.g., antijamming and antispoofing capability, at the node and network level, including spreading means that defeat denial-of-service measures in which the frequencies and/or time periods containing synchronization and training bits are selectively jammed by an adversary.

Adaptive power management and cyclic feature reduction at node, link, and network levels, in order to minimize transmitted power and/or detectable features of emitters in the network.

Extreme low complexity (<200 kcps DSP software operations, <30 Mcps ASIC or FPGA coreware operations) for communications commensurate with VoIP communication, allowing maintenance of a collaborative networking information commensurate with pedestrian networking applications.

Collaborative communication applications that can be additionally handled by these transceivers include the following:

Distributed Kalman state circulation to enable widebaseline network geolocation algorithms.

Internode channel measurement and range/timing/carrier offset estimation algorithms used to enable wide-baseline network geolocation algorithms.

Collaborative interference avoidance methods during transmission and reception operations, e.g., allowing wide-area communications in presence of jammers in military communication systems, or incumbent broadcast emitters in commercial communication systems (e.g., 802.22).

Collaborative communication over long-range to out-of-theatre nodes, e.g., reachback nodes in military communication networks, or LEO/MEO/GEO satellites in commercial satellite communication networks.

BRIEF DESCRIPTION OF THE DRAWINGS

The invention is depicted in the Figures below.

FIG. 13A illustrates a network of MIMO-capable nodes, that is, nodes with multiple antennae, multitone transceivers with DSP capability (FIG. 13B), wherein the network has two subsets with preferentially reciprocal uplinks and downlinks and diversity channel capacity between the subsets.

FIGS. 52A-52D show receive packet detection, address association, and link SINR estimation processing performed in the preferred embodiment of the invention.

OBJECTS

Figure 1:
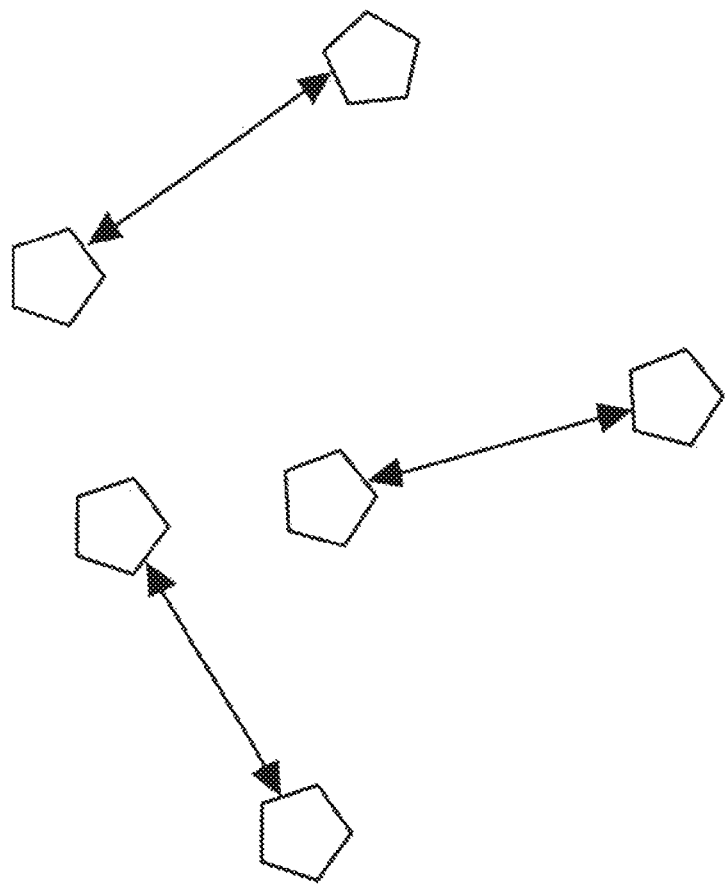
FIG. 1 illustrates a Point-To-Point or PTP network; each pentagon indicates a node, or transmission and reception (a.k.a. transceiver) station, and each arrow indicates a link along which communication flows between nodes.
Figure 2:
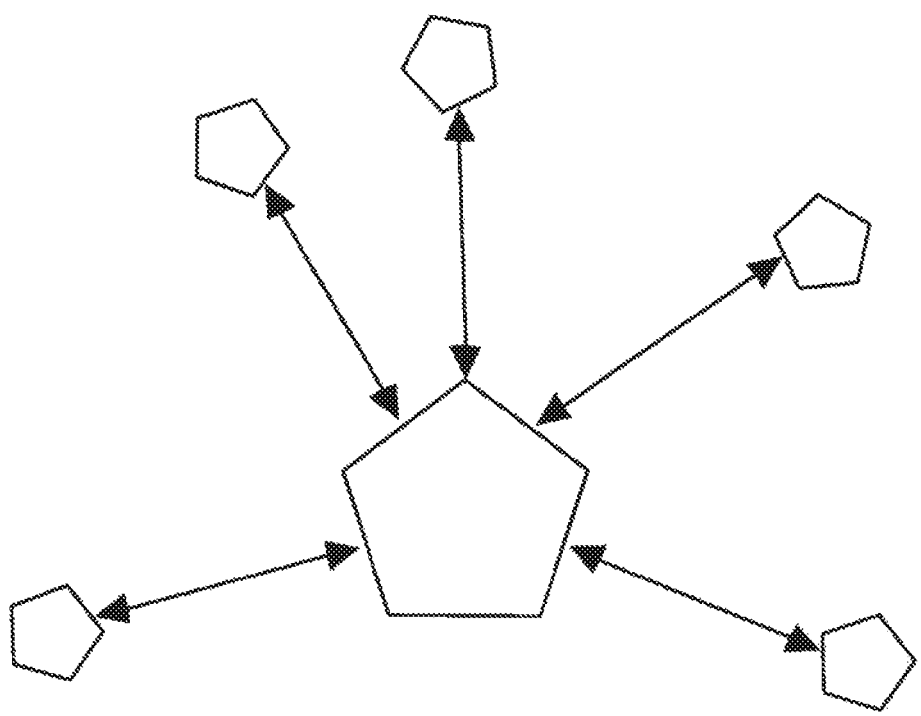
FIG. 2 illustrates a Point-To-Multipoint network. The large pentagon indicates a Base Station (BS) capable of communicating with many individual Subscriber Units (SU), indicated by the small pentagons.
Figure 3A:
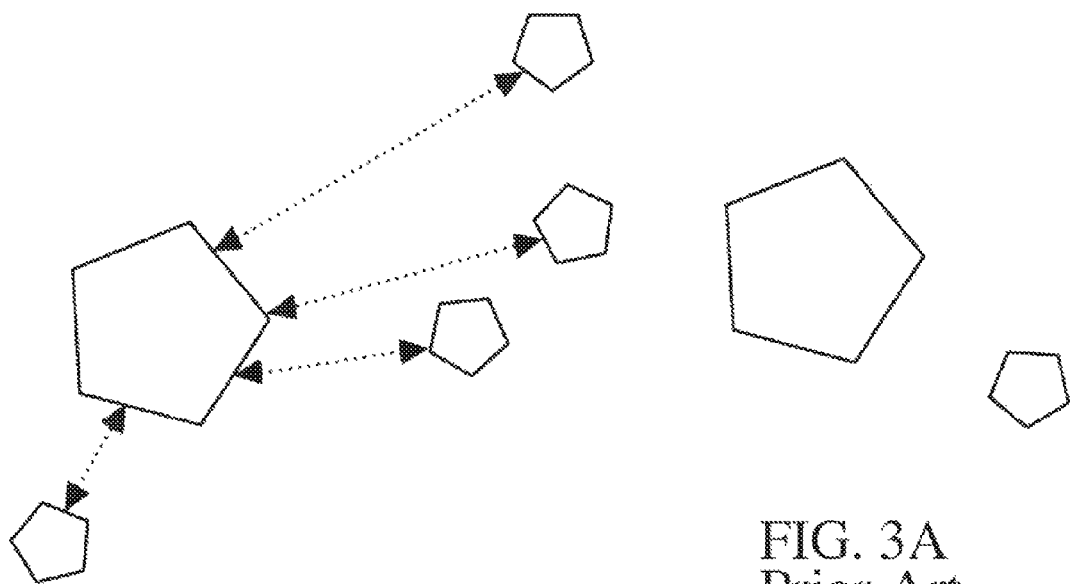
FIGS. 3A and 3B each illustrate a more complex PMP network with multiple BS and SU nodes, and multiple links. The solid lines indicate one diversity channel and the dotted lines a second diversity channel.
Figure 3B:
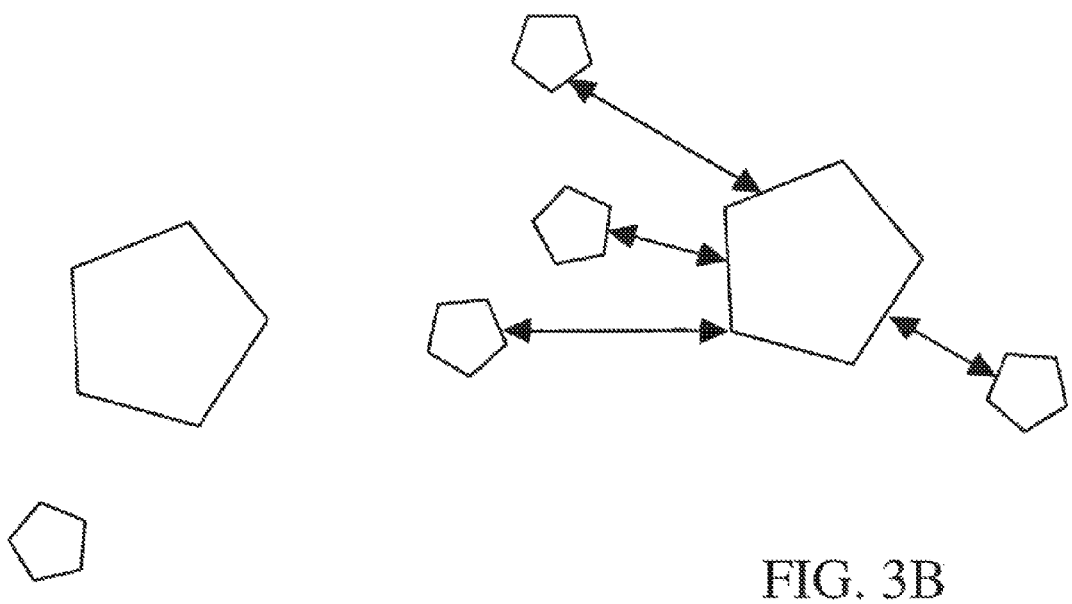

Resolving many of the prior art's weaknesses by enabling true, opportunistic. MIMO networks is one of the principle objects of the invention. Creating a truly adaptive, flexible, multi-protocol wireless electromagnetic communications network is a second of the principle objects of the invention. A third is to simultaneously resolve the interplay between transmission power and network capacity by considering and using the interplay between one local node's transmissions as a signal and other nodes' reception of the same as either a signal (if the receiving node is an intended target) or as environmental noise (if the receiving node is an unintended target).

A secondary objective under this third objective is to provide methods which improve signal quality received by a targeted recipient node while simultaneously reducing interference energy received by other untargeted recipient nodes, so as to enable improved capacity amongst existing nodes, adding more nodes, increasing coverage area, and improving communications quality, or any sub-combination thereof.

Another secondary objective under this third objective is to provide an adaptive method which accounts for multipath interaction amongst the nodes and network, and minimizes unwanted effects while maximizing potential useful effects thereof.

Another secondary object under this is to provide improved load balancing amongst nodes and communication paths or links within the network with a minimum of overall control.

Another secondary object under this is to enable improved access to new nodes to the network.

Another secondary object under this is to enable multiple, competing, yet cooperating sub-networks that are mutually and automatically adaptive and responsive.

A second of the principal objects of the invention is to simultaneously resolve the interplay between local optimization, which demands detailed consideration of the immediate environmental details that affect each link between that node and others over which communications are flowing, and global optimization, which demands a minimum of control information be exchanged across the network and amongst the nodes in lieu of otherwise usable signal capacity.

A secondary object under this is to use the reception of signal information from other nodes, both those targeting the recipient and those not targeting the recipient, to enhance both reception and transmission quality to and from the receiving node while minimizing the explicit and separate feedback signals that must be exchanged amongst the nodes and network.

Another secondary object under this is to provide methods for optimization that can use or be independent of antenna array geometry, array calibration, or explicit feedback control signals from other nodes, whether the same are continuous, regular, or reactive to environmental changes affecting the link between the receiving node and the other nodes.

A third of the principal objects of the invention is to maximize the communications capacity and minimize the power usage both locally and globally across the network for any given set of hardware, software, and protocols.

A secondary object under this is to provide higher content throughput in underloaded networks, thereby providing faster perceived access or usage.

A secondary object under this is to provide higher reliability for any given hardware and software implementation.

A fourth of the principal objects of the invention is to provide a method for network optimization that can be extended to mixed networks, whether such mixing is amongst wireless and fixed links, or amongst electromagnetic spectra, or amongst types of nodes (BSs, dumb terminals, single- or limited-purpose appliances, or human-interactive input/output), and across both access schema and communications protocols with a minimum of particularization.

A fifth of the principal objects of the invention is to provide relatively simple and powerful methods for approximation which enable improvement that rapidly converges to the best solution for any optimization.

A secondary object under this is to provide a computationally efficient mechanization for cross-correlation operations that takes maximal advantage of multiport signals on particular single channels.

A sixth of the principle objects of the invention is to maximize the use of local information and minimize the use of global information that is required for approximation and approach to the best solution for any optimization.

SUMMARY OF THE INVENTION

The multiple-input, multiple-output (MIMO) network approach summarized here can incorporate as lesser, special cases, point-to-point links, point-to-multipoint networks, and disjoint (e.g., cellular) point-to-point links and point-to-multipoint networks. It can also be applied to spatial, temporal, or frequency-based access schemes (SDMA, TDMA, FDMA) employing combinations of spectral, temporal, spatial or polarization diversity, and to fixed, mixed, and mobile communications, as its focus is on the network in context rather than on the signal differentiation methodology, access determinations, or basing structure. One key to this approach is employment of spatially (or more generally diversity) adaptive transmit and receive processing to substantively reduce interference in general multipoint links, thereby optimizing capacity and/or other measures of network quality in multiply connected networks. A second key to this approach is the minimization of secondary consequences of signaling, and a second is using internalized feedback, so that the signaling process itself conveys information crucial to the optimization. Rapid, dynamic, adaptation reactive to the changing environment and communications within and surrounding each node and the entire network is used to promote both local and global efficiency. Unlike Varanesi, the feedback is neither limited to BSs only, nor effectively independent of the continual, real-world, signal and network environmental adaptation.

Figure 14:
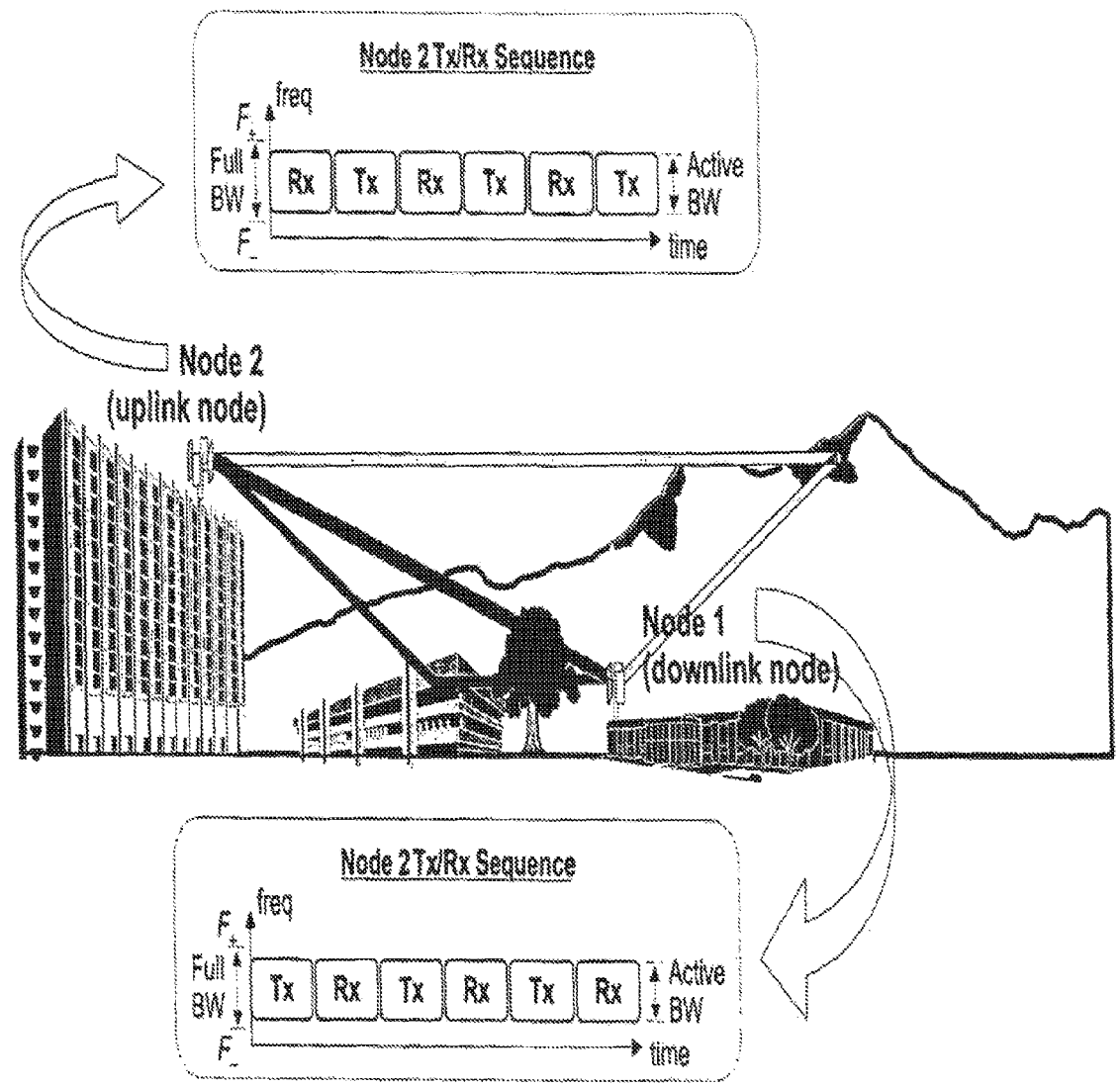
FIG. 14 illustrates MIMO-capable nodes wherein each node transmits and receives signal energy during alternating time slots (or sequences of time slots in TDD-TDMA systems).
Figure 15:
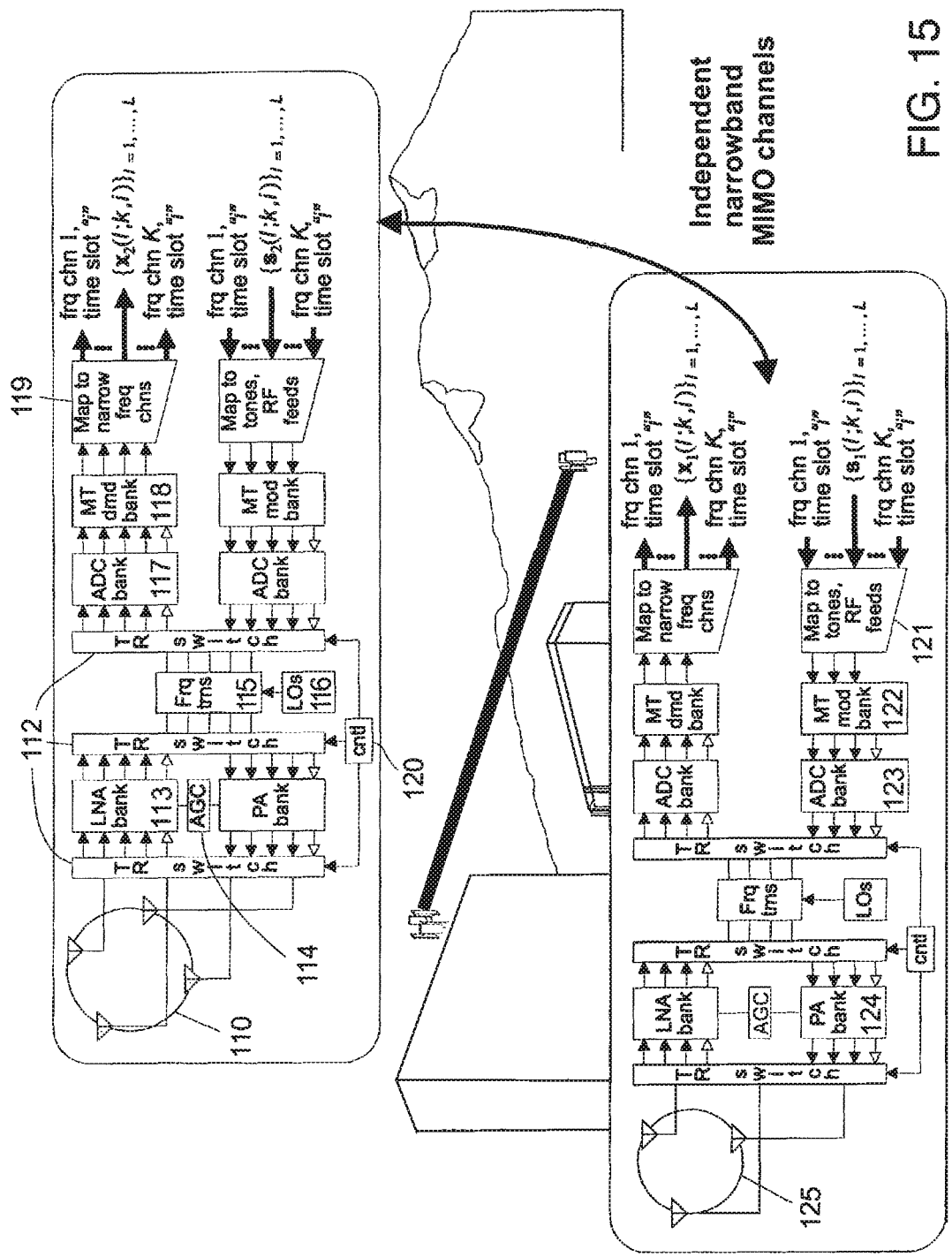
FIG. 15 illustrates more details of the MIMO-capable node, including on the receiving side: receiving spatially and/or polarization diverse antennae in a multiple antennae array (Item 110), a vector OFDM transceiver switch (Item 112), a LNA bank (Item 113), an AGC (Item 114), a Frequency translator (Item 115), a LOs ((Item 116), an ADC bank (Item 117), a MultiTone Demodulator Bank (Item 118), means for mapping received data over each diversity channel, on each frequency channel and receive time slot (Item 119), and a transceiver controller (Item 120); and including on the transmitting side means for mapping transmitted data for each frequency channel and transmit time slot (Item 121), a MultiTone Modulator bank (Item 122), a DAC bank (Item 123), the transceiver switch, a PA bank (Item 124), and transmitting spatially and/or polarization diverse antennae in a multiple antennae array (Item 125) which may be distinct from those used in receiving (Item 110).

Instead of avoiding diversity, or fighting diversity, the present embodiment of the invention exploits and makes use of spectral, temporal, polarization, and spatial diversity available at each node, as well as and route (location based) diversity provided over the network of nodes. The network of nodes uses MIMO-capable nodes, that is, nodes with multiple antennae, multitone transceivers and preferentially reciprocal uplinks and downlinks (FIG. 13A and FIG. 13B). In the preferred embodiment each node transmits and receives signal energy during alternating time slots (or sequences of time slots in TDD-TDMA systems) (FIG. 14); has a spatially and/or polarization diverse multiple-antenna array, a vector OFDM transceiver that downconverts, A/D converts, and frequency channelizes data induced on each antenna (or other diversity channel) during receive time slots, and inverse channelizes, D/A converts, and upconverts data intended for each antenna (or diversity channel) during transmit time slots; linearly combines data received over each diversity channel, on each frequency channel and receive time slot; redundantly distributes data intended for each diversity channel, on each frequency channel and transmit time slots; and computes combiner and distributer weights that exploit the, narrowband, MIMO channels response on each frequency channel and time slot (FIG. 15).

The concept of a 'diversity channel' is introduced to permit a distinction to be made between "channels" that data is redundantly distributed across during receive (or transmit) operations, from "channels" that data is transported over (e.g., frequency channels or time slots). Data is redundantly transported over diversity channels. i.e., the same data is transported on each diversity channel with weighting determined by the methods described in detail below, while independent data is generally transported over the second flavor of channel. Effectively exploiting available diversity dimensions, the present embodiment of the invention can maximize its ability to attain Rank 2 capacities, since multiple redundant transmissions can be made over the plurality resources, whether that plurality comes from different frequencies, multipaths, time slots, spatially separable antennae, or polarizing antennae. This is distinct from prior art approaches which required multiple redundant transmissions over a plurality of frequencies to attain Rank 2 capacities. Because the signal flow between nodes is not limited to a particular dimension of substantive differentiation the preferred embodiment of the network can at every point in time, and for every node in the network, exploit any and all diversity opportunities practicable and attainable for the network's communication channels.

Figure 16:
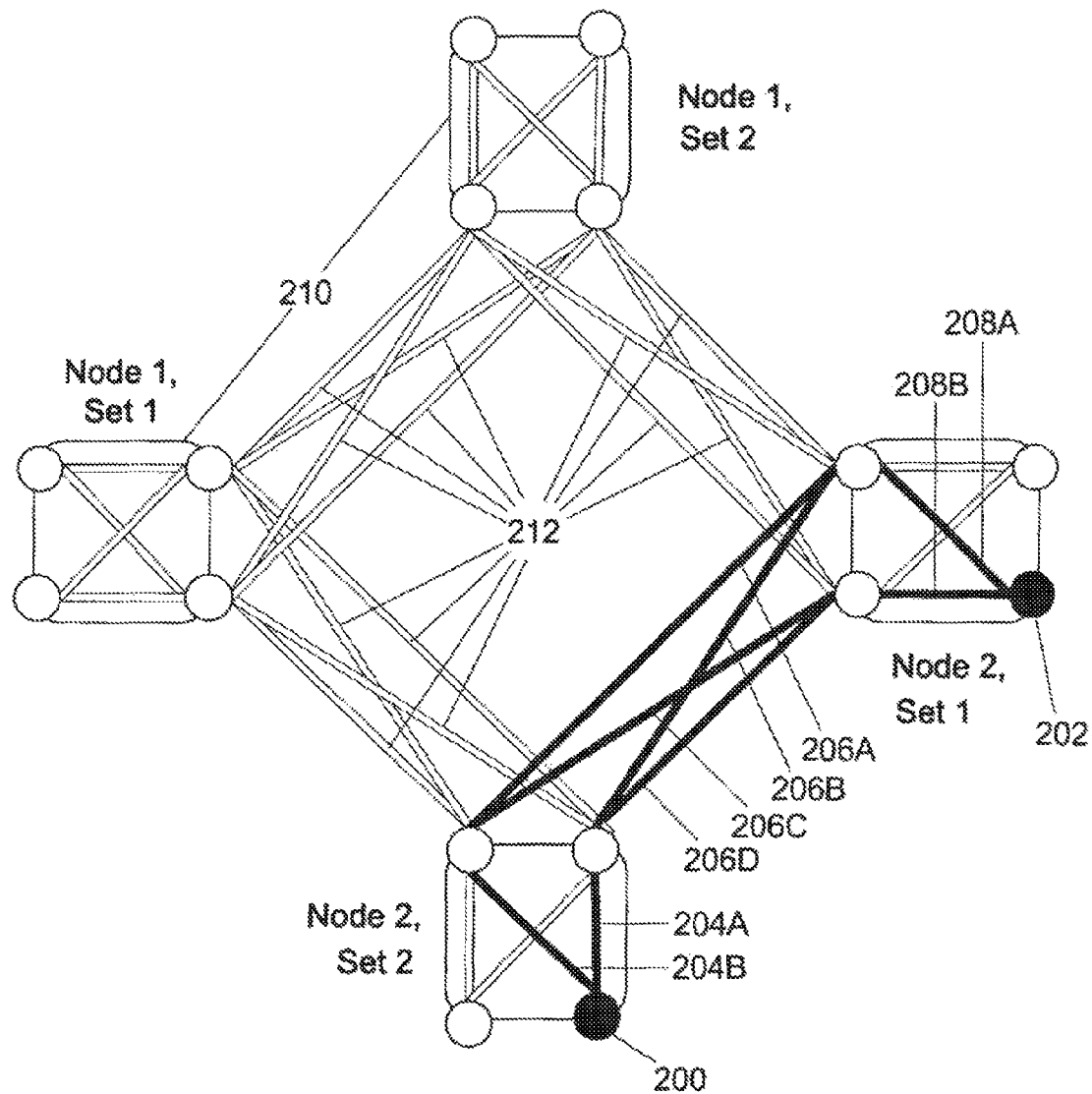
FIG. 16 illustrates a MIMO-capable network of the preferred embodiment, wherein an originating transceiver Node 2 in an uplink transmit set (Item 200) distributes a signal through multiple antennae (Items 204A and 204B), which goes over the channel matrix of diversity channels available (Items 206A,B,C, and D) to a uplink receive set node, which receives the signals over its multiple antennae and combines them (Items 208A and B) to the desired recipient (Item 202); leaving all other transmissions and channel diversity available (Item 212) for other network communications.

The signal flow between the multiplicity of nodes in the network comprises a multiplicity of information channels, emanating from and being received by a set of antennae at each node (FIG. 16). The physical channel flow in a network with M(n) diversity channels (e.g., M(n) antennae per node, at each node n in the network) means that for each transmitting node's pair of antennae, as many as M distinguishable receptions are feasible at each receiving node it can communicate with (FIG. 15, M=4, for a PTP link example).

Figure 17:
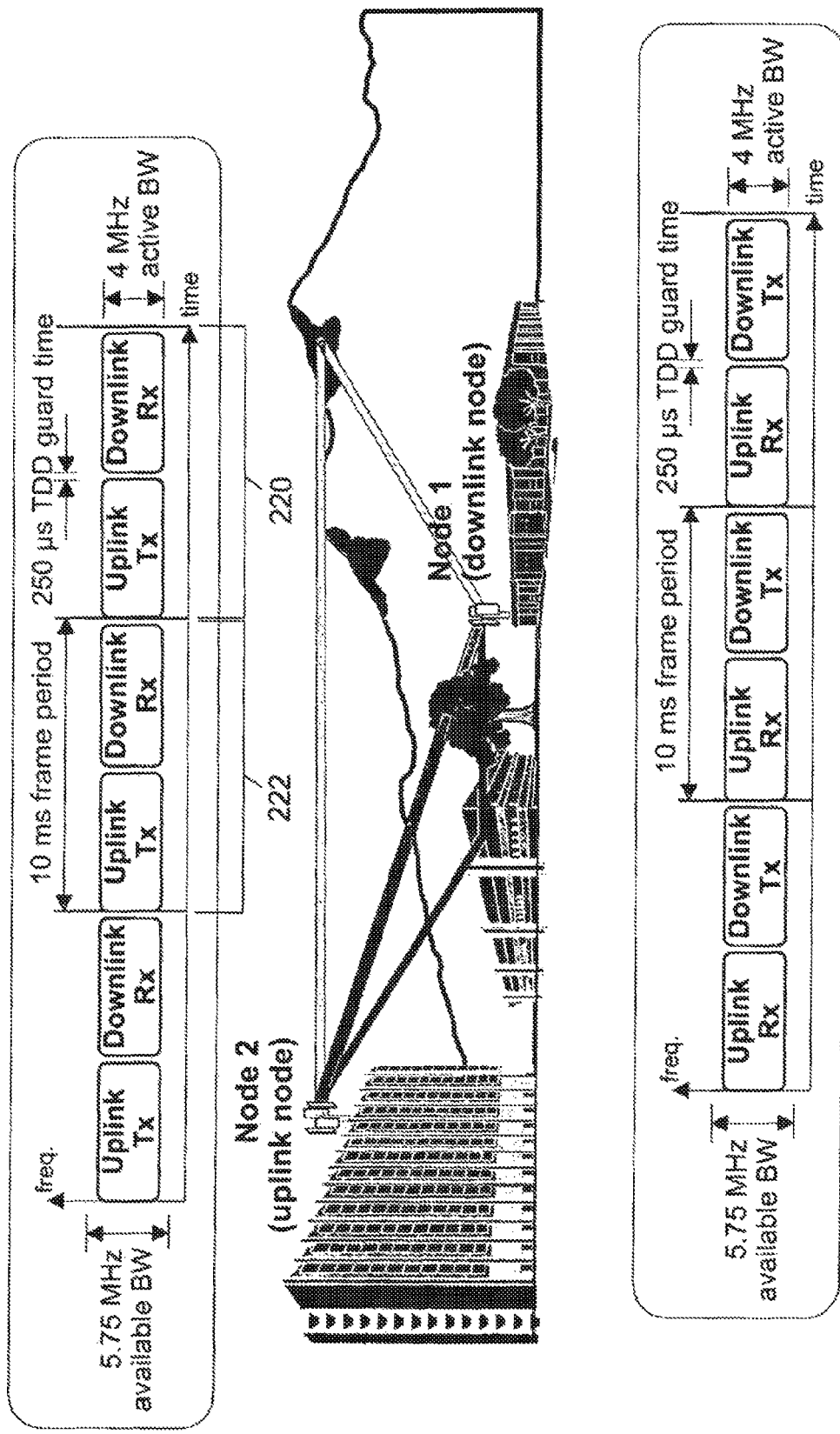
FIG. 17 illustrates a PTP MIMO node layout employing TDD, but one using a guard-time prefix (Item 220) and a 10 ms content frame period (Item 222), where the uplink Tx for Node 2 is at the time for the Uplink Rx for Node 1.

The preferred embodiment performs complex digital signal manipulation that includes a linear combining and linear distribution of the transmit and receive weights, the generation of piloting signals containing origination and destination node information, as well as interference-avoiding pseudorandom delay timing (FIG. 17), and both symbol and multitone encoding, to gain the benefit of substantive orthogonality at the physical level without requiring actual substantive orthogonality at the physical level.

Figure 18:
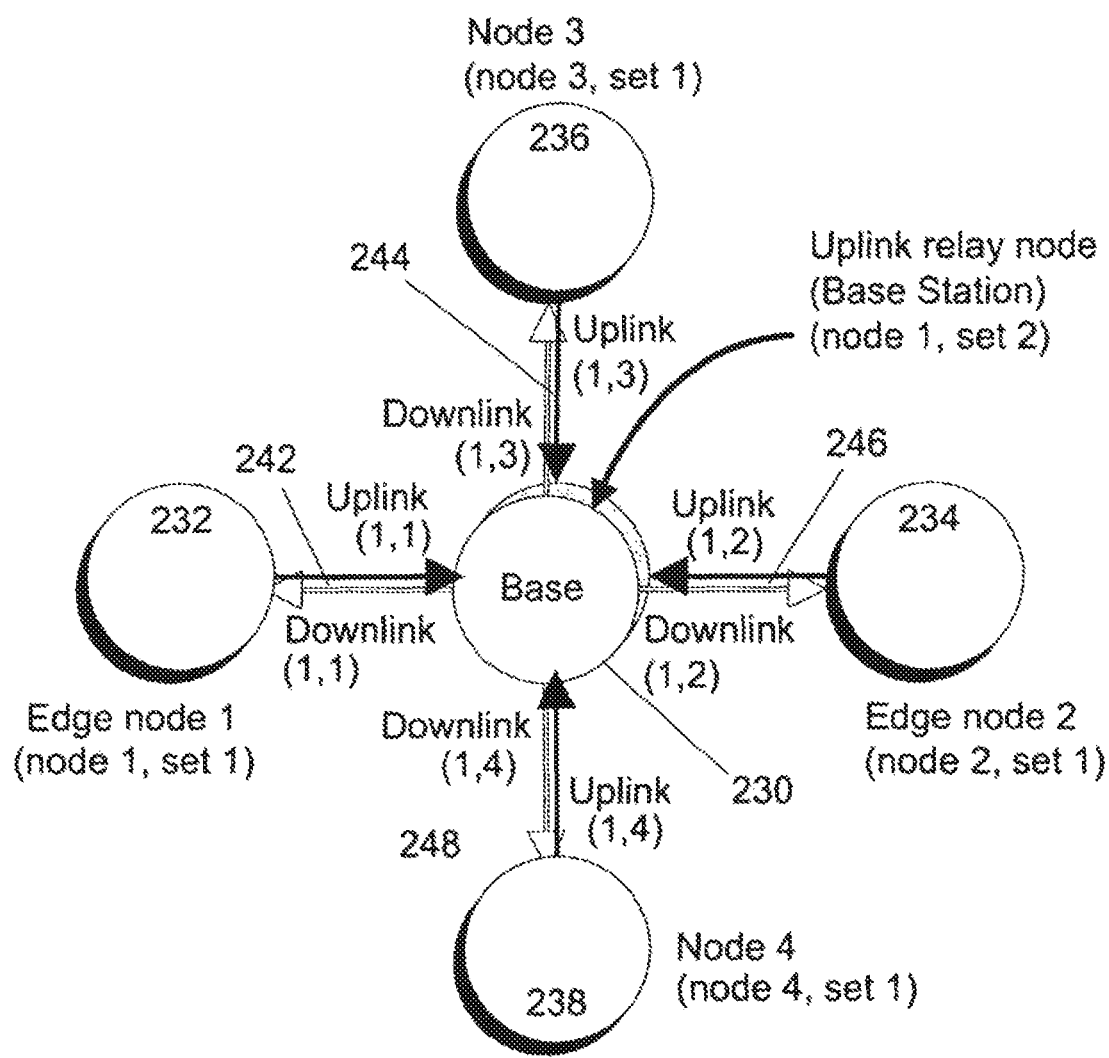
FIG. 18 illustrates a MIMO network in a star topology, where the uplink relay node (Node 1, Set 2) talks to 4 edge nodes (Nodes 1-4, set 1) with distinct channels for uplinks and downlinks.

The network is designed such that a subset of its nodes are MIMO-capable nodes, and that each such node can simultaneously communicate with up to as many nodes in its field of view as it has antennae. The network is further designed such that it comprises two or more proper subsets, each proper subset containing members who cannot communicate directly with other members of the same proper subset. So if the network contained only two proper subsets, First and Second, the members of First could transmit only to, and receive only from, the members of Second, and the members of Second could transmit only to, and receive only from, the members of First. Independent information is then transmitted from every member of First and is independently processed by each member of Second. (See FIG. 18, exemplifying one such topology, a 'Star' topology; and FIG. 19, exemplifying another such topology.)

A non-MIMO-capable node may belong to any subset containing at least one MIMO-capable node that has at least one antenna available to that non-MIMO-capable node that has the non-MIMO-capable node in its field of view.

Diversity channels, rather than antennae, limits the number of non-set members a MIMO-capable node may communicate with simultaneously, that is, the number with which it may hold time/frequency coincident communications. Also, this limiting number is a function of number of users attempting to communicate over the same diversity channels—users on different time-frequency channels do not affect this limit. Thus a node with 128 time frequency channels (8 TDMA time slots×16 FDMA frequency channels) and a 4 antennas (4 diversity channels per time-frequency channel) can support up to 4×128=512 links, to as many users. If the internode channel response to a given user has rank 1 (e.g., if antennas are on same polarization and multipath is absent), then only a single link can be established to that user on each time-frequency channel, e.g., 128 separate links (one on each time-frequency channel) in the example given above. Higher internode channel rank allows more channels to be established; for example if nodes are polarization diverse, then the internode channel response has rank 2 and 256 channels (2 per time-frequency channel) can be established. The MIMO channel response equation determines power on each channel—depending on needs of network and pathloss to user, some or most of channels nominally available may be turned off to optimize the overall network capacity.

A significant element is that the diversity channel distribution need not be equal; one recipient node may have half the channels, if the traffic density requires it, while the transmitting node may divide its remaining channels evenly amongst the remaining nodes. Therefore the more users that have rank 2 or better capacity, the greater the available channels for those who have only capacity 1. This supports incremental optimization as improvement for the network is not dependent upon global replacement of every lesser-capacity node, but results from any local replacement.

The preferred embodiment details the means for handling the two alternative cases where the interference is, or is not, spatially white in both link directions, the means for handling interference that is temporally white over the signal passband. Preferentially, each link in the network possesses reciprocal symmetry, such that:

$$H_{12}(k;n_1,n_2)=H^T_{21}(k;n_2,n_1),\qquad\text{EQ. 1}$$

Where $H_{12}$ (k; $n_1$, $n_2$) is the $M_1(n_2) \times M_2(n_1)$ MIMO transfer function for the data downlinked from node 1 to node 2 over channel k, less possible observed timing and carrier offset between uplink and downlink paths.
and,
$H_{21}$(k; $n_2$, $n_1$) is the $M_2(n_2) \times M_1(n_1)$ MIMO transfer function for the data uplink from node 2 to node 1 over channel k, and where $(\ )^T$ denotes the matrix transpose operation.

In the preferred embodiment, this is effected by using the TDD protocol, and by sharing antennas during transmit and receive operations and performing appropriate transceiver calibration and compensation to remove substantive differences between transmit and receive system responses (this can include path gain-and-phase differences after the transmit/receive switch, but does not in general require compensation of [small] unequal observed timing and carrier offset between uplink and downlink paths). However, simplex, random-access packet, and other alternative methods are also disclosed and incorporated herein.

The network is further designed such that at each MIMO-capable node n with M(n) antennae, no more than M(n) other actively transmitting nodes are in node n's field of view, enabling node n to effect a substantively null-steering solution as part of its transmissions, such that each node belonging to a downlink receive set can steer independent nulls to every uplink receive node in its field of view during transmit and receive operations, and such that each node belonging to an uplink receive set can steer independent nulls to every downlink receive node in its field of view during transmit and receive operations.

The preferred embodiment also has means for incorporation of pilot data during transmission operations, and means for computationally efficient exploitation of that pilot data during subsequent reception operations. This is to enable transmitting nodes to unambiguously direct information to intended recipient nodes in the network; to enable receiving nodes to unambiguously identify information intended for them to receive; to enable nodes to rapidly develop substantively null-steering receive weights that maximize the signal-to-interference-and-noise ratio (SINR) attainable by the link, to enable nodes to reject interference intended for other nodes in the network, to enable nodes to remove effects of observed timing offset in the link, and to enable the nodes and network to develop quality statistics for use in subsequent decoding, error detection, and transmit power management operations.

Figure 19:
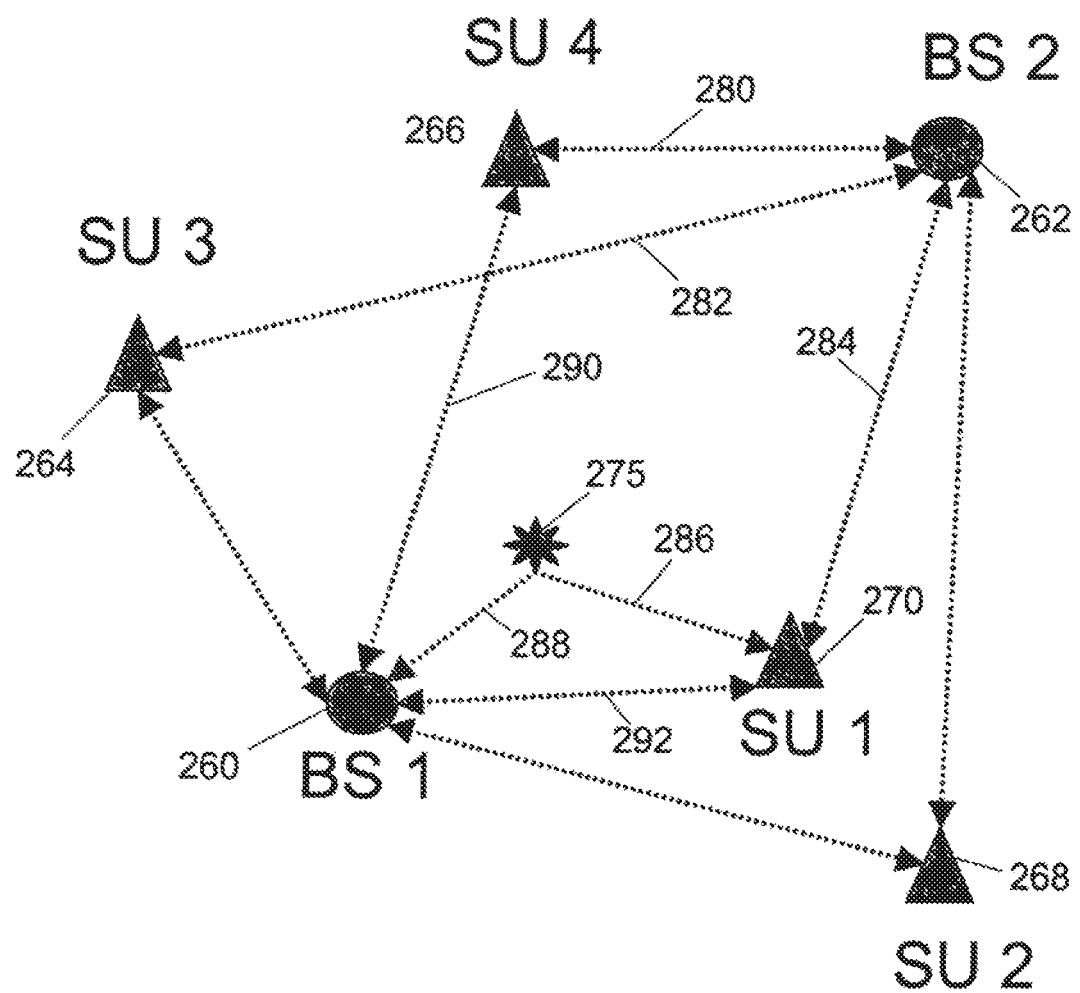
FIG. 19 illustrates a complex network topology with multiple BSs (Items 260, 262), SUs (Items 264, 266, 268, and 270), and a potentially interfering non-network node (Item 275), with transmissions amongst the network (280, 282, 284, 290, 292) competing with transmissions from outside the network which are perceived as interference at BS 1 (Item 260) and SU1 (Item 270).
Figure 20:
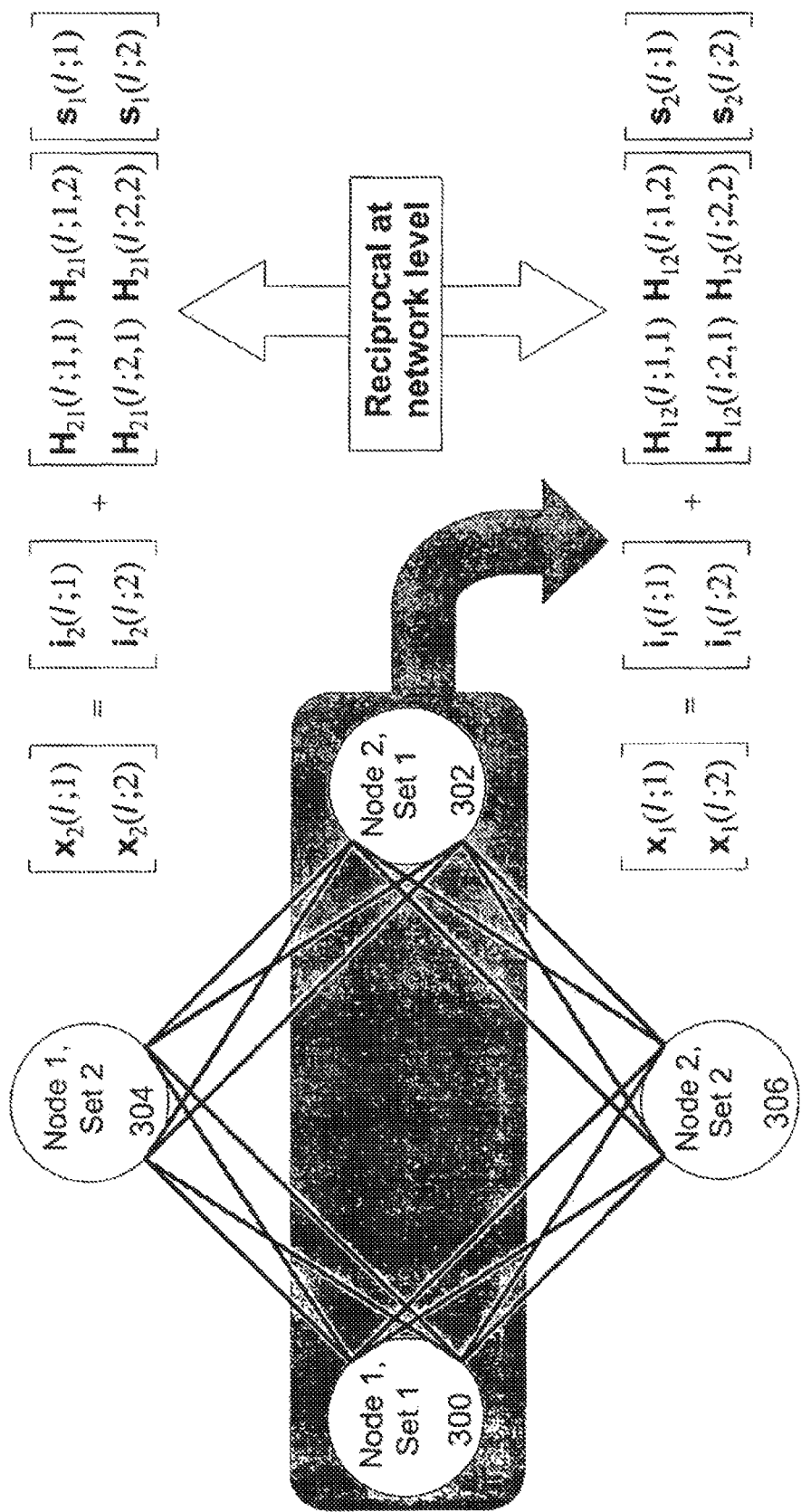
FIG. 20 illustrates a MIMO network in a ring configuration with reciprocity at the network level.

The preferred embodiment prefers a network designed to create and support a condition of network reciprocity, where the uplink and downlink criteria are reciprocal at the network level. (FIG. 19). The present form of the invention further exploits the reciprocity to attain both local and global optimization, of both capacity and power, through locally enabled global optimization of the network (LEGO).

LEGO is enabled by exploiting substantive reciprocity of the internode channel responses, together with appropriate normalization of transmit power measures, to design uplink and downlink network quality metrics $D_{21}(W_2,G_1)$ and $D_{12}(W_1,G_2)$ that satisfy network reciprocity property:

$$D_{12}(W,G)=D_{21}(G^*,W^*)\qquad\text{EQ. 2}$$

where $(W_2,G_1)$ and $(W_1,G_2)$ represent the receive and transmit weights employed by all nodes in the network during uplink and downlink operations, respectively. If equation 1 holds, then equal network quality can be achieved in each link direction by setting $G_1=W_1^*$ and $G_2=W_2^*$, such that each node use the receive combiner weights as transmit distribution weights during subsequent transmission operations, i.e., the network is preferentially designed and constrained such that each link is substantially reciprocal, such that the ad hoc network capacity measure can be made equal in both link directions by setting at both ends of the link:

$$g_2(k,q) \propto w_2^*(k,q) \text{ and } g_1(k,q) \propto w_1^*(k,q)$$

where $\{g_2(k,q), w_1(k,q)\}$ are the linear transmit and receive weights to transmit data $d_2(k,q)$ from node $n_2(q)$ to node $n_1(q)$ over channel k in the downlink, and where $\{g_1(k,q), w_2(k,q)\}$ are the linear transmit and receive weights used to transmit data $d_1(k,q)$ from node $n_1$ (q) back to node $n_2(q)$ over equivalent channel k in the uplink; thereby allowing Eq. 1 to be satisfied for such links.

The invention further iteratively optimizes network quality (as defined by $D_{12}$ and $D_{21}$) over multiple frames, by first adapting combiner weights to locally optimize link (and therefore network) performance during receive operations, and then using Eq. 1A and the reciprocity property (Eq. 1) to further optimize network quality in the reverse direction over subsequent transmit operations.

The invention further improves on this approach by using Eq. 1 to scale each transmit vector, based on a partial linearization of the network quality metrics, to either minimize the total transmit power in the entire network subject to a network quality constraint, preferentially capacity, or maximize network quality, preferentially capacity, subject to a total transmit power constraint. This constraint is defined and managed as a control parameter that is updated by the network. The total transmit power at a given node is then reported as an output to the network.

By using target criteria such as (1) for a cellular network, a max-min capacity criterion subject to a power constraint, or (2) for a wireless LAN, a max-sum capacity that is subject to a power constraint, and using simple comparative operations in feedback for the network to optimize towards those criteria, this invention enables flexibility and stability for any given hardware and software combination that underlies a wireless electromagnetic communications network and improves, for the entire network and at each particular node thereof, the communication capacity and power requirements. Furthermore, the present form of the invention does not ignore but rather directly addresses and resolves both the overhead vs. content and the power vs. capacity conundrums which otherwise limit present-day state of the art approaches to optimization. It does this using the experienced environment as part of the direct feedback, rather than requiring additional control information or signaling that reduces content capacity.

Figure 7A:
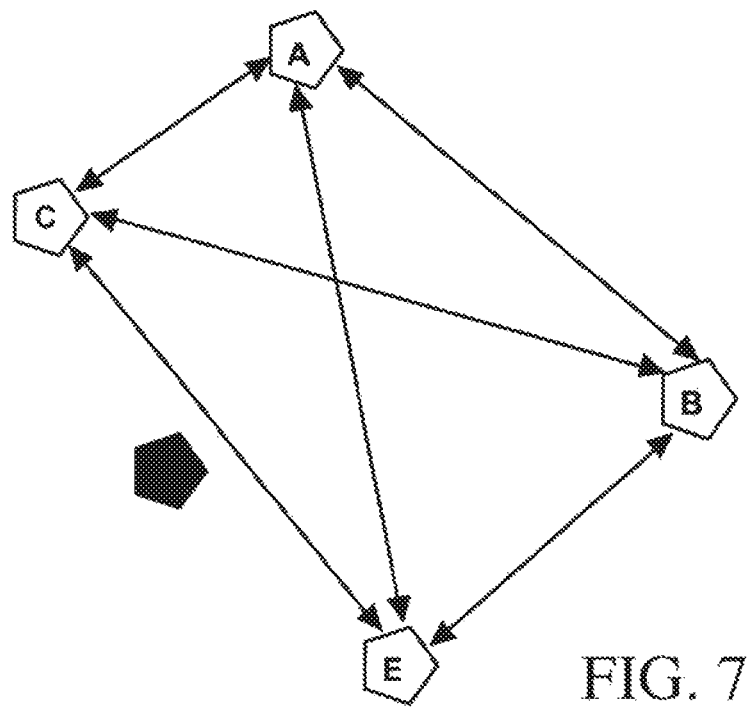
FIGS. 7A and 7B illustrate a capacity problem that may arise with a prior art PMP network when a new node attempts to enter and existing nodes are not capable of dynamically adapting diversity channels to form the new subsets. Although nodes C and E can readily talk with D, by substituting their direct link to each other for intervening links with D, nodes D, A, and B, being limited to 3 existing channels, cannot adapt to connect with each other by dropping either E or C depending on traffic needs.
Figure 7B:
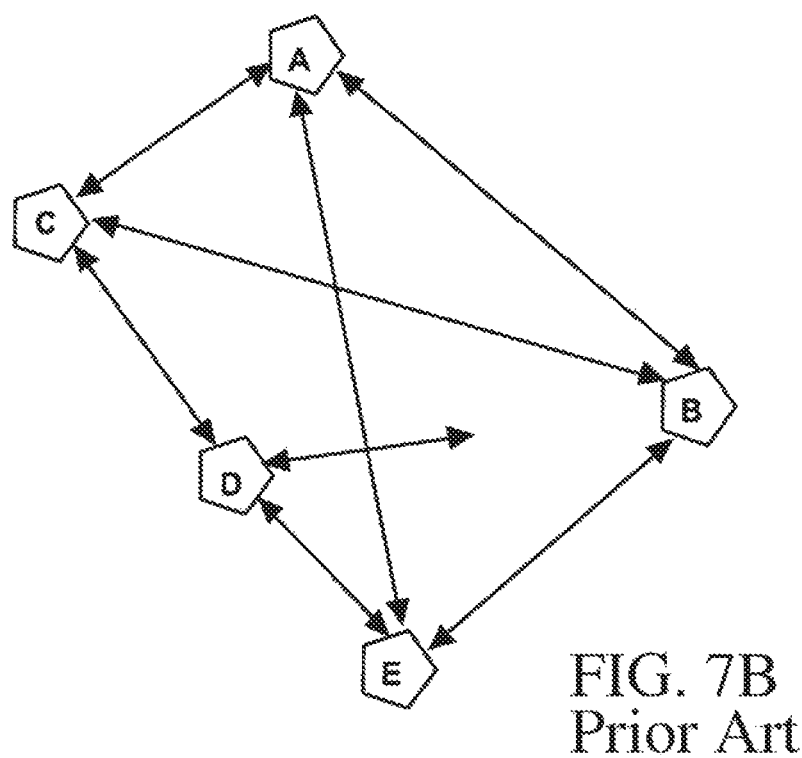
Figure 8:
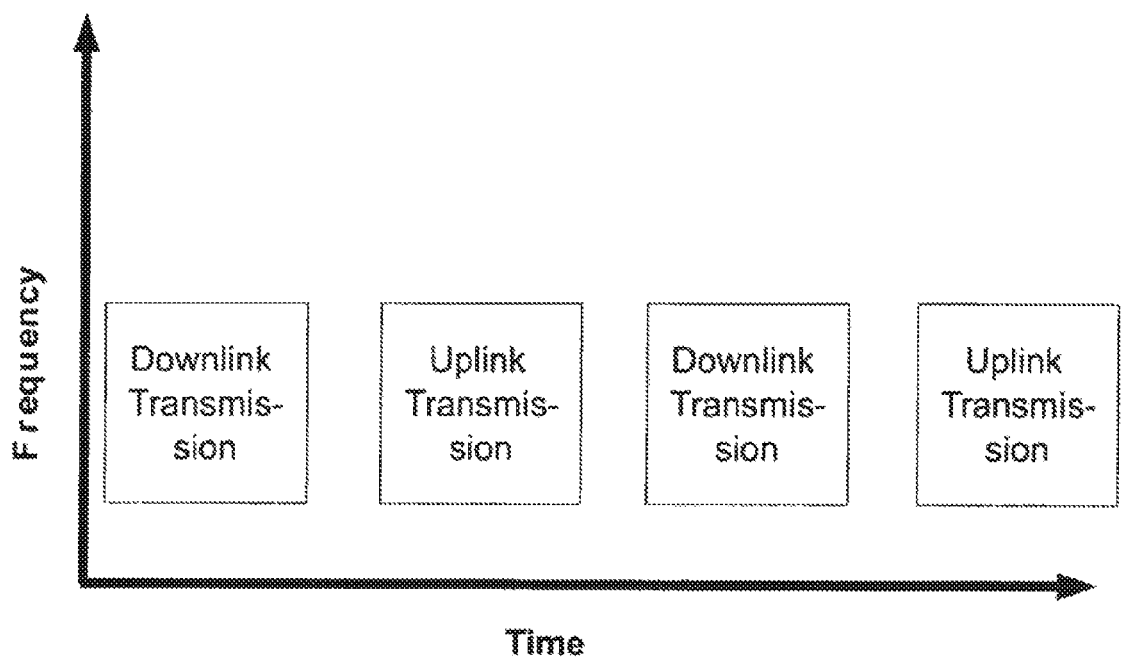
FIG. 8 illustrates a Time-Division Duplex communications protocol, whereby alternating uplink and downlink, or transmission and reception, slices of network activity take place at a node.
Figure 9:
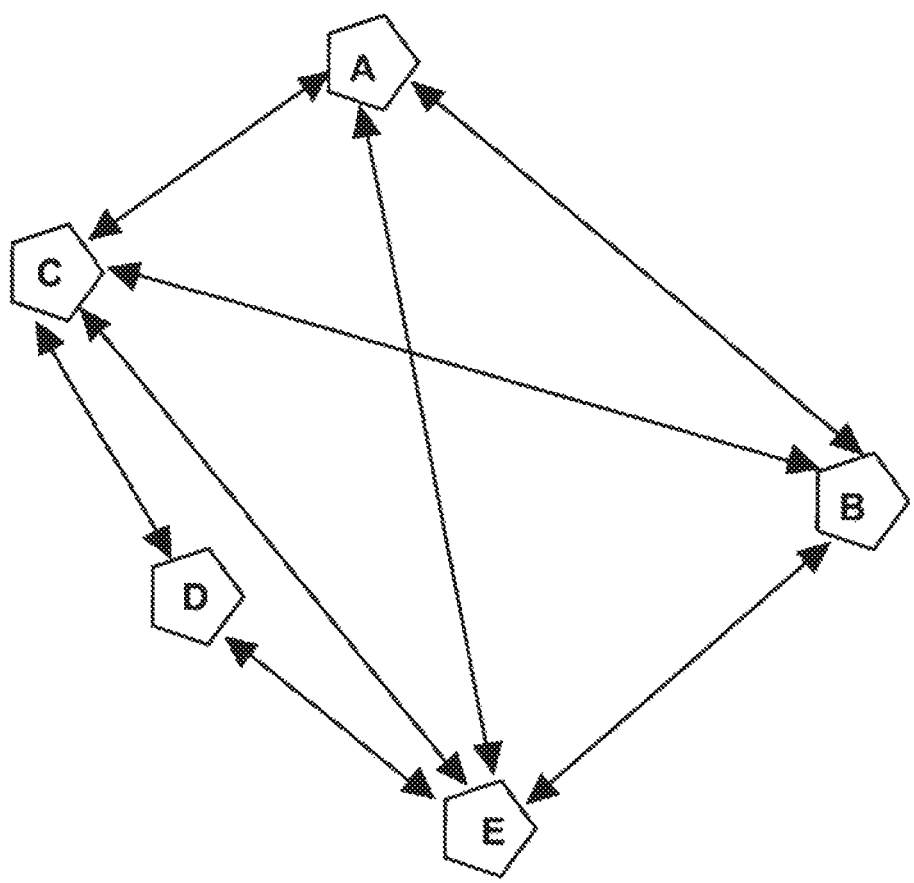
FIG. 9 illustrates an asymmetric network where nodes C and D have greater capacity than nodes A and B, which in turn have greater capacity than node D, but where the network cannot dynamically allocate this capacity to meet signal density needs to differing subsets of nodes.
Figure 10:
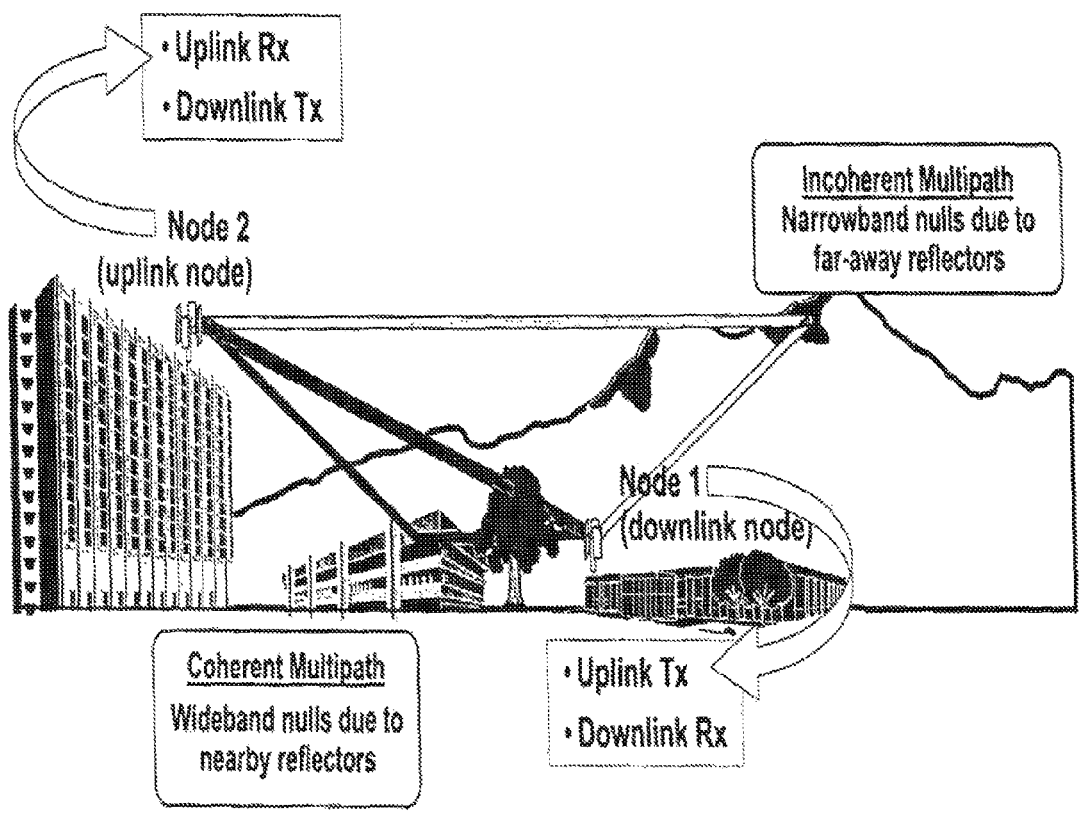
FIG. 10 illustrates a multipath network, where transmissions between node 1 and node 2 are both direct and reflected off environmental features both near and far.
Figure 11:
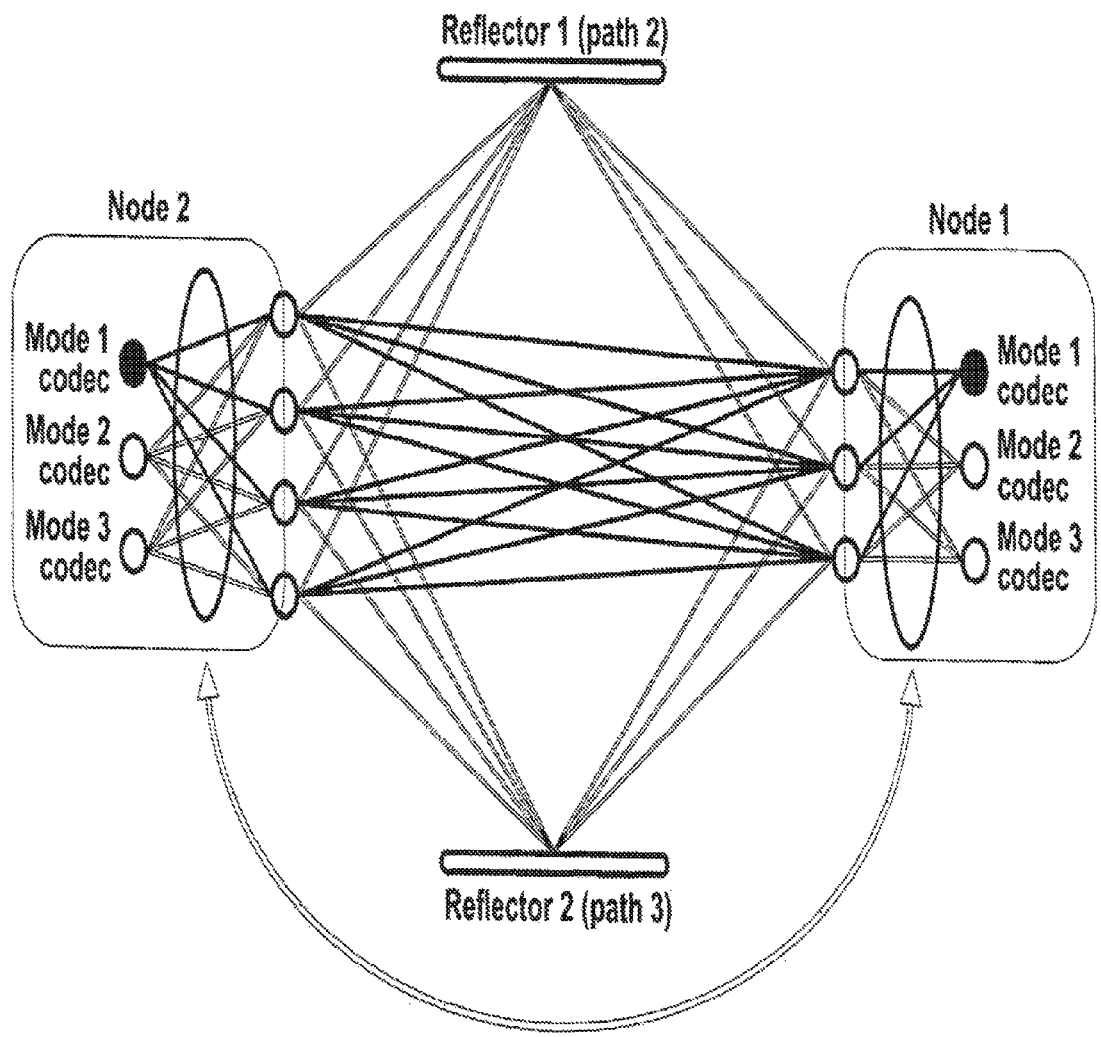
FIG. 11 illustrates a data flow diagram in a PTP MIMO link, where signal flows from one CODEC in node 2 through all of node 2's antennae, thence into all of node 1's antennae, and finally into one CODEC of node 1. Existing multipath potential of either or both reflectors, and dynamic allocation of less or more of the possible diversity modes, is ignored.
Figure 12:
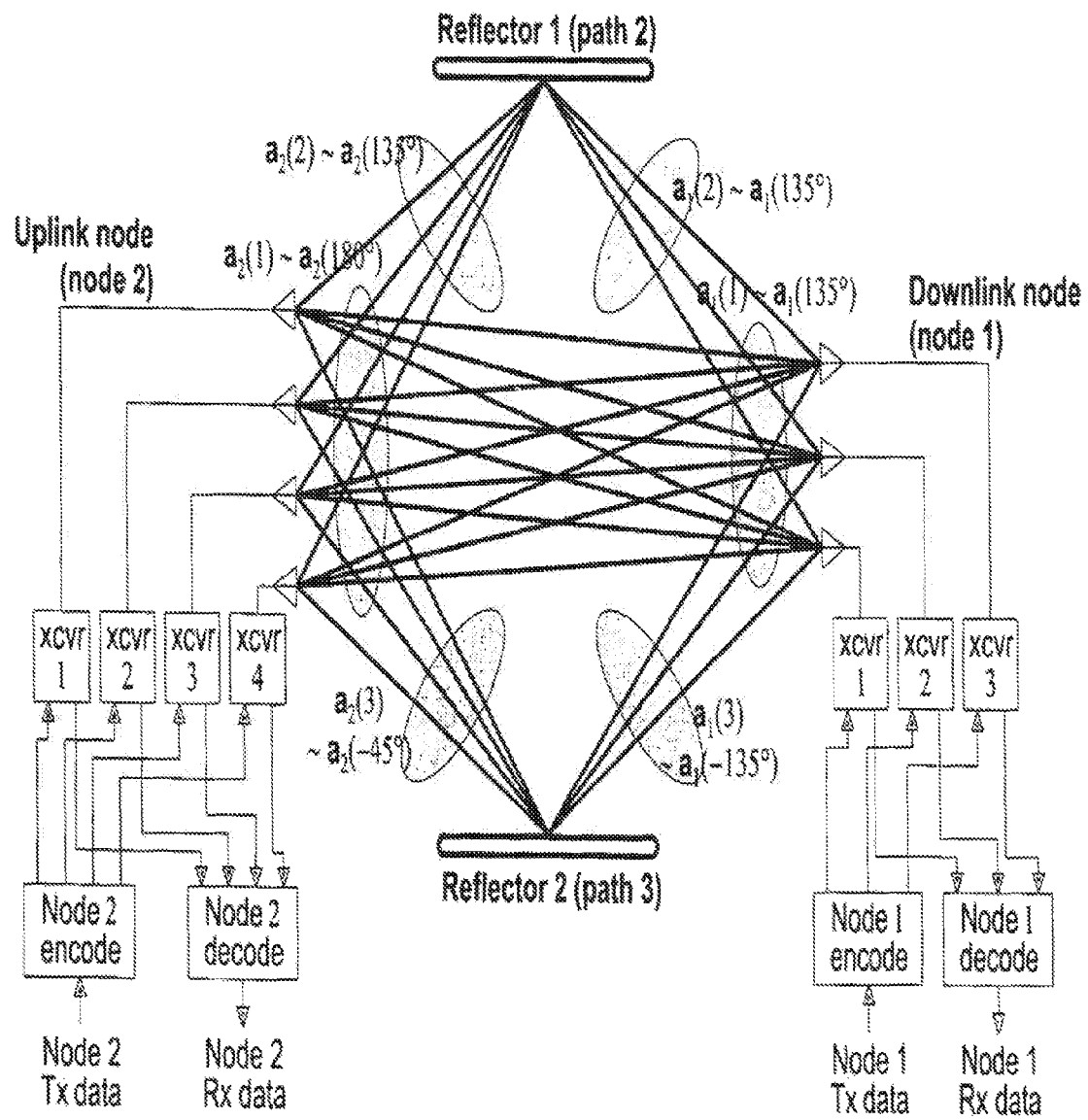
FIG. 12 illustrates a physical PTP multipath, consisting of one direct and two reflective links, using all of node 1's antennae and transceivers, and all of node 2's antennae and receivers.

When combined with the substantively null-steering approach described here, which helps to minimize the generated noise from all other signals sent from a node, the network power requirement for clear communication drops as the links effectively decouple; that is, the 'other' channels, since they are being null-steered, do not form part of the background noise against which the intended signal's power must be boosted to be accurately received by the intended recipient. (See FIG. 7.)

The LEGO power optimization and null-steering then feed back (reciprocally) into the requirements for the network and network's hardware at each node, inasmuch as the minimization of unused and unintentional interaction (or interference) reduces the precision and power necessary for frequency and other differentiation means at the node's transceiver, and reduces the number of antennae in each array by increasing the effective bandwidth within each multipath channel, by reducing the amount of bandwidth, frequency, time, or channel, or all of the above, that must be devoted to error avoidance or correction. That in turn simplifies the codec and other element designs for each node and lowers the cost of the transceiver front-ends.

The preferred embodiment of the invention employs a network of fully-adaptive PHY-IA MIMO Network Capable Transceivers, in which each transceiver implementing an upper PHY that performs transmit and receive TRANSEC, node signaling/detection protocol, transmit/receive beamforming, and receive-side node discovery and adaptation algorithms, and a lower PHY that can meet the needs of intermittent, burst packet communications such as VoIP.

Communication between source and destination nodes, defined by unique two-hex port addresses comprising the source and destination node addresses (SNA's and DNA's) for the packet transmission, is accomplished by routing traffic packets over at least one and possibly several routes or collections of sequential links between the source and destination node. Means for partitioning traffic data into individual data packets at the source node, and collecting data packets into traffic packets at the destination node, are accomplished in this invention using existing network routing protocols. For each combination of a transmitting node, a receiving node, and a communication channel (diversity link), the unique link address and identifying transmit node address and receive node address for the respective nodes are used as part of the messaging context.

Combining packet-specific, structural and origin/destination network information into a unified overhead allows implementation of orthogonal transformations of that overhead, through the use of specific power-of-two integer number of lower PHY (LPHY) symbols (which are preferably an OFDM waveform or PAM signal), and using a unique and identifying link address for each node-to-node link currently instantiated, which incorporates source, destination, and channel rank information, enables informational efficiency for short transmissions where otherwise structural and routing information might overweigh content, e.g. in each packet. Working within bounds (time intervals, frequency ranges, or transmission strengths) that guard against intrasystemic interference, the use of MIMO transformations and reciprocity-based pilot or signal weighting calculations for the correct weighting of signals transmitted and received, enables the individual packets and messages to adapt, in a bottom-up, flexible, and responsive fashion to the real-world dynamics of a continuously varying EM flux.

Using adaptively-derived diversity weighting, the method and system can rapidly take advantage of reciprocity between each node pairings' transmit and receive channels to distinguish the desired signal from the general noise and potential interference. Upon RF reception at any node, downconversion and ADC operations on the diversity channels passes the incoming signal(s) through a set of inverting transformations that, for the desired incoming signal(s), strip off known structural elements and continuously updates the combiner weights to reflect the dynamically varying environmental and signal context, thereby continuously matching necessitated signal and waveform transformations to the environmental and signal effects and sources. By successive iterations of the transmit and receive adaptation algorithm each node can have its transceiver adapt its multiport combiner and distribution weights to the eigenmodes (left and right eigenvectors) of their MIMO internode channel response, so that the resultant fully adaptive link can approach the Shannon capacity of the MIMO communication channel, regardless of the rank or distribution of the eigenvalues of that channel.

In addition, the fully adaptive system provides an automatic power control mechanism (LEGO Algorithm) that can be used to maximize capacity (high throughput applications) or minimize transmit power (LPD applications), depending on the requirements of the system at any point during a mission.

The resultant network is able to pass data with high spectral efficiency relative to non-MIMO networks, or to meet specified packet transmission rates at much lower power levels relative to non-MIMO networks, due to its ability to pass data over multiple time-and-frequency coincident links and routes, and to exploit the much lower pathloss between intermediate nodes in the network. Moreover, the network is able to provide this performance in the complete lack of any opportunistic multipath (although that multipath can be exploited if it is available).

DETAILED DESCRIPTION OF THE DRAWINGS

Glossary and Definitions

ACK Acknowledgement
ADC Analog-to-Digital Conversion
ADSL Asynchronous Digital Subscriber Line
AGC Automatic Gain Control
BS Base Station
BER Bit Error Rate
BW Bandwidth
CBR Committed Bit-Rate service
CDMA Code Division Multiple Access
CE&FC RWA Computationally Efficient And Fast-Converging Receive Weight Algorithm
CMRS Cellular Mobile Radio Systems
CODEC Encoder-decoder, particularly when used for channel coding
CPU Central Processing Unit
CR Channel Reciprocity
DAC Digital-to-Analog Conversion
DEMOD Demodulator
DMT Digital MultiTone,
DSL Digital Signal Loss
DMX De-multiplexer
DOF Degrees of Freedom
DSP Digital Signal Processing
EDB Error-Detection Block EEPROM Electronically Erasable, Programmable Read Only Memory
FDD Frequency Division Duplex
FDMA Frequency Division Multiple Access
FFT Fast Fourier Transform(s)
FPGA Freely Programmable Gate Array
GPS Global Positioning Satellites
GSM Global System for Mobile Communications
LEGO Locally Enabled Global Optimization
LMS Least Mean-Square
LNA Low Noise Amplifier
LS Least-Squares (An alternative form can be 'matrix inversion')
MAC Media Access Control
MGSO Modified Gram-Schmidt Orthogonalization (most popular means for taking QRD)
MOD Modulator
MIMO Multiple-Input, Multiple-Output
MMSE Minimum Mean-Square Error
MSE Mean-Square Error
MT Multitone
MUX Multiplex, Multiplexer
NACK Negative acknowledgement & request for retransmission
NAK Negative Acknowledgement
OFDM Orthogonal Frequency Division Multiplexing
PAL Programmable Array Logic
PDA Personal Data Assistant
PHS Personal Handiphone System
PHY Physical layer
PMP Point-to-Multipoint (An alternative form can be 'broadcast')
PSTN Public Switched Telephone Network
PSK Phase-Shift Key
π/4 QPSK (pi/4)-Quadrature Phase Shift Key
π/4 DQPSK (pi/4)-Digital Quadrature Phase Shift Key
PTP Point-to-Point
QAM Quadrature Amplitude Modulation
QoS Quality of Service
QRD Matric {Q,R} decomposition (see, MGSO)
RF Radio Frequency
RTS Request To Send, recipient ready for traffic
SDMA Spatial Division Multiple Access
SINR Signal to Noise Ratio
SOVA Soft-Optimized, Viterbi Algorithm
SU Subscriber Unit
TCM Trellis-Coded-Modulation
TCP/IP Transmission Control Protocol/Internet Protocol
TDMA Time Division Multiple Access
TDD Time Division Duplex
T/R Transmit/Receive (also Tx/Rx)
UBR Uncommitted Bit-Rate (services)
ZE-UBR Zero-error. Uncommitted Bit-Rate (services)

Groundwork: The Network as a Dynamic Connected Set

A network is generally viewed as the combination of a set of nodes (where transmissions originate and are received) and the connections between those nodes through which the information is flowing. FIGS. 1A, 1B, and 1C are graphical representation of a simple network of five nodes (A through E) and a varying number of channels, indicated by the lines drawn between pairs of nodes. In FIGS. 1A and 1C, all five nodes are active and able to communicate with all or most of their neighbors. In FIG. 1B, node D is inactive and unable to communicate. The two-step channel, from C to D and from D to E, in FIG. 1A is replaced by a one-step channel from C to E in FIG. 1B, and co-exists with the two-step channel in FIG. 1C. A connection between any two nodes without any intervening nodes is also known as a 'link'.

Because each node may both transmit (send) and receive, and because the connections amongst the set of nodes may change over time, the network is best thought of as a dynamic structure, i.e. one that is constantly shifting yet which still occupies the same general 'space' in the communications world. While traditional broadcast networks, or PTP or PMP networks generally tried to 'fix' at least the originating node, a MIMO network begins with the presumption that the communications are dynamically allocated amongst the nodes and throughout the network. In the present embodiment of the invention, diversity in spatial, spectral, temporal, or polarization attributes of the potential channels are not seen as variations that must be controlled or limited, but as opportunities for enhancing performance.

Limitations of Existing Art

The approaches currently described in the field, especially in Raleigh and Cioffi, G. Raleigh, J. Cioffi, "Spatio-Temporal Coding for Wireless Communications," in *Proc.* 1996 *Global Telecommunications Conf.*, November 1996, pp 1809-1814), and in Foschini and Gans (G. Foschini, M. Gans, "On Limits of Wireless Communication in a Fading Environment When Using Multiple Antennas", *Wireless Personal Comm.*, March 1998, Vol. 6, Nol. 3, pp. 311-355), require additional hardware at each node comprising one end of a channel per diversity path to exploit that diversity path. This creates a geometric growth in the hardware complexity for each particular node, and a linear growth in cost for each diverse path exploited by a given network, that rapidly renders any network attempting to exploit such diversity uneconomic. Moreover, such an approach 'muddies its own stream' in that it reduces the capacity increase by the power increase needed to power the more complex transceiver. Exploitation of this multipath approach requires both high power (to permit data transport over the relatively weaker additional diversity path) and complex codecs (to permit data transports at high rates on the dominant path by filtering out the diversity path transmissions). To the extent that the nodes differ in their antennae mix, this approach complicates the administration and management of the network by constraining the potential path exploitation to previously-known or approved channels where the required equipment for each diverse path is known to exist.

Spatially distributed networks overcome this particular limitation by exploiting the inherent diversity between internode channel responses in the network. This diversity exists regardless of any multipath present on any individual path in the network, i.e. it does not require high levels of opportunistic multipath to be exploitable by the system. Moreover, such spatial diversity can be designed into the network by careful choice of topologies for the nodes during the deployment process, in order to provide linear growth in capacity as transceivers are added to the network. As a side benefit, the network can spatially excise transmissions from compromised nodes and emitters, allowing secure, high quality service in environments with external interference.

A downside to such an approach is its obvious weakness to unexpected growth, dynamic changes in topology (from mobile, transitory, or transient nodes), or dramatic changes in relative channel densities. Unlike the present form of the invention, such an approach does not handle well unplanned-for competition, environmental changes, or readily exploit opportunities arising from surprisingly (i.e. unplanned for) good network performance.

MIMO Networks: Shapes and Spaces

The complex MIMO environment and multiple dimensions of differentiation (spatial, frequency, time, code), the physical geography of any network (ring, star, mesh), the physical geographies of the surrounding terrain (creating the multipaths) and the other wireless signals from outside the network, and the internal network environment (of traffic patterns and node differences) create a diversity explosion.

To create and manage optimal network capacity, the preferred embodiment creates a network topology that enforces a constraint where each node with M(n) antennae has ≤M(n) other nodes in its view with whom it communicates at any particular interval of time. This may take the form of a ring (see FIG. 16), star (FIG. 18), mesh (FIGS. 39, 40), or combination thereof, depending on the individual nodes' hardware and geographic specifics. Moreover, this may dictate the placement of nodes, geographically or in uplink or downlink transmission subsets. This enables the creation of reciprocal subspaces for each sub-set of the network and therefore for the network as an entirety. However, the approach in the preferred embodiment can manage with other network shapes and spaces, just as it can manage with the hardware or protocol or software constraints inherent in particular nodes.

While the preferred embodiment works with reciprocal subspaces, wherein the network maintains reciprocity according to Eq. 1 between nodes over all links joining them, some parameters may be allowed to vary and create asymmetric spaces. For example, in a carrier offset case, the channel responses are actually invariant but for the complex scalar sinusoid which creates the frequency offset; physically, this is a non-reciprocal link but logically it remains (assuming signal content density on both sides is kept equal) a substantively reciprocal link. Other adaptation means are permissible as long as the network design rule of Eq. 1 is kept as a high priority.

One major difference in the present embodiment of the invention from prior art is that by making the control and feedback aspects part of the signal encoding process, and thereby eliminating or at least reducing the need for a separate channel(s) for control and feedback, the network content overhead is reduced and an additional range within the signal dimension is available for signal content. The LEGO reduction to single, or small, bit sized power management signals can be similarly echoed for other network management, depending on the target objective the network elects.

Furthermore, because the MIMO and LEGO approach described herein is usable in any network topology, and with existing protocols and schema (PSK/QAM; FDD; CDMA, including modulation-on-symbol, or synchronous, CDMA; TDMA; SDMA, etc.) the network can adapt to a diverse environment of users rather than requiring all to have the identical hardware, software, and standards.

The diversity of transmission and reception at all nodes in the network, rather than just at a subset of hub nodes or BSs, means that every node can use in its local environment any redundancy in transmission or reception of data over multiple channels, whether they be spatial, polarization, spectral, temporal, or any combination thereof. The maximum use can be made of all available (i.e. unused by others) signaling lacunac, with the nodes adaptively adjusting to the traffic and external environmental conditions according to the objectives set by the network.

Furthermore, the present embodiment of the invention does not require a preliminary calibration of the transceiver array, the communications channel, or geographic site as do many approaches used in the prior art. The continuous feedback and rapid convergence of the approach allow for flexibility and adaptivity that will permit correction of miscalibrated data, when the miscalibration represents a no-longer valid model of the environment for the receiving node.

Additionally, the MIMO network of the present embodiment is adaptive to channel response changes due to network point failures. This includes: the ability to survive element failure at individual nodes (i.e. one antenna, or transceiver, fails) without loss of communication to that node (though it may incur possible loss of capacity); the ability to survive failure of links without loss of communication to that node (e.g., by routing data through other paths); the ability to survive failure of node (all links terminating at that node) without unduly affecting connectivity or capacity of network; and the ability to achieve network reliability that is higher than reliability of any node in that network. The network will automatically adjust itself to optimal performance in event of any of these failures; potentially by rerouting active links based on available SINR experienced at that link.

Application Areas and Advantages: MIMO

The incorporation of the control and feedback signal as part of the process rather than as discrete, separate, and particular parts of the signal, can decrease the complexity of apparatus by removing the need for a separate channel for network control. It also can decrease the complexity of the processing by removing the need for particular dedication of a time aspect of the reception, or by removing the need for additional detection and interpretation of control signal from other content through either software or hardware. Moreover, such incorporation also integrates the entire aspect of power management and control into the signaling process rather than artificially and needlessly separating it from the network dynamics. This integration allows both capacity and power control to cooperatively handle packet acknowledgment, signal synchronization, and transmit/receive functionality at each node, and to optimize their conjoined functionality to the needs of the environment, the user, or the node rather than being constrained to disparate, pre-set and non-dynamic dictates by network administration that are only responsive to the real world environment to the extent that the system designers' assumptions accurately modeled the real-world and unknowable complexities.

Because the control and feedback signaling is incorporated into the process, the present form of the invention does not impose overhead constraints or capacity demands upon the network to nearly the same degree as the prior art does. For a given infrastructure and environment, therefore, the present form of the invention provides increased capacity and performance through dynamic, and self-moderating signal processing algorithms, with a minimal overhead.

Additionally, because the method does not require a strict hierarchical division between Base Station and Subscriber Unit nodes, but rather adapts to the diversity of reception and transmission at each particular node depending on its then-current environmental context, the method allows for rapid and responsive deployment of mixed hardware units being conditioned by factors external to the network, such as user choice or economic limitations.

Unlike prior art, the present form of the invention will work with each of CDMA, FDD, TDMA, SDMA, and PSK/QAM implementations, and with any combination thereof. Because the present form of the invention will work with diverse environments, where the diversity may come from within the network (rather than from sources external to it), this protects users and companies' investments in prior infrastructure and avoids creating either a 'captive service market' subject to crippling and sudden innovation, or creating a network which will suffer when a Christiansen-style disruptive technology advance arrives. Moreover, diversity reception, which is the redundant transmission and reception of data over multiple channels (whether the diversity comes in spatial, polarization, spectral, or temporal form, or any combination thereof), permits successful operation in environmental conditions which would otherwise block any particular channel or perfect subset of channels. This means that the present form of the invention will continue to operate in dirty, bursty, or difficult conditions, whether the impact of the negative force is on the nodes or the external environment.

As such, there are a number of potential implementations which immediately become feasible for a dynamically adaptive network, in the military and security fields. These include military and civilian applications where individual unit or node failure can be anticipated and therefore must not bring down the network, and where environmental conditions can become disruptive for particular nodes or links. These would also include support and exploration applications where the external environment (including node location) and network internal environment (traffic, connectivity) may change over time, as the component nodes move and change capabilities and capacities.

Among the effects which enhance the ready establishment and dynamic use of security advantages through the present form of the invention are the three-layer pilot signal (network mask plus originator mask plus recipient mask) detailed below (See FIG. 21). This allows users to communicate both on an unsecured overall network and a separately secure sub-network, on discrete (possibly encrypted) subnets through a subnet mask. This also allows network establishment and alteration of any subnet through designation and adaptation of shared subnet masks, wherein layers of encryption become algorithmically establishable. The present form of the invention also allows the fast detection, acquisition, interference excision, and reception of originators attempting to talk with the recipient, prioritizing the same according to their match to any set of subnet masks (highly secured signals presumably taking priority over less secured or open signals). Alternative uses of origination masks or recipient masks allow dual-natured communication priorities and the ability to suppress unintended recipients via the imposition of either origination or recipient masks, the secure transmission through interim nodes not provided with either mask, and the ability to determine and remove group delay as a fundamental part of the FLS algorithm.

Unlike the prior art, the present form of the invention will also allow for optional specialization (e.g. in transmission, reception, flow-through channelization) at any particular node in a dynamic fashion, thereby allowing the network as a whole to adapt to transient environmental fluctuations without concomitant alteration in on-the-ground hardware or in-the-system software alterations. Such ready adaptivity increases the total cost-effectiveness, as well as the dynamic stability for the entire network.

Unlike prior art, the present form of the invention supports diversity reception and transmission at all nodes in the network. This creates a level of flexibility, adaptivity to environmental or network changes, and dynamic stability which increases the ready scalability over multiple distinct approaches simultaneously or serially accepted by the network. Since the core reciprocity and protocols can be used by distinctly different hardware and signals, the present form of the invention permits local accretive growth rather than demanding top-down, network-wide initial standardization, thereby decreasing the capital and planning cost for implementing or changing a network.

Another advantage of the present form of the invention is that it permits shared antenna usage amongst multiple nodes, thereby decreasing the number of antenna necessary for any given node to attain a particular capacity, and thereby decreasing for the network as a whole the cost and complexity required for that same level of capacity. Furthermore, it also permits any set of nodes to use a diversity of channels without requiring an increase in the antenna or internal complexity (in both hardware and software) at every node in said set of nodes.

A further advantage of the present form of the invention is the ability to adaptively select and use ad-hoc, single-frequency networks on all or part of the network, under conditions when network traffic is 'bursty', that is, when there are significant disparities between the high and low content volumes of traffic being communicated amongst that part of the network.

A particularly significant advantage of the present form of the invention is that using the reciprocity equation equalizes the processing or duty cycle for message transmission and reception across both directions of a link, thereby lowering the processing imbalance which otherwise might be created between transmission and reception modes. This in turn reduces the average complexity which must be built into each particular node by decreasing the maximal capacity it must be created to handle for an overall network minimal capacity average.

Another advantage of the present form of the invention is that, unlike much of the prior art, the present form of the invention will work in uncalibrated areas where the environmental context is either previously unknown or altered from previous conditions. This allows for rapid, uniphase adoption and expansion in any given area without requiring prior to the adoption the precise calculation of all environmental effects upon transmissions and receptions within said area at all planned or possible node locations. This further allows the adoption and use for transient, or mobile, nodes in areas without requiring all possible combinations of channel responses amongst said nodes first being calibrated and then said channel responses matched to current conditions, or constrained to pre-set limitations.

Another advantage of the present form of the invention is that it provides rapid correction for miscalibrated data, thereby reducing the cost of inaccurate measurement, human or other measurement error, or incorrect calibration calculations. This in turn reduces the overhead and planning required for adaptation for any given network to a particular environment, either initially or as the environment changes over time, as the channel responses in the real world can be readily adapted to.

A concomitant advantage of the present form of the invention is the rapid and dynamic adaptation to channel response changes when a network failure, at any particular node or sub-set of nodes, occurs. This greatly increases the stability and durability of any network incorporating the present form of the invention without the level of cost, complexity, or duplication required by the present state of the art. Amongst the advantages conveyed are the ability for the network to survive partial failure at any particular node without being forced to drop or lose that node (i.e. maintaining maximal attainable capacity between that node and all others to which is can communicate), the ability to survive the total lose of any particular node, by sharing the signal traffic amongst alternative channels. The present form of the invention also permits the rerouting of active links around 'lost' or 'damaged' nodes without human intervention by adherence to the new reciprocity measurements. And the increase in network stability to exceed not just the reliability of each particular node, but the average reliability of all nodes for, while any subset of nodes still remains operable, the maximal network capacity for that set can be maintained. This is unlike the present state of the art, where if 50% of the nodes of a network fail then the average network communication drops to zero, as all the channels lose one half of their pairs. Furthermore, the present form of the invention enables the network to automatically adjust itself and its optimal performance in the event of any partial failure without requiring human intervention, thereby decreasing the cost and increasing the responsiveness of the network. Even more important is the fact that, upon incremental re-instatement or restoration of particular node or channel function, network optimization continually advances without manual re-establishment.

Another advantage of the present form of the invention is that it minimizes the complexity, and increases the accuracy, of the signal weight update operation at each particular node and for the network as a whole.

Another advantage of the present form of the invention is that it provides a computationally efficient mechanization of cross-correlation operations for both nodes and channels across and within the network. As the number of signals simultaneously processed on a single time-frequency channel grows, the marginal complexity increase caused by addition of those signals drops, for fast adaptation methods such as autocorrelation approaches, e.g. inverse-based or least-squares). This is because the Digital Signal Processing (DSP) cycles needed for high-complexity operations in fast techniques, such as matrix computations, QR decompositions, or data whitening operations common to DSP processing, can be amortized over the larger number of signals. The higher overhead of hardware and software complexity needed to handle signal complexity thereby is lowered on a per-signal basis the greater the complexity actually used by the system. For certain techniques such as pilot-based or least-squares signal weighting, the fast techniques become less complex than the current conventional approaches such as Least-Mean-Squares or stochastic gradient, wherein the overhead remains indifferent to the increasing complexity of the signals being processed. When the number of signals that must be processed is equal to one-half the number of combiner weights used at an adaptive receiver, for example, then the crossover in overhead complexity vs. speed occurs between least squares and least mean squares.

Because the present form of the invention is dynamically adaptive, it can use any subordinate portion (in time, channels, or network subset) of the process wherein a 'reciprocal subspace' exists to implement its full value. Even though the parameters of the signal processing may vary between the uplink (transmission) and downlink (reception) phases between any two nodes on any given channel or link, to the extent that they overlap such a reciprocal subspace can be effectuated and used. For example, a reciprocal subspace can be created where there is a carrier offset, where the channel responses are distinguished solely by a scalar complex sinusoid (e.g. a frequency offset), between the two nodes, regardless of which is, at any particular moment, transmitting or receiving.

Since the present form of the invention with its non-orthogonal multitone capability allows the addition of mobile, transient, or temporary nodes to any network, it creates a system that can manage and provision any combination of fixed, portable, low mobility, and high mobility nodes and links. The capacity constraints being node and channel specific rather than network delimited also permits the heterogeneous combination of differing capacities, thereby allowing peripheral distinctiveness, creating the potential for a system with a hierarchy of nodes including high-function, base-function, and limited-function or even single-function (e.g. appliance) nodes.

The present form of the invention permits the ability to achieve nearly linear increases in capability, even superlinear increases (in dirty environments) for increases in infrastructure, namely the RF transceiver capacities within the network. This is a significant advance over the prior state of the art for PTP networks which achieve sublinear capacity growth with network infrastructure growth.

In non-fully loaded networks using the present form of the invention, the MIMO connectivity can provide sharply higher data rates to individual channels or nodes where the additional information flow, to the maximal capacity of the particular nodes, is routed through nodes which have intended reception or transmission capacity available. This is a 'water balancing' approach to traffic maximization available only when multiple rather than single path capabilities are established through a network, or any network structure that instantiates fixed bottlenecks (e.g. 'star' or 'hub' topologies, BS PMP networks, or fixed-channel PTP networks).

Additionally, the reciprocity approach enables an automatic and dynamic load sharing amongst the channels and nodes which minimizes bottlenecks or, in the military or security environment, desirable targets of opportunity for 'hot centers' of traffic. Commercially this is more valuable by reducing the power and complexity requirements of what in PTP and PMP networks are BSs to attain a given network capacity and power efficiency.

The preferred embodiment of the present form of the invention includes a number of interacting and synergistic elements, both in hardware and in operational software. The preferred embodiment, as a network, will incorporate particular functional elements at individual nodes, as well as overall systemic features which may not be shared by or incorporated in the hardware of each particular node (i.e. there may exist specialization amongst the nodes). As stated in the summary, each node preferentially has an antennae array; multiple, multitone, transceivers (one per antenna); and constrains itself to reciprocal uplinks and downlinks (FIGS. 13A and 13B). The antennae array is spatially and/or polarization diverse and transmits and receives signal energy during alternating time slots (or sequences of time slots in TDD-TDMA systems). Each transceiver is a vector OFDM transceiver, with digital signal processing elements, that downconverts, A/D converts, and frequency channelizes data induced on each antenna (or other diversity channel) during receive time slots, and inverse channelizes, D/A converts, and upconverts data intended for each antenna (or diversity channel) during transmit time slots; linearly combines data received over each diversity channel, on each frequency channel and receive time slot; redundantly distributes data intended for each diversity channel, on each frequency channel and transmit time slots; and computes combiner and distributer weights that exploit the, narrowband. MIMO channels response on each frequency channel and time slot (FIG. 15). Although the preferred embodiment of the invention allows individual nodes to vary greatly in their capacities, a set of nodes preferentially will incorporate the hardware capabilities detailed in the following paragraphs.

Figure 22:
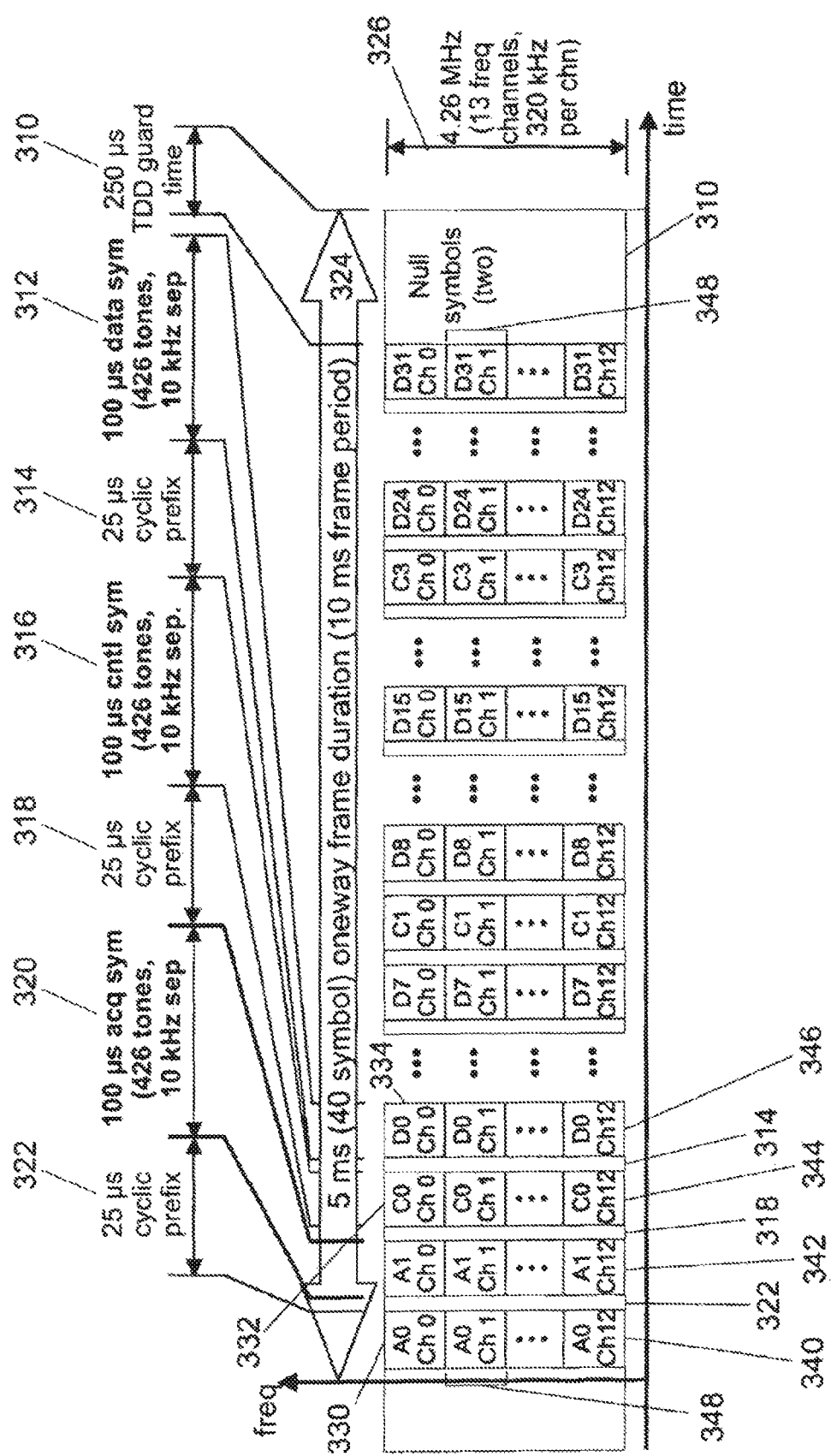
FIG. 22 illustrates a time-frequency mapping pattern of an acquisition channel (Item 340, 342), control channel (Item 344), 32 Data channels (Item 346, not shown for D1 through D31), with cyclic prefixes (Items 322, 318, 314) and a guard time (Item 310) with 100 μs acquisition symbols (Item 320), control symbols (Item 316), and then 32 data symbols (Item 312, again not shown for D1-D31).
Figure 23:
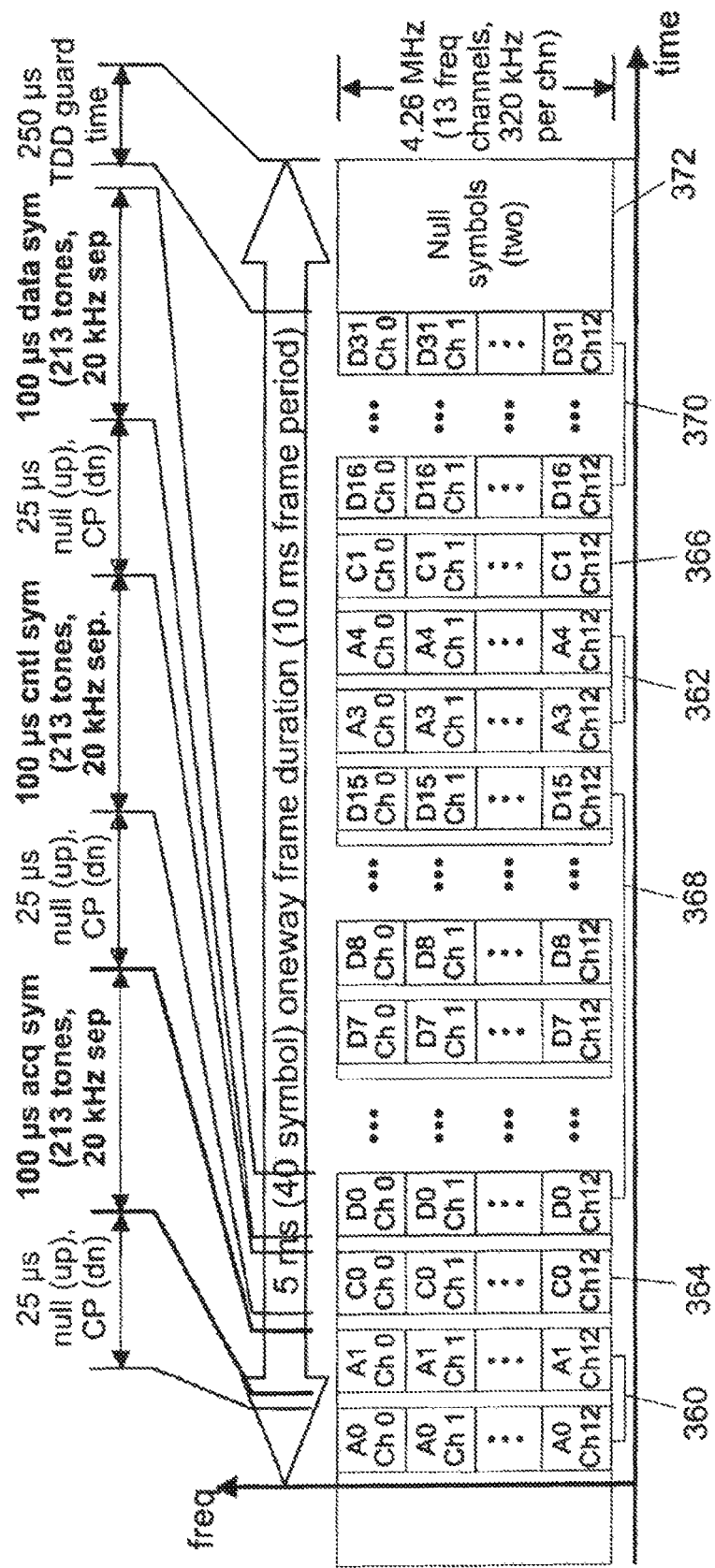
FIG. 23 illustrates an alternative time-frequency mapping pattern for high-mobility situations, where the acquisition, control, and data elements are repeated (Items 362, 366, and 370), but the number of data-bearing channels is halved to allow the duplication within the same bandwidth and time.

The first preference is that the transmission element be a multi-tone front end, using OFDM with cyclic prefixes at fixed terminals (generally, BS) (FIG. 22, Items 314, 318, 322,) and generalized multitone with guard-time gaps (FIG. 22, Item 310) at mobile terminals (generally, SU). To minimize aperture blur, the system uses tone grouping into narrowband frequency channels (FIG. 22, Item 348). The OFDM can be readily implemented in hardware using Fixed-Fourier Transform enabling chips; it also simplified the equalization procedure, eliminated decision feedback, and provides a synergistic blend with adaptive arrays. An alternative uses frequency-channelized PSK/QAM with modulation-on-symbol CDMA (that is, synchronous CDMA).

Figure 24:
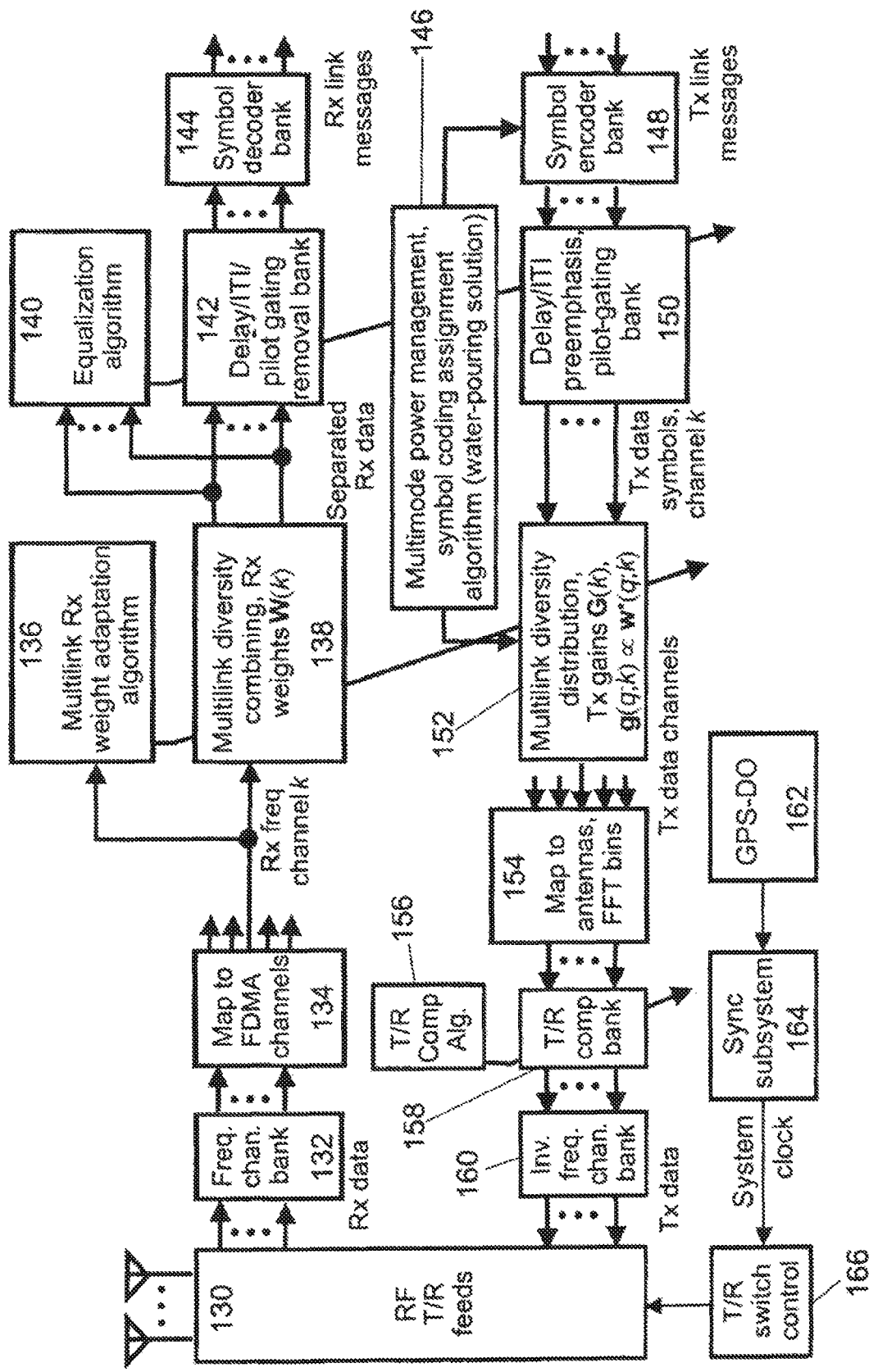
FIG. 24 illustrates one embodiment of the MIMO transceiver, with the RF feeds (Item 130), the Frequency channel bank (Item 132), the mapping element (Item 134), the Multilink Rx weight adaptation algorithm (Item 136), the Multilink diversity Rx weights combining element (Item 138), the equalization algorithm (Item 140) and Delay/ITI/pilot gating removal bank (Item 142), symbol decoder bank (Item 144), multimode power management, symbol coding assignment algorithm element (Item 146), the synchronization elements (Items 162, 164), and T/R comp. Algorithm (Item 156) and element (Item 158), and multilink diversity distribution of Tx Gains element (Item 152).

Each node of the network incorporates a MIMO transceiver. FIG. 24 displays a functional representation of such, and the hardware and processing is detailed over the next several paragraphs.

Each MIMO transceiver possesses an antennae array where the antennae are spatially separated and the antennae array itself is preferentially circularly symmetric (FIG. 15, Item 110). This provides 1-to-M modes (RF feeds) for the signals to be transmitted or received over, maximizes the separability of transmission links, enables a scalable DSP backend, and renders the MIMO transceiver fault-tolerant to LNA failures.

Figure 25:
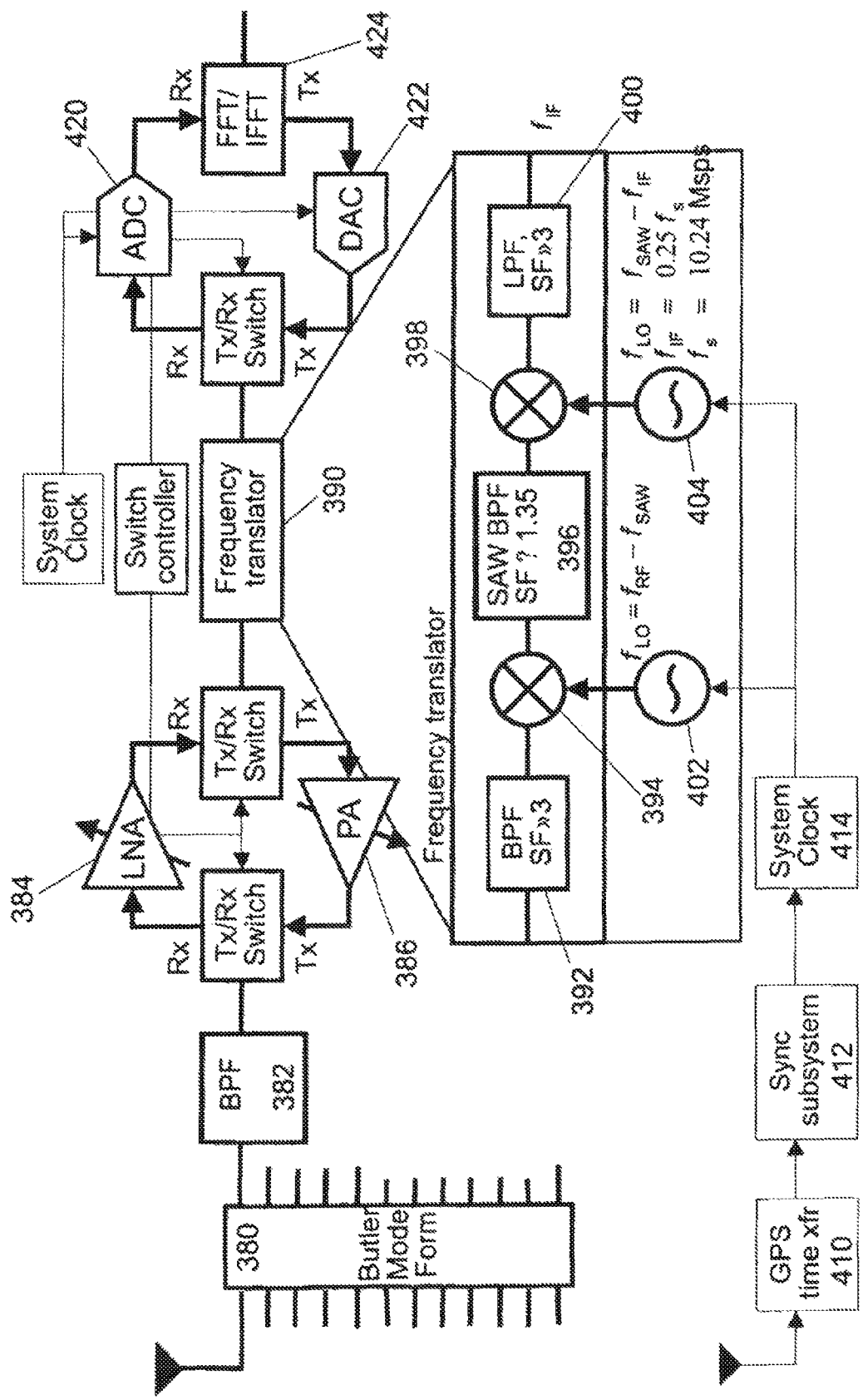
FIG. 25 illustrates in more detail the frequency translator, detailing the Band Pass Filters, element wise multiplier, sinusoids, SAW BPF, and LPF elements.

In an alternative embodiment the transceiver sends the transmission signal through Butler Mode Forming circuitry (FIG. 25, Item 380), which includes in a further embodiment a Band Pass Filter (FIG. 25, Item 382) where the transmission is reciprocally formed with the shared Receiver feeds, and the number of modes out equals the numbers of antennae, established as an ordered set with decreasing energy. The Butler Mode Forming circuitry also provides the spatial signal separation adaptation, preferentially with a FFT-LS algorithm that integrates the link separation operation with the pilot/data sorting, link detection, multilink combination, and equalizer weight calculation operations. This Butler Mode Forming approach means that the transmission forming is readily reciprocal with the receiver feeds (also shared), makes the transmission fault tolerant for PA (Phase-Amplitude) failures, and enables a readily scalable DSP front end; it also enables the transceiver to ratchet the number of antennae used for a particular transmission or reception up or down.

Having passed through the Butler Mode Forming circuitry, the transmission is then sent through the transmission switch (FIG. 15, Item 112), with the uplink frequencies being processed by the LNA bank (FIG. 15, Item 113), moderated by an AGC (FIG. 15, Item 114), and the downlink frequencies being processed by a PA bank (FIG. 15, Item 124). The LNA bank also instantiates the low noise characteristics for the outgoing signal and communicates the characteristics to the PA bank to properly manage the power amplification of the incoming signals to moderate the transmission overlap.

Further transmission switch processing then hands off the transmission to the frequency translator (FIG. 15, Item 115), which is itself governed in part by the Los circuit (FIG. 15, Item 116). The transmission switch throughout is controlled by a controller (FIG. 15, Item 120) such that baseband link distribution of the outgoing signals takes place such that energy is distributed over the multiple RF feeds on each channel, steering up to $K_{feed}$ beams and nulls independently on each FDMA channel in order to enhance node and network capacity and coverage. This control further greatly reduces the link fade margin and that node's PA requirements.

From the transmission switch the transmission goes to an ADC bank (FIG. 15, Item 117), while a received signal will come from a DAC bank (FIG. 15, Item 123), the complexity of the analog/digital/analog conversion determining the circuit mix within the banks.

Then from the ADC bank the transmission flows through a Multitone Demodulator Bank (FIG. 15, Item 118), which splits it into 1 through K FDMA channels, where K is the number of feeds. The now separated tones (1 through M for each channel) in aggregate forms the entire baseband for the transmission, which combines spatial, polarization, either, or both, feeds across the FDMA channels or even combines up to K FDMA channels as transmission data density requires. This combination enables steering a greater number of beams and nulls than the RF feeds, up to the number of feeds times the number of FDMA channels. It also separates up to $K_{feed}$ links per FDMA channel, improves overall transmission link error and/or retransmission rates, improves overall network capacity and coverage, and reduces the link fade margins, reduces the PA cost, and reduces battery consumption at the other ends of the link.

From the Multitone Demodulator Bank the Rx data is passed to circuitry for mapping the received broadband multitone signal into separated, narrowband frequency channels and time slots (FIG. 15, Item 119).

An outgoing transmission signal experiences the reverse of the above process; having been mapped to tones and RF feeds (FIG. 15, Item 121), it passes into a Multitone Modulator bank (FIG. 15, Item 122), an DAC bank (FIG. 15 Item 123), the transceiver switch, the Frequency Translator, the transceiver switch, the PA bank element (FIG. 15, Item 124), the transceiver switch, and thence in the preferred embodiment through the Butler Mode Form and on to the RF T/R feeds (FIG. 24, Item 130) and to the antennae array and the particular transmission antennae therein (FIG. 15, Item 125)

The transmission switch throughout is controlled such that baseband link distribution of the outgoing signals takes place such that energy is distributed over the multiple RF feeds on each channel, steering up to $K_{feed}$ beams and nulls independently on each FDMA channel in order to enhance node and network capacity and coverage. This control further greatly reduces the link fade margin and that node's PA requirements.

The particular Multitone MOD and DEMOD elements (FIG. 15, Item 118 and 119) in a node vary according to whether it will be handling Fixed, Portable, Low-Mobility, and/or High-Mobility Nodes. Generally, a signal passing into the MT DEMOD may be passed through a comb filter, where a 128-bit sample is run through a 2:1 comb; then passed through an FFT element, preferably with a 1,024 real-IF function; and then mapped to the data using 426 active receive 'bins'. Each bin covers a bandwidth of 5.75 MHz with an inner 4.26 MHz passband, so each of the 426 bins has 10 MHz. The middle frequency, bin 256, will be at 2.56 MHz, leaving a buffer of 745 kHz on either side of the content envelope. Within the transmission, when it passes through the MT MOD, presuming each link is 100 µs, 12.5 µs at each end of the transmission is added as a cyclic prefix buffer and cyclic suffix buffer, to allow for timing error. (FIG. 22, Items 314, 3181, 322.) In an alternative embodiment, presuming that only a cyclic prefix is needed, the system can either double the size of the prefix (FIG. 22, Item 310) or add the suffix to the signal time. The reverse processing as appropriate (i.e. stripping off the cyclic prefix and suffix buffers) is not shown but is well known to the art.

Figure 26:
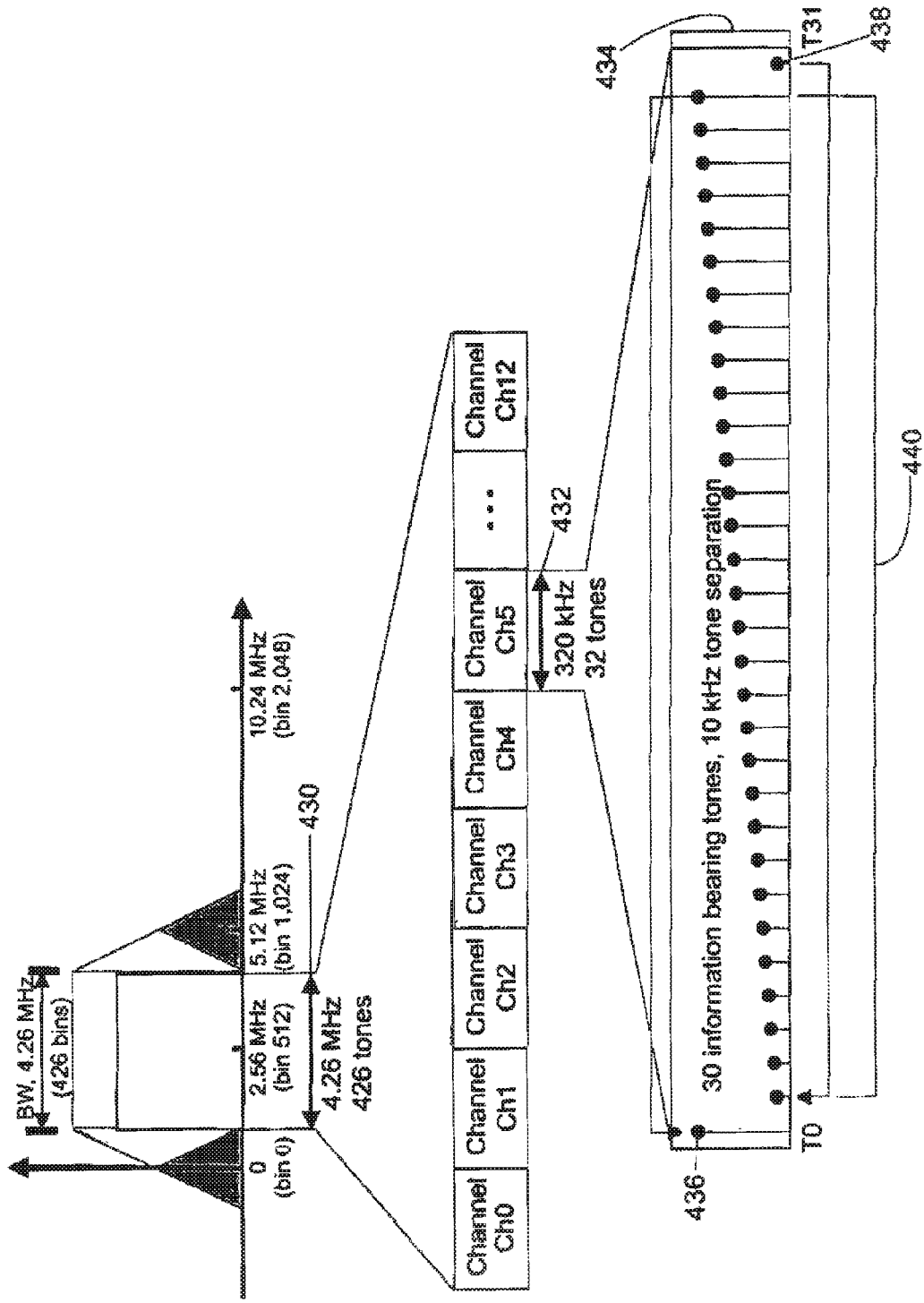
FIGS. 26 and 27 illustrate tone-mapping to frequency bins approaches for low and high mobility situations, respectively.
Figure 27:
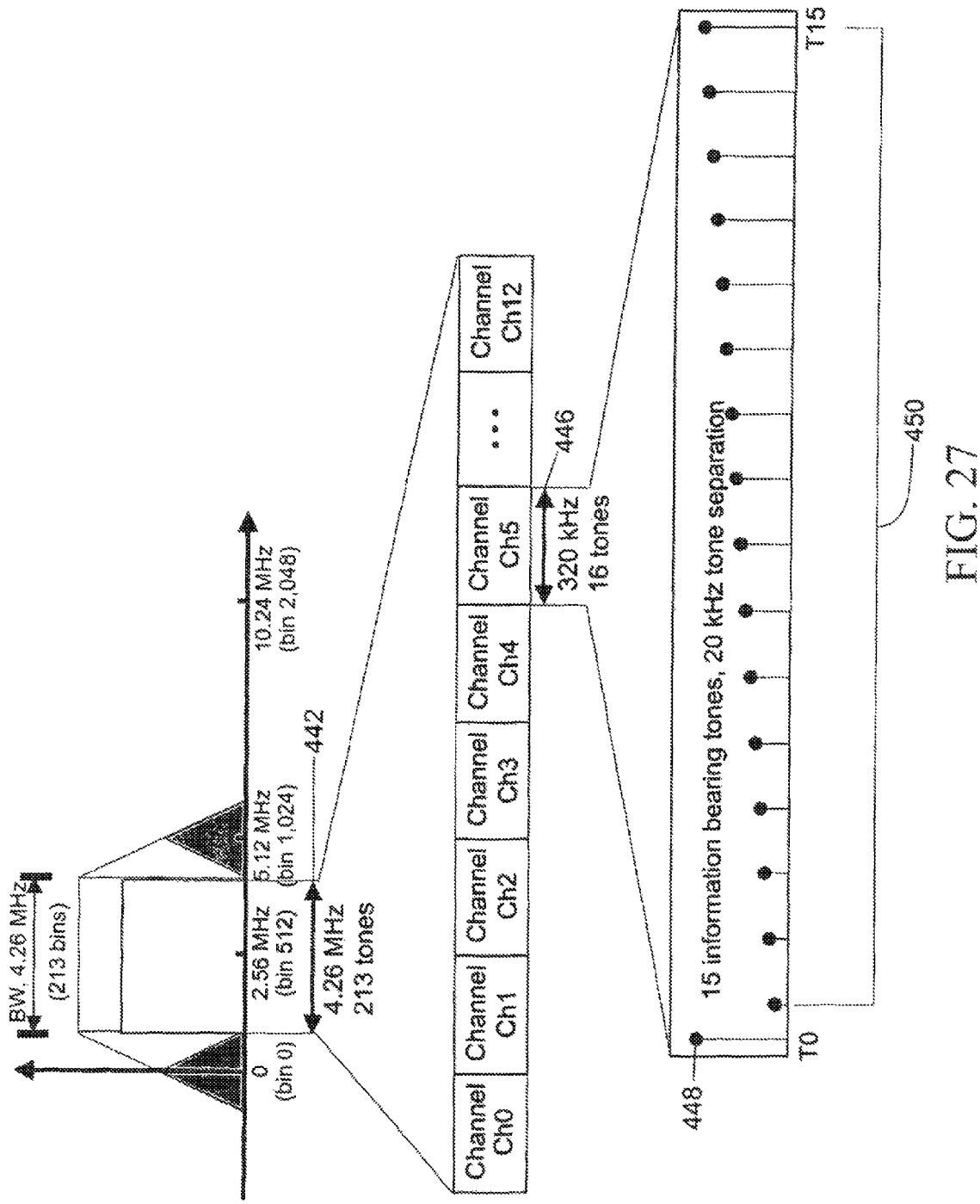

The 426 bins form 13 channels and 426 tones, (FIG. 26, Item 430), with each Channel forming 320 kHz and 32 tons (FIG. 26, Item 432), being further organized with an upper and lower guard tone (FIG. 26, Items 438 and 436, respectively) and 30 information bearing tones (FIG. 26, Item 440). An alternative embodiment for a high-mobility environment halves the numbers of tones and doubles the MHz, so there are only 213 bins (and tones) for 4.26 MHz (FIG. 27, Item 442), and each channel only carries 16 tones (FIG. 27, Item 446), with 1 being an guard tone (FIG. 27, Item 448) and fifteen being information-carrying tones (FIG. 27, Item 450).

For non-fixed embodiments, the timing modifications may be varied. The signal being processed is handed first to a MUX where an element-multiply with a Tx or Rx (for transmit or receive, respectively) window is performed. The guard time is retained to serve as dead time between signals, effectively punctuating them. The high-mobility embodiment halves the number of bins, doubling the average bin size, and uses duplication to increase QoS within the multitone. (FIG. 26.)

The next stage through the MIMO transceiver is the incorporation (on the transmission side) or interpretation (on the reception side) of the QAM/PSK symbols, prior to the signal's passing through the MIMO transceiver exits (if being transmitted) or enters (if being received) through a Link codec. Each FDMA channel will separate through the codec into 1 through M links, and each Link codec will incorporate tone equalization and ITI remove as necessary. The Link codec also includes SOVA bit recovery, error coding and error detection, and package fragment retransmission methodologies.

An optional alternative embodiment would at this point further include tone/slot interleaving (for the reception) or deleaving (for the transmission). A further optional alternative embodiment would replace the TCM codec and SOVA decoder with a Turbo codec.

Another optional alternative will incorporate dual-polarization. (See FIG. 25.) Fundamentally, this halves the modes and complexity of the transmissions and receptions, while doubling the capacity for any particular link/PA power constraint. In this alternative embodiment, the antennae array provides 1-to-(M/2) modes (RF feeds) for downconversion and demodularization. The Butler Mode Forming splits the modes into positive and negative polarities, where the negative polarization has the opposite, and normally orthogonal, polarization to the positive path. Preferentially the Butler Mode Forming works with circular polarizations. This alternative embodiment enables scalable DSP transmission and reception paths and renders the entirety fault tolerant to LNA/PA failures. At the last stage (for transmission; the first stage, for reception) the signal passes through a dual-polarized Link codec. That links the nodes over the dual polarizations, doubles the capacity under any particular link/PA power constraint, greatly reduces the codec complexity (and thus cost), and the link/PA power requirement for any particular link rate constant.

The Transceiver DSP backend for the preferred embodiment is detailed in FIG. 15. The Butler Mode Forming element with its RF transmission and reception leads, is controlled by the T/R switch control, which in turn is subject to the system clock and synchronization subsystem. An transmission signal (which can be continuous, periodic, triggered, human-determined, reactive, context-sensitive, data quality or quantity sensitive) that forms a Tx link message passes through a symbol encoder bank and into the circuitry where Delay/ITI/pilot gating are imposed, said circuitry being linked to its reciprocal for received signals. The transmission data symbols, over k channels, now pass through the multilink diversity distribution circuitry, where for each channel k transmission gains G(k) are adapted to the proper weighting, as determined by the multilink. LEGO gain adaptation element (with both algorithms and circuitry). From the multilink diversity distribution the transmission next is mapped over diversity modes and FFT bins, then handed to the transmission/reception compensation bank. Here, according to the perceived environment of transmissions and reception and the particular Transmission/Reception compensation algorithm used, the transmission is passed to the inverse frequency channel bank and, finally, into the Butler Mode Forming element. This Transceiver DSP backend also passes the information about the transmission signal from the compensation bank element to the synchronization subsystem.

Figure 32:
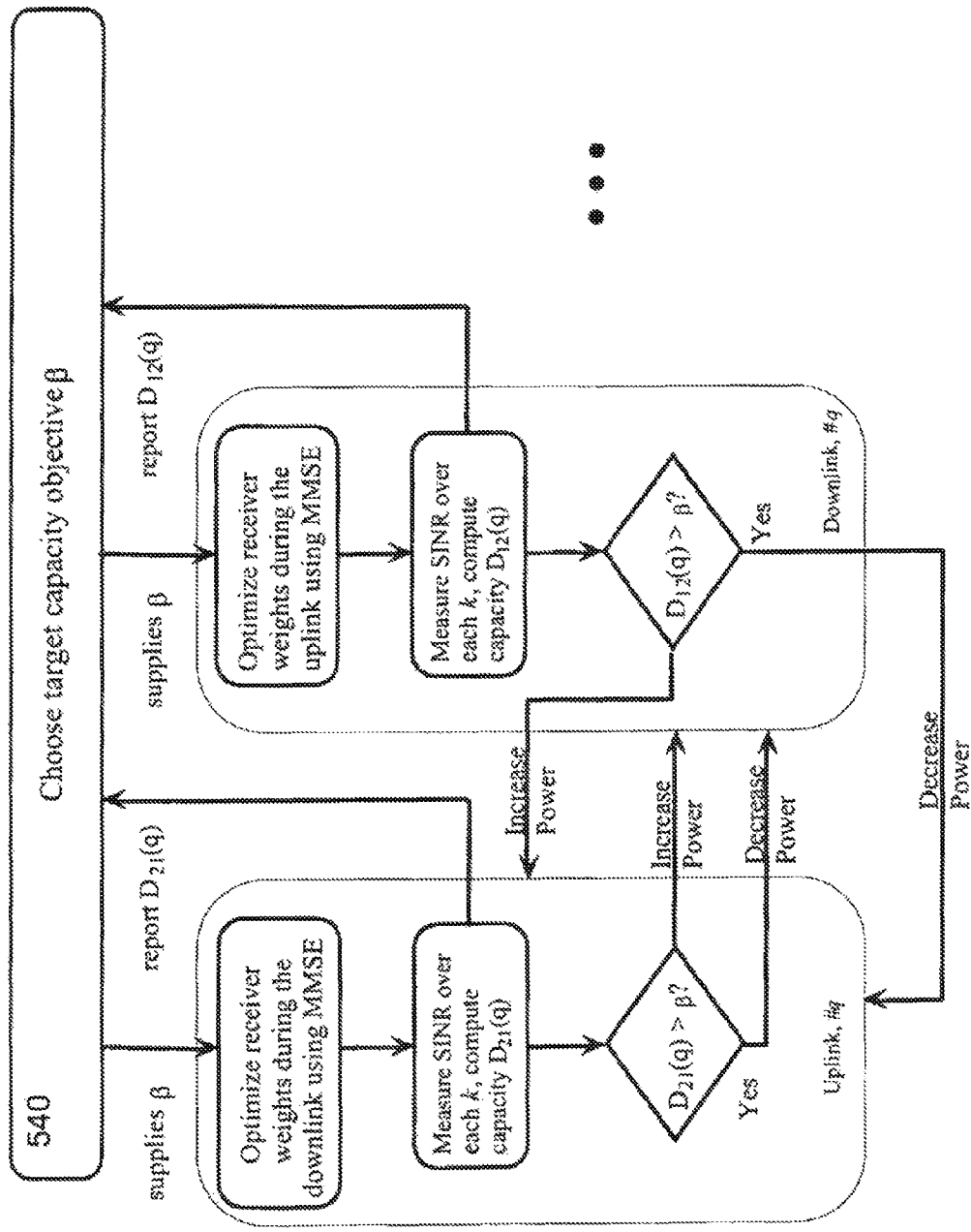
FIG. 32 illustrates the LEGO optimization function for a target capacity objective β.

The LEGO gain adaptation element at each node enables the network to optimally balance the power use against capacity for each channel, link, and node, and hence for the network as a whole. FIG. 32 discloses the fundamental form of the algorithm used.

A capacity objective β for a particular node 2 receiving from another node 1 is set as the target to be achieved by node 2. Node 2 solves the constrained local optimization problem:

$$\min_{\pi_1(q)} \sum_q \pi_1(q) = 1^T \pi_1 \text{ such that} \qquad \text{EQ. 3}$$

$$E_{q \in Q(m)} \log(1+\gamma(q)) \geq \beta(m), \qquad \text{EQ. 4}$$

where $\pi_1(q)$ is the SU (user 1 node) transmit power for link number q, $\gamma(q)$ is the signal to interference noise ratio (SINR) seen at the output of the beamformer, $\mathbf{1}$ is a vector of all 1s, and $\pi_1$ is a vector whose $q^{th}$ element is $p_1(q)$.

The aggregate set Q(m) contains a set of links that are grouped together for the purpose of measuring capacity flows through those links.

An example of this would be if SU had connections to multiple BSs, and we were primarily concerned with the total information flow into and out of a given node. In this case all of the links that connected to that node would be in the same aggregate set. Also in this description, we have adopted the convention that each transmit path from a transmitter to a receiver for a given narrow-band frequency channel is given a separate link number, even if the BS and SU are the same. Thus multiple transmit modes, that say exploit multipath or polarization diversity, are each given different link numbers, even though the source and destination nodes might be identical. Moreover, if a BS/SU pair transmit over multiple frequency channels, then each channel is given a separate link number. (This simplifies notation considerably.)

An example of this is shown in FIG. 19. The BSs are represented by circles and the SUs by triangles. Each arrow represents a communication link. The BSs and SUs can be dynamically combined into proper subsets of transmit uplink and receive uplink. The choice of aggregate sets can be arbitrary, provided no link is in multiple aggregate sets. However in a preferred embodiment, the aggregate sets are links that share a common node and hence common, readily available channel parameters.

The downlink objective function can be written as:

$$\min \Sigma_q \pi_2(q) = 1^T \pi_2 \text{ such that} \qquad \text{EQ. 5}$$

$$\Sigma_{q \in Q(m)} \log(1+\gamma(q)) \geq \beta(m) \qquad \text{EQ. 6}$$

The required feasibility condition, that $\Sigma_{q \in Q(m)} \pi_1(q) \leq R_1(m)$ is reported to the network, and in the preferred embodiment, reported to a network controller, so that β(m) can be modified as needed to stay within the constraints.

In an alternative embodiment, the capacity constraints β(m) are determined in advance for each aggregate set, based on known QoS requirements for given nodes or group of nodes. The objective function then seeks to minimize the total power in the network as suggested by EQ. 4.

By defining the noise normalized power transfer matrix by:

$$P_{rt}(q,j) = |w_r^H(q) H_{rt}(q,j) g_t(j)|^2, \qquad \text{EQ. 7}$$

where $w_r(q)$ is a receiver weight vector for link q, and, $g_t(j)$ is the transmit weight vector for link j.

By unit normalizing the receive and transmit weights with respect to the background interference autocorrelation matrix, the local model can state:

$$w_r^H(q) R_{i_r i_r}(q) w_r(q) = 1, \text{ and } g_t^T(q) R_{i_t i_t}(q) g_t^*(q) = 1 \qquad \text{EQ 52}$$

enabling the nodal model to express the SINR equation as:

$$\gamma(q) = \frac{P_{rt}(q,q) \pi_t(q)}{1 + \sum_{j \neq q} P_{rt}(q,j) \pi_t(j)} \qquad \text{EQ. 8}$$

Accordingly, a matrix condition can be defined on the range of possible output SINRs; and from this, $\pi_t$ has a feasible, that is non-negative solution, if and only if:

$$\rho(\delta(\gamma)(P_{rt} - \delta(P_{rt}))) < 1, \qquad \text{EQ. 9}$$

where ρ(M) is the spectral radius of a matrix M,
the non-negative power transfer matrix $P_{rt}$ has qj'th element given in EQ. 7.
δ(γ) is a diagonal matrix whose q'th element is γ(q) and
$\delta(P_{rt})$ is a diagonal matrix with the same diagonal as $P_{rt}$.

The weight normalization in EQ. 52, and the assumption of reciprocal channel matrices leads to the reciprocity equation (EQ. 1), and the fact that the uplink and downlink objective functions in EQ. 3 and EQ. 4 are identical for the same target SINRs.

Various means for solving the optimization in EQ. 3 exist; the preferred embodiment uses a very simple approximation for γ(q), as very weak constraints to the transmit powers are all that are needed to yield objective functions which satisfy the reciprocity equation (EQ. 2).

Another approach can take advantage of the case where all the aggregate sets contains a single link, and we have non-negligible environmental noise or interference. For smaller networks, all the channel transfer gains in the matrices $P_{12}$ and $P_{21}$ are estimated and the transmit powers are computed as Perron vectors from:

$$D_{21} = \log\left(1 + \frac{1}{p(p_{21}) - 1}\right) \qquad \text{EQ. 10}$$

-continued $$= \log\left(1 + \frac{1}{p(p_{12}^T) - 1}\right)$$

$$= D_{12}$$

In this case a simple power constraint is imposed upon the transmit powers, so that they remain feasible. The optimization is alternating directions, first the weights are optimized, then the powers are obtained from the Perron vectors, and the process is repeated.

Another embodiment assumes effectively that the denominator in Eq. 8 remains approximately constant even after changes to the power levels in other nodes in the network (hence the local optimization approach), because the beamformer weights in the network (transmit and receive) in the MIMO approach will attempt to cancel the co-channel interference in the network, making it insensitive to power level changes of the interferers. The denominator in Eq. 8 represents the post beamforming interference seen by the receiver associated with link q for the forward link (downlink) if r=1, and the reverse link if r=2.

With this approximation, and a rewriting of Eq. 8 (for the uplink) to:

$$\gamma(q) \approx \frac{P_{21}(q, q) \pi_1(q)}{i_2(q)} \qquad \text{EQ. 11}$$

where $$i_2(q) = 1 + \Sigma_{j \neq q} P_{21}(q,j) \pi_1(j) \qquad \text{EQ. 12}$$

is the post beamforming interference energy, and is assumed constant for the adjustment interval for current transmit power values, the node can solve EQ. 3 in closed form using classic water filling arguments based on Lagrange multipliers. A similar equation is established for the downlink.

An alternative embodiment of Eq. 11 is to measure, provide, and use actual information for additional, available, or important terms in the denominator of Eq. 8 and to incorporate them into Eq. 12, and then rather than closed form use successive applications thereof to the modified problem using local data.

Another alternative embodiment is to solve, at each node, the constrained optimization problem:

$$\max_m \sum_{q \in Q(m)} \log(1 + \gamma(q)), \text{ such that} \qquad \text{EQ. 13}$$

$$\sum_{q \in Q(m)} \pi_1(q) \leq R_1(m), \gamma(q) \geq 0 \qquad \text{EQ. 14}$$

using the approximation in Eq. 11, which is a water-filling solution similar to that described above for Eq. 3. This solution requires a high-level network optimizer to control the power constraints, $R_1(q)$, to drive the network to a max-min solution.

The preferred embodiment, however, solves the local problem by attempting to minimize the total power as a function of the target output SINR. The output SINR will be the ratio of square of the channel transfer gain times the transmit power, divided by the interference power seen at the output of the beamformer, where:

$$\gamma(q) = |h(q)|^2 \pi_1(q)/i_2(q) \quad \text{EQ. 15}$$

$$\gamma(q) = |h(q)|^2 \pi_2(q)/i_1(q) \quad \text{EQ. 16}$$

where $|h(q)|^2$ is the square of the channel transfer gain.

$\pi_1(q)$ is the transmit power for link q during the reverse link or uplink transmission.

$\pi_2(q)$ is the transmit power for link q during forward link or downlink transmission, $i_1(q)$ is the interference power seen at the output of the beamformer used by the SU associated with link q, and, $i_2(q)$ is the interference power seen at the output of the beamformer used by the BD associated with link q.

This makes the output SINR a function of all the transmit powers at all the other SUs in the network. Additionally, by normalizing the beamforming weights with respect to the background interference, it is possible to maintain the reciprocity equation even in the presence of arbitrary interference and noise, due to non-cooperative signal sources, such as jammers or co-channel communication devices. Maximizing the SINR yields optimal receiver weights that can remove the effect of jammers and co-channel interferers. The reciprocity equation insures that the optimal transmit weights puts substantive nulls in the direction of these same co-channel interferers. For military applications, this implies that the network reduces it's probability of detection and interception, and for co-channel communication systems, it reduces it's transmitted interference, and is effectively a 'good neighbor' permitting system deployment in otherwise unacceptable environments. Commercially, this allows a network employing the present embodiment of this invention to cope with competitive, impinging, wireless network nodes and transmissions.

It can be shown that there is a 1-1 mapping between all the transmit powers and all of the output SINRs, i.e. there exists a vector valued function $F_1$ such that $F_1(\gamma) = \pi_1$.

The function has an inverse so that $F_1^{-1}(\pi_1) = \gamma$. A key result that is exploited by this embodiment is the fact that if the channels are reciprocal, then the objective functions, and the constraint set imposed by (1) is identical as a function of $\gamma$ for both the uplink and downlink objective functions. Mathematically this means these objective functions can be stated in general terms as:

$$f(\gamma) = 1^T F_1(\gamma) = 1^T F_2(\gamma), \quad \text{EQ. 17}$$

where $\pi_2 = F_2(\gamma)$ is the mapping between the SINRs and the BS transmit powers.

In the preferred embodiment, each node uses the above as it defines and generates its local model as follows:

Given an initial $\gamma_0$ generate the model, $$L(\gamma, g, \beta) = g^T \gamma \quad \text{EQ. 20}$$

$$\Sigma_{q \in Q(m)} \log(1 + \gamma(q)) \geq \beta(m) \quad \text{EQ. 21}$$

$$g = \nabla_\gamma f(\gamma_0) \quad \text{EQ. 22}$$

where $L(\gamma, g, \beta)$ is a linearized model of the objective function.

$g^T \gamma$ is an inner product between the gradient of the objective function and a set of target SINRs, $\Sigma_{q \in Q(m)} \log(1 + \gamma(q)) \geq \beta(m)$, is the capacity constraint for aggregate set m, and, $g = \nabla_\gamma f(\gamma_0)$ is the gradient of the objective function (the total transmit power) as a function of the target SINRs.

The new $\gamma_\alpha$ is updated from $$\gamma_* = \arg \min_\gamma L(\gamma, g, \beta) \quad \text{EQ. 23}$$

$$\gamma_\alpha = \gamma_0 + \alpha((\gamma_* - \gamma_0)) \quad \text{EQ. 24}$$

The constant $\alpha$ is chosen between 0 and 1 and dampens the update step of the algorithm. This determines a target SINR that the algorithm adapts to. The update for the transmit power for link q becomes, $$\pi_2(q) = \gamma_\alpha i_1(q)/|h(q)|^2 \quad \text{EQ. 25}$$

$$\pi_1(q) = \gamma_\alpha i_2(q)/|h(q)|^2 \quad \text{EQ. 26}$$

Where $i_1(q)$ and $i_2(q)$ are the post beamforming interference power seen at the SU and the BS respectively for link q.

The present embodiment of this invention uses advantageously the fact that the $q^{th}$ element of the gradient of the objective function can be written as the product of the interference powers divided by the square of the transfer gain:

$$\{\nabla_\gamma f(\gamma_0)\} q = i_1(q) i_2(q)/|h(q)|^2. \quad \text{EQ. 27}$$

The transmit power update relationship in Eq. 25 and Eq. 26 can be applied repeatedly for a fixed feasible $\gamma_\alpha$ and the convergence of $\pi_1 \rightarrow F_1(\gamma_\alpha)$ is guaranteed. In fact some assert this convergence will be guaranteed if we optimize the receive weights at each iteration. (See Visotsky, E; Madhow, U, "Optimum Beamforming Using Transmit Antenna Arrays", Vehicular Technology Conference, 1999 IEEE $4^{th}$, Volume 1, pp 851-856, though he only considered the effects in a Rank 1 channel, that is a single narrowband rather than a MIMO channel.) A similar statement holds for $\pi_2 \rightarrow F_2(\gamma_\alpha)$. In an alternative embodiment where the proper relationship is unknown, or dynamically changing, then a suitably long block of N samples is used to establish the relationship, where N is either 4 times the number of antennae or 128, whichever is larger, with the result being used to update the receive weights at each end of the link, optimize the local model in Eq. 23 and Eq. 24, and then apply Eq. 25 and Eq. 26.

The algorithm used in the preferred embodiment enables the network, and local nodes thereof, to attain several important results. First, for each aggregate set m, the optimization of the local model(s) at each node(s) completely decouples the network optimization problem to an independent (set) of local problem(s) that is solved among the aggregate set links. Accordingly, within a given aggregate set, we inherit the network objective function model:

$$L_m(\gamma, g, \beta) = \Sigma_{q \in Q(m)} g_q \gamma(q) \quad \text{EQ. 28}$$

$$\Sigma_{q \in Q(m)} \log(1 + \gamma(q)) \geq \beta(m) \quad \text{EQ. 29}$$

$$g_q = i_1(q) i_2(q)/|h(q)|^2 \quad \text{EQ. 30}$$

where $L_m(\gamma, g, \beta)$ is the sum of the separable, linearized, objective functions corresponding to the aggregate set number m, where each localized objective function depends only on variables that pertain to the given aggregate set.

$g_q \gamma(q)$ is the product of the q'th element of the gradient vector with the SINR for link q.

$g_q$ is the q'th element of the gradient vector, and, $|h(q)|^2$ is the square of the channel transfer gain from the transmit beamformer, through the channel to the output beamformer (not including the transmit power).

Second, this approach eliminates matrix channel estimation as a necessary step, as solving the local problem only requires that an estimate of the post beamforming interference power, a single real number for each link, be transmitted to the other end of the link, or in another embodiment to the node assigned to computing the transmit powers for a given aggregate set. For each link, a single real number, the transmit power, is then propagated back to the transmitter. This is true even for networks with large rank MIMO channel matrices.

Third, the optimization problem, which is stated in general terms in Eq. 17, when you plug in a formula for $\pi$ as a function of $\gamma$ into the objective function, i.e. $1^T F_r(\gamma)$ for the SINR to power mapping $F_r(\gamma)$, is reduced from a complex and potentially unsolvable problem to one that has a simple closed form solution, and thus can use a well known water filling problem seen in classical information theory (see T. Cover, T. Joy, *Elements of Information Theory*, Wiley; 1991); Matthew Bromberg and Brian Agee, "The LEGO approach for achieving max-min capacity in reciprocal multipoint networks," in *Proceedings of the Thirty Fourth Asilomar Conf. Signals, Systems, and Computers*, October 2000.

Fourth, even when starting from non-feasible starting points, the algorithm rapidly converges; in the preferred embodiment, where all parameters are updated after every receive block, it converges to a fixed point within the vicinity of the optimal solution; and in an alternative embodiment, where the $\gamma_\alpha$ vector is held fixed until $\pi_1 \to F_1(\gamma_\alpha)$ and $\pi_2 \to F_2(\gamma_\alpha)$ before updating the weights and updating $\gamma_\alpha$ again.

Figure 34:
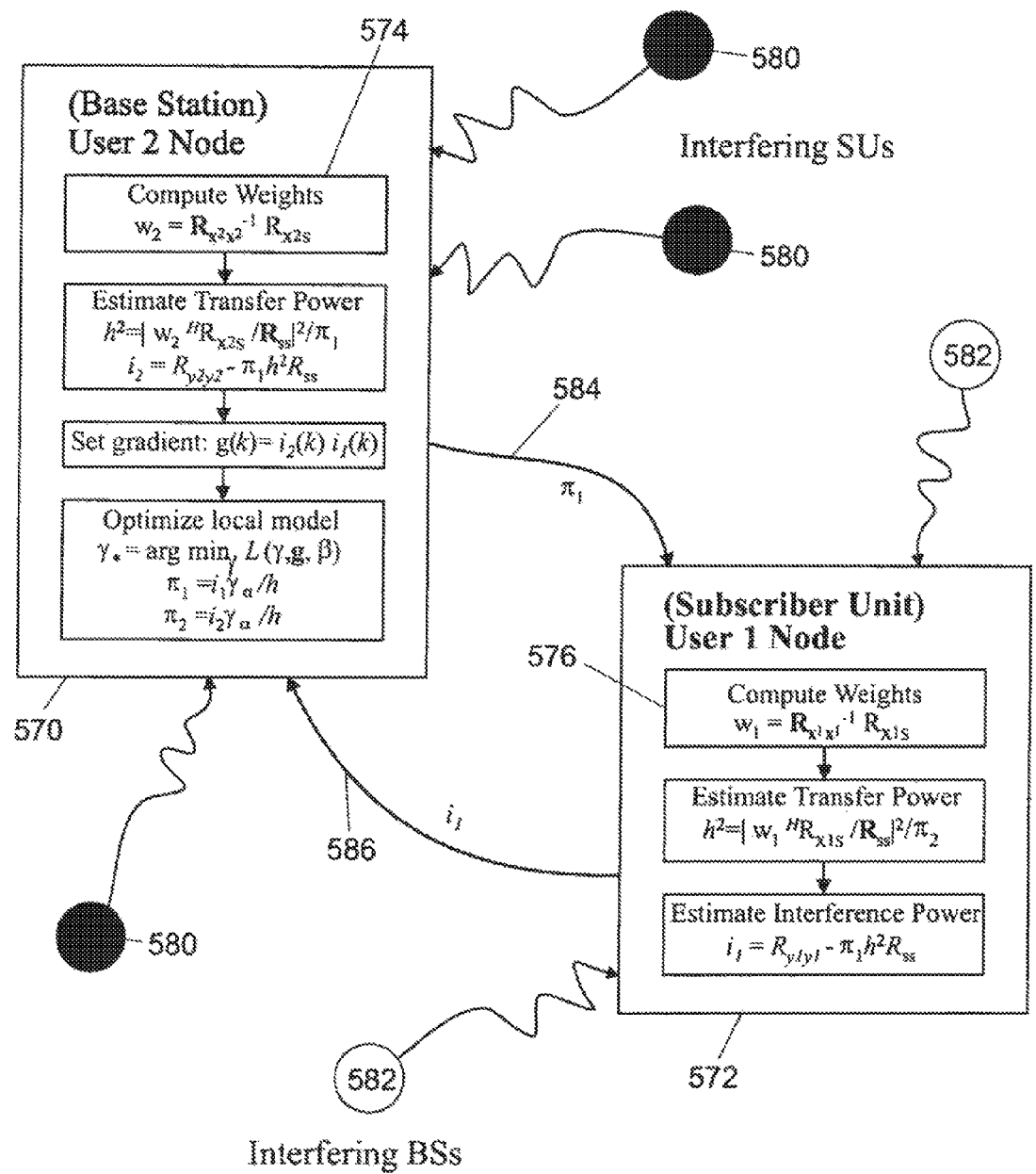
FIG. 34 illustrates two nodes using dynamic, feedback driven information from transmissions and receptions to perform a particular LEGO optimization, involving observed interference power from non-subset or non-network BSs (528) or SUs (580).

A figure illustrating the computational tasks at the BS and the SU for a given link q is shown in FIG. 34. It is assumed that the BS is assigned the task of computing the transmit gains for this particular example. The figure shows that only two numbers are transferred from the BS to the SU and from the SU to the BS. The basic computational tasks at each node are also shown.

In the preferred embodiment, only one side of the link need perform the power management computations. One of the principle advantages and strengths of the present embodiment of the invention is that it replaces half of the prior art's explicit, dual computations with an implicit computation that is performed by the physical transmission of data, which generates the real-world interference (and thus interference values) used by the power control algorithm.

The estimation of the transfer gains and the post beamforming interference power is done efficiently in the preferred embodiment with simple least squares estimation techniques.

The problem of estimating the transfer gains and the post beamforming interference power (in the preferred embodiment, by using a least squares algorithm) is equivalent to solving for the transfer gain h as follows:

$$y(n) = hgs(n) + \in(n) \quad \text{EQ. 31}$$

where y(n) is the output of the beamformer at the time sample.
$h \approx w^H_r(q) H_{21}(q,q) g_t(q)$, whose square modulus is $P_{rt}(q,q)$,
$w_r(q)$ is the receive weight vector for link q,
$g_t(q)$ is transmit weight vector for link q,
g is the square root of the transmit power $\pi_t(q)$,
s(n) is the transmitted complex symbol at time sample n, and
$\in(n)$ represents all of the remaining co-channel interference and noise. (Indexing is dropped to avoid clutter.) Then y(n) is defined as the output after applying the unit normalized despread weights to the received data. This is simply the usual beamformer output divided by the norm of the despread weights with respect to the noise covariance matrix, and for many applications, this will be a scaled multiple of the identity matrix.

Using a block of N samples of data, h is then estimated as:

$$h = \frac{\sum_{n=1}^{N} s^*(n) y(n)}{\sum_{n=1}^{N} |s(n)|^2 g} \quad \text{EQ. 32}$$

where h is the channel transfer gain.
s*(n) is the conjugate of s(n),
y(n) is the output of the beamformer at the time sample n, and,
s(n) is the transmitted complex symbol at time sample n.
From this an estimation of the residual interference power, $R_\in$, which is identified with $i_1(q)$ in Eq. 11 by:

$$R_\varepsilon = \langle |\varepsilon(n)|^2 \rangle = \frac{1}{N} \sum_{n=1}^{N} (|y(n)|^2 - |ghs(n)|^2). \quad \text{EQ. 33}$$

where
gh is the product of the transmit gain and the post-beamforming channel gain.

The knowledge of the transmitted data symbols S(n) in the preferred embodiment comes from using remodulated symbols at the output of the codec. Alternative embodiments use the output of a property restoral algorithm used in a blind beamforming algorithm such as constant modulus or constellation restoral, or by using a training sequence explicitly transmitted to train beamforming weights and assist the power management algorithms, or other means known to the art. This information, and the knowledge of the data transmit power values $\pi_1(q)$ will be at the receiver and can be transmitted to the transmitter as part of a data link layer message; and if the processing occurs over fairly large blocks of data the transfer consumes only a small portion of the available bandwidth. Means for handling the case when a transmit mode is shut off, so that one of the $\pi_1(q)=0$, include removing the index (q) from the optimization procedure and making no channel measurements.

Figure 33:
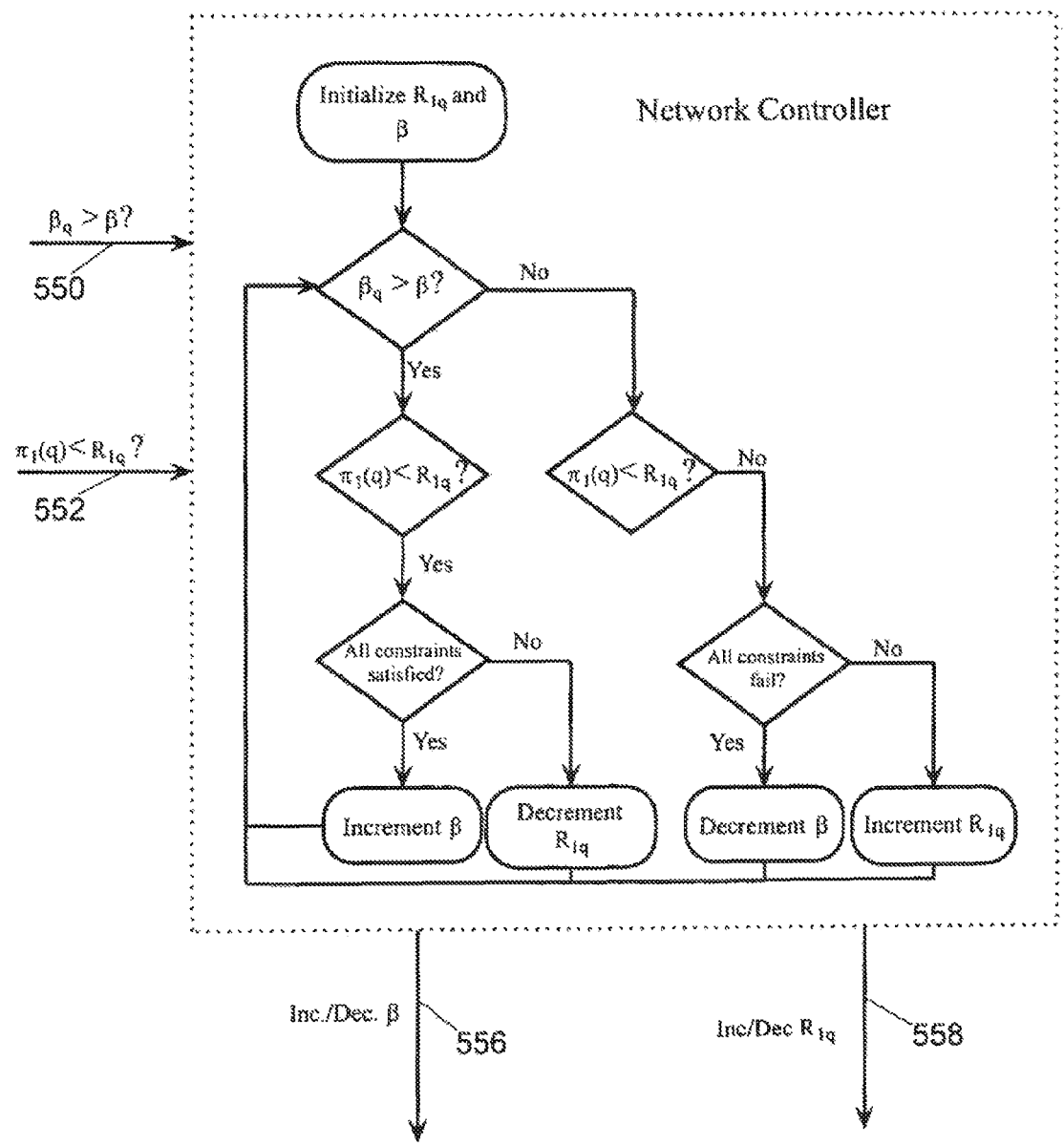
FIG. 33 illustrates the network LEGO optimization function for a network controller, using constraint $R_{1q}$ and target objective β, to determine for the network or node which should be incremented or decremented.

In the preferred embodiment, a link level optimizer and decision algorithm (See FIGS. 32A and 32B) is incorporated in each node; its inputs include the target and the bounds for that node, and its outputs include the new transmit powers and indications to the network as to how the node is satisfying the constraints. FIG. 33 indicates a decision algorithm used by the link level optimizer.

In an alternative embodiment, the solution to Eq. 3 is implemented by using a variety of Lagrange multiplier techniques. In other alternative embodiments, the solution to Eq. 3 is implemented by using a variety of penalty function techniques. All of these embody techniques known to the art for solving the local problem. One such alternative takes the derivative of $\gamma_{(q)}$ with respect to $\pi_1$ and uses the Kronecker-Delta function and the weighted background noise; in separate alternative embodiments, the noise term can be neglected or normalized to one. An approximation uses the receive weights, particularly when null-steering efforts are being made, and as the optimal solution will have weights that approach the singular vectors of the interference-whitened MIMO channel response. In the situation where the links of a given aggregate set Q(m) are all connected to a single node in the network, all information pertaining to the subchannels and propagation modes of the MIMO channel associated with that node are available, hence the norm squared transfer gain $P_{21}(q,q)$ is available for all $q \in Q(m)$ from the processing used to obtain the MMSE receive beamforming weights.

In the preferred embodiment, adaptation of the power is done in a series of measured and quantized descent steps and ascent steps, to minimize the amount of control bits that need to be supported by the network. However, in an alternative embodiment, a node may use more bits of control information to signal for and quantize large steps.

Various alternative methods can be used to develop the local model for each node. The preferred embodiment's use of measured data (e.g. function values or gradients) to develop the local model valid in vicinity of the current parameter values, is only one approach; it can, however, be readily optimized within the node and network. The usual model of choice in prior art has been the quadratic model, but this was inadequate as elements of the functions are monotic. One alternative embodiment is to use a log-linear fractional model:

$$\beta_q \approx \log\left(\frac{a\pi_1(q) + a_0}{b\pi_1(q) + b_0}\right) = \hat{\beta}_q(\pi_1(q)) \qquad \text{EQ. 34}$$

where βq is the achievable bit capacity as a function of the transmit gains $\pi_1(q)$; and to characterize the inequality $$\hat{\beta}_q(\pi_1(q)) \geq \beta \qquad \text{EQ. 35}$$

with a linear half-subspace, and then solving the approximation problem with a simple low dimensional linear program.

Another alternative embodiment develops the local mode by matching function values and gradients between the current model and the actual function. And another develops the model as a solution to the least squares fit, evaluated over several points.

Because of the isolating effect of the transmit and receive weights the fact that the transmit weights for the other nodes in the network may change mitigates the effect on the local model for each node. Yet another alternative broadens the objective function to include the effect of other links in the network, viewing them as responding to some extent to the transmit values of the current link q. A finer embodiment reduces the cross-coupling effect by allowing only a subset of links to update at any one particular time, wherein the subset members are chosen as those which are more likely to be isolated from one another.

In the preferred embodiment, and as shown in the figures. Node 2 optimizes the receiver weights during the uplink (when sending) using a MMSE function; then measures the SINR over all paths k for a particular channel q, and informs the sending node 1 both of the measured capacity for channel q, that is, $(D_{12}(q))$ and, if the measured capacity experienced for that channel is too high, to lower the power, or, if the measured capacity for that channel is too low, to increase the power, with the power increase or decrease being done by small, discrete increments. Node 2 then sets, for that channel, the transmit weights to the receive weights and repeats this sub-process for the downlink case. By successive, rapid iteration node 2 rapidly informs node 1 of the precise transmission power needed at node 1 to communicate over channel q with node 2.

This process is performed for every channel q which is active at node 2, until either the target capacity is attained, or the capacity cannot be improved further. It is also repeated at every node in the network, so node 1 will be telling node 2 whether node 2 must increase or decrease the power for node 2's transmissions to node 1 over channel q.

In an alternative embodiment, the network contains one or more network controllers, each of whom govern a subset of the network. The network controller initiates, monitors, and changes the target objective (in the preferred alternative embodiment, capacity) for the set of nodes it governs and communicates the current objective to those nodes and the rest of the network as necessary. (See FIG. 33.) Different sub-networks can use different capacity objectives depending on each network's localized environment (both external and internal, i.e. traffic density).

The network controller, once it has initialized the reciprocal set and objective continually monitors the network of nodes it governs, continually compares if the desired capacity has been reached, and for each node n, perform a fitting function. If a node n is compliant with the power constraints and capacity bound, then $R_1(n)$ should be reduced by a small amount; but if node n has both power constraints and capacity violations than $R_1(n)$ should be incremented for that node. These increments and decrements are preferably quantized to fixed small numbers. In an alternative embodiment of the invention the scalar and history of the increments and decrements are recorded to feed into experientially modified approximations, effectively embodying a real-world adaptation learning for each node.

One important consequence of this approach is that compliance with any network constraint or objective can be conveyed with a single bit, and increment or decrement with two bits, thereby reducing the control overhead to a minimum.

From the Butler Mode Forming element received signals are first passed through the frequency channel bank, then mapped to the FDMA channels. The received data on channel k will be passed through both the Multilink Receive weight adaptation algorithm and the Multilink diversity combining, Receive weights W(k) element, which in turn both feed into the Multilink LEGO gain adaptation algorithm and thus feed-back into the multilink diversity distribution element for outgoing transmissions. The Multilink Receive weight adaptation algorithm passes the adapted data from channel k over to the Multilink Diversity combining, Receive Weights W(k) element passes on the signal to both the circuits for the Equalization algorithm and the Delay/ITI/pilot-gating removal bank, that strips out the channel-coordinating information and passes the now combined signal to the symbol decoder bank to be turned into the information which had been sent out from the originating transceiver, the inverse process, generally, from the symbol encoding at the transmission end.

Figure 21:
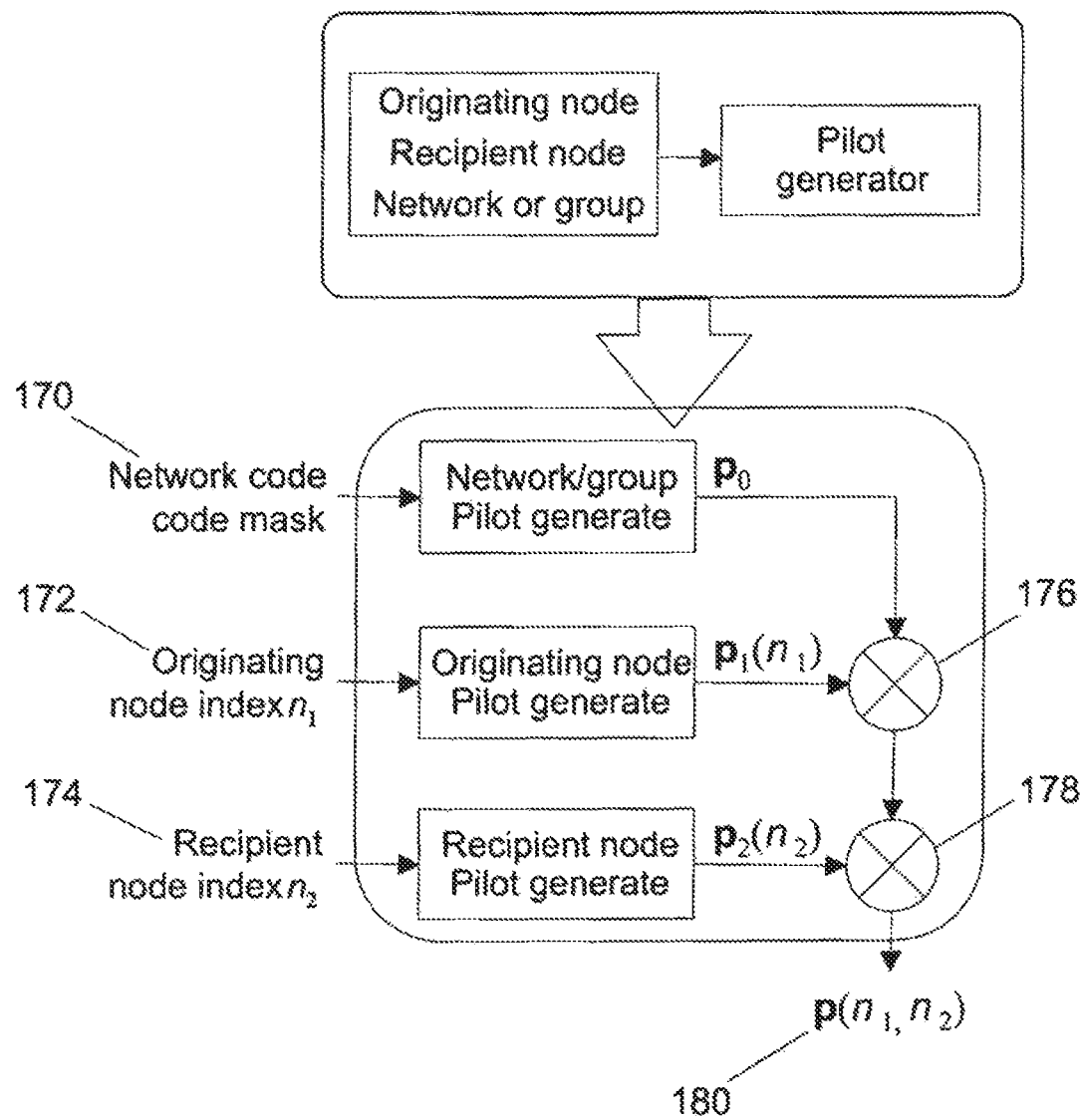
FIG. 21 illustrates the means for generating the pilot tone mask with network code mask pseudodelay (Item 170), originating node index mask element (Item 172), and Recipient node index mask element (Item 174) being combined by two element-wise MUX units (Items 176, 178), to create the final pilot tone signal (Item 180).

These Signal Encoding Operations are graphically displayed in FIG. 21. (Because the decoding is both the inverse and well enough known, given a particular encoding, to be within the state of the art for any practitioner in the field, there is not a for the inverse, Symbol Decoding Operations.) A given signal, such as an IP datagram, is formed into a fragment and passed along to a MUX element. (Any signal which can be equated to or converted into an IP datagram, for example an ATM, would either be converted prior to this point or handled similarly.) The desired MAC header data, which in one alternative embodiment is optionally timestamped, is also fed into the same MUX element where the two combine. This combined signal now passes through a CRC generator as well as feeding into a second MUX that combines the CRC output with it. Next, the signal passes into an encryption element that also performs trellis encoding. (In an alternative embodiment one or both of these operations are eliminated, which reduces the transceiver's hardware and software complexity but decreases the network's security and reliability.) (For more information on the alternative use of Trellis coded modulation, see. Boulle, et al., "An Overview of Trellis Coded Modulation Research in COST 231", IEEE PIMRC '94, pp. 105-109.) The now-encoded signal is next passed to the element where it is mapped to the individual tones and the MT symbols, and where buffer tones and time and frequency interleaving is done. A second, optional, delay preemphasis signal element, and a third signal element from a pilot generator, taking input from the originating node, recipient node, group, or network, or any combination or sub-combination thereof, now are combined with the signal from the mapping element in a MUX. This MUX may use the first two slots for a pilot without modulation by the information tones, using the remaining slots for the pilot modulated by the information tones to further harden the pilot/signal combination. An alternative embodiment would at this point further pass the transmission signal through an ITI pre-distortion element; otherwise, the now-encoded, piloted, and mapped transmission signal is ready.

Figure 28:
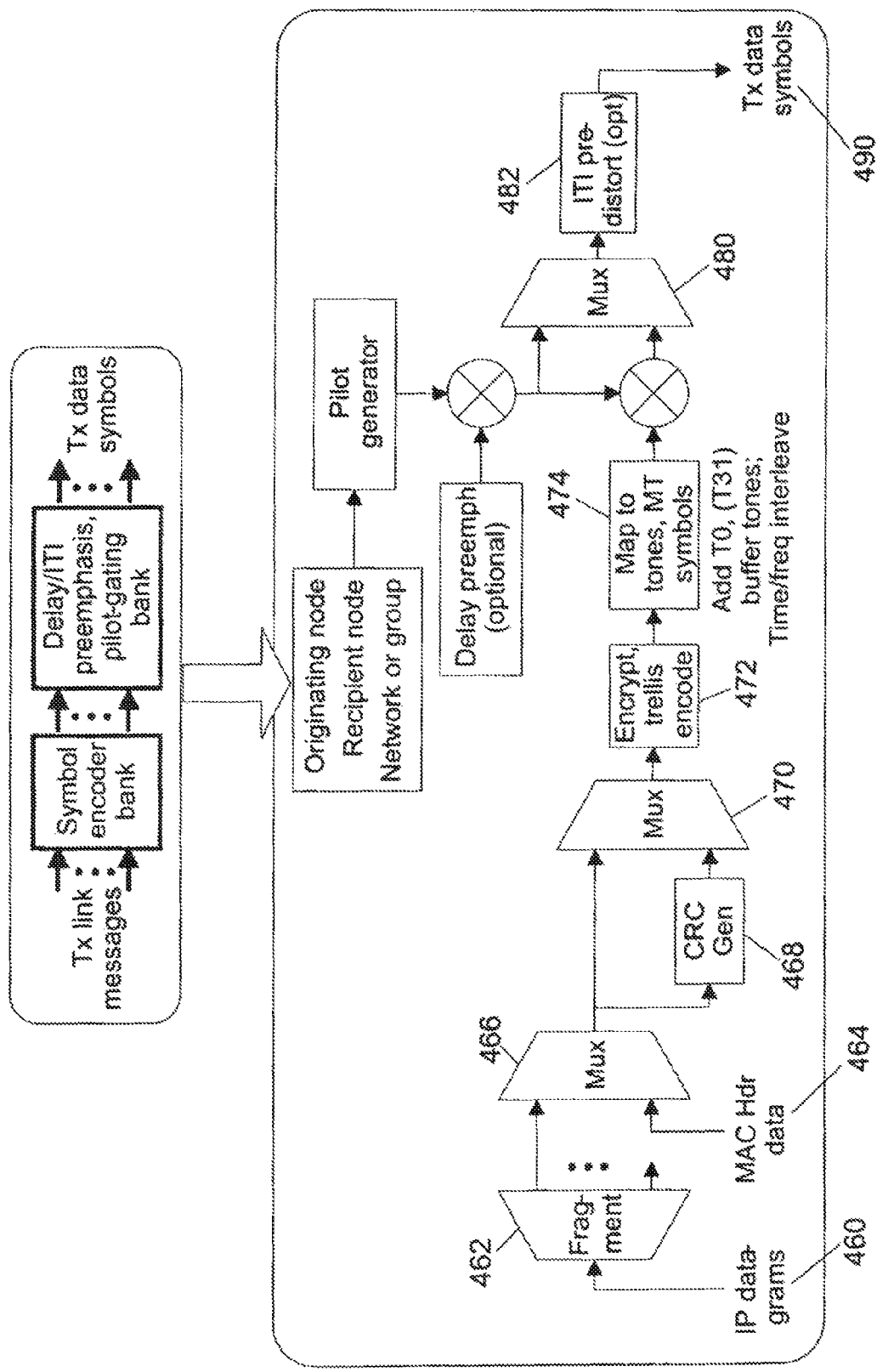
FIG. 28 illustrates in more detail the implementation of the Delay/ITI preemphasis, pilot-gating bank, tying the details of FIG. 21 into the mapping element (Item 474), the Trellis encryption and encoding element (Item 472), the pilot signal and information signal MUX (Item 480), leading to the final Tx data symbols signals (Item 490).
Figure 29:
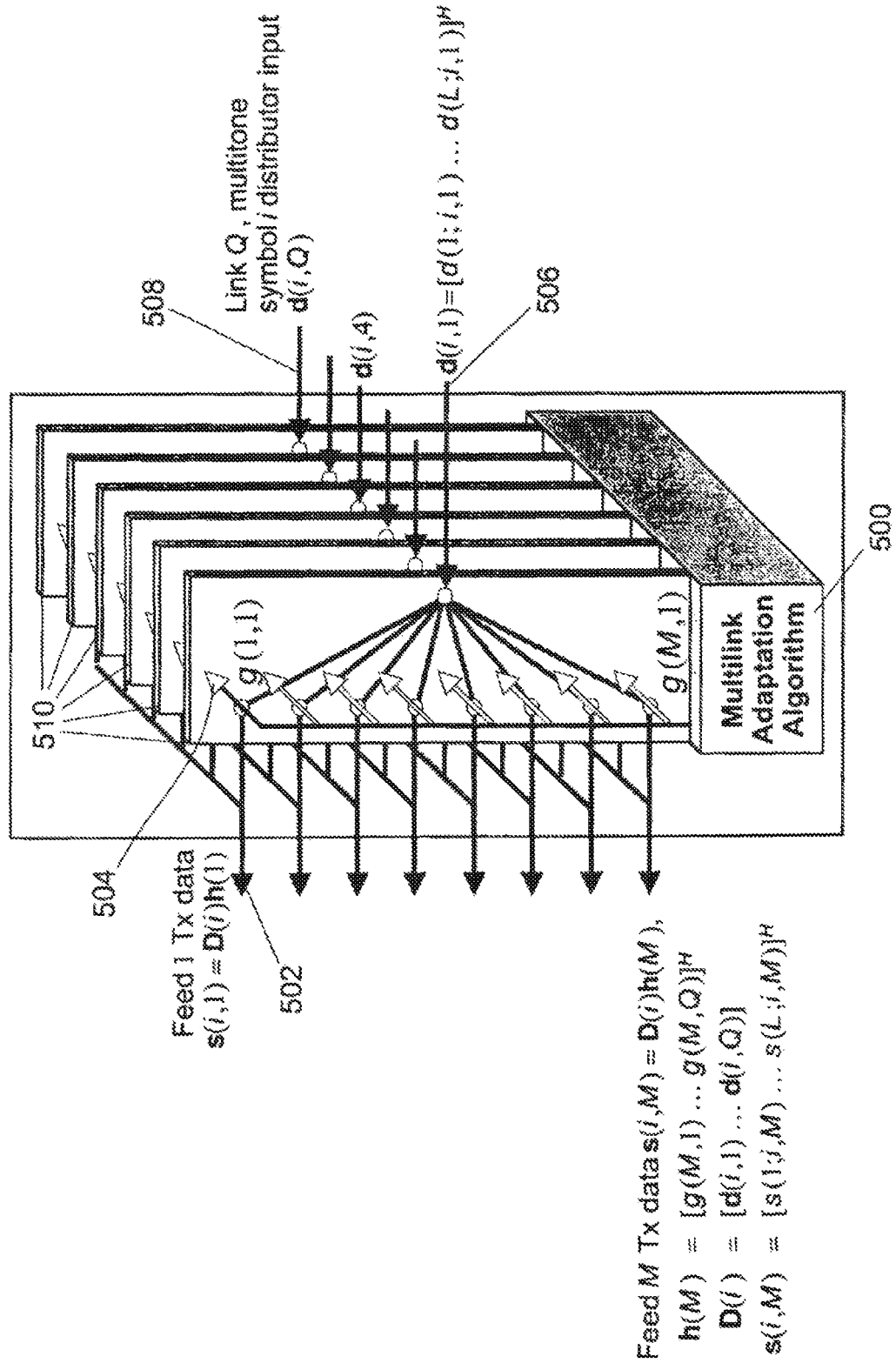
FIGS. 29 and 30 illustrate the antennae feeds (502, 512) across diversity modes and multilinks through the Multilink Adaptation Algorithm element (500) to and from the Link and multitone symbol distributor/combiner inputs and outputs (506, 508; and 516, 518 respectively).

Pilot tone generation, summarily disclosed on FIG. 21, is further detailed in FIG. 28. Information concerning one or more of the originating node, recipient node, and network or group channel organization flow into a pilot signal generator, and the resulting pilot signal is further modified by a network code mask. This multilayer mask then is used to form a signal with a pseudorandom sequence that is shared by all nodes in the same network or group, though the sequence may vary over channels and MT symbols to allow further coordination amongst them at the receiving end. Passing on the signal is modified in an element-wise multiplication (typically a matrix operation, embedded in hardware) by a signal that indexes on the originating node, which in an optional variation includes a nodal pseudodelay, unique to that node in the network or group, which overlay again may vary over channels and frames to improve security. The originating node index overlay is a complex, exponential phase ramping. The combined signal now mixes with a recipient node index, another pseudorandom sequence that is unique to the recipient node, modifying the whole in a second element-wise multiplication. Thus the final pilot tone reflects the content signal, modified to uniquely identify both the originating node and its context, and the receiving node and its context, effecting a signal composition that allows the network to pilot the communication through the network from origin to destination regardless of the intervening channels it takes.

Figure 30:
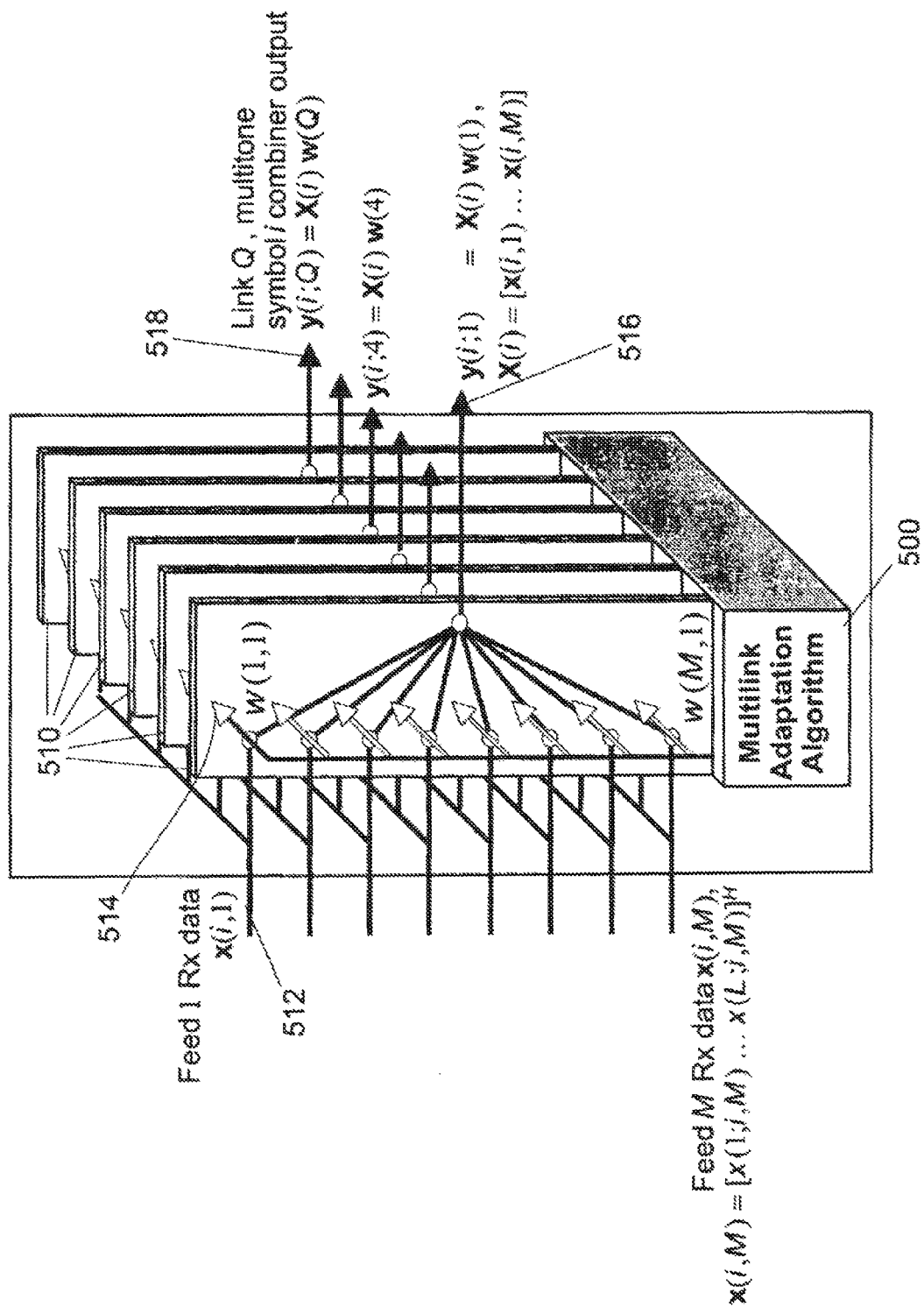
Figure 31:
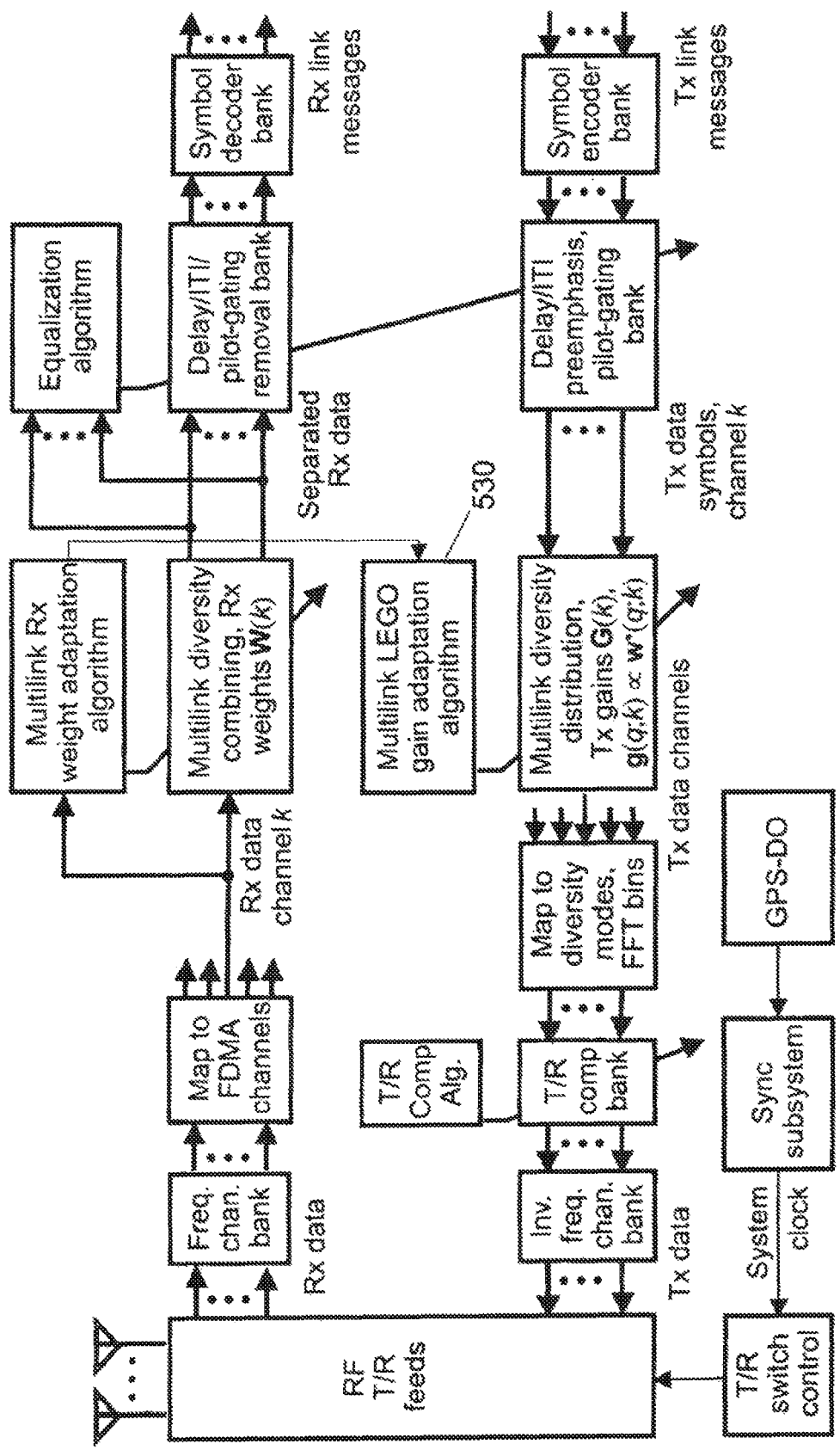
FIG. 31 illustrates the incorporation of the preferred embodiment of the Multilink LEGO gain adaptation algorithm and element (Item 530) into the diversity combining and distribution elements of the MIMO transceiver hardware.

When a communication is transmitted, it will be received; and the MIMO reception is, like the transmission, adaptive. See FIG. 30, detailing the logical processing involved. Received data passes through both a Multilink weight adaptation algorithm and (to which that part is combined) a Multilink diversity combining of the Reception weights. This reweighted transmission now passes through the equalization algorithm and (to which that is combined) a Delay/ITI/pilot-gating removal bank stage. These sort out the properly weighted tones, perform the recombinations, and undo the pilot-gating distortion to effectively reassemble at the reception end the symbol pattern of the original signal.

That now passes through a symbol decoder bank to recover the message from the symbolic representation and the whole now is joined with the other received and linked messages for final reassembly. The functional and firmware processing (fixed logic hardware, limited purpose firmware, or combined software, processors and circuitry). The received symbol $X(i, 1)$, comprising a matrix combination of L Link and M multitone elements, is first modified by the pilot tone generator that sends the recipient node, network, and group modifications for an element-wise reverse multiplication, to strip off that component of the signal and identify if the received symbol is from any originating source trying to send to this particular recipient. If the recipient pilot signal matches, then the signal passed on to a circuit that separates the pilot signal elements from the data signal elements. The pilot signal elements are passed through a link detection circuit that preferentially uses a FFT-LS algorithm to produce link quality statistics for that particular received transmission, identifies the weighting elements that were contained in the pilot signal and passes those over to the multilink combination circuit, and sends the pilot weights over to the circuit for equalizing weight calculations. The data signal, combined with the pilot weighting elements, now is combined with the equalizer calculated factors to strip off all pilot information from the traffic data. Next, the re-refined traffic data passes through a link demodulator to produce the original channel-by-channel link streams of data. In an alternative embodiment, the first channel, which has been reserved for decryption, decoding, and error detection signal ling, not passes through the ITI correction circuitry and thence to the instantiated decryption, decoding, or retransmission circuitry as indicated by the data elements of the first channel signal; meanwhile, the remaining data channel elements are available, having been refined from the combined received elements.

A MIMO transceiver contains and uses simultaneously a multiple of single RF feeds. A signal passes between the Butler Mode Forming element and a Band Pass Filter, or preselection, element, and then between the Band Pass Filter element and the Transceiver switch. If the signal is being transmitted, it goes through a Low Noise Amplifier element and then back into the Transceiver switch; if the signal is being received, it goes through a Phase Amplifier and back into the Transceiver switch. The signal passes between the Transceiver switch and the Frequency translator, and then back into the Transceiver switch.

In the Frequency translator (FIG. 25), the signal passes through a second Band Pass Filter with a Surface Acoustic Wave (SAW) Frequency greater than three, then between that second Band Pass Filter and a first mixer, where it will be mixed (or unmixed, depending on direction) with (or by) another waveform which has come from the timing element(s), which may be any of the system clock, synchronization subsystem, and GPS time transfer, or their combination. The combined timing and content signal passes between the first mixer and a SAW element where it is combined (or separated) with a saw frequency of less than or equal to 1.35 times that of the signal. The SAW-modified signal passes between the SAW element and a second mixer, where the saw-modified signal is mixed (or unmixed, depending on direction) by the waveform which also has come from the timing element(s) mentioned above. The signal passes between the second mixer and the LPF element with a SAW Frequency greater than three; the next transition is between the frequency translator and the Transceiver switch. Depending on the direction of the signal, it passes between the Transceiver switch and the ADC element or the DAC element (the ADC and DAC together are 'the converter elements') and the Transceiver switch, and between the ADC element and the FFT/IFFT element or between the FFT/IFFT element and the DAC element. Both the DAC and ADC elements are linked to and governed by the system clock, while the signal's passage through the Transceiver switch and the other elements (LNA or PA, Frequency Translator, and between the Transceiver switch and the converter elements, is governed by the Switch Controller element. This approach is used because the Frequency Translator can be implemented as a single piece of hardware which lowers the cost of the overall unit and lessens the signal correction necessary.

Different multitone formats are used at different transceivers, thereby enabling ready distinction by and amongst the receivers of the transmitter frequency tone set. For fixed transceivers (BS or fixed SU), rectangular windows with cyclic prefixes and/or buffers are used; for mobile transceivers, non-rectangular windows and guard times are used. This provides the network with a capacity fall-back as the network environment and traffic dynamics vary. In the preferred embodiment the guard times are matched to the cyclic prefixes and buffers, the multitone QAM symbols are matched at all windows, and the different windows and capacity are used in different modes.

The multitone (multifrequency) transmission that occurs between every pair of nodes when they form a communications link exploits the multipath phenomena to achieve high QoS results. Each node, when it is acting as a receiver, optimizes the receive weights, using the MMSE technique. This goes directly against Varanesi's assessment that "decorrelative and even linear MMSE strategies are ill-advised for such channels because they either do not exist, and even if they do, they are plagued by large noise-enhancement factors".

An alternative embodiment uses the Max SINR technique, and any combination of these and other industry-standard receiver optimization algorithms are feasible alternative implementations. Then the transmit weights for that node in its reply are optimized by making them proportional to the receive weights. Finally, the transmit gains (gain multipliers that multiply the transmit weights) are optimized according to a max-min capacity criterion for that node, such as the max-min sum of link capacities for that transceiver node at that particular time.

An alternative embodiment includes as part of the network one or more network controllers that assist in tuning the local nodes' maximum capacity criterion to network constraints, e.g. by enforcing a balancing that reflects an intermediate nodes' current capacity which is lower than the local, originating node's current capacity.

The MIMO network model for the aggregate data transmitted between $N_1$ "Set 1 nodes" $\{n_1(1), \ldots, n_1(N_1)\}$, receiving data over downlink time slots and transmitting data over uplink time slots, and $N_2$ "Set 2 nodes" $\{n_2(1), \ldots, n_2(N_2)\}$ receiving data over uplink time slots and transmitting data over downlink time slots, can be approximated by $$x_2(k,l) \approx i_2(k,l) + H_{21}(k,l)s_1(k,l) \quad \text{EQ. 36}$$

(uplink network channel model)

$$x_1(k,l) \approx i_1(k,l) + H_{12}(k,l)s_2(k,l) \quad \text{EQ. 37}$$

(downlink network channel model)

within frequency-time channel (k,l) (e.g., tone k within OFDM symbol l) transmitted and received at uplink frequency $f_{21}(k)$ and time $t_{21}(l)$ and downlink frequency $f_{12}(k)$ and time $t_{12}(l)$, where $s_1(k,l) = [s^T_1(k, l; n_1(1)) \ldots s^T_1(k, l; n_1(N_1))]^T$ represents the network signal vector transmitted from nodes $\{n_1(p)\}$ within uplink channel (k,l);

$s_2(k,l) = [s^T_2(k, l; n_2(1)) \ldots s^T_2(k, l; n_2(N_2))]^T$ represents the network signal vector transmitted from nodes $\{n_2(q)\}$ within downlink channel (k,l);

$x_1(k,l) = [x^T_1(k, l; n_1(1)) \ldots x^T_1(k, l; n_1(N_1))]^T$ represents the network signal vector received at nodes $\{n_1(p)\}$ within downlink channel (k,l);

$x_2(k,l) = [x^T_2(k, l; n_2(1)) \ldots x^T_2(k, l; n_2(N_2))]^T$ represents the network signal vector received at nodes $\{n_2(q)\}$ within uplink channel (k,l);

$i_1(k,l) = [i^T_1(k, l; n_1(1)) \ldots i^T_1(k, l; n_1(N_1))]^T$ models the network interference vector received at nodes $\{n_1(p)\}$ within downlink channel (k,l);

$i_2(k,l) = [i^T_2(k, l; n_2(1)) \ldots i^T_2(k, l; n_2(N_2))]^T$ models the network interference vector received at nodes $\{n_2(q)\}$ within uplink channel (k,l);

$H_{21}(k,l) = [H_{21}(k, l; n_2(q), n_1(p))]$ models the channel response between transmit nodes $\{n_1(p)\}$ and receive nodes $\{n_2(q)\}$ within uplink channel (k,l); and $H_{12}(k,l) = [H_{12}(k, l; n_1(p), n_2(q))]$ models the channel response between transmit nodes $\{n_2(q)\}$ and receive nodes $\{n_1(p)\}$ within downlink channel (k,l);

and $(\ )^T$ denotes the matrix transpose operation, and where $s_1(k, l; n_1)$ represents the $M_1(n_1) \times 1$ node $n_1$ signal vector transmitted over $M_1(n_1)$ diversity channels (e.g., antenna feeds) within uplink frequency-time channel (k,l);

$s_2(k, l; n_2)$ represents the $M_2(n_2) \times 1$ node $n_2$ signal vector transmitted over $M_2(n_2)$ diversity channels within downlink frequency-time channel (k,l);

$x_1(k, l; n_1)$ represents the node $n_1$ signal vector received over $M_1(n_1)$ diversity channels within downlink frequency-time channel (k,l);

$x_2(k, l; n_2)$ represents the $M_2(n_2) \times 1$ node $n_2$ signal vector received over $M_2(n_2)$ diversity channels within uplink frequency-time channel (k,l);

$i^1(k, l; n_1)$ models the $M_1(n_1) \times 1$ node $n_1$ interference vector received over $M_1(n_1)$ diversity channels within downlink frequency-time channel (k,l);

$i_2(k, l; n_2)$ models the $M_2(n_2) \times_1$ node $n_2$ interference vector received over $M_2(n_2)$ diversity channels within uplink frequency-time channel (k,l);

$H_{21}(k, l; n_2, n_1)$ models the $M_2(n_2) \times M_1(n_1)$ channel response matrix between transmit node $n_1$ and receive node $n_2$ diversity channels, within uplink channel (k,l); and $H_{12}(k, l; n_1, n_2)$ models the $M_1(n_1) \times M_2(n_2)$ channel response matrix between transmit node $n_2$ and receive node $n_1$ diversity channels, within downlink channel (k,l).

In the absence of far-field multipath between individual nodes. $H_{21}(k, l; n_2, n_1)$ and $H_{12}(k, l; n_1, n_2)$ can be further approximated by rank 1 matrices:

$$H_{21}(k,l;n_2,n_1) \approx \lambda_{21}(n_1,n_2)a_2(f_{21}(k),t_{21}(l);n_1,n_2)a^T_1(f_{21}(k),t_{21}(l);n_2,n_1) \times \exp\{-j2\pi(\tau_{21}(n_2,n_1)f_{21}(k) - \nu_{21}(n_2,n_1)t_{12}(l))\}] \quad \text{EQ. 38}$$

$$H_{12}(k,l;n_1,n_2) \approx \lambda_{12}(n_2,n_1)a_1(f_{12}(k),t_{12}(l);n_2,n_1)a^T_2(f_{12}(k),t_{12}(l);n_1,n_2) \times \exp\{-j2\pi(\tau_{12}(n_1,n_2)f_{12}(k) - \nu_{12}(n_1,n_2)t_{12}(l))\} \quad \text{EQ. 39}$$

where $\lambda_{21}(n_2, n_1)$ models the observed uplink pathloss and phase shift between transmit node $n_1$ and receive node $n_2$;

$\lambda_{12}(n_1, n_2)$ models the observed downlink pathloss and phase shift between transmit node $n_2$ and receive node $n_1$;

$\tau_{21}(n_2, n_1)$ models the observed uplink timing offset (delay) between transmit node $n_1$ and receive node $n_2$;

$\tau_{12}(n_1, n_2)$ models the observed downlink timing offset between transmit node $n_2$ and receive node $n_1$;

$v_{21}(n_2, n_1)$ models the observed uplink carrier offset between transmit node $n_1$ and receive node $n_2$;

$v_{12}(n_1, n_2)$ models the observed downlink carrier offset between transmit node $n_2$ and receive node $n_1$;

$a_1(f, t; n_2, n_1)$ models the $M_1(n_1) \times 1$ node $n_1$ channel response vector, between node $n_2$ and each diversity channel used at node $n_1$, at frequency f and time t; and $a_2(f, t; n_1, n_2)$ models the $M_2(n_2) \times 1$ node $n_2$ channel response vector, between node $n_1$ and each diversity channel used at node $n_2$, at frequency f and time t.

In many applications, for example, many airborne and satellite communication networks, channel response vector $a_1(f, t; n_2, n_1)$ can be characterized by the observed (possibly time-varying) azimuth and elevation $\{\theta_1(t; n_2, n_1), \phi_1(f, t; n_2, n_1)\}$ of node $n_2$ observed at $n_1$. In other applications, for example, many terrestrial communication systems, $a_1(f, t; n_2, n_1)$ can be characterized as a superposition of direct-path and near-field reflection path channel responses, e.g., due to scatterers in the vicinity of $n_1$, such that each element of $a_1(f, t; n_2, n_1)$ can be modeled as a random process, possibly varying over time and frequency. Similar properties hold for $a_2(f, t; n_1, n_2)$.

In either case, $a_1(f, t; n_2, n_1)$ and $a_2(f, t; n_1, n_2)$ can be substantively frequency invariant over significant breadths of frequency, e.g., bandwidths commensurate with frequency channelization used in 2G and 2.5 G communication systems. Similarly, $a_1(f, t; n_2, n_1)$ and $a_2(f, t; n_1, n_2)$ can be substantively time invariant over significant time durations, e.g., large numbers of OFDM symbols or TDMA time frames. In these cases, the most significant frequency and time variation is induced by the observed timing and carrier offset on each link.

In many networks of practical interest, e.g., TDD networks, the transmit and receive frequencies are identical $(f_{21}(k) = f_{12}(k) = f(k))$ and the transmit and receive time slots are separated by short time intervals $(t_{21}(l) = t_{12}(l) + \Delta_{21} \approx t(l))$, and $H_{21}(k,l)$ and $H_{21}(k,l)$ become substantively reciprocal, such that the subarrays comprising $H_{21}(k,l)$ and $H_{21}(k,l)$ satisfy $H_{21}(k, l; n_2, n_1) \approx \delta_{21}(k, l; n_1, n_2) H^T_{12}(k, l; n_1, n_2)$, where $\delta_{21}(k, l; n_1, n_2)$ is a unit-magnitude, generally non-reciprocal scalar.

If the observed timing offsets, carrier offsets, and phase offsets are also equalized, such that $\lambda_{21}(n_2, n_1) \approx \lambda_{12}(n_1, n_2)$, $\tau_{21}(n_2, n_1) \approx \tau_{12}(n_1, n_2)$, and $v_{21}(n_2, n_1) v_{12}(n_1, n_2)$, for example, by synchronizing each node to an external, universal time and frequency standard such as Global Position System Universal Time Coordinates (GPS UTC), then $\delta_{21}(k, l; n_1, n_2) \approx 1$ can be obtained and the network channel response becomes truly reciprocal. $H_{21}(k,l) \approx H^T_{12}(k,l)$. However, this more stringent level of reciprocity is not required to obtain the primary benefit of the invention.

In order to obtain substantive reciprocity, each node in the network must possess means for compensating local differences between transmit and reception paths. Methods for accomplishing this using probe antennas are described in Agee, et. al. (U.S. patent application Ser. No. 08/804,619, referenced above). A noteworthy advantage of this invention is that substantive reciprocity can be obtained using only local transmit/receive compensation means.

The channel model described above is extendable to applications where the internode channel responses possess substantive multipath, such that $H_{21}(k, l; n_2, n_1)$ and $H_{12}(k, l; n_2, n_1)$ have rank greater than unity. This channel response can also be made substantively reciprocal, such that the primary benefit of the invention can be obtained here.

The preferred embodiment uses a substantively null-steering network wherein each node transmits baseband data (complex symbols provided by a multirate codec) through the multiplicity of reciprocal linear matrix operations prior to transmission into the antenna array during transmit operations, and after reception by the antenna array during receive operations, in a manner that physically separates messages intended for separate recipients. This is accomplished by (1) forming uplink and downlink transmit signals using the matrix formula $$s_1(k,l;n_1) = G_1(k,l;n_1) d_1(k,l;n_1)$$

$$s_2(k,l;n_1) = G_2(k,l;n_2) d_2(k,l;n_2) \qquad \text{EQ. 40}$$

where $d_1(k, l; n_1) = [d_1(k, l; n_2(1), n_1) \ldots d_1(k, l; n_2(N_2), n_1)]^T$ represents the vector of complex data symbols transmitted from node $n_1$ and intended for each of nodes $\{n_2(q)\}$, respectively, within uplink channel (k,l);

$d_2(k, l; n_2) = [d_2(k, l; n_1(1), n_2) \ldots d_2(k, l; n_1(N_1), n_2)]^T$ represents the vector of complex data symbols transmitted from node $n_2$ and intended for each of nodes $\{n_1(q)\}$, respectively, within downlink channel (k,l);

$G_1(k, l; n_1) = [g_1(k, l; n_2(1), n_1) \ldots g_1(k, l; n_2(N_2), n_1)]$ represents the complex distribution weights used to redundantly distribute symbol vector $d_1(k, l; n_1)$ onto each diversity channel employed at node $n_1$ within uplink channel (k,l); and $G_2(k, l; n_2) = [g_2(k, l; n_1(1), n_2) \ldots g_2(k, l; n_1(N_1), n_2)]$ represents the complex distribution weights used to redundantly distribute symbol vector $d_2(k, l; n_2)$ onto each diversity channel employed at node $n_2$ within downlink channel (k,l);

(2) reconstructing the data intended for each receive node using the matrix formula $$y_1(k,l;n_1) = W^H_1(k,l;n_1) x_1(k,l;n_1)$$

$$y_2(k,l;n_2) = W^H_2(k,l;n_2) x_2(k,l;n_2) \qquad \text{EQ. 41}$$

where $(\ )^H$ denotes the conjugate-transpose (Hermitian transpose) operation, and where $y_1(k, l; n_1) = [y_1(k, l; n_2(1), n_1) \ldots y_1(k, l; n_2(N_2), n_1)]^T$ represents the vector of complex data symbols intended for node $n_1$ and transmitted from each of nodes $\{n_2(q)\}$, respectively, within downlink channel (k,l);

$y_2(k, l; n_2) = [y_2(k, l; n_1(1), n_2) \ldots y_2(k, l; n_1(N_1), n_2)]^T$ represents the vector of complex data symbols intended for node $n_2$ and transmitted from each of nodes $\{n_1(p)\}$, respectively, within uplink channel (k,l);

$W_1(k, l; n_1) = [w_1(k, l; n_2(1), n_1) \ldots w_1(k, l; n_2(N_2), n_1)]$ represents the complex combiner weights used at node $n_1$ to recover symbol symbols $\{d_1(k, l; n_2(q), n_1)\}$ intended for node $n_1$ and transmitted from nodes $\{(n_2(q)\}$ within uplink channel (k,l); and $W_2(k, l; n_2) = [w_2(k, l; n_1(1), n_2) \ldots w_2(k, l; n_1(N_1), n_2)]$ represents the complex combiner weights used at node $n_2$ to recover symbol symbols $\{d_2(k, l; n_1(p), n_2)\}$ intended for node $n_2$ and transmitted from nodes $\{n_1(p)\}$ within uplink channel (k,l).

(3) developing combiner weights that $\{w_1(k, l; n_2, n_1)\}$ and $\{w_2(k, l; n_1, n_2)\}$ that substantively null data intended for recipients during the symbol recovery operation, such that for $n_1 \neq n_2$:

$$|w^H_1(k,l;n_2,n_1)a_1(f_{12}(k),t_{12}(l);n_2,n_1)| \ll |w^H_1(k,l;n_1,n_1)a_1(f_{12}(k),t_{12}(l);n_1,n_1)| \ll \quad \text{EQ. 42}$$

and $$|w^H_2(k,l;n_1,n_2)a_2(f_{21}(k),t_{21}(l);n_1,n_2)| \ll |w^H_2(k,l;n_2,n_2)a_2(f_{21}(k),t_{21}(l);n_2,n_2)| \quad \text{EQ. 43}$$

(4) developing distribution weights $\{g_1(k, l; n_2, n_1)\}$ and $\{g_2(k, l; n_1, n_2)\}$ that perform equivalent substantive nulling operations during transmit signal formation operations;
(5) scaling distribution weights to optimize network capacity and/or power criteria, as appropriate for the specific node topology and application addressed by the network;
(6) removing residual timing and carrier offset remaining after recovery of the intended network data symbols; and
(7) encoding data onto symbol vectors based on the end-to-end SINR obtainable between each transmit and intended recipient node, and decoding that data after symbol recovery operations, using channel coding and decoding methods develop in prior art.

In the preferred embodiment, OFDM modulation formats is used to instantiate the invention, and substantively similar distribution and combining weights are computed and applied over as broad a range of tones (frequency channels k) and OFDM symbols (time slots l) as is practical. The range of practical use is determined by the frequency selectivity (delay spread) and time selectivity (Doppler spread) of the communications channel, which determines the degree of invariance of the channel response vectors $a_1$ and $a_2$ on (k,l); the dynamics of interference $i_1$ and $i_2$; latency requirements of the communications network; and dimensionality of linear combiners used at each node in the network, which determine the number of frequency-time channels needed to determine reliable substantively null-steering distribution and combining weights.

Figure 35:
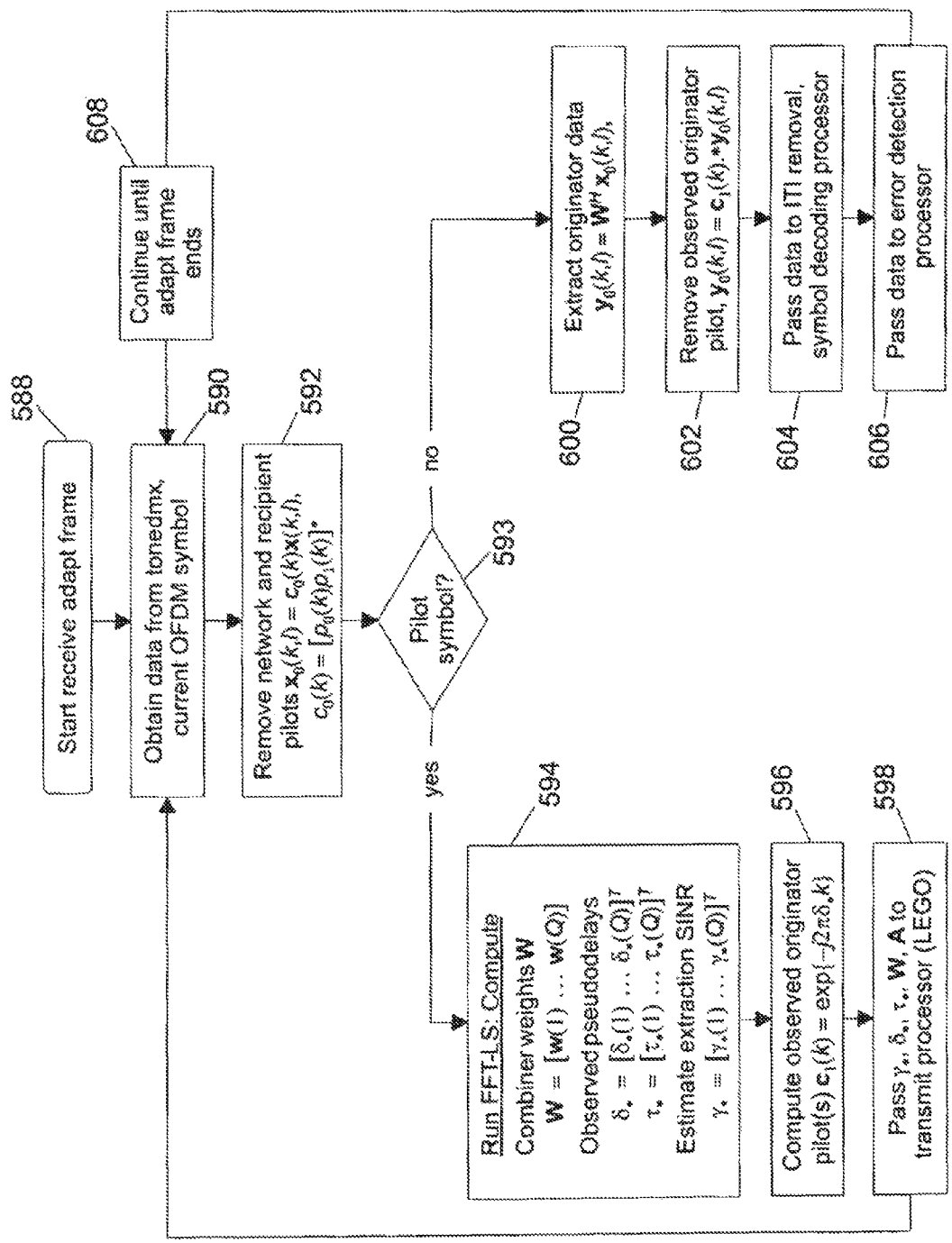
FIGS. 35 and 36 illustrate the FFT-based LS algorithm used in the preferred embodiment that adapt $\{w_1 (k, l; n_2, n_1)\}$ and $\{w_2 (k, l; n_1, n_2)\}$ to values that minimize the mean-square error (MSE) between the combiner output data and a known segment of transmitted pilot data.
Figure 36:
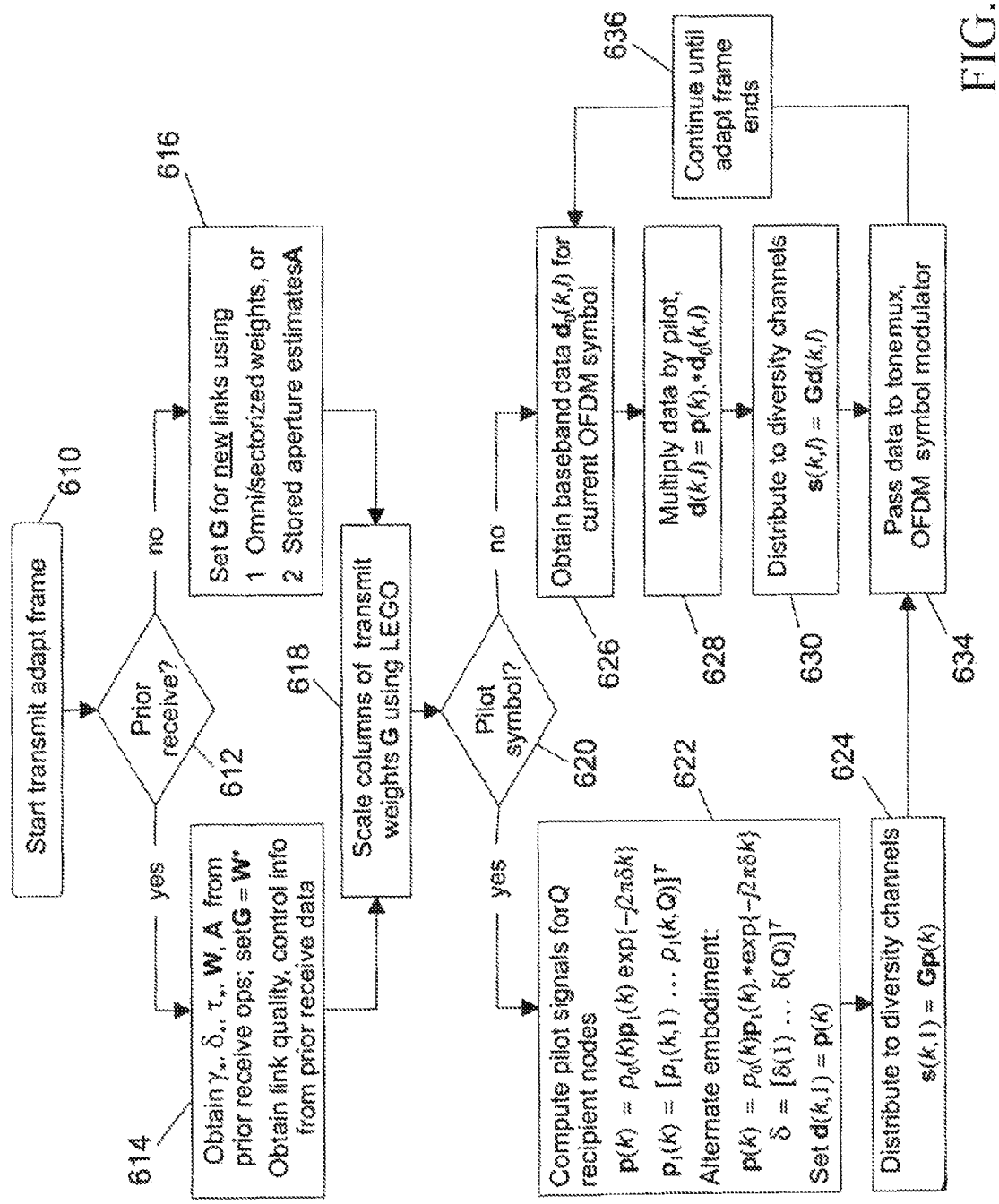

In the preferred embodiment, substantively nulling combiner weights are formed using an FFT-based least-squares algorithms that adapt $\{w_1(k, l; n_2, n_1)\}$ and $\{w_2(k, l; n_1, n_2)\}$ to values that minimize the mean-square error (MSE) between the combiner output data and a known segment of transmitted pilot data. Operations used to implement this technique during receive and transmit operations are shown in FIGS. 35 and 36, respectively. The preferred pilot data is applied to an entire OFDM symbol at the start of an adaptation frame comprising a single OFDM symbol containing pilot data followed by a stream of OFDM symbols containing information data. The pilot data transmitted over the pilot symbol is preferably given by $$p_1(k;n_2,n_1)=d_1(k,l;n_2,n_1)=p_{01}(k)p_{21}(k;n_2)p_{11}(k;n_1) \quad \text{EQ. 44}$$

$$p_2(k;n_1,n_2)=d_2(k,l;n_1,n_2)=p_{02}(k)p_{12}(k;n_1)p_{22}(k;n_2) \quad \text{EQ. 45}$$

where symbol index l is referenced to the start of the adaptation frame, and where
- $p_{01}(k)$ is a pseudorandom, constant modulus uplink "network" or "subnet" pilot that is known and used at each node in a network or subnet;
- $p_{02}(k)$ is a pseudorandom, constant modulus downlink "network" or "subnet" pilot that known and used at each node in the network;
- $p_{21}(k; n_2)$ is a pseudorandom, constant modulus uplink "recipient" pilot that is known and used by every node intending to transmit data to node $n_2$ during uplink transmission intervals;
- $p_{12}(k; n_1)$ is a pseudorandom, constant modulus downlink "recipient" pilot that is known and used by every node intending to transmit data to node $n_1$ during downlink transmission intervals;
- $p_{11}(k; n_1)=\exp\{j2\pi\delta_1(n_1) k\}$ is a sinusoidal uplink "originator" pilot that is used by node $n_1$ during uplink transmission intervals;
- $p_{22}(k; n_2)=\exp\{j2\pi\delta_2(n_2) k\}$ is a sinusoidal downlink "originator" pilot that is used by node $n_2$ during downlink transmission intervals;

The "pseudodelays" $\delta_1(n_1)$ and $\delta_2(n_2)$ can be unique to each transmit node (in small networks), or provisioned at the beginning of communication with any given recipient node (in which case each will be a function of $n_1$ and $n_2$). In either case, the minimum spacing between any pseudodelays used to communicate with a given recipient node should be larger than the maximum expected timing offset observed at that recipient node. This spacing should also be an integer multiple of 1/K, where K is the number of tones used in a single FFT-based LS algorithm. If K is not large enough to provide a sufficiency of pseudodelays, additional OFDM symbols can be used for transmission of pilot symbols, either lengthening the effective value of K, or reducing the maximum number of originating nodes transmitting pilot symbols over the same OFDM symbol (for example, the recipient node can direct 4 originators to transmit their pilot symbols over the first OFDM symbol in each adaptation frame, and 4 other originators to transmit their pilot symbols over the next OFDM symbol, allowing the recipient node to construct combiner weights for 8 originators). In the preferred embodiment, K should also be large enough to allow effective combiner weights to be constructed from the pilot symbols alone. The remaining information-bearing symbols in the adaptation frame are then given by $$d_1(k,l;n_2,n_1)=p_1(k;n_2,n_1)d_{01}(k,l;n_2,n_1) \quad \text{EQ. 46}$$

$$d_2(k,l;n_1,n_2)=p_2(k;n_1,n_2)d_{02}(k,l;n_1,n_2) \quad \text{EQ. 47}$$

where $d_{01}(k, l; n_2, n_1)$ and $d_{02}(k, l; n_1, n_2)$ are the uplink and downlink data symbols provided by prior encoding, encryption, symbol randomization, and channel preemphasis stages.

Preferably, the adaptation frame is tied to the TDD frame, such that the TDD frame comprises an integer number of adaptation frames transmitted in one link direction, followed by an integer number of adaptation frames transmitted in the reverse link direction. However, the OFDM symbols in the adaptation frame may be interleaved to some degree or any degree. The pilot data may also be allowed to pseudorandomly vary between adaptation frames, providing an additional layer of "physical layer" encryption in secure communication networks.

At the recipient node, the pseudorandom pilot components are first removed from the received data by multiplying each tone and symbol by the pseudorandom components of the pilot signals $$x_{01}(k,l;n_1)=c_{02}(k;n_1)x_1(k,l;n_1) \quad \text{EQ. 53}$$

$$x_{02}(k,l;n_2)=c_{01}(k;n_2)x_2(k,l;n_2) \quad \text{EQ. 48}$$

where $c_{02}(k; n_1)=[p_{02}(k) p_{12}(k; n_1)]^*$ and $c_{01}(k; n_2)=[p_{01}(k) p_{21}(k; n_2)]^*$ are the derandomizing code sequences.

This operation transforms each pilot symbol authorized and intended for the recipient node into a complex sinusoid with a slope proportional to the sum of the pseudodelay used during the pilot generation procedure, and the actual observed timing offset for that link (observed pseudodelay).

Figure 38A:
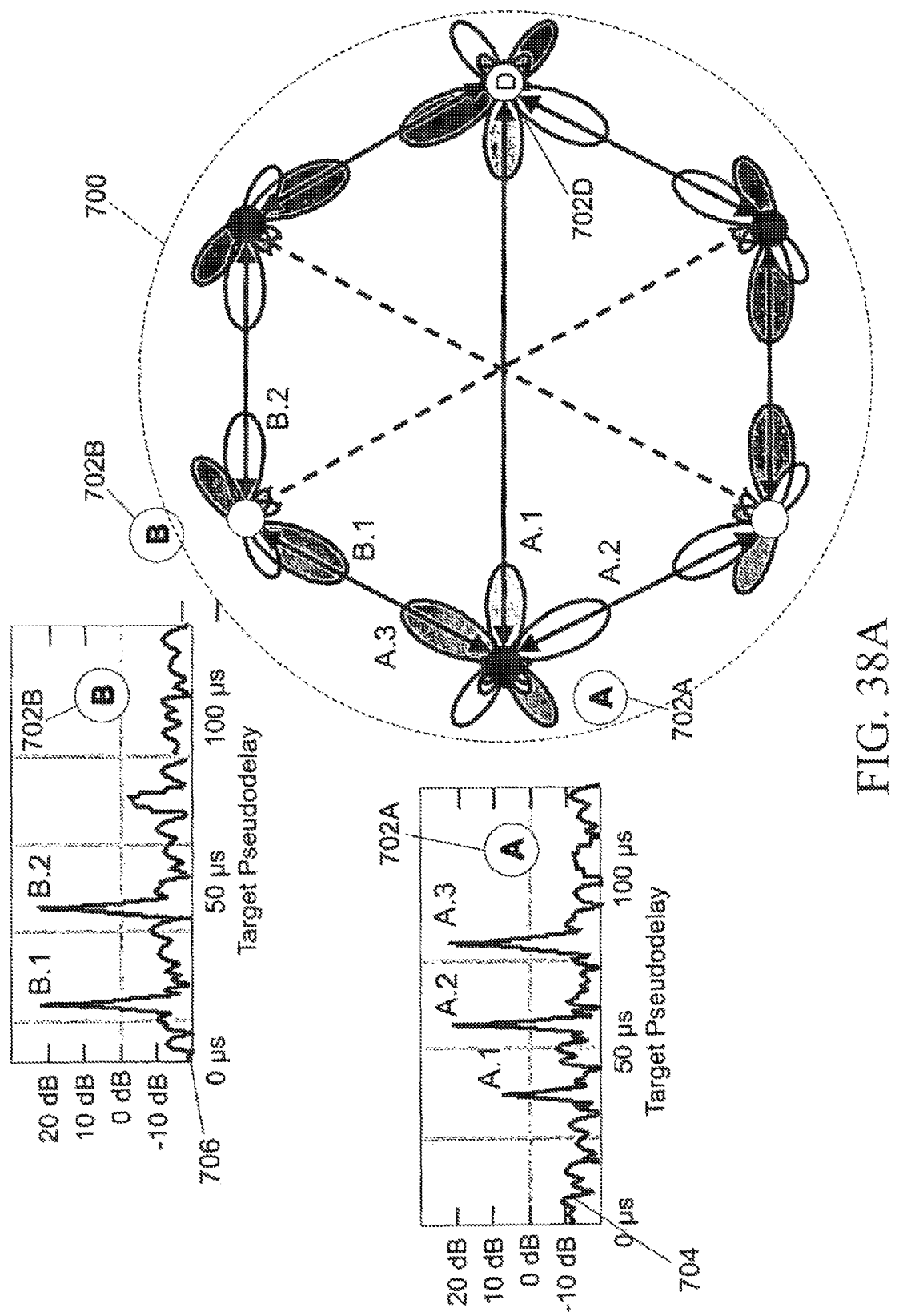
FIGS. 38A and 38B illustrate a MIMO network with null-steering and pilot-tone transmissions, with the overall transmission shown as the Extraction SINR, and the mask-fitted transmissions perceived at 702A and 702B which correctly account through the imposed pilot pseudodelay for the intended transmission peaks.
Figure 38B:
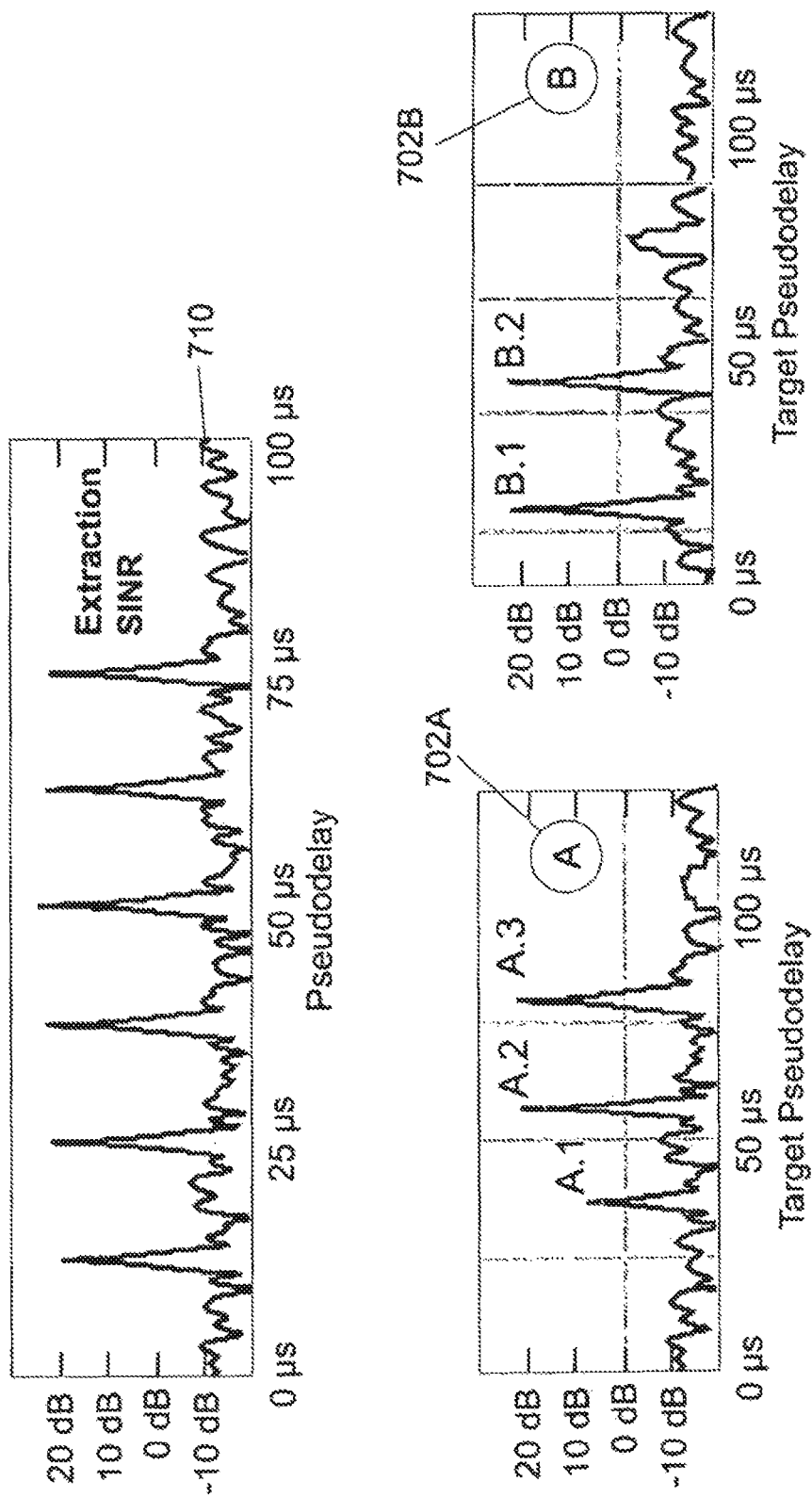

(See FIGS. 21, 28.) Unauthorized pilot symbols, and symbols intended for other nodes in the network, are not so transformed and continue to appear as random noise at the recipient node (See FIG. 38A, 38B).

Figure 37:
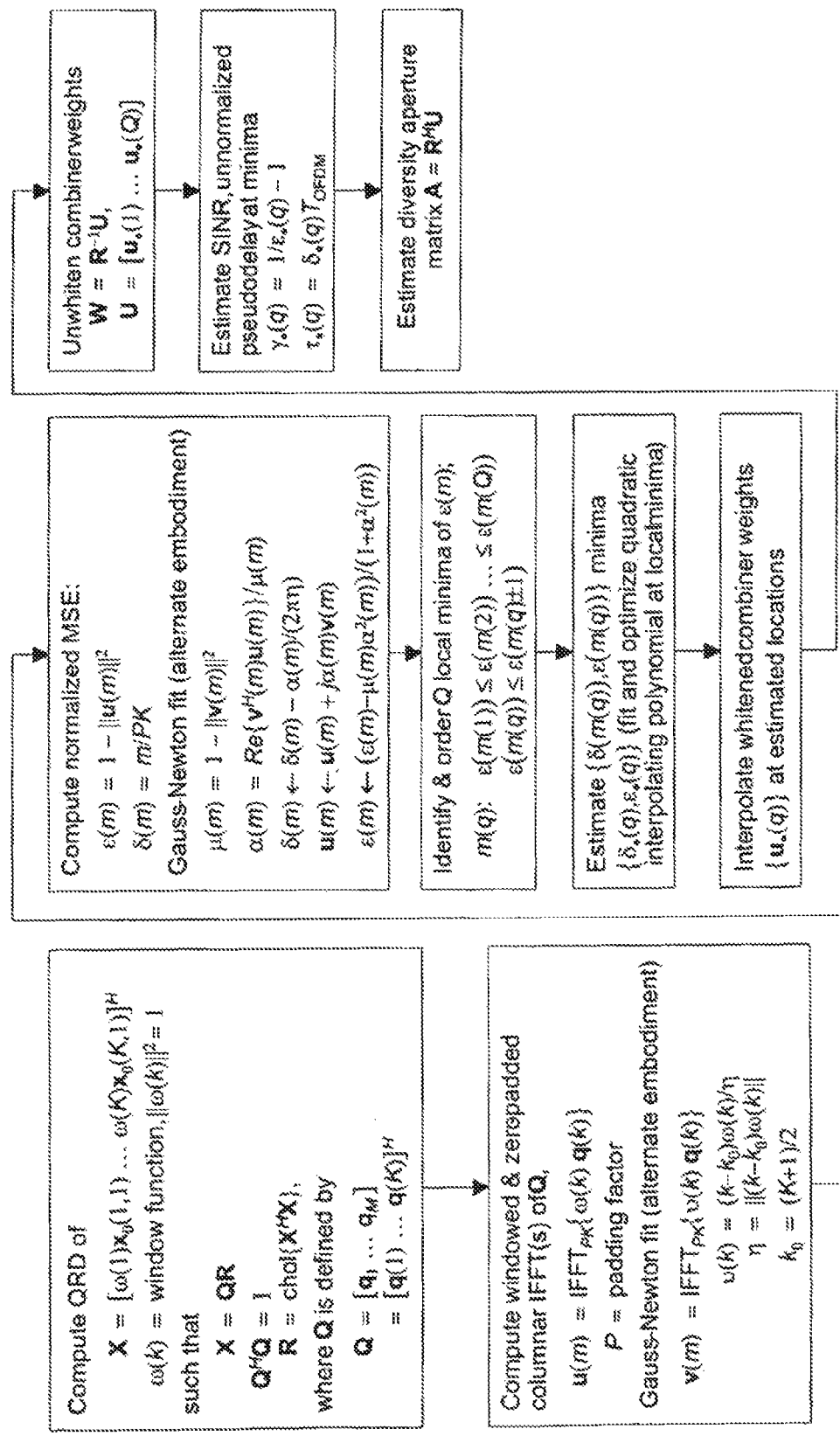
FIG. 37 illustrate the FFT-based LS algorithm used in the preferred embodiment for the normalized MMSE or, in an alternative embodiment, the Gauss-Newton algorithm.

The FFT-based LS algorithm is shown in FIG. 37. The pilot symbol, notionally denoted $x_0(k,l)$ in this Figure (i.e., with reference to uplink/downlink set and node index suppressed), is multiplied by a unit-norm FFT window function, and passed to a QR decomposition algorithm, preferably a block modified-Gram-Schmidt Orthogonalization (MGSO), and used to compute orthogonalized data $\{q(k)\}$ and upper-triangular Cholesky statistics matrix R. Each vector element of $\{q(k)\}$ is then multiplied by the same window function, and passed through a zero-padded inverse Fast Fourier Transform (IFFT) with output length PK, with padding factor P, preferably P=4, to form uninterpolated, spatially whitened processor weights $\{u(m)\}$, where lag index m is proportional to target pseudodelay $\delta(m)=m/PK$. The whitened processor weights are then used to estimate the mean-square-error (MSE) obtaining for a signal received at each target pseudodelay, $\in(m)=1-\|u(m)\|^2$, yielding a detection statistic (pseudodelay indicator function) with a minimum (valley) at IFFT lags commensurate with the observed pseudodelay (alternately, combiner output SINR $\gamma(m)=\in^{-1}(m)-1$ can be measured at each target pseudodelay, yielding a detection statistic (peak) at FFT lags commensurate with that pseudodelay. The pilot symbol, notionally denoted $x_0(k,l)$ in this Figure (i.e., with reference to uplink/downlink set and node index suppressed), is multiplied by a unit-norm FFT window function, and passed to a QR decomposition algorithm, preferably a block modified-Gram-Schmidt Orthogonalization (MGSO), and used to compute orthogonalized data $\{q(k)\}$ and upper-triangular Cholesky statistics matrix R. Each vector element of $\{q(k)\}$ is then multiplied by the same window function, and passed through a zero-padded inverse Fast Fourier Transform (IFFT) with output length PK, with padding factor P, preferably P=4, to form uninterpolated, spatially whitened processor weights $\{u(m)\}$, where lag index n is proportional to target pseudodelay $\delta(m)=m/PK$. The whitened processor weights are then used to estimate the mean-square-error (MSE) obtaining for a signal received at each target pseudodelay, $\in(m)=1-\|u(m)\|^2$, yielding a detection statistic (pseudodelay indicator function) with a minimum (valley) at IFFT lags commensurate with the observed pseudodelay (alternately, combiner output SINR $\gamma(m)=\in^{-1}(m)-1$ can be measured at each target pseudodelay. The IFFT windowing function is dependent on the minimum spacing between pseudodelays, and is designed to minimize interlag interference ("picket fence" effect) between pilot signal features in the pseudodelay indicator function. In the preferred embodiment, and for a node capable of forming four links, a Kaiser-Bessel window with parameter 3 is preferred.

A valley (or peak) finding algorithm is then used to detect each of these valleys (or peaks), estimate the location of the observed pseudodelays to sub-lag accuracy, and determine additional ancillary statistics such as combiner output SINR, input SINR, etc., that are useful to subsequent processing steps (e.g., LEGO). Depending on the system application, either the Q lowest valleys (highest peaks), or all valleys below a designated MSE threshold (peaks above a designated SINR threshold) are selected, and spatially whitened weights U are interpolated from weights near the valleys (peaks). The whitened combiner weights U are then used to calculate both unwhitened combiner weights $W=R^{-1}U$, used in subsequent data recovery operations, and to estimate the received channel aperture matrix $A=R^H U$, to facilitate ancillary signal quality measurements and fast network entry in future adaptation frames. Lastly, the estimated and optimized pseudodelay vector $\delta_*$ is used to generate $c_1(k)=\exp\{-j2\pi\delta_* k\}$ (conjugate of $\{p_{11}(k; n_1)\}$ during uplink receive operations, and $\{p_{22}(k; n_2)\}$ during downlink receive operations), which is then used to remove the residual observed pseudodelay from the information bearing symbols. (See FIG. 38A, Items 702A, 704, 702B, 706, and FIG. 38B, Item 710, for illustration of the overall signal and the signal modified by the correct origination, target, and pilot mask.)

In an alternate embodiment, the pseudodelay estimation is refined using a Gauss-Newton recursion using the approximation $$\exp\{-j2\pi\Delta(k-k_0)/PK\} \approx 1 - j2\pi\Delta(k-k_0)/PK$$

This algorithm first estimates $\Delta$, providing an initial sublag estimate of pseudodelay, before estimating the lag position to further accuracy. The resultant algorithm can reduce the padding factor P, and reduces interpolation errors in the receive combination weights. However, it requires estimation of an additional IFFT using a modified FFT window, and is therefore not preferred in applications where DSP complexity is of overriding importance.

The optimized combiner weights are substantively null-steering, in that the combiner weights associated with each originating signal will (notionally, in absence of multipath) form a composite antenna pattern that steers nulls in the direction of all other time-and-frequency coincident signals (signals transmitting on the same time slot and frequency channel) impinging on the array. However, the weights will also (notionally, in absence of multipath) form a beam in the direction of the originating signal, further improving performance of the overall network. In the presence of multipath, a clear gain pattern of this sort may not necessarily form; however, the effect of this processing will be the same, and is typically be improved due the added diversity provided by multipath.

In additional alternate embodiments, the combiner weights can be further refined by exploiting known or added structure of the information bearing symbols using blind property-restoral algorithms. Algorithms of this sort are described in Agee (U.S. Pat. No. 6,118,276) and Agee. et. al., (U.S. patent application Ser. No. 08/804,619, referenced above) as well as other disclosures in the public domain. These alternate embodiments can reduce the size of K, or allow the airlink to be extended into more complex systems where the linear combiner dimensionalities are too large to allow computation of effective weights given the value of K employed in an existing system.

The resultant network has several useful attributes over prior art. It is computationally efficient, especially for nodes receiving data from large numbers of originating nodes, since the complex operations employed in the FFT-LS algorithm can be amortized over multiple links. It is also rapidly convergent, allowing computation of 4-element diversity combiner weights to attain nearly the maximum SINR obtainable by the combiner using 8-to-16 pilot data tones. It automatically detects and reconstructs data from nodes that have been authorized to communicate with the network, or with recipient nodes within the network, and rejects nodes that are not so authorized, allowing the network to adjust and control its topology and information flow at the physical layer, and providing an important level of security by rejecting signals that do not possess appropriate network or recipient pilots. It also provides an additional level of data scrambling to prevent occurrence of correlated interlink symbol streams that can cause severe misadjustment in conventional linear combiner adaptation algorithms.

In reciprocal channels, the linear combiner weights provided during receive operations can be used to simply construct linear distribution weights during subsequent transmit operations, by setting distribution weight $g_1(k, l; n_2, n_1)$ proportional to $w^*_1(k, l; n_2, n_1)$ during uplink transmit operations, and $g_2(k, l; n_1, n_2)$ proportional to $w^*_2(k, l; n_1, n_2)$ during downlink transmit operations. The transmit weights will be substantively nulling in this system, allowing each node to form frequency and time coincident two-way links to every node in its field of view, with which it is authorized (through establishment of link set and transfer of network/recipient node information) to communicate.

Among other advantages, this capability allows nodes to independently adjust transmit power directed to other nodes in the network, for example, to optimize capacity achievable at that node given the total power available to it, or to minimize power emitted into the network by that node given an aggregate power requirement. This capability also allows the node to adjust its contribution to the overall network, for example, to maximize the total aggregate (max-sum) capacity of the network, or to minimize network power subject to a network-level capacity constraint. In addition, this capability can allow the node to provide two-way communication to authorized nodes, or in defined subnets, in the presence of other nodes or subnets that it is not authorized to communicate with, for example, adjacent cells in CMRS networks, and adjacent (even interpenetrating), and virtual private nets. In wireless LAN's and MAN's.

Figure 39:
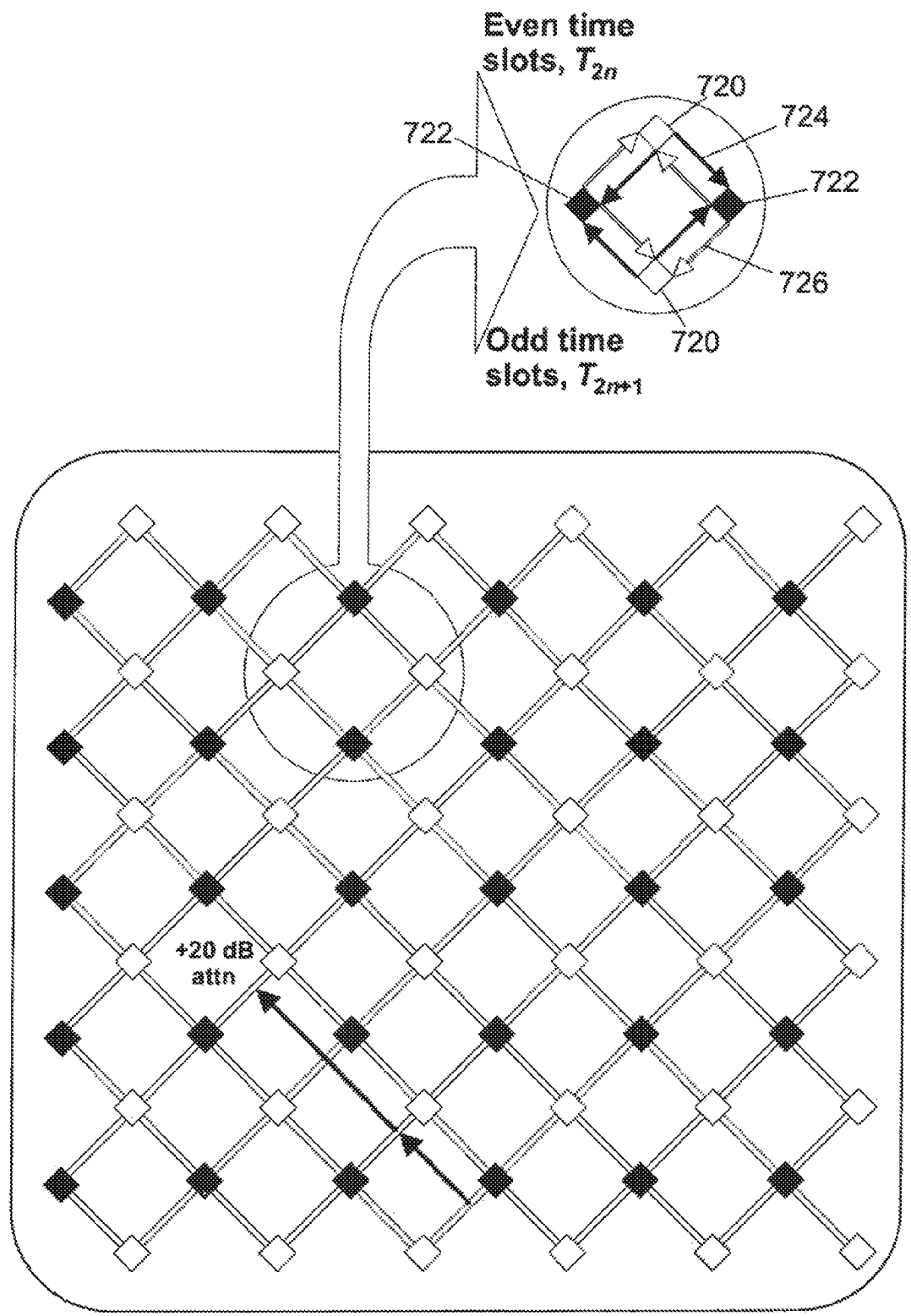
FIGS. 39 and 40 illustrate alternative topological layouts for proper uplink receive and uplink transmit subsets with links and expected attenuation.
Figure 40:
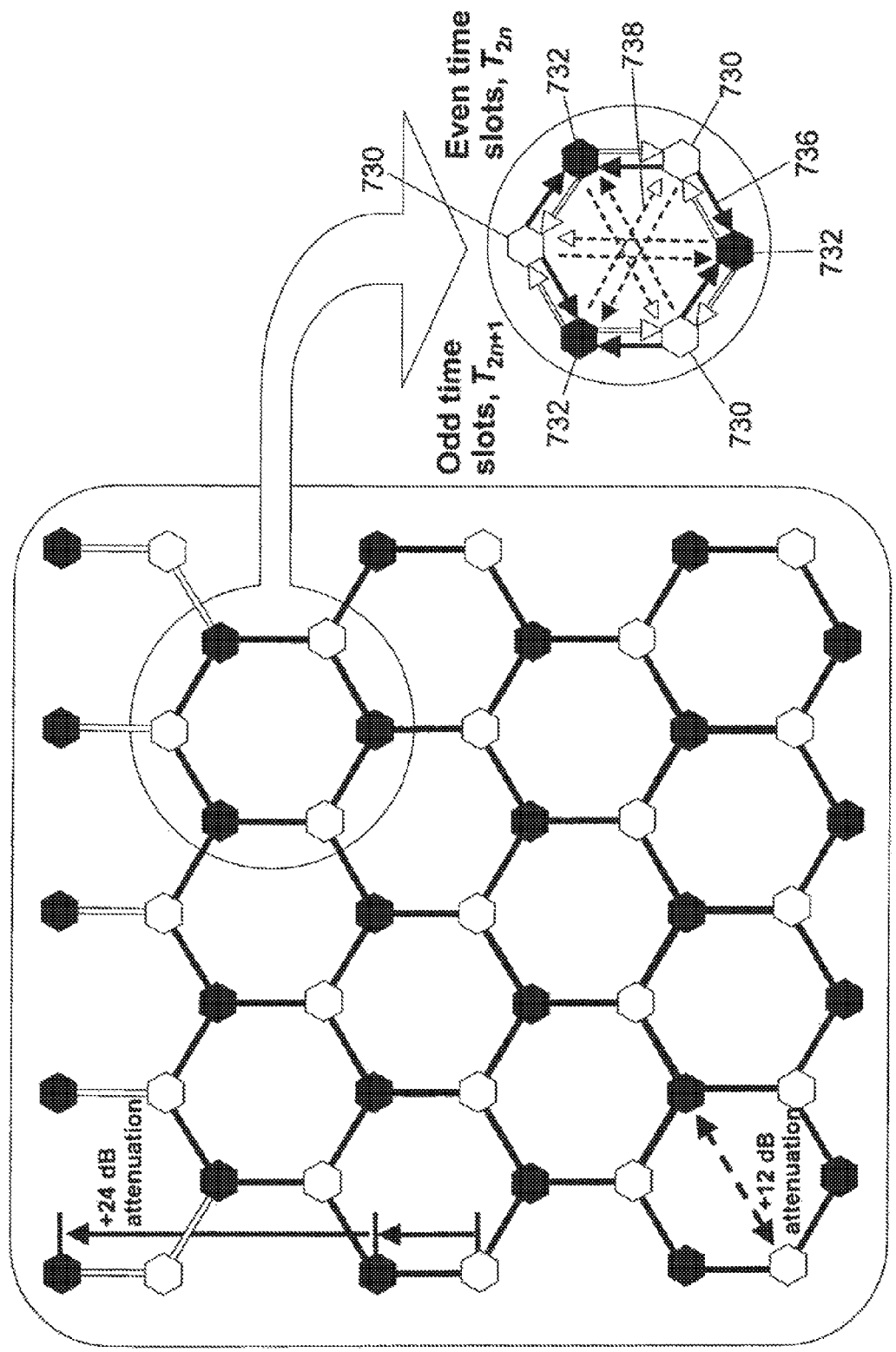

This capability is illustrated in FIGS. 39 and 40, the latter being for a hexagonal network of six nodes arranged in a ring network, with an additional direct connect between nodes A and D. In this example, each node has been provided with a recipient pilot for its adjacent node, e.g., node B has been provided with recipient pilots for nodes A and C, facilitating time-frequency coincident communication with those adjacent nodes. In addition, Node A has been provided with recipient pilots for node D, i.e., node A can communicate with nodes B, D, or F.

The pseudodelay indicator functions (provided as a function of SINR, i.e., with peaks at observed pseudodelays) are shown for each of the nodes. Indicator functions generated at nodes B, C, E, and F have two strong peaks, corresponding to pseudodelays used at their connecting nodes, plus a 10 microsecond time-of-flight delay (assuming all nodes are synchronized to GPS UTC). In addition, nodes A and D have a third peak at their respective delays, plus a 20 microsecond time-of-flight delay. The pseudodelays are minimally separated by 25 microseconds for each of the originating nodes (12.5 microsecond minimal separation between all nodes), which is easily wide enough to allow peaks from different originators to be discerned. In addition, the peak values (near 20 dB SINR for all links except the A-to-D link) are detectable with a 0 dB threshold. As Figure ## shows, the receive and transmit weights form beam and null patterns that allow independent links to be formed between authorized nodes, and that allow unauthorized signals to be screened at the points or reception and transmission.

The aperture estimates A will (also notionally, in absence of multipath) form beams in the direction of the originating node; however, they will ignore all other nodes in the network. For this reason, they cannot be used in general to sustain independent links. However, the aperture estimates can be used to allow rapid reentry into the network, for example, in packet data systems where users may quickly begin and end signal transmissions over brief time periods (e.g., such that the channel response has not changed substantively between transmissions). The aperture estimates can also be combined with combiner/distribution weights to form rapid nulls again other links or nodes in the network.

The primary application area for the fully adaptive MIMO arrays of the preferred embodiment will be below 10 GHz, where the abilities to achieve non-LOS and to exploit multipath are still possible, and where pathloss, weather effects, and channel dynamics can be handled by adaptive arrays. The preferred embodiment's MIMO network will provide a strong advantage over conventional MIMO links, by not requiring antenna separation of 10 wavelengths to provide effective capacity gain. The present state of the art considers 10 wavelengths to be the rule of thumb for the distance between antennas that provides spatially independent antenna feeds due to disparate multipath at each antenna. This rule has greatest applicability in worst-case mobile environments subject to Rayleigh fading, i.e., where the (typically much stronger) direct path is obscured, and propagation occurs over many equal-power reflection paths.

The MIMO network of the preferred embodiment, however, exploits route diversity due to reception of signals from widely separated nodes, and does not need multipath to provide the capacity gains cited for MIMO links in the present state of the art. This enables the preferred embodiment to employ antennas with much smaller separation, e.g., circular arrays with half-to-full wavelength diameter, to provide effective capacity or QoS gains. The preferred embodiment's exploitation of multipath can further improve performance, by providing additional differences between gain and phase induced at each antenna in the array. In this regards, a smaller aperture is also better, as it reduces frequency selectivity across individual frequency channels. Polarization diversity can also be employed between antennas with arbitrary spacing (e.g., in "zero aperture" arrays), as well as "gain diversity" if the antennas have distinct gain patterns.

The MIMO network of the preferred embodiment has application in the 10-100 GHz region (for example, LMDS bands around 25-35 GHz where mesh networks are of increasing interest), even though these networks are likely to employ nonadaptive directional antennas, or partially adaptive antennas, e.g., arrays in focal plane of directional dish antennas, that direct high gain or "pencil" beams at other ends of the link, rather than fully adaptive beam-and-null steering networks. This is due to small form factor of such antennas, as well as pathloss, atmospheric absorption, and weather effects prevalent above the 10 GHz band.

The next preference is that for each channel that is dynamically established, the uplink and downlink share a common frequency (that is, the transmission and reception are on the same frequency). This enables the establishment and exploitation of channel reciprocity (CR) between pairs of nodes, the sharing of antennae and diversity channels in transmit and receive operations in particular nodes, and other network advantages. The network advantages include the use of ad hoc, single-frequency networks in bursty (data-intensive) networks, such as packet-switched networks, random-access networks, or at the network "edges" (where the SINR level threatens to overcome the network capacity). This also allows the establishment of a two-layer time-division duplex schema in persistent networks or channels (e.g. ones that are circuit-switched, or perform connectionless datagram backhaul functions), where there is an equal duty cycle in both directions. An alternative embodiment will permit asymmetric duty cycles, and yet a third configurable balancing of duty cycles. Additionally, in the multitone case of dual-frequency approach (uplink and downlink using distinct frequencies), the network uses a frequency division duplex (FDD) protocol, preferably in combination with channel-based transmission and reception weights.

The network advantage to the preferred embodiment is that, instead of the network serving as a Procrustean bed to which the communications links must be fitted out of the combination of its environmental SINR, established protocols, and channel approach, each communications link can use the environmental SINR, protocols, and channel approach to dynamically adapt the network's functioning to maximize capacity and minimize power consumption.

The second preference is that the network uses and exploits diversity frequency transmission and reception at all nodes in the network. This particular aspect of the preferred embodiment carries the complexity and hardware cost of requiring that each node incorporate spatially separated and shared receive/transmit antennae, although the separation need only be measured in tens of lambdas of the lowest frequency (longest wavelength) used by that particular node. This pragmatically can create a situation where BS nodes are equipped with larger antennae which are spatially separated by feet or meters, and thus use far lower frequencies for 'backhaul' or BS to BS transmissions; this also carries, however, the advantage that SU nodes lacking such spatial separation will be intrinsically deaf to such frequencies. (Care must be taken to consider harmonics between BS backbone frequencies and SU channel frequencies.)

Optionally, in an enhancement to the preferred embodiment, the network would include and make use of frequency polarization, spectral diversity, or any combination thereof, at any subset (including a proper subset) of the network's nodes to provide further coding and differentiation potential. And in another, further enhancement, the network would employ Butler RF networks to provide common RF front-end and scalable and expandable transceiver DSP backends in peer-to-peer network implementations.

The third preference is that the nodes include a multitone QAM encoder, whereby individual tones would be multiplied by Quadrature-Amplitude-Modulated symbols to further differentiate the signals between nodes, even those using the same frequencies. Alternative QAM approaches would include PSK, $\pi/4$ QPSK, and $\pi/4$-DQPSK symbols to increase the variation potentialities. These symbols would be generated using Trellis-Coded-Modulation (TM) encoding over individual frequency channels and would include several-to-one multitone symbols. One alternative embodiment would use Reed-Solomon codes and direct mapping to symbols; other alternatives would use Turbo encoding, either at the baseband or as part of the TM, or any combination thereof. To aid the Viterbi decoding at the receiver the 'tail-biting approach would be used at the edge of the symbol blocks. To assist the maximum capacity solution for each frequency channel, the network would use variable information bits per frequency channel rather than a fixed set of information bits per frequency channel, in a method analogous to the Digital MultiTone, Digital Signal Loss (DMT DSL) approach, trading the need for information density encoding as part of the signal overhead for the need for all channels to be constrained to the minimum guaranteed capacity of any environmentally or hardware constrained channel, to avoid pathloss for the most tightly constrained link or channel. However, rather than insist upon this approach, the network would include the capability to shift to a constant bits per frequency channel approach with appropriate LEGO power management, to enable and support the minimum-power solution for the network when either power or capacity constraints determine this is preferable.

The fourth preference is that the network adds pseudo-random modulation to the symbols after encoding. This is to eliminate the need to increase the signaling overhead by runs of correlated symbols, as it aids in the receive adaptation algorithms, provides discrete link encryption, thereby greatly increasing both channel and network security, and enables pilot-gated fast acquisition and timing recovery algorithms. An extension to the pseudorandom modulation is the analysis and elimination of certain detectable features by the network in one alternate embodiment. A distinct extension is the embedding of invariance for exploiting broader modulation, using gated SCORE. And a third extension combines the two extensions just described.

The fifth preference is the addition of an error detection syndrome, or CRC block to transmissions to detect bit errors, which would enable the initiation of a retransmission request at the end of a packet's reception when an error is signaled.

The sixth preference is using a computationally efficient and fast-converging receive weight algorithm (CE&FC RWA) to reduce the computational and hardware overhead for each channel's transmission and node. Variations of such CE&FC RWA that would be used include any one, subcombination, or combination, of the following: Least-Squares Like (LS), which are also known as matrix-inversion; Block-Update implementations (on a per-packet basis) that amortize matrix operations over multiple data snapshots (using tones and/or multitone symbols); and recursive single-snapshot algorithms. Furthermore, the preferred embodiment may use one, more than one, or all of the following for the same purposes: calculation of autocorrelation statistics in voltage domain (e.g. using QRD, MGSO) to minimize the complexity and increase the accuracy of the weight-update operation; multiport adaptation (simultaneous processing of multiple co-channel links) on each frequency channel to amortize autocorrelation operations over multiple users (more at BS than SU nodes); or single-step, single-port adaptations (more at SUs than BSs). Depending on the network constancy and dynamic state, or static constancy, the network may vary between uncalibrated techniques which are not dependent upon knowledge or calculation of channel information (e.g. the emitter location, or the elevation/azimuth separating transmitter and receiver), non-blind and blind weight adaptation techniques such as pilot-based initial weight acquisition signaling, blind and/or pilot-aided decision-direction weighting in persistent links, and blind embedded-invariance techniques such as gated SCORE, in an alternative embodiment. For pilot-aided and gated SCORE techniques the network would preferentially use the computationally efficient mechanization of cross-correlation operations employing fast transform (and in a specific embodiment, FFT) methods. In yet other alternative embodiments the network may use combined channel sounding, channel-based weight estimation, or any combination of the foregoing.

The seventh preference is using post-combining in-channel tone equalization to remove timing and carrier offset. This could include multiplication by constant modulus weights, as the first preference, to remove timing and/or delay offsets; alternatively, it could include low-complexity intertone filtering to remove carrier offset and Doppler errors; and, of course, a combination of both could be employed depending on the environmental and hardware complexity needs, constraints, and costs.

The eighth, and most important preference for the preferred embodiment is that each node of the network be capable of employing and employ retrodirective transmission and reception modulation, wherein the transmit gains are set proportional to the actually experienced reception weights for the frequencies used. For single frequency links, this exploits their potential reciprocity (especially for TDD or ad-hoc networks). When a TDD approach is used each data frame is encapsulated in smaller guard frames, and the entire transmission occupies a smaller portion of the available bandwidth to similarly encapsulate it in the available bandwidth. The signal for a one-way frame duration is further broken down to incorporate a guard time, a data symbol, an encapsulating cyclic prefix, a control symbol, a cyclic prefix separation the control symbol from the acquisition symbol, and a final encapsulating cyclic prefix. The frequency channels that occupy the bandwidth carry bearer data fragments over fractional subfragments. One embodiment for low-mobility, fixed or portable TDD uses a 120B Bearer Data Fragment which is comprised of eight 15B subfragments, 8 differentiating and coordinating multitone symbols, and of 5.75 MHz available only 4.26 MHz bandwidth, said bandwidth being divided into 13 frequency channels, each with 320 kHz, to provide 2 fragments per frame per link, or 6.24 Mbytes each frame, or 4.608 Mbps as one channel (Channel 0) is reserved for fragment resends, thereby providing the equivalent in wireless transmission of 3 land-based T1 lines with, thanks to the reservation and resend provision, a $10^{-4}$ BER. This embodiment further uses for each 15B subfragment a MAC header providing 2B CRC and 13B MAC data, providing 52 MAC channels and at full duplex 10.4 kbps per channel. The acquisition symbols have 30B pilot or synchronization data per 320 kHz frequency channel, 32 to 64 pilot tones per channel, and thereby provide fast acquisition for up to 32 Degrees of Freedom; and if the area is sparsely populated or for other reasons (downtime, occupied by other transmissions) less than 17 Degrees of Freedom were needed, the excess DOF could be reused and reprovisioned to enable dynamic channels and thereby further increase the local flexibility.

The high-mobility TDD link replaces the cyclic prefixes with nulls on the uplink and CP on the downlink, halves the number of tones and doubles the separation of tones (from 426 to 213 tones, from 10 kHz to 20 kHz separation), and provides half the DOF, but doubles the amount of overlap that can be tolerated for the same QOS.

In the preferred embodiment for fixed, portable, and low-mobility links, the tone layout divides the 4.26 MHz into 426 'bins', each of 10 kHz separation; these are then shared such that thirteen channels, each with 32 tones covering 320 kHz, from Channel 0 to Channel 12 are formed, with each channel further carrying of the 32 tones a network-information-bearing tone at the bottom and top of the channel (T0 and T31) that encapsulate the content-carrying tones T1 through T30. Each channel is modulated by a 32-tone pilot to facilitate the acquisition and fine time synchronization. The 10 kHz tone separation controls reasonable levels of time selective Multipath (+/−100 MHz), with a cyclic buffer being added at channel edges. The network can, should environmental or network conditions suggest, 'step down' the overall frequency spread to 160 kHz BW without affecting the fundamental stability of the traffic algorithms or network. (See FIG. 26)

However, for high-mobility TDD links the number of bins, pilot size, and information-bearing tones per channel are halved, while the tone separation is doubled. This will permit high levels of Doppler shift (+/−5 kHz) without sacrificing QoS or content integrity; and again, the network can step down the overall frequency spread and thus the bandwidth per bin can be halved (from 320 kHz to 160 kHz) without affecting the fundamental stability of the traffic algorithms or network. (See FIG. 27)

Preferentially transmit gains are set proportionally to the conjugate of the receive weights for that particular node and channel. An alternative approach uses channel-based retrodirective transmit gains (more for SU than BS); a second alternative uses channel-based directive (beam-pointing) transmit gains (more for BS than SU); a third applies retrodirection to in-channel preemphasis gains; and any combination of these alternative approaches may be employed. For any such single-frequency link the transmitting node breaks periodically (in one particular alternative embodiment every 5 msec) to collect ACKs, NACKs, or RTSs, that is, to monitor the link performance as perceived by the receiving node. This approach, though it provides all the capacity in a particular link to a user as needed, is very compatible with small, stationary networks but less compatible with LEGO network management due to the effects of nonstationary network fields.

The ninth preference is that the network employs Locally-Enabled Network Optimization (LEGO) to manage the transmit power for each node (BS and SU) operating, dynamically. This requires that relatively complex computational operations (e.g. receive weight and transmit gain calculations, multitone, QAM, TCM, and the above-mentioned signal/symbol/weight/frequency calculations) be carried out autonomously at each node in the network, rather than limited to one class of nodes. This further requires that as part of the network overhead simple, network-level control parameters be passed to, or shared by (for certain time intervals, though such may either be hard-set invariances in the hardware, subject to change signal, or network-alterable) all nodes in the network. Additionally, each node would implement its power-management algorithm to minimize transmit power and manage its links, thereby indirectly optimizing performance over the entire network. An alternative embodiment would effect network-level optimization; and a third would combine node-driven local determined optimization with network-level optimization.

Although the preferred embodiment uses an algorithm that presumes that power capacity will vary over the network, and that establishes local maxima by favoring capacity maximization for the power constraint at each particular node in the network (i.e. a goal driven minimization algorithm), various alternative LEGO algorithms could be employed. For example, if power shortfalls or constraints on any part of the network are anticipated, then a capacity maximization subject to that power constraint algorithm could be used. A third alternative, presuming that the network capacity (as opposed to the power) is the guiding constraint, sets the power minimization subject to the capacity attainment to the limit possible over the entire network. And a fourth, which is better, sets the power minimization at each particular node in the network subject to the capacity constraint at that particular node.

The preferred embodiment incorporates into each node a multitone QAM decoder, with a soft-optimized, Viterbi algorithm (SOVA) embodied in the decoder, such that the network can effect changes in the decoder at its nodes by a software or information transmission that re-sets the hardware (EEPROM, FPGA, PAL, or other semiconductor chip) and software at that node for the new decoding scheme. An alternative embodiment with lesser cost and complexity at each node, but lesser flexibility, is to use hard-optimized, Viterbi or Reed-Solomon, decoders at each node in the network. A third alternative is to combine both SOVA and HOVA decoders in the network and establish hierarchies wherein the more flexible stations moderate as needed to communicate with their less flexible but simple contacts.

The preferred embodiment of the present form of the invention also incorporates synchronization means for its communications, which encompass timing estimation, carrier estimation, and synchronization operations as part of the network communication and control methodologies. The preferred synchronization is to a single, universal, and commonly observable timing signal such as that used in GPS operations, and occurs as part of the carrier signal (also known as 'GPS Sync'). An alternative embodiment would use synchronization to a timing, carrier, or mutual offset which would be observed at the transmission or master node during the reception process, wherein the slaved receiver synchronization would introduce a x2 delay and carrier error at the slaved transmitter, to avoid interference with the master transmission. Another alternative embodiment would use precompensation (in timing, carrier advancement, or both), to equalize any timing or carrier offset observed at both ends of the link (a means to synchronize the slaved node's transmission). Combinations of universal, offset, or precompensation synchronization methods would be yet further alternative embodiments.

Synchronization would be performed by including in the transmission dedicated multitone signals (such forming part of the set of QAM symbols used by the preferred embodiment), or by using dedicated tones in each multitone symbol, or most preferentially, by combinations of dedicated tones and slots to maximize the synchronization possible for the minimal transmission density. Coarse synchronization would be performed prior to the multitone demodulation, using the envelope features of the waveform. Fine synchronization would be performed after multitone demodulation, using dedicated QAM synchronization symbols and tones. For embodiments using universal observed timing through GPS synchronization, or using slaved transmission synchronization, these would be performed using control or MAC channels. An alternative embodiment would bypass the synchronization operation entirely by using GPS-based timing and carrier acquisition methods. A separate alternative embodiment would use blind, data-based synchronization methods, minimizing the use of specific synchronization data.

In the preferred embodiment Transmit/Receive (T/R) compensation means are employed to remove nonreciprocal channels after shared transmit or receive operations. These would be employed intermittently on an 'as-needed' basis through transmission of specialized T/R compensation packets to initiate the compensation processing. An alternative embodiment would use dedicated T/R compensation channels to initiate the compensation processing. And the network would employ loops back of the received signal data to provide the initial transmitter with the T/R channel differences.

The preferred embodiment further includes methods for datagram network instantiations, particularly applicable for conditions such as edge networks (e.g. where the wireless electromagnetic communications network is connecting to the Internet) and entirely interior networks (e.g. the 'backhaul', dedicated, data-heavy, and often fiber-optic networks of other carriers). These enable the transmission of data in discrete datagrams, or fragments of datagrams, over multiple routes, such as neighboring nodes, according to the availability of transmission channel capacities. The recipient nodes would then reconstitute the original data stream from the received and re-ordered datagrams or datagram fragments. The preferred embodiment mechanizes the process by incorporating, or enabling, both TCP/IP and FTP protocols, and further uses fragment-level CRC's, error detection, and retransmission protocols to provide Zero-error, Uncommitted Bit-Rate (ZE-UBR) services. By using reservation protocols such as VoIP RSVP common to the industry, the preferred embodiment can also provide Committed Bit-Rate (CBR) service.

The preferred embodiment also incorporates means for resolving scheduling and capacity problems, preferentially the soft-contention and Demand-Assigned. Multiple-Access (DAMA) scheduling means. These would primarily be employed at network edges, though they also can serve at 'bursty' edge networks or handle 'unconcentrated' data streams. The soft contention means minimize the effects of data collisions and the latency due to retransmissions and/or backoff network effects; the DAMA scheduling is principally employed over longer sessions to maximize the network efficiency.

The topology of the wireless electromagnetic communications network affects the local details of implementation of the preferred embodiment, as different constraints and needs dictate how the best adaptation occurs. For small network embodiments where most, if not all of the nodes are in a common field of view, it is not important whether the network be in a star, ring, bus, or mesh topology. Under these conditions the preferred embodiment matches each transceiver's Degrees of Freedom (DOF) to the nodes in the possible link directions and equalizes them to provide node-equivalent uplink and downlink capacity. An alternative embodiment may also be used, depending on network traffic or user payment/preferences, wherein asymmetric transceiver assignments reflect the desired capacity weighting. After the DOF matching is completed, each node adapts the Receive Weights to form a hard (max-SINR, null-steered) or soft (max SINR) solution for multipath resolution for transmissions to that node. Then explicit interference whitening for in-network nodes, or implicit data whitening for soft nulling of out-of-network interferers are employed for conditions, e.g. as in Part 15 applications. Finally, retrodirective transmit gains (whitened or unwhitened as above) are used during subsequent transmission operations during a channel communication. In an alternative embodiments, the Receive Weights are directive, whitened, channel-based, or a combination thereof.

Figure 4:
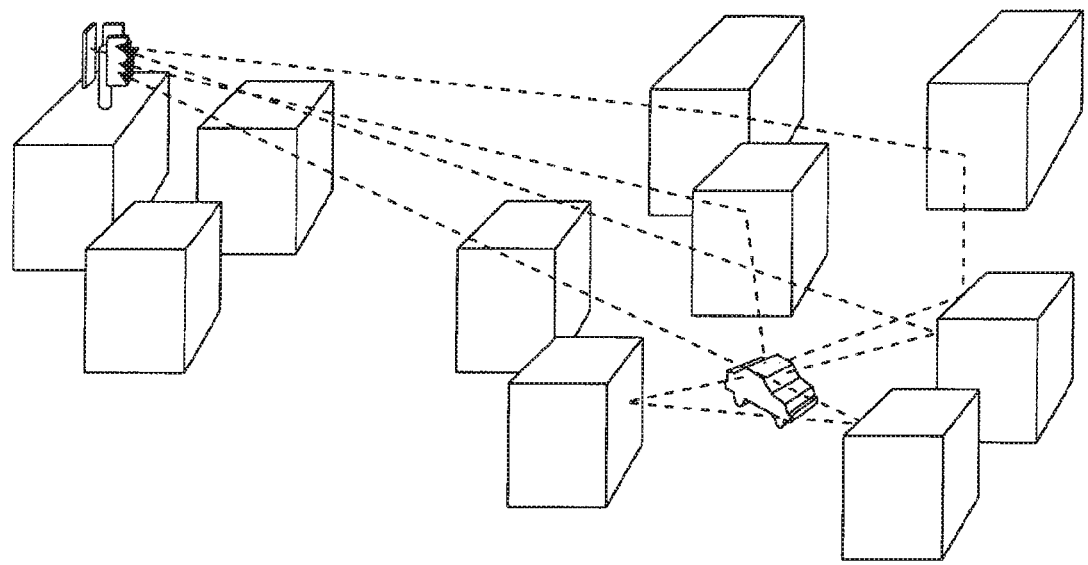
FIG. 4 illustrates a multipath environment, where a single BS with a complex antenna radiates multiple beams to a single SU (the car), wherein the beams also arrive from reflections off the surrounding features.
Figure 5:
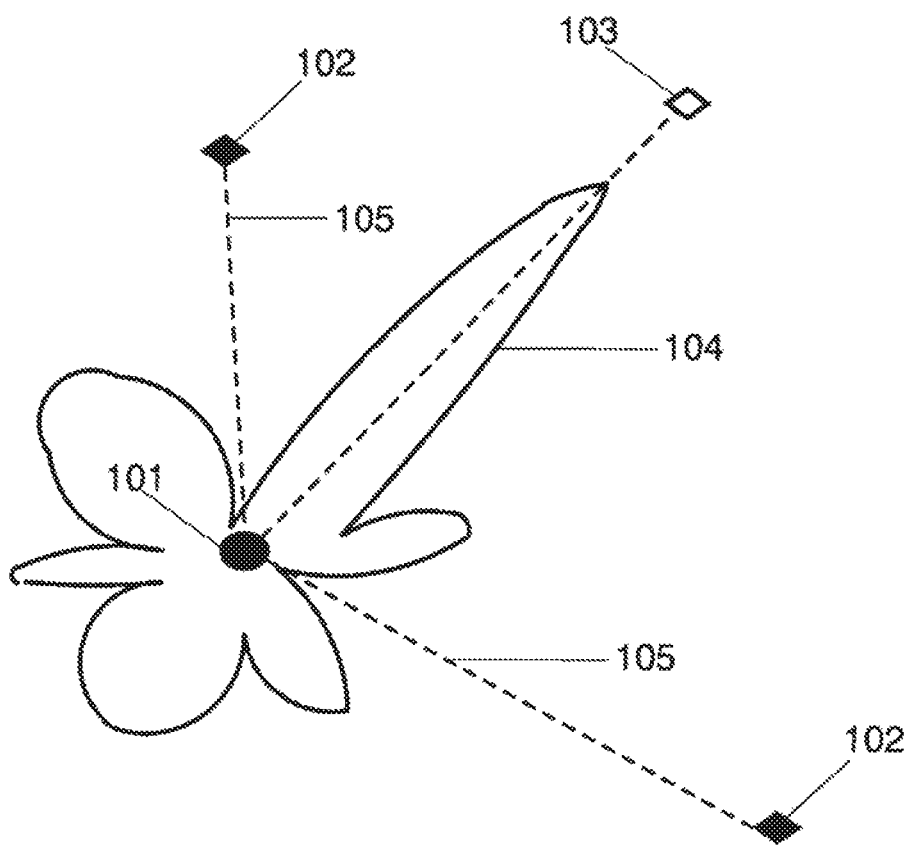
FIG. 5 illustrates a null-steering effort by a single node (Item 101), possessing at least three antennae, which is capable of directing towards two unintended recipients (Item 102) null transmissions (Item 105) and directing a focused beam (Item 104) towards an intended recipient (Item 103).
Figure 6A:
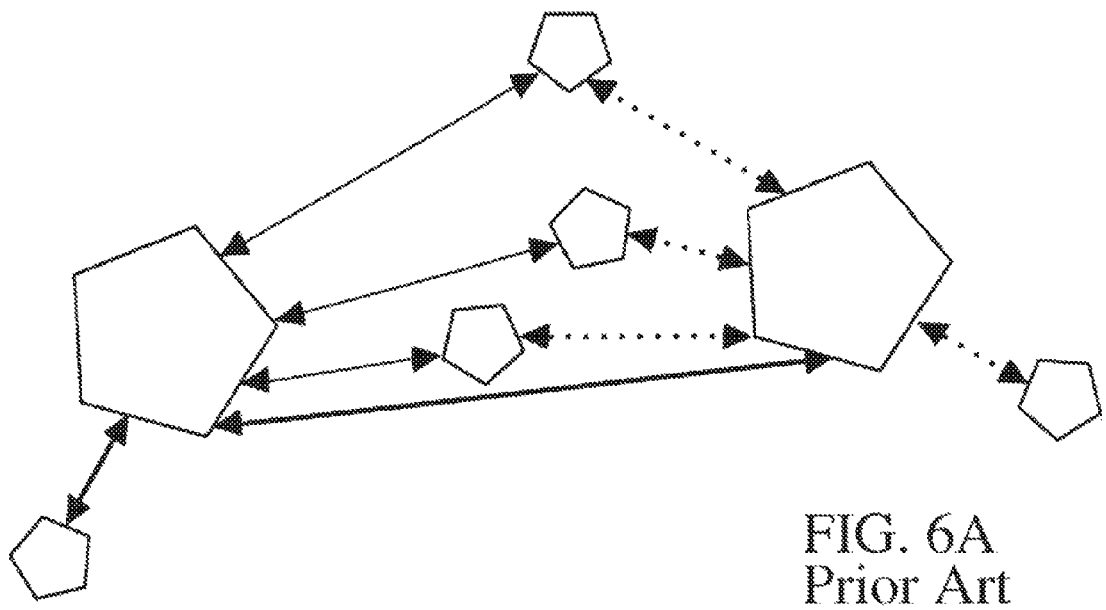
FIG. 6A illustrates a more complex multipoint network, where the BSs communicate with each other and with individual SUs, even if a BS to BS link may risk interfering with communications between the BSs and a particular SU.
Figure 6B:
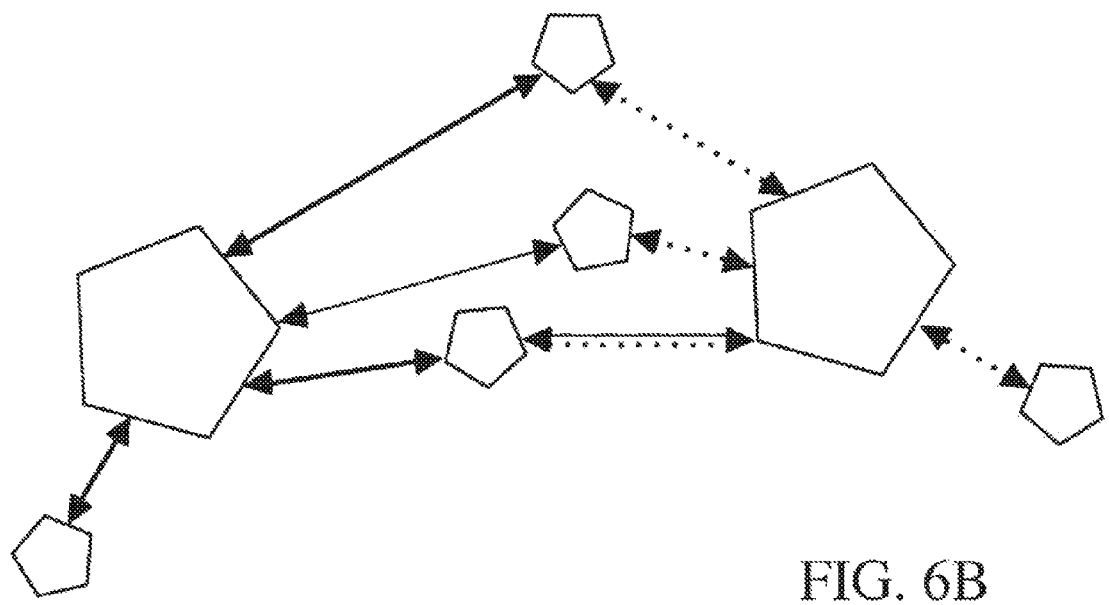
FIG. 6B illustrates a more effective use of the existing diversity of channels, whereby the BS to BS signal passes through a (possible multiplicity of) channel(s) from one BS to the intervening SUs thence to the second BS.

For large network embodiments the fundamental conditions are different and thus a different implementation and adaptation strategy is usually required. These include mesh extensions of star, ring, and bus networks (see FIG. 4); and the principal difference is that most nodes are not in a common field of view. A greater amount of network 'passing over' is required and nodes must more often serve as intermediary rather than terminal transceivers. Under these conditions, for each node the transceiver DOF is matched to those nodes that are observable during the Receive operation, and then performs the symmetric equalization (or alternative, asymmetric equalization) and other operations (and alternatives) as described in the preceding paragraph. Under these conditions the LEGO parameters used for management of the network are disseminated throughout the network.

A third possible topology and concomitant operating conditions occurs when the network is cellular, or has overlapping subordinate or coordinating networks. Under these conditions, which are particularly likely to occur under competition, not all the nodes will be connected to the same wireless electromagnetic communications network. A greater potential for signal interference which is beyond the network's control results and the preferred embodiment adapts to this constraint. Furthermore, there may be some minimal transmissions of control, network health, or network OAMP data through a disparate infrastructure (wired or wireless), or even a high-rate connection through a wired infrastructure in an alternative embodiment.

When these conditions occur and networks are in view of each other, they can experience signal or physical overlapping; in many situations, such as urban areas, there may be heavy interpenetration. In principle there will be physical separation of the disparate networks' nodes, at least as to their geographic identity (two mobile phones generally do not share the exact, same physical location and continue to work when so crushed together); in practice, however, all the networks' nodes share the same physical layer of the electromagnetic spectrum and the real world geography and hardware. What ensures the continued separation of the networks is and enforced separation at the non-physical, information and communication layer. Alternative embodiments may allow low-rate communication, or means for limited, or even allowable full inter-network communication, depending on the differing networks' contract agreement as to communications and provisioning sharing.

Under these conditions the nodes in the preferred embodiment direct nulls (hard or soft) at all observed Transmission nodes in other networks, to minimize the interference from and with the other network's signals. This same approach may be used, in an alternative embodiment, to enforce a 'lock out' of unauthorized nodes in a secure network. The nulls are further enabled using network-wide scrambling, gating, or encryption means as described elsewhere, to differentiate the two networks' internal signals.

An alternative embodiment incorporates one or more broadcast modes from network master controllers, that would enforce common timing standards and provide broadcast, i.e. network common information, without requiring two-way bandwidth for such effort.

Advantages: LEGO

Among the advantages of the preferred embodiment's solution of the local optimizations to obtain global optimization are the following: (1) the working target capacity objective for any given set of nodes may be rapidly reached by iterating from an initial approximation to an acceptably-constrained solution with many fewer iterations overall; (2) the power levels that solve the local target capacity objective minimize the transmitted energy at the local node, thereby minimizing the co-channel interference to other uses in the network; and (3) the quantities needed for the local solution only require local information to solve, thereby reducing substantially the ratio between 'control' and 'content' information, thus further enhancing the overall capacity of the network.

Additional advantages of the preferred embodiment's LEGO approach are (1) that it can be solved at each node using a very simple but powerful approximation technique that converges rapidly to the correct solution; (2) the power levels, at each respective node, that solve Eq. 3 actually minimize the transmitted energy at each respective node, hence (3) minimizing co-channel interference to other users (nodes) in the network while achieving the targeted capacity rates; and (4) most of the quantities required for the optimization only require local information.

Further advantages of the preferred embodiment include the lack of any need for estimating any channel matrices, and substantial lessening of detailed and fine calculation and recalculation of both (1) the initial SINR ratios and (2) the effect on each node of changing the power usage of any other node in the network. This latter has a secondary effect of reducing the amount of 'control' information that needs to be sent across the network, and reduces the amount of work or complexity that has to be managed by the network controller.

LEGO Effect on the MIMO Network

By solving the optimization at the local level for each node of the network, the problem of network optimization becomes a hierarchical one, where the overall problem is reduced to a series of subproblems. The preferred embodiment's implementation as described above, is then generalized to handle both the power constrained unconstrained (negligible noise) objective functions.

For the channel capacity value $D_{21}$, the network performs the optimization $$D_{21} = \max \beta \text{ such that}$$

$$\beta \leq \sum_{q \in U(m)} \sum_{k} \log(1 + \gamma(k, q)), \quad \text{EQ. 49}$$

$$\gamma(k, q) \geq 0,$$

$$\sum_{m} R_1(m) \leq R,$$

$$\pi_1(k, q) \geq 0,$$

$$\sum_{q \in U(m)} \sum_{k} \pi_1(k, q) \leq R_1(m)$$

where U(m) is a collection of links in a given aggregate set m, k is a transmission mode index, reflecting the fact that a single link may transmit over multiple diversity channels, $\pi_1(k,q)$ is the transmit power for mode k and link q, $\gamma(k,q)$ is the post beamforming signal to interference noise ratio, and $R_1(m)$ is the total allowed transmit power for aggregate set m; by solving first the reverse link power control problem; then treating the forward link problem in an identical fashion, substituting the subscripts 2 for 1. The solution for the link-level optimization as described above is then implemented at each node, and the network solution derived therefrom.

The means used to solve $D_{21}$ optimization are chosen to minimize the amount of auxiliary channel information, or network control information that displaces network content. For most of the max-min objective functions described herein, a necessary condition of optimality is that all of the links over each link index q achieve the same capacity. We can therefore require the constraint in Eq. 49 to be an equality For this embodiment, the objective function that is solved at each aggregate set m, becomes:

$$\min_{\pi_r(q)} \sum_{q \in Q(m)} \pi_r(q), \text{ such that} \quad \text{EQ. 50}$$

$$\beta = \sum_{q \in Q(m)} \log(1 + \lambda(q))$$

The preferred embodiment linearizes this objective function as a function of γ(q) and optimizes it using the formulation in EQ 28, EQ 29 and EQ 30.

For each aggregate set m, the network now attempts to achieve the given capacity objective, β, by (1) optimizing the receive beamformers, using simple MMSE processing, to simultaneously optimize the SINR; (2) based on the individual measured SINR for each q index, attempt to incrementally increase or lower its capacity as needed to match the current target; and (3) step the power by a quantized small step in the appropriate direction. When all aggregate sets have achieved the current target capacity, then the network can either increase the target capacity β, or add additional users (opportunistically or by signal) to exploit the now-known excess capacity. The network controller of the preferred embodiment is computationally extremely simple and requires a very small feedback channel, or portion of the control channel otherwise unused, to accomplish its tasks.

As the network evolves each independent channel is assigned a variable rate codec optimized for the currently achieved SINR for that link, whereby a code and associated rate are chosen to achieve the desired bit error using any of the Trellis Codes, interleavers, and/or Reed-Solomon codes known to the literature.

Good network performance includes, generally, a measure of uniform minimum performance level for all links assigned the same quality of service (QoS). The preferred embodiment uses Max-Min capacity criterion as disclosed above to attain this, as it is generalizable to a wide variety of network configurations. Minimizing the total power subject to arbitrary capacity constraints β(m), as in EQ 3 and EQ 4 is also an embodiment of interest and is easily accommodated by the current invention. The addition of reciprocity as a feature of the preferred embodiment allows us to state the decoupled objective function:

$$D_{rt} = \max_{\pi_1(k,q)} \min_m D_{rt}(m) \text{ where} \quad \text{EQ. 51}$$

$$D_{rt}(m) \equiv \sum_{q \in U(m)} \sum_k \log(1 + \gamma(k, q))$$

as the largest possible mutual information that can be obtained, as the one to be used to obtain network optimality.

The reciprocity equation, Eq. 2, establishes that the network's uplink capacity will equal its downlink capacity provided that the receive weights are used to transmit and the transmit weights to receive. Implementing the network optimization in this fashion provides the following benefits: (1) transmit weights can be obtained from receive weights; (2) transmit and receive weights require only local information at each node, thereby eliminating the 'network God' and 'common knowledge' problems; and (3) local optimization done using this optimizes the entire network, both making it stable and converging. The reciprocity equation is used particularly to tell each node how to choose its transmit weights optimally.

An improvement over blindly substituting transmit and receive weights, however, is in using the proper form of the objective function that satisfies the reciprocity equation, for that determines how to optimally adjust and select the gain over multiple outputs and multiple inputs. The choice of objective function specified above dictates the algorithmic procedure that is also specified above to optimize the network.

Figure 41:
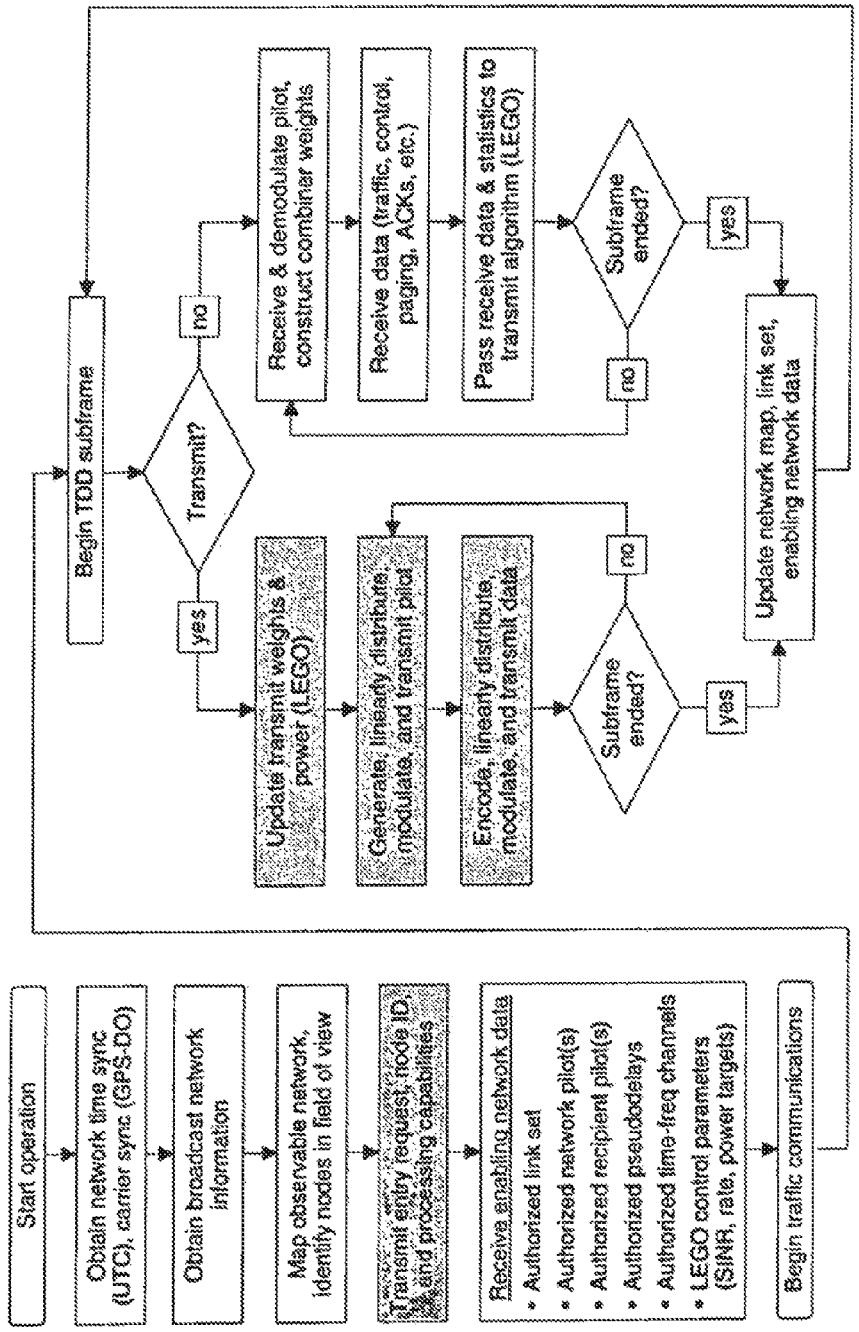
FIG. 41 illustrates, for a TDD MIMO network as in the preferred embodiment, an algorithm for any node entering the network.

Alternative embodiments of the network controller include having it set the entire network target capacity objective (β), using the network controller to add a node, drop a node, or change the target capacity objective for the nodes it governs or the network. FIG. 41 illustrates one feasible algorithm whereby a new node (or a node which had earlier dropped out of the network) enters the network. Further embodiments include using a network control element that may, either in addition to or in replacement for altering β, add, drop, or change channels between nodes, frequencies, coding, security, or protocols, polarizations, or traffic density allocations usable by a particular node or channel. In yet another embodiment the network control element selects and manages differing constraints, not being limited just to power and capacity, but also QoS, the amount of frequency spread between channels, the multipath density allocated to any particular pairing of nodes, or to any particular user, or any combination and subcombination of all of the above.

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features which are already known in the design, manufacture and use of wireless electromagnetic communications networks, systems and MIMO networks and systems therefore, and which may be used instead of or in addition to features already described herein. The algorithms and equations herein are not limiting but instructive of the embodiment of the invention, and variations which are readily derived through programming or mathematical transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

Figure 42:
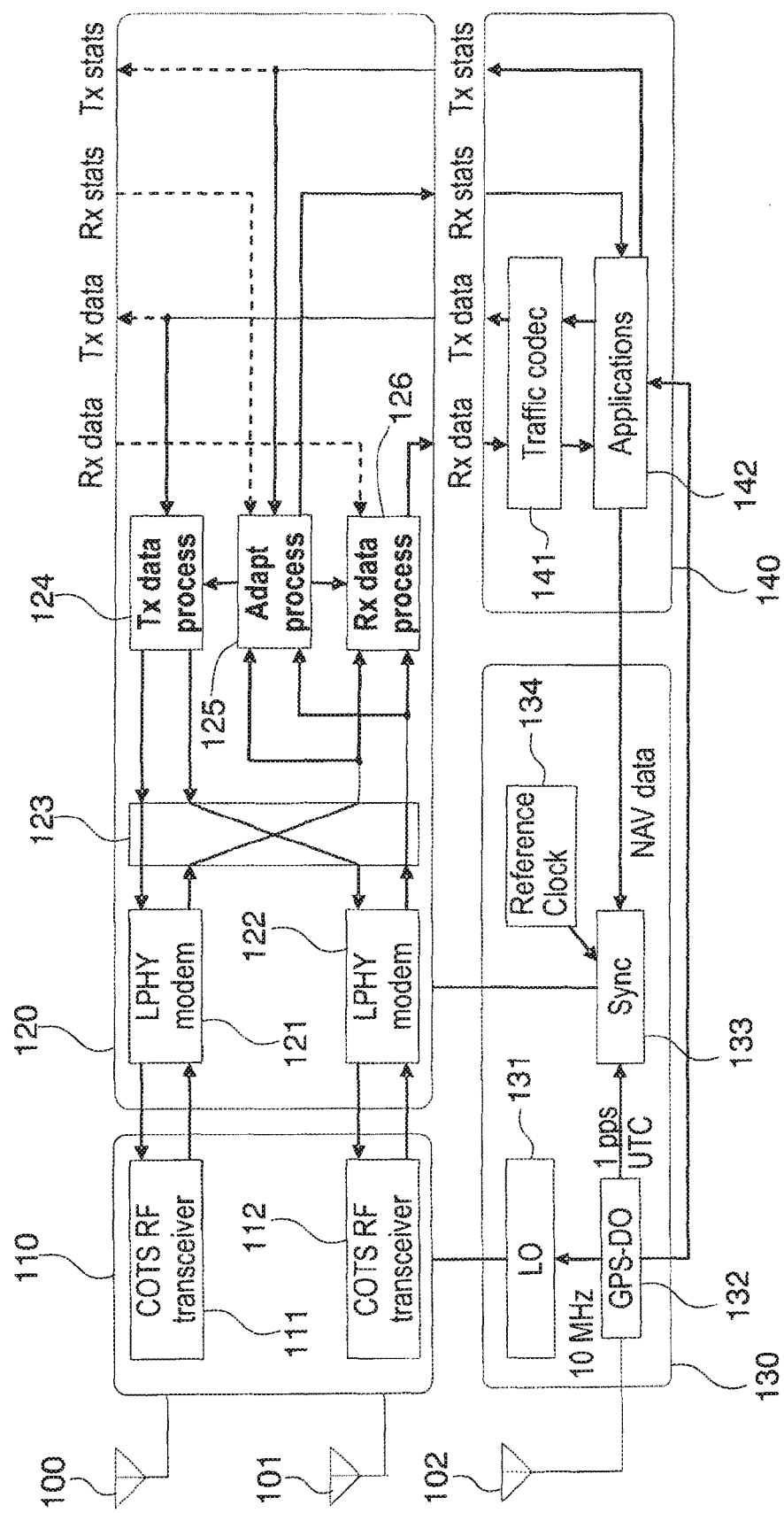
FIG. 42 shows MIMO-capable hardware transceiver means for, and the processing steps performed, in the baseline two-channel transceiver used in the invention.

FIG. 42 depicts the baseline transceiver employed in the primary embodiment. The radio consists of a pair of antennas and RF transceivers (frequency up/down converters and PA's); a digital ASIC. FPGA, or software radio component to implement lower-PHY (LPHY) symbol modulation/demodulation operations, linear combining of LPHY modem output signals during receive operations and corresponding linear weighting and distribution of LPHY model input signals during transmit operations; an LO employing a GPS disciplined oscillator (GPS-DO); and a software computer to implement optional higher-layer codec and collaborative radio applications. Typical commercially available GPS-DO's can provide <100 ns relative node-to-node timing error (well within the 800 ns delay error budget provided by the lower PHY modulation format) and <1 Hz carrier offset error (separate from Doppler shift between nodes), stable to within 300 ns over periods of >1 hour in event of GPS outage, e.g., due to foliage or man-made obstructions. In TDD network instantiations, this can allow fast (1.25 ms) node entry to the network without the need for detailed and distributed timing synchronization mechanisms. In absence of GPS-DO's collaborative means can be implemented to allow the radios to synchronize to a common shared time reference by monitoring broadcast signals transmitted from adjacent transceivers, or to synchronize to GPS time and frequency standards if just one of the transceivers in the network possesses a GPS-DO, allowing the transceivers to be implemented at greatly reduced cost. The baseline transceiver can to employ two degrees of freedom during receive and subsequent transmit operations, to set up independent ports to up to two other transceivers in the network during transmit or receive operations, or to null one external interferer during receive operations. Antennas in the network can be polarization diverse (transmitting and receiving on linearly independent, preferably orthogonal polarizations), spatially diverse (deployed at spatially separated locations), or combinations of polarization and spatially diverse. It is also possible to have a single channel transceiver capable of communicating with the network, or any number of ad-hoc combinations of transceivers of varying capabilities, likewise.

Figure 43:
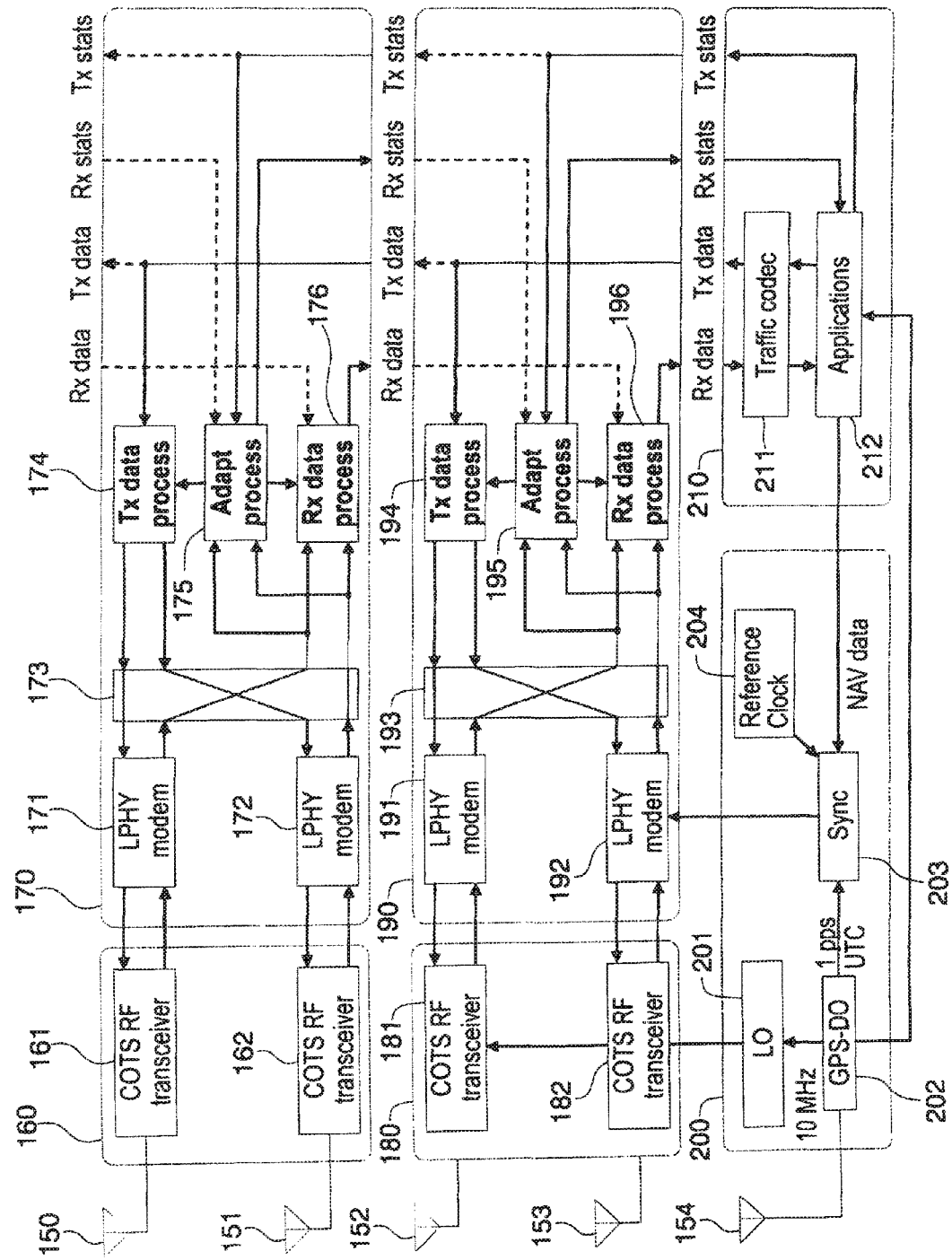
FIG. 43 shows enhanced MIMO-capable hardware means for, and the processing steps in combining, baseline two-channel transceivers to provide additional degrees of freedom (receive combining and transmit distribution) in larger networks.

FIG. 43 depicts means for extending the baseline transceiver to larger numbers of antenna channels. The baseline transceiver and adaptation algorithm include provisions for routing of transmit and receive data and a modified Gram-Schmidt orthogonalization (MGSO) statistics between boards, in order to allow the radio to be scaled up to as many as 8 antennas by combining 2, 3, or 4 Transceiver boards together. A transceiver employing L baseline transceivers can employ up to 2L degrees of freedom during receive and subsequent transmit operations, to establish independent channels to up to 2L separate transceivers in a network, or to excise up to 2L−1 external interference during receive operations.

Figure 44:
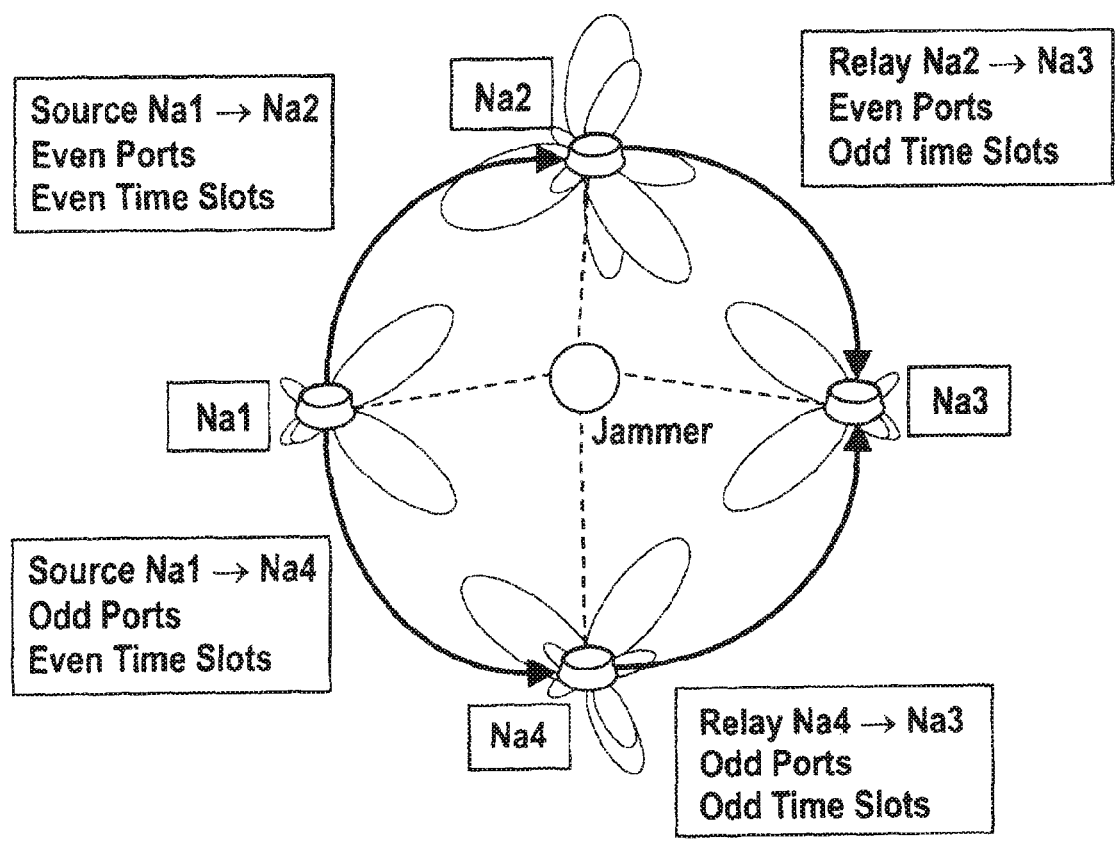
FIG. 44 shows an exemplary MIMO networking routing scenario in which four transceivers with four spatial degrees of freedom are used to route data around a four-node network in the presence of a strong jammer.

FIG. 44 depicts an exemplary MIMO networking routing scenario in which four transceivers with four spatial degrees of freedom are used to route data around a four-node network in the presence of a strong jammer. Each transceiver employs two of its four available degrees of freedom to establish connections with its neighboring transceivers. The remaining degrees of freedom are then used to excise the jammer in the center of the network, and to increase signal-to-noise ratio (SNR) in the direction of its neighboring transceivers. In a time-division duplex (TDD) communication network, these connections can be used to simultaneously route data in clockwise and counter-clockwise directions to form a counter rotating ring network. In lightly loaded networks, this can double the capacity available to any node in the network; moreover, this can greatly increase availability of the network to each node, by providing a redundant path for transmission of data between network ports.

Figure 45:
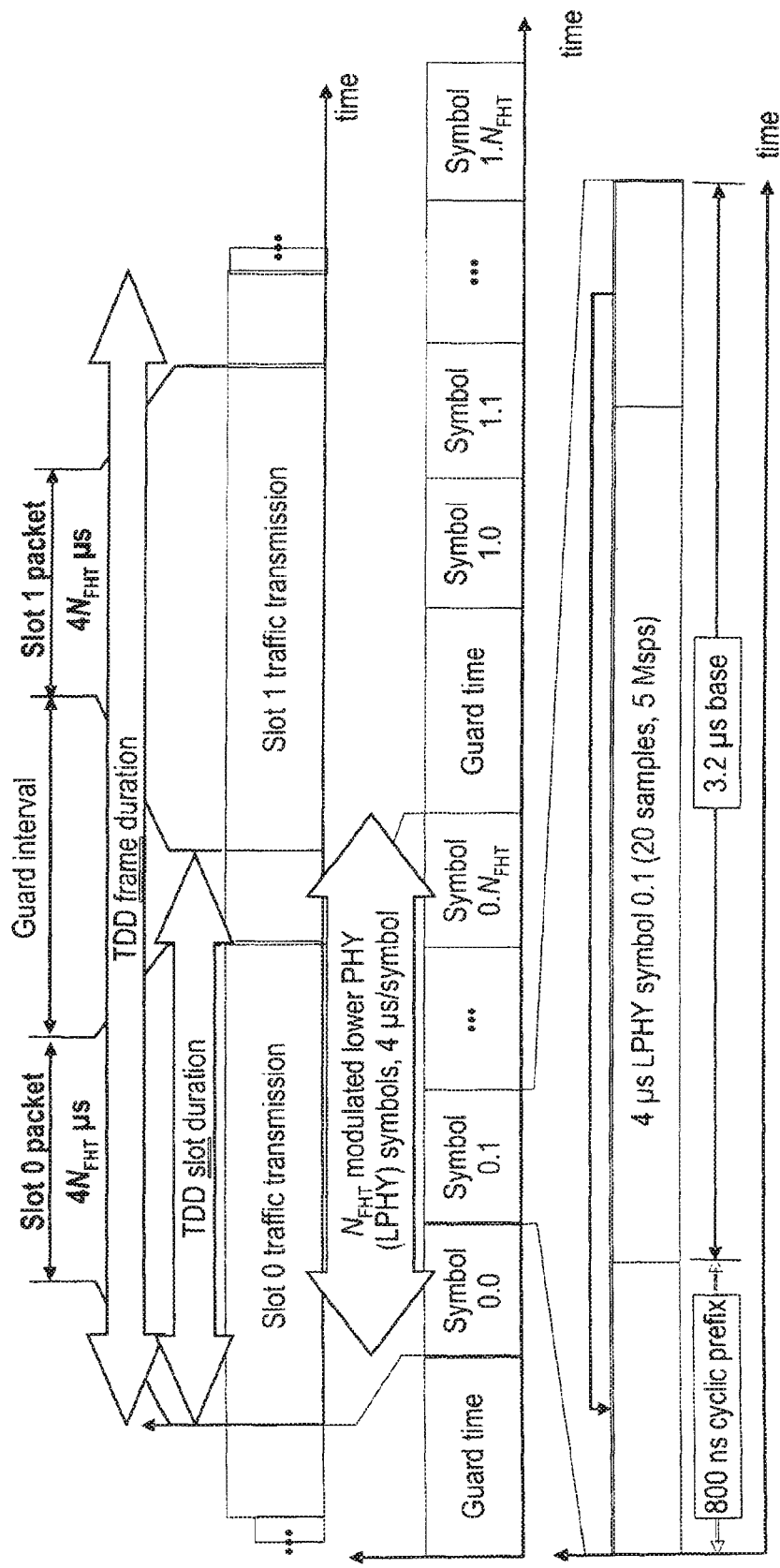
FIG. 45 shows the baseline symbol and timing structure for each transmission, when transceivers are operated in a symmetric time-division duplex (TDD) multimode network.

FIG. 45 depicts the baseline symbol and timing structure allowing transceivers to connect with each other in a symmetric time-division duplex (TDD) multinode network. Packets are transmitted to and from uplink receive nodes and downlink receive nodes during alternating time slots, with an appropriate guard time, e.g., for switching between transmit and receive modes, transmission of signaling/control and network maintenance/provision packets, computation of receiver CRC's and decoding algorithms, and operation of higher-layer data routing procedures. Within each slot, an integer number of lower PHY (LPHY) symbols is transmitted. The number of symbols is chosen to have a value that allows implementation of efficient orthogonal transformations over the symbol time index. In the primary embodiment, this number is set equal to a power-of-two, e.g., 256 symbols, in order to use of fast Hadamard transform (FHT) operations; however, other embodiments can employ different numbers of symbols, e.g., allowing implementation of mixed-radix fast Fourier transforms (FFT's) or other linear orthogonal operations. Each LPHY symbol is assumed to possess a base symbol and a cyclic prefix that is discarded during the LPHY symbol demodulation operation, allowing the transceivers to be insensitive to delay and multipath with maximum substantive value that is less than the cyclic prefix. In the preferred embodiment, the cyclic prefix and base symbol is set to 800 ns and 3.2 µs, commensurate with the 802.11 OFDM traffic PHY, and may include additional synchronization and signaling symbols (external to symbols carrying traffic information) in order to maximize commonality with 802.11 hardware, and/or promote eventual coexistence and/or integration of the invention into 802.11 networks. In the preferred embodiment, the LPHY symbol is also either an OFDM waveform comprising multiple subcarriers (modulated OFDM tones) or a PAM signal equivalent to a single carrier of an OFDM waveform, e.g., for low-rate applications. However, the invention is compatible with many different LPHY modulation formats besides OFDM or PAM, including spread spectrum modulation formats that spread the signal over wide bandwidth, and LPI/LPD modulation formats that reduce or eliminate cyclic features of the waveform.

Figure 46:
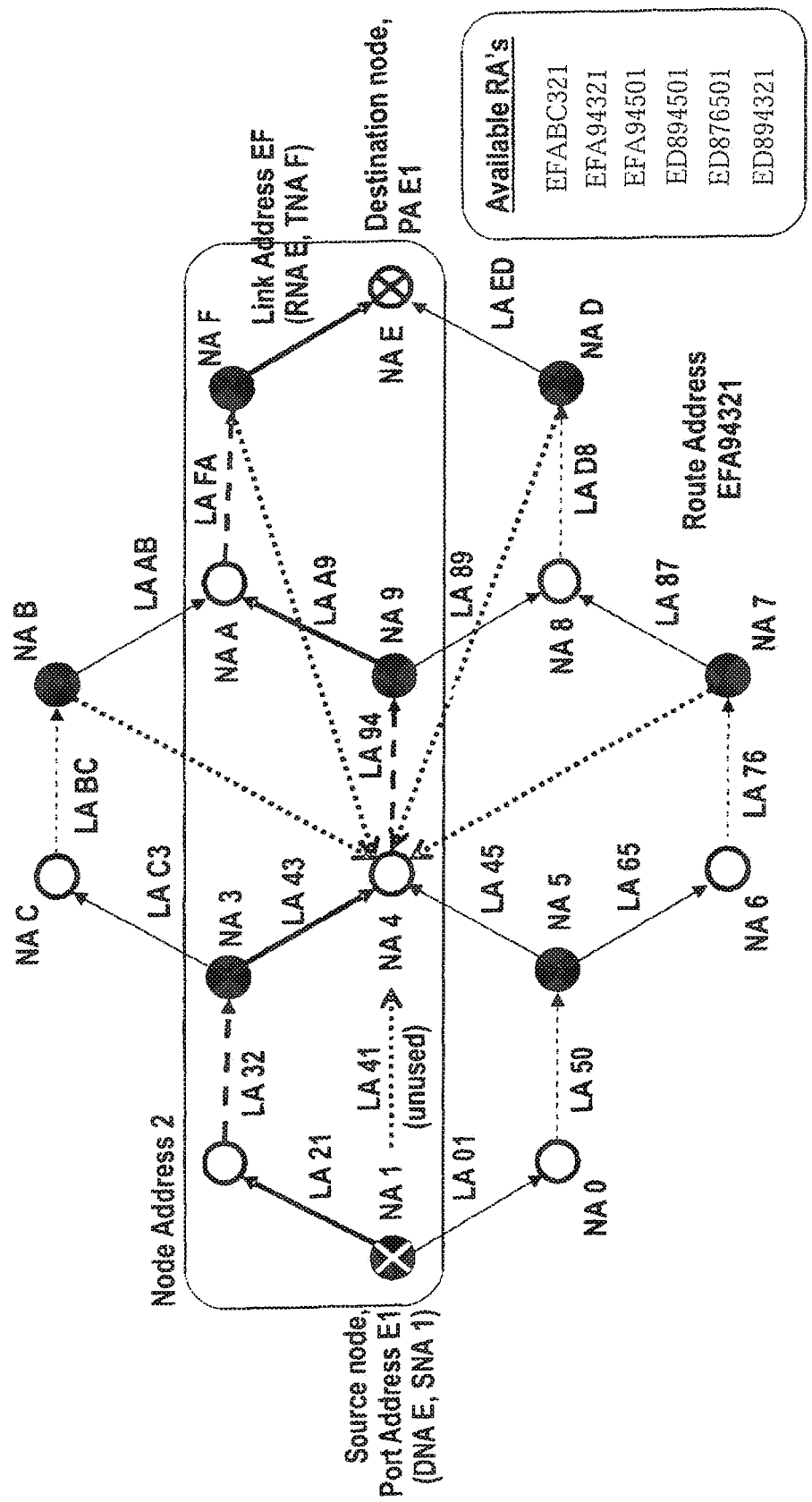
FIG. 46 shows an exemplary deployment and installation of the invention in a communication over a TDD mesh network topology.

FIG. 46 depicts exemplary means for deploying the preferred embodiment in a TDD mesh network topology, in order to transmit data between a widely separated source and destination node. In this embodiment, the network nodes are first separated into uplink transmit nodes (downlink receive nodes), depicted with light interiors in FIG. 46, which transmit data over even time slots and receive data over odd time slots, and uplink receive nodes (downlink transmit nodes), depicted with dark interiors in FIG. 46, which receive data over even time slots and transmit data over odd time slots. Each transceiver is assumed to possess sufficient spatial channels to allow it to communicate simultaneously with at least two of its nearest neighbors over each time interval, i.e., to form two links between its nearest neighbors in the network, suppress any network or external interference impinging on the nodes, and close each individual link under channel propagation conditions observed by that node. At high spectral efficiency. e.g., in applications where the nodes must transmit data at high rate, each node (and especially internal nodes) may require as many as eight antennas, or four baseline transceivers, to support MIMO networking communication. Conversely, in applications where the nodes must transmit data at modest rates, e.g., VoIP communications, each transceiver could operate with as few as two diversity channels, or a single baseline transceiver, to support needs of the network.

Each link is given a unique link address (LA), defined by the transmit node address (TNA) and receive node address (RNA), i.e., the node address (NA) of the nodes originating and terminating that link, and the channel rank of that particular link if a true multirank MIMO link exists and is exploited by those nodes. In the sixteen-node network shown in FIG. 46, each LA is defined as a two-hex address comprising the (RNA, TNA) for that link, with a third hex number (equal to zero in every LA shown in the Figure) reserved to capture the mode index (0=dominant rank) of that link. In FIG. 46, uplinks instantiated over odd time-slots and passing data from uplink transmit nodes to downlink receive nodes are depicted as solid arrows, and downlinks instantiated over even time slots and passing data from downlink transmit nodes to downlink receive nodes are depicted as dashed arrows. In this Figure, packets can be transported across the entire network in 7 time slots (3.5 TDD frames).

Figure 47:
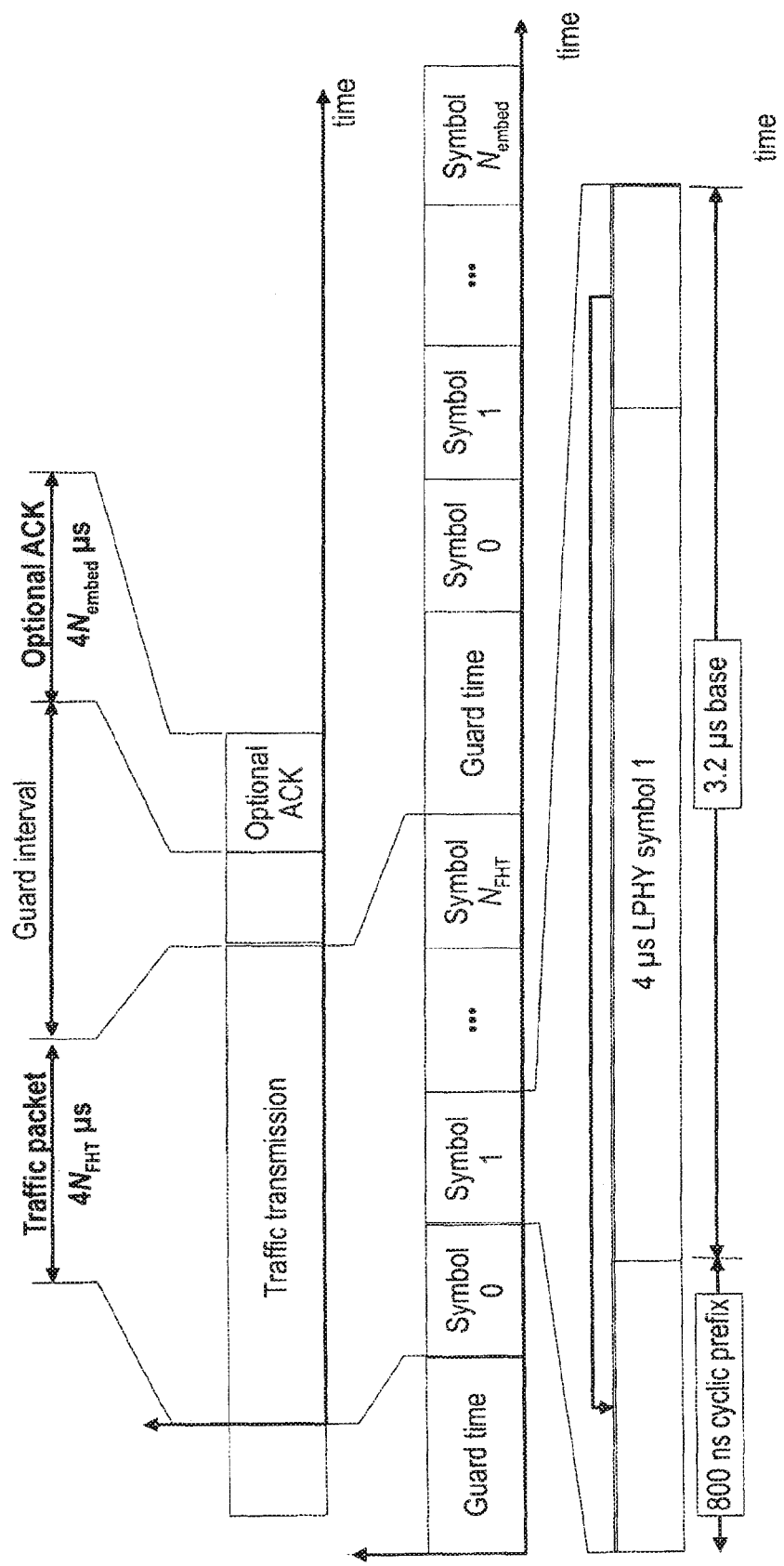
FIG. 47 shows the baseline symbol and timing structure for each transmission, when transceivers are operated in an ad-hoc multimode network.

FIG. 47 describes the baseline symbol and timing structure for the invention, when transceivers are operated in an ad-hoc multinode network. In the preferred ad hoc embodiment, traffic data is transmitted over a preset numbers of LPHY symbols, e.g., determined at the beginning of data communications, which is larger than a minimum number of signals $N_{embed}$ determined by the overhead structure set aside to implement receive adaptation algorithms at each transceiver, and which is a convenient number, e.g., power-of-two, allowing implementation of efficient data transformations in subsequent processing steps. However, the preferred ad hoc embodiment employs an overhead structure that allows implementation of alternate methods that do not require exact knowledge of the full packet length to implement receive adaptation algorithms, and that can allow transmission of packets of different length to different nodes in the network.

For certain levels of quality-of-service, the traffic packet may be followed by an acknowledgment packet sent from the receive node(s) back to the transmit node, comprising $N_{embed}$ LPHY symbols. As in the TDD instantiation, the traffic and acknowledgement packets are separated by a guard time interval; however, the time interval between traffic and acknowledgement packets may be very short, e.g., on the order of the Short Interframe Space (SIFS) in 802.11 communications.

Figure 48:
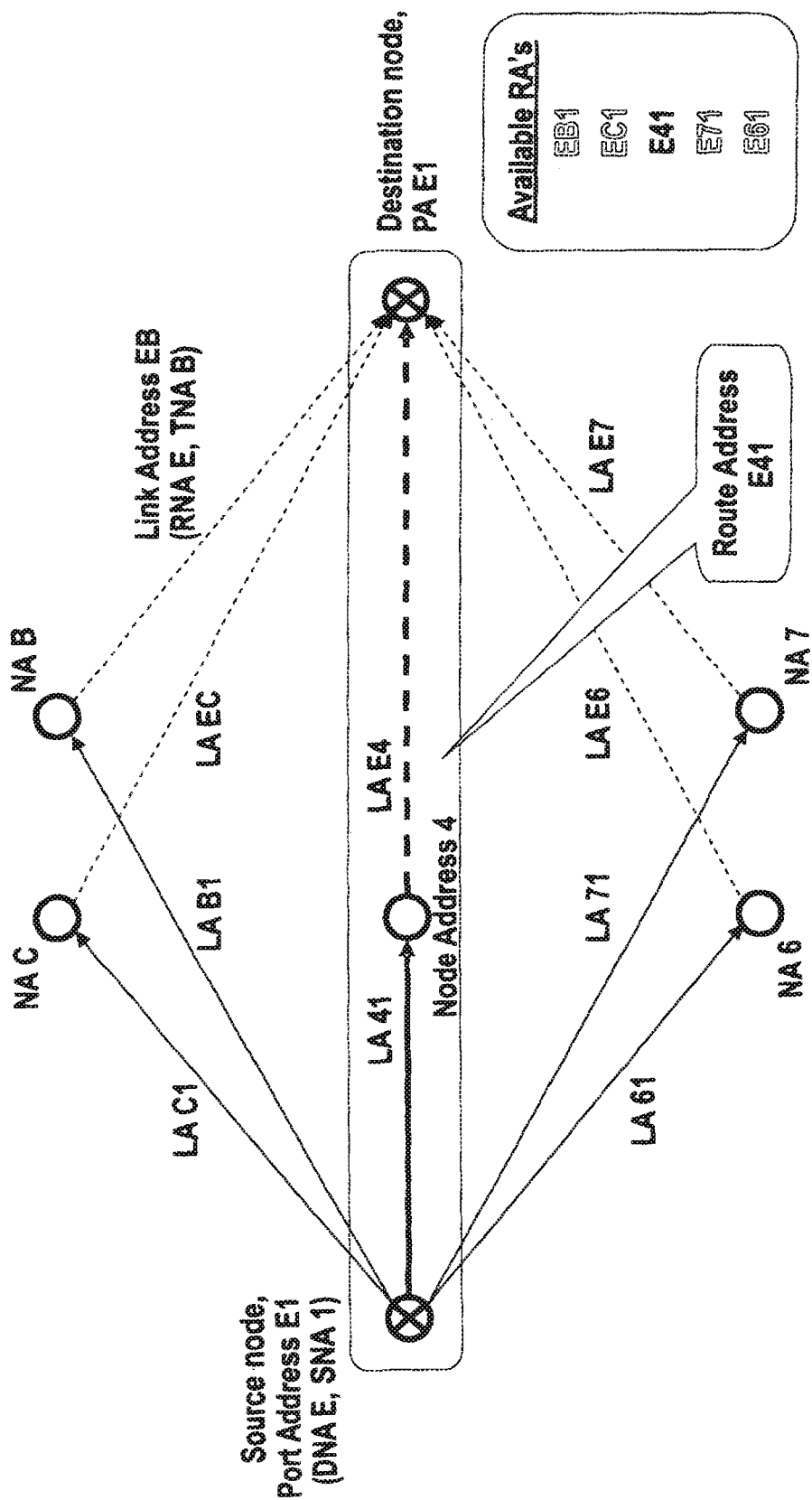
FIG. 48 shows an exemplary deployment and instantiation of the invention in a communication over an ad-hoc mesh network topology.

FIG. 48 depicts exemplary means for deploying the invention in an ad hoc mesh network topology. In this network, any node can communicate with any other node in its field of view, allowing the source node to simultaneously transmit packets to any available node in the network. In FIG. 48, for example, the source node transmits packets to five separate intermediate (relay) receive nodes over a first traffic time slot, and directs those nodes to transmit packets directly to the destination node over a subsequent traffic time slot. In the preferred ad hoc embodiment, each of the relay nodes receive independent data, e.g., one of five subsets of data, from the source nodes, similar to the approach employed in the TDD embodiment. However, the invention supports an additional macrodiverse mode in which the source node transmits identical traffic data to each intermediate node. In this case, the intermediate nodes will form a macrodiverse transmitter that can exploit the full network transfer function between the source node and intermediate nodes during the first traffic time slot, and the full network transfer function between the relay nodes and the destination node over the second traffic time slot.

Figure 49:
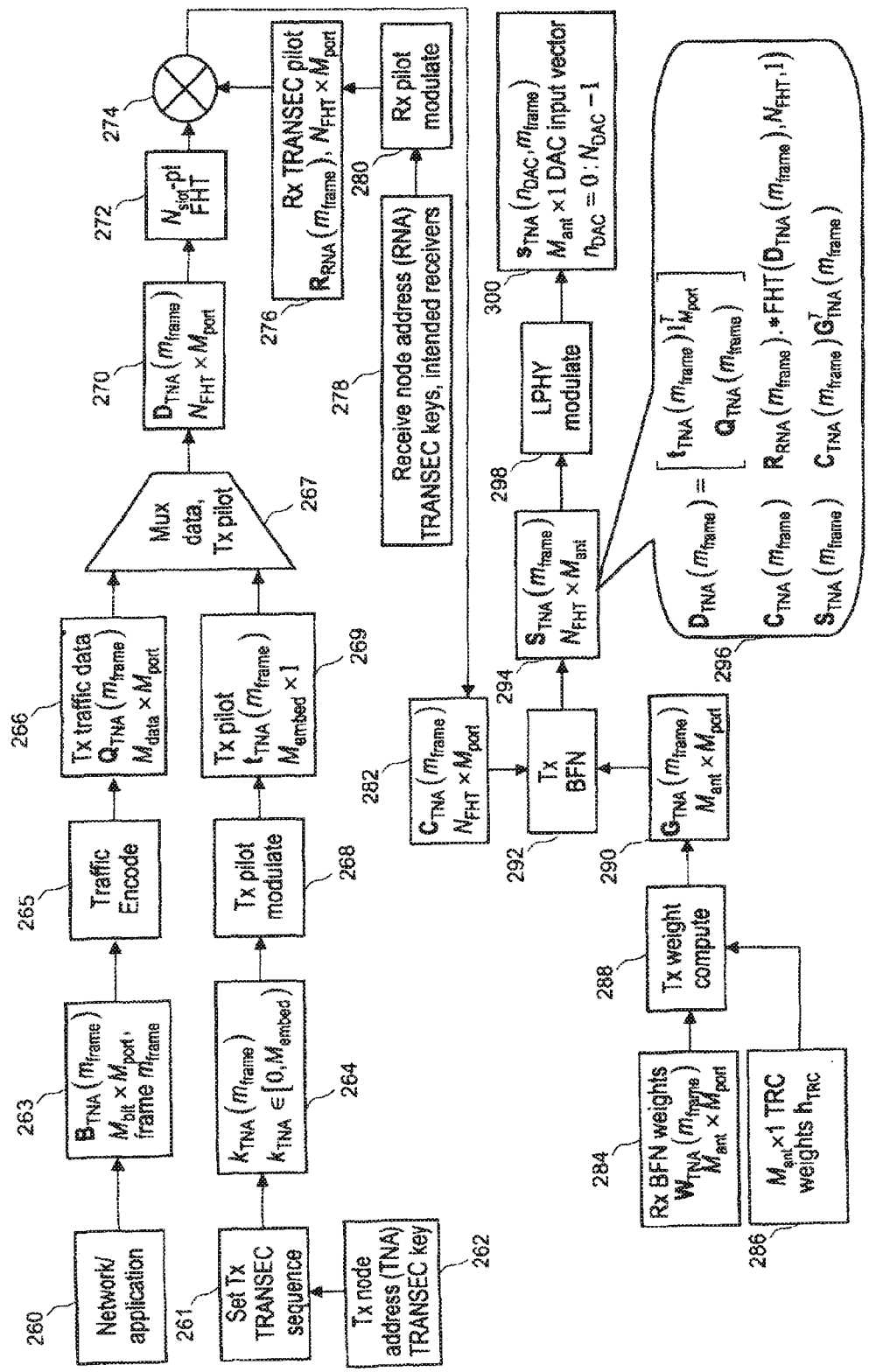
FIG. 49 shows multiport PHY transmit operations and processing performed at transceivers using the invention.

FIG. 49 describes multiport PHY transmit operations performed at transceivers using the invention; and these are described in detail below. In order to minimize complexity of the Figure, operations are shown for a single-carrier LPHY modulation format, e.g., a PAM format employing a cyclic prefix as shown in FIG. 45 and FIG. 47, or for a single subcarrier of an OFDM LPHY. In the latter case, all operations are replicated across subcarriers, with possible exception of subcarriers that may be reserved for synchronization purposes or for compatibility with existing wireless air interfaces, e.g., 802.11ag, and additional variations that may be introduced to increase security of the network.

On the traffic path, data bits intended for each of $M_{port}$ receive node are first encoded into $N_{data}$ complex traffic data symbols, e.g., complex QPSK or QAM symbols, using conventional encoder technology. These symbols are then multiplexed onto the upper $N_{data}$ input bins of an efficient orthogonal transform operator such as a fast Hadamard transform (FHT), such that at least $N_{embed}$ bins of the transformation are not modulated by data during the subsequent transform operation. On the overhead or "pilot" path, at least one of $N_{embed}$ bins is modulated. This bin location is chosen based on the node address of the transmit node, and a network-wide (e.g., time-of-day based) Transmission Security (TRANSEC) operation known to each node in the network, e.g., by modulo-$N_{embed}$ adding the TNA to a common TRANSEC word, such that each node is modulating a unique bin during any given traffic or acknowledgement time slot. Each port of modulated traffic and pilot symbols are then passed through the fast orthogonal transformation, yielding $N_{FHT}$ transformed output symbols. Each port of transformed output symbols are then multiplied by a second, pseudorandom constant modulus TRANSEC receive code based on the node address of the receive node that the transmit node is attempting to communicate with over that port and time slot, and other information known only to the network users. The resultant symbols are then multiplied by the $M_{port} \times M_{ant}$ transmit diversity weights employed at the transmitter, where $M_{ant}$ is the number of antennas employed at the transmitter. If those weights are determined adaptively, e.g., using knowledge of reciprocity of the communication channel, this data is further multiplied by a set of transmit-receive compensation weights that enforce reciprocity between the transmit and receive channels at the node. These symbols are then passed through the LPHY symbol modulator (in combination with symbols corresponding to other subcarriers if the transceiver employs an OFDM LPHY), and onto the subsequent DAC, upconversion, power amplification, and RF transmission operations.

Figure 50:
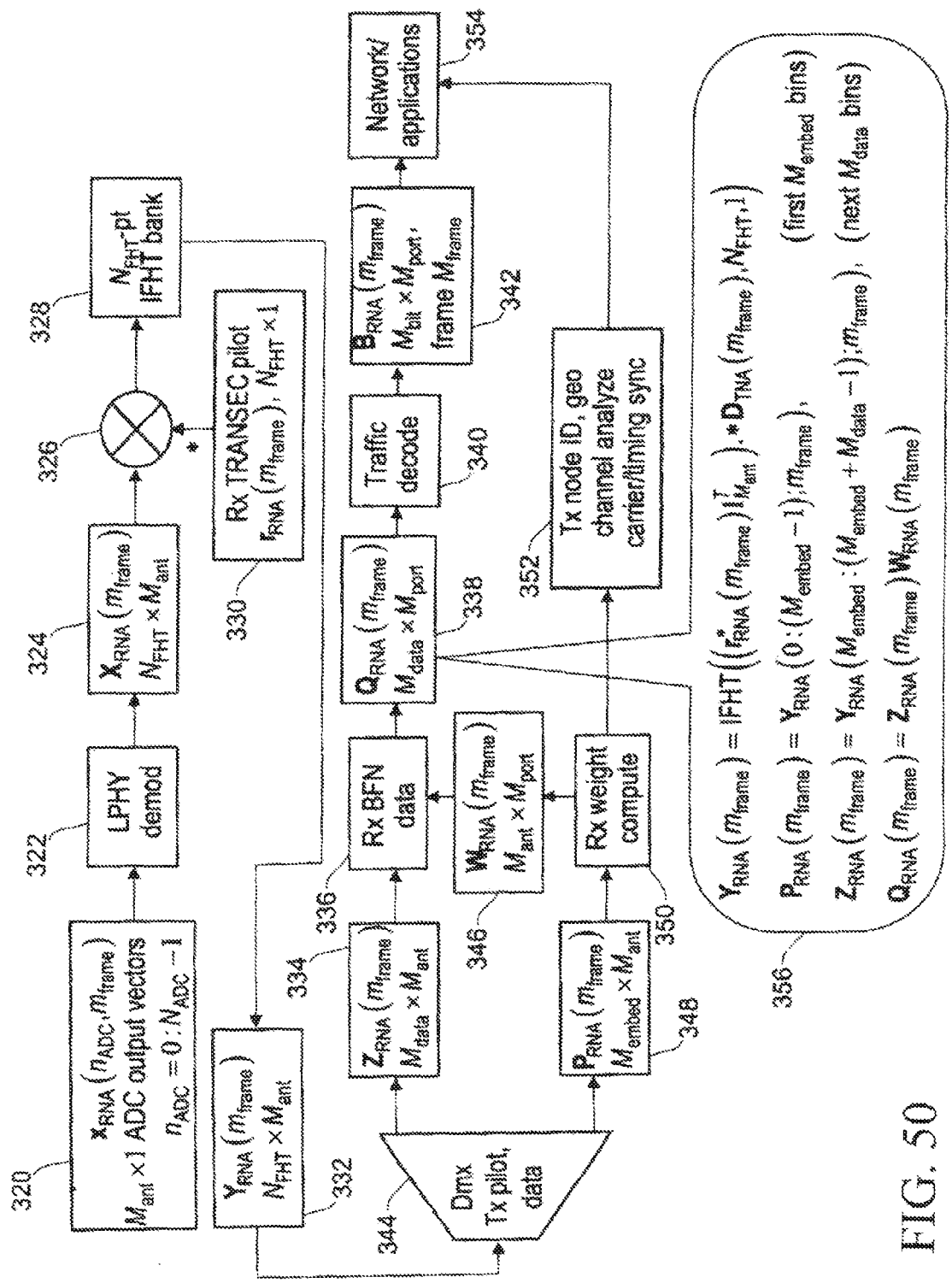
FIG. 50 shows multiport PHY receive operations and processing performed at transceivers using the invention.

FIG. 50 describes multiport PHY receive operations performed at transceivers using the invention; and these are described in detail below. In order to minimize complexity of the Figure, operations are shown for a single-carrier LPHY modulation format, e.g., a PAM format employing a cyclic prefix as shown in FIG. 45 and FIG. 47, or for a single subcarrier of an OFDM LPHY. In the latter case, all operations are replicated across subcarriers, with possible exception of subcarriers that may be reserved for synchronization purposes or for compatibility with existing wireless air interfaces, e.g., 802.1ag, and additional variations that may be introduced to increase security of the network.

After RF reception, downconversion, and ADC operations on $M_{ant}$ spatial or polarization diverse antennas, data received at each antenna is passed through an LPHY demodulator that converts that data to $N_{FHT} \times M_{ant}$ complex matrix representation ($M_{ant}$ columns of $N_{FHT} \times 1$ complex data), on each subcarrier if the transceiver is employing an OFDM LPHY. Each $N_{FHT} \times 1$ complex data vector is then multiplied by the conjugate of the TRANSEC receive code for that node, which removes that TRANSEC receive code added at the transmitter for that port (and only for ports that were intended to pass data to that receive node). This data is then passed through the inverse of the orthogonal transformation employed at the transmitter, e.g., an inverse FHT, and separated into the lower $N_{embed}$ output bins (an $N_{embed} \times M_{ant}$ complex pilot data matrix) corresponding to the pilot signal(s) employed at each transmit node attempting to communicate with that receive node, and $N_{data}$ output bins (an $N_{data} \times M_{ant}$ complex traffic data matrix) corresponding to the traffic data transmitted to the receive node, as well as interference generated by other nodes in the network or external emitters.

On the pilot path, the $N_{embed} \times M_{ant}$ complex pilot data matrix is then passed to an adaptation algorithm that detects bins modulated by the transmitters attempting to communicate with the receiver; identifies those transmitters based on the detected bins and the TRANSEC transmit code algorithm employed in the network, determines quality of the received pilot symbols and (by extension) traffic data, and develops combining weights that can extract the traffic data from the $N_{data} \times M_{ant}$ complex traffic data matrix at the maximum signal-to-interference-and-noise ratio (max-SINR) achievable by the transceiver. On the training path, these combiner weights are then applied to the traffic data matrix, and the extracted data is then passed to a traffic decoder that decodes the traffic data back into bits and performs additional operations employed by the communication link, e.g., bit-level data decryption and error detection operations.

In the preferred TDD and ad hoc embodiments, each transmitter uses an orthogonal transformation of the same length during its transmit operation, generating packets of the same time duration as well. However, in some alternate embodiments different transmitters may transmit signals with different numbers of traffic data symbols. In this case, if an appropriate orthogonal transformation is employed at the transmitters, e.g., a radix-2 FHT, and the pilot symbols are restricted to an appropriate subset of input bins in that transformation, e.g., the first $N_{embed}=2^P$ bins of an FHT, then the first $N_{embed}$ symbols (or a multiple of the first $N_{embed}$ symbols) can be used in the receive adaptation algorithm. This can allow the invention to be used in fully adhoc networks where nodes can transmit packets of arbitrary length. However, receive combiner weights obtained through this process may exhibit misadjustment relative to optimal weights for the traffic data, as the pilot symbols may not experience the full processing gain of the FHT.

Figure 51:
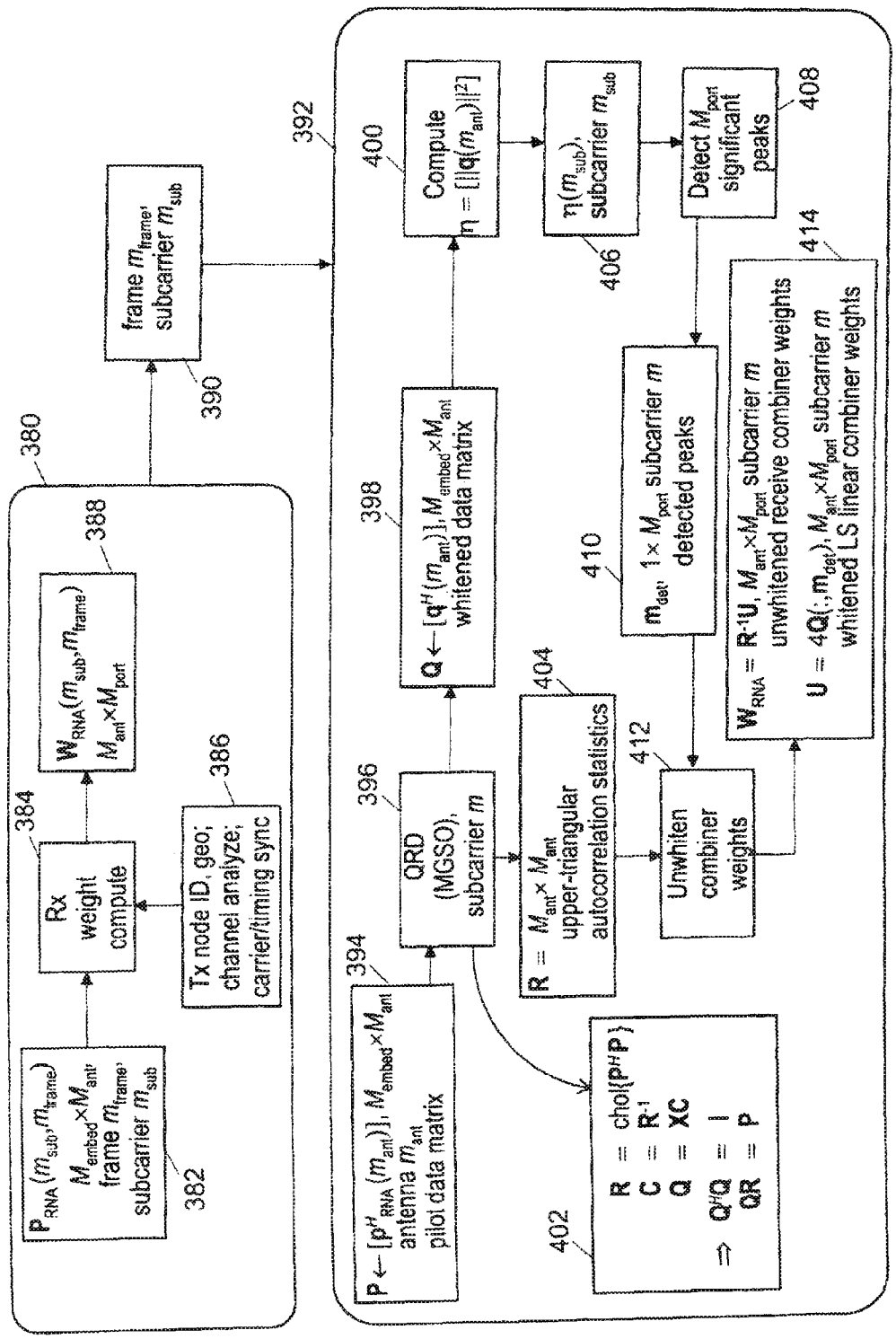
FIG. 51 shows multiport PHY receive adaptation operations and processing performed in the primary embodiment of the invention.
Figure 52B:
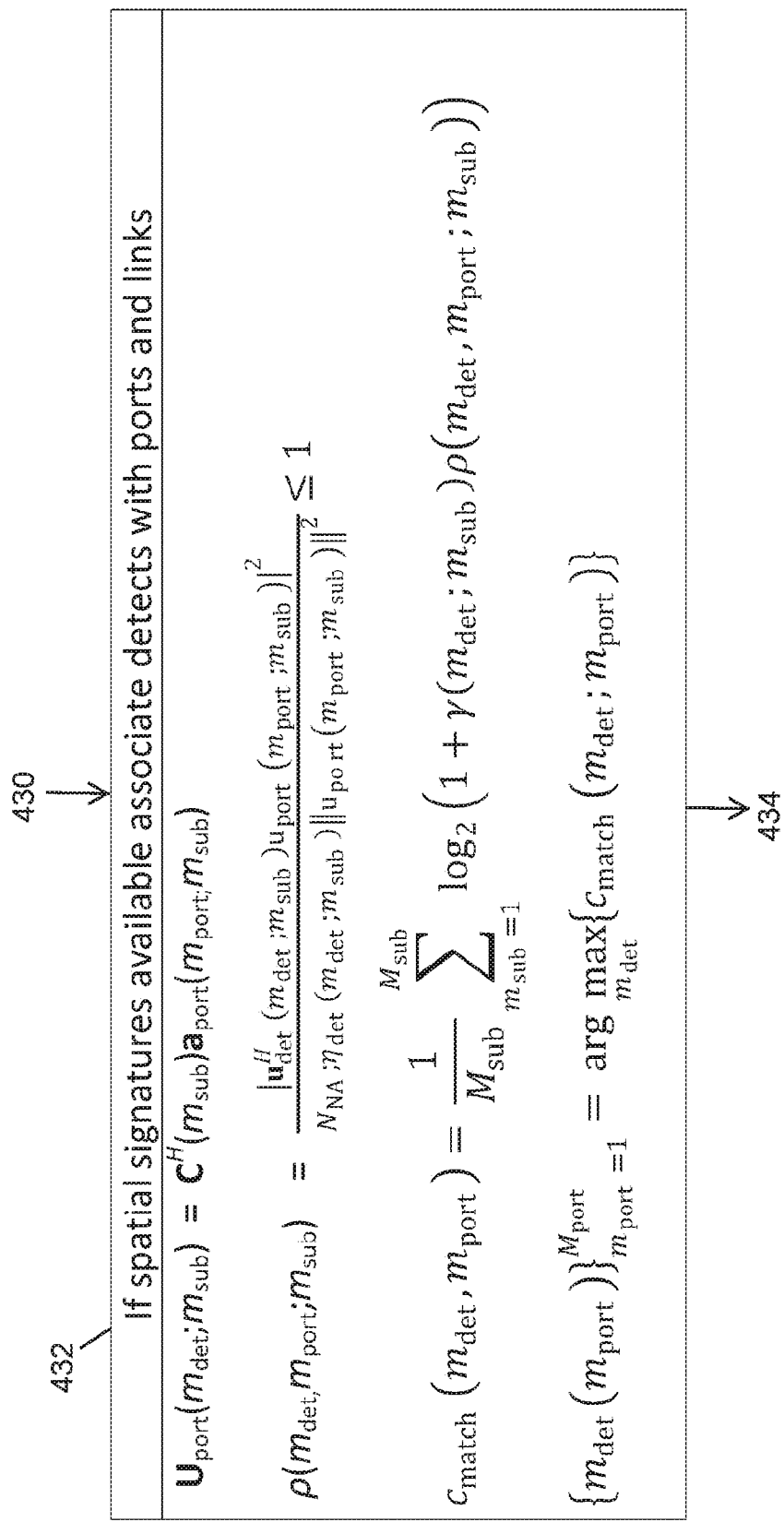
Figure 52C:
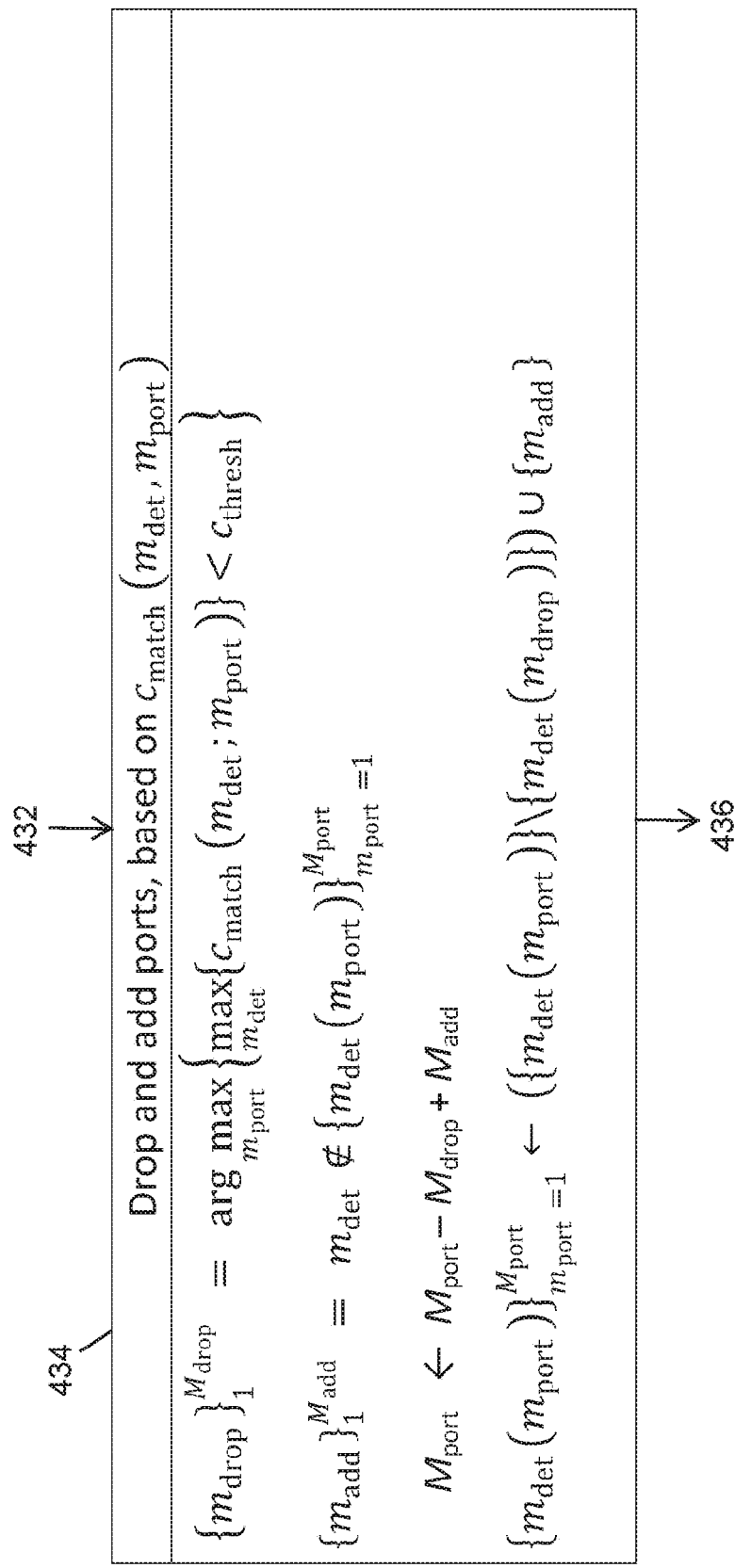
Figure 52D:
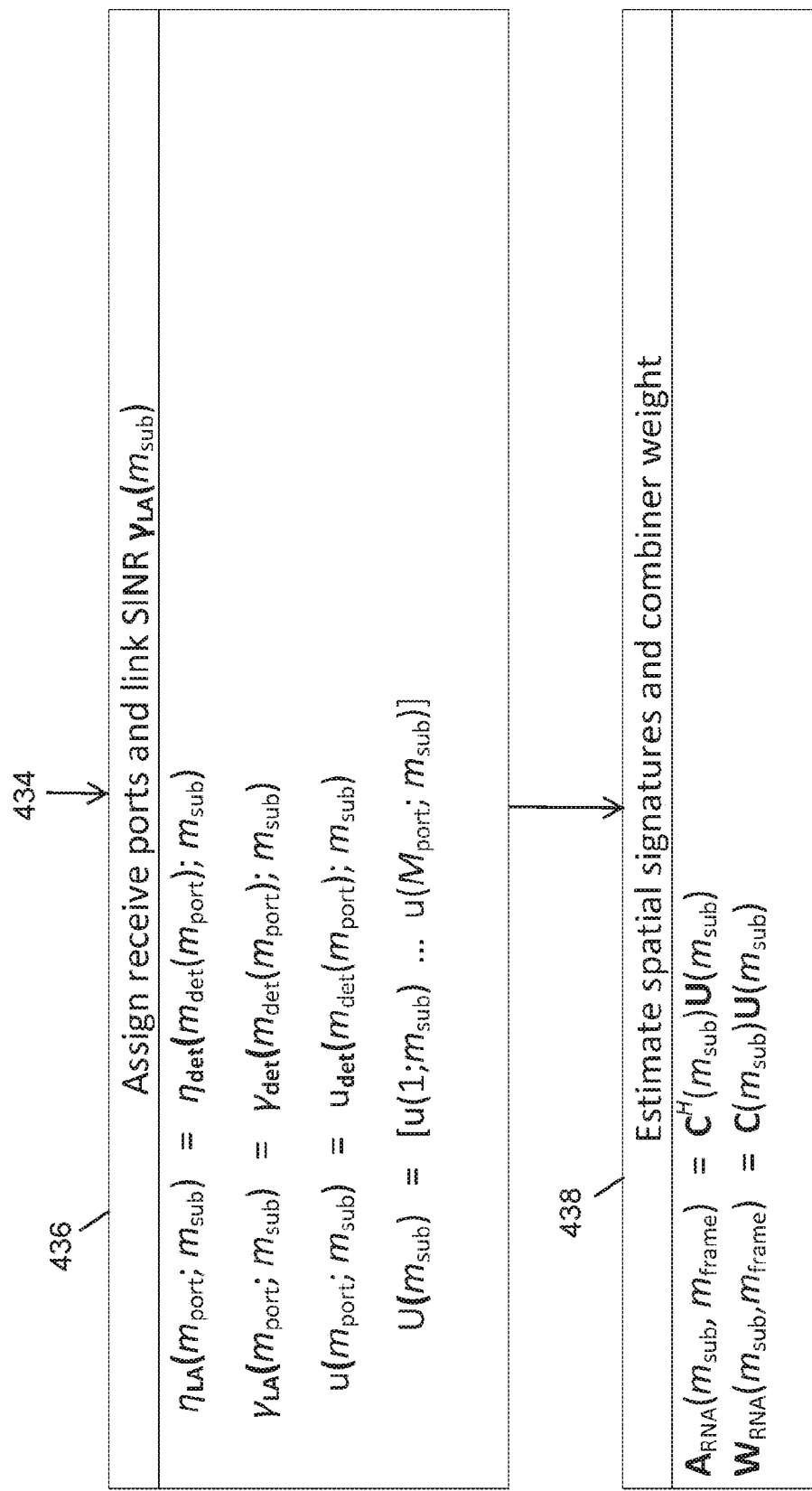

FIG. 51 describes multiport PHY receive adaptation operations performed in the primary embodiment of the invention; and these are described in detail below. On each subcarrier, the $N_{embed} \times M_{ant}$ complex pilot data matrix is first passed to a whitening operation such as a modified Gram-Schmidt orthogonalization (MGSO) or other QR decomposition (QRD) that separates the pilot data X into an $N_{embed} \times M_{ant}$ whitened data set satisfying $Q^H Q = I$, and an $N_{embed} \times M_{ant}$ statistic vector R that captures the autocorrelation of X, e.g., the Cholesky decomposition of $X^H X$. The Q matrix is then analyzed (across multiple subcarriers for OFDM LPHY's) to detect all of the modulated pilot bins. This information is used to unambiguously determine the TNA of each node attempting to communicate with the receiver. Once this determination has been made, the link SINR, whitened linear combiner weights, and subsequent unwhitened combiner weights are computed for each transmitted signal (and subcarrier for OFDM LPHY's).

FIGS. 52A-52D describe receive packet detection, address association, and link SINR estimation performed in the primary embodiment of the invention; and these are described in detail below. The adaptation algorithms are uncalibrated, i.e., they do not exploit knowledge of the shaping, polarization, or physical placement of antennas used by the transceiver, and can be used to instantiate arbitrary network topologies, including point-to-point links, star networks, ring networks, or full mesh networks. When deployed in point-to-point links, successive iterations of the transmit and receive adaptation algorithm causes each transceiver to adapt its multiport combiner and distribution weights to the eigenmodes (left and right eigenvectors) of their MIMO internode channel response, typically in 2-to-4 TDD frames (5-10 ms). The resultant fully adaptive link can approach the Shannon capacity of the MIMO communication channel, regardless of the rank or distribution of the eigenvalues of that channel.

Figure 53:
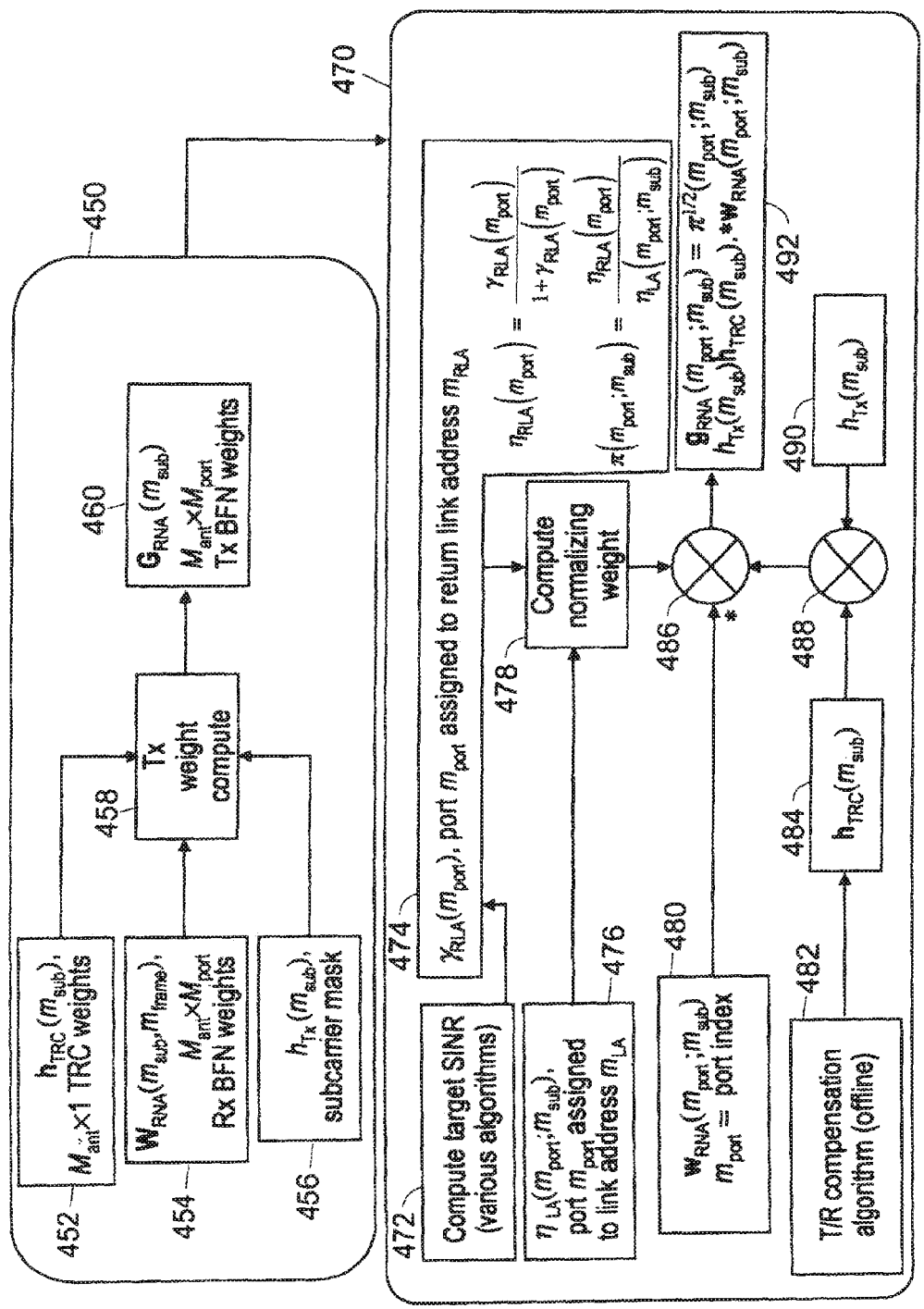
FIG. 53 describes transmit adaptation algorithms operations and processing performed in the preferred embodiment of the invention.

FIG. 53 describes transmit adaptation algorithms performed in the primary embodiment of the invention. The baseline system employs network-wide collaborative link optimization rules referred to in [2] as locally enabled global optimization (LEGO), which optimize network-wide measures of network quality using retrodirective transmit weight adaptation and local (link layer) power management instructions. The approach exploits the ability to form nulls during transmit operations to intelligently manage interference presented to other nodes transmitting or communicating in the same frequency channel. This includes other nodes operating on the same network, and nodes operating on disconnected networks, without the need for higher-layer cross-communication between interference nodes or networks.

Also described below is also describe an alternate embodiment in which the adaptive receive combining weights are adapted to completely separate intended links with maximum signal-to-interference ratio rather than SIR, i.e., to direct "hard nulls" at each transmitter attempting to communicate with the node during the receive time slot so that interlink interference is completely removed during the receive operation, and to direct corresponding hard nulls back at the intended links during subsequent transmission opportunities. Although this algorithm does introduce some misadjustment (particularly during receive operations), it can improve the stability of the LEGO transmit adaptation algorithms in highly dynamic communication networks.

The resultant fully-adaptive system provides a much more versatile solution than competing multilayer receive-adaptive techniques such as BLAST and STP, which only approaches the Shannon capacity in full-rank (i.e., high multipath) channels. In particular, the fully-adaptive system can use its diversity degrees of freedom (DoF's) to provide substantive transmit gain in low-rank channels found in airborne and rural conditions. The fully-adaptive system can also use these DoF's to excise interference impinging on either end of the link due to other nodes operating in the same frequency band, hostile jamming of the link. In addition, the fully adaptive system provides an automatic power control mechanism (LEGO Algorithm) that can be used to maximize capacity (high throughput applications) or minimize transmit power (LPD applications), depending on the requirements of the system at any point during a mission. These attributes greatly increase the flexibility, range of operation, and application of the approach.

Moreover, the weight adaptation procedure is decoupled from operations used to encode data onto each transmitter port (channel eigenmode) and decode data taken from the corresponding receive port at the other side of the link, without expensive multilayer decoding, encoding, and cancellation procedures employed in receive-adaptive methods. This greatly reduces the complexity and reaction time of the transceiver, by allowing the transmit/receive weights to quickly adjust to highly dynamic environments encountered in military use scenarios.

The fully adaptive point-to-point link seamlessly extends to collaborative multimode networks. In particular, each transceiver employs the same multiport linear processor structure to form simultaneous links to multiple neighbors in multinode networks. The resultant MIMO networking strategy (first disclosed in [1]) exploits the additional inherent route diversity of star, ring, or mesh networks, to provide the benefits of MIMO processing in a network setting.

The MIMO network illustrated in FIG. 44 displays a minimalist-model, four-node, network that is operating in the presence of a jammer. In this figure, nodes employ the multiport linear receive and transmit operations discussed above, to establish multiple simultaneous links with their neighbors. In the presence of point-to-point link diversity (high-rank MIMO channel response between communicators), e.g., polarization or multipath diversity, nodes may establish multiple connections between their neighbors. In the absence of such link diversity, or if desired by the network, the nodes may alternately establish simultaneous connections with their neighbors. These connections can be used to directly source data to these neighbors, or transmit data through these neighbors to more distant destination nodes. In the example shown in FIG. 46, this strategy doubles the amount of data transportable to or from any node in the network—even if no link diversity exists on any of the internode channels (rank-1 internode channel response). More generally, this strategy allows the capacity of each node to grow linearly with the number of antennas at that node, even in nondiverse communication scenarios such as airborne systems, desert combat scenarios, and ship-to-ship/shore naval communication networks, while maintaining the ability to provide superlinear throughput increases at low power levels. Moreover, this strategy allows unused DoFs to be used for other purposes, including excision of strong jamming likely to be encountered in battlefield conditions.

The symbol and timing structure for the baseline Phase 1 Lower-PHY (LPHY) is illustrated in FIG. 45. In order to simplify the Phase 1 lower PHY and requisite RF transceiver hardware, the method and system can employ a linear PAM LPHY with a 250 kHz symbol rate (4 μs lower PHY symbol period). In FIG. 45, the PAM symbol shape is assumed to be a 4 μs rectangle comprising a 3.2.mu·s base pulse, used during demodulation operations, and an 800 ns cyclic prefix that is discarded during demodulation operations. The resulting LPHY modem can be consequently be modeled as a single subcarrier of an 802.11g-like OFDM symbol, allowing the radio to be easily scaled to much wider bandwidths in later program phases. In addition, many other linear-PAM LPHY's are also consistent, including spread spectrum modulation formats that spread the signal over wide bandwidth, and LPI/LPD modulation formats that reduce or eliminate cyclic features of the waveform. The nominal ADC and DAC rates for the transceivers can be 5 Msps, well within the capability of low SWaP/cost systems.

The multiport PHY transmit/receive operations are illustrated in FIG. 47. At the transmitter, a frame of data intended for each transmit port is encoded to QAM using forward error correcting (FEC) encoding, organized into blocks of 240 QAM symbols, multiplexed with a transmit pilot that is unique to each node or transmit node address (TNA) in the network, and spread over the frame and PHY subcarriers using a fast Hadamard transform (FHT). The transmit pilot is designed to allow implementation of computationally efficient adaptive detection and reception algorithms at the intended receiver(s) in the network, without the need for prior knowledge of that pilot at the receiver. Sixteen Hadamard bins (software provisionable at each node based on the number of antennas employed by that node) set aside for pilot transmission add only 6.25% (16/256) overhead to the communications network, allowing effective node detection, receive adaptation, and node data extraction in one TDD slot (1.25 ms), with as many as eight antennas per transceiver. However, the number of pilot bins can be easily modified in software, or even provisioned on a dynamic basis, e.g., to improve the performance of receive adaptation algorithms when more complex transceivers enter the network, or to increase link throughput as those radios leave the environment.

After the FHT, the combined information and transmit pilot are modulated by a pseudorandom receive TRANSEC pilot, unique to the intended receiver or receive node address (RNA) in the network. If needed, the TRANSEC pilot is also frequency compensated to remove Doppler shift anticipated at the intended receiver, allowing the link to operate effectively velocities much higher than those anticipated in the Phase I demo. The TRANSEC output data is then passed through a linear distribution network (transmit beamformer) that can place beams in the direction of up to $M_{ANT}$ targeted receive nodes for a transceiver with $M_{ANT}$ transmit antennas. Alternately, the transmit beamformer can place up to 20 $\log_{10}(M_{ANT})$ energy in the direction of a single targeted receive node, allowing effective data transfer at a much lower power and consequent intercept footprint.

At the receiver, the processor strips off the receive TRANSEC pilot, simultaneously scrambling signals from any unauthorized user, and revealing the unique transmit pilots from each authorized user attempting to contact the receiver during that receive frame. The resultant data is passed to a computationally efficient, Modified Graham-Schmidt Orthogonalization (MGOS) based joint detection and signal extraction processor, which simultaneously detects each authorized pilot in the environment, and develops multiport receive combiner weights that excise interference in the communication channel (including self-interference from other authorized users). These weights are dewhitened and applied to the information-bearing signal after the inverse FHT (IFHT), and used to adapt retrodirective distribution weights used during subsequent transmit operations. The combined receive TRANSEC and IFHT spreading operations guarantees that the receive algorithm will apply equal interference rejection to the pilot and data symbols, for any interferer impinging on a node during its receive time slot.

The baseline system employs network-wide collaborative link optimization rules referred to as locally enabled global optimization (LEGO), which optimize network-wide measures of network quality using retrodirective transmit weight adaptation and local (link layer) power management instructions. The approach exploits the ability to form nulls during transmit operations to intelligently manage interference presented to other nodes transmitting or communicating in the same frequency channel. This includes other nodes operating on the same network, and nodes operating on disconnected networks, without the need for higher-layer cross-communication between interference nodes or networks. This capability, originally developed for optimization of point-to-multipoint cellular networks in wireless local-loop (AT&T Wireless Project Angel) and wireless metropolitan area networks (IEEE 802.16), cannot be employed in systems that do not perform transmit adaptation. This method and system can extend the LEGO approach to game theoretic methods that may perform this network optimization over a wider range of applications, networks, and optimization criteria.

The complexity of the method and system are shown in FIGS. 49-53. System complexity can be divided into two components: an FPGA coreware component, comprising regular operations that are easily implemented using field-programmable gate arrays or ASIC's, and a DSP software component. FPGA coreware operations can include the lower PHY modem, transmit and receive beamforming (linear distribution and combining operations), transmit/receive TRANSEC operations, and FHT/IFHT operations. The DSP software operations can include the MGSO operation, node discovery, and weight dewhitening operation. In both such cases, complexity is calculated in DSP clock cycles per second, for a hypothetical DSP hardware element that can compute a simultaneous real add and a real multiply in 4/3 clock cycle (1 clock cycle with 33% derating for memory transfer operations). Complexity is further divided by the number of transceiver ports (simultaneous transmit and receive channels), to provide a measure of the DSP cost of each link used accessed by the transceiver.

The overall complexity of the DSP component of transceiver operations (adaptive algorithm) is less than 200 kcps for the phase 1 system, or well within the capabilities of a low-cost DSP components. Similarly, the overall complexity of the FPGA component of transceiver operations is less than 30 Mcps, which easily fits on the commercially available FPGA and in fact can be implemented using moderate cost DSP components.

Assuming low power rate-1 BPSK QAM encoding on each link, the resultant system can provide a PHY throughput (data rate into the MAC layer) of 96 kbps (192 kbps full duplex), or establish 12 simultaneous 48 kbps full-duplex data links (576 kbps network transfer rate) between each node-pair in a four-node ring network, using a single two-channel transceiver at each node in that network and a simple 250 ksps PAM lower PHY. Assuming an active bandwidth of 250 kHz, this corresponds to a spectral network efficiency of over 2 bps/Hz. This efficiency and bandwidth scales linearly with the number bits/symbol employed in the QAM encoding operation. Because the ring network establishes a counterrotating ring that can transfer data over two simultaneous routes, the reliability of the collaborative network increases dramatically—by over 2 nines if each node in the network as a two nines reliability!

Detailed Embodiment Description

Parameter Definitions, Equations and Glossary

Network Parameters:

| | Network parameters: | Defaut | Index # |
|---|---|---|---|
| $M_{NA} =$ | Number of node addresses (active nodes) in the network | Variable | (1.1.01) |
| $M_{LA} =$ | Number of link addresses (active links) in the network | Variable | (1.1.02) |
| $M_{PA} =$ | Number of network-layer port addresses in the network | $M_{NA}(M_{NA}-1)$ | (1.1.03) |
| $M_{RA} =$ | Number of network-layer route addresses in the network | Variable | (1.1.04) |

| | Network addresses: | Range | |
|---|---|---|---|
| $m_{NA} =$ | Node address (NA) | $1:M_{NA}$ | (1.1.05) |
| $m_{TNA} =$ | Transmit Node address (TNA) | $1:M_{NA}$ | (1.1.06) |
| $m_{RNA} =$ | Receive Node address (RNA) | $1:M_{NA}$ | (1.1.07) |
| $m_{SNA} =$ | Source Node address (SNA) | $1:M_{NA}$ | (1.1.08) |
| $m_{DNA} =$ | Destination Node address (DNA) | $1:M_{NA}$ | (1.1.09) |
| $m_{LA} =$ | Link address (LA) | $1:M_{LA}$ | (1.1.10) |
| $m_{RLA} =$ | Return link address (RLA) | $1:M_{LA}$ | (1.1.11) |

-continued

| | Network addresses: | Range | |
|---|---|---|---|
| $m_{PA} =$ | Network-layer port address (PA) | $1:M_{PA}$ | (1.1.12) |
| $m_{RA} =$ | Network-layer route address (PA) | $1:M_{PA}$ | (1.1.13) |

| | Network mappings: | | |
|---|---|---|---|
| $\mu_{NA}(m_{LA}) =$ | $[m_{TNA}\ m_{RNA}]$ connected by link $m_{LA}$. Alternate notation $\mu_{TNA}(m_{LA})$, $\mu_{RNA}(m_{LA})$ can also be used to refer to individual elements of $\mu_{NA}$. | | (1.1.14) |
| $\mu_{TDD}(m_{LA}) =$ | TDD subframe used by link $m_{LA}$ ($\mu_{TNA}(m_{LA})$ transmits over TDD subframe $\mu_{TDD}(m_{LA})$) | | (1.1.15) |
| $\mu_{LA}(m_{TNA},m_{RNA}) =$ | Address of link connecting TNA $m_{TNA}$ to RNA $m_{RNA}$ (0 if no LA) $\mu_{NA}(m_{LA}) = [m_{TNA}\ m_{RNA}] \Rightarrow \mu_{LA}(m_{RNA}, m_{TNA}) = m_{LA}$ | | (1.1.16) |
| $\mu_{RLA}(m_{LA}) =$ | Return link address (RLA) for link $m_{LA}$: $\mu_{NA}(m_{LA}) = [m_{TNA}\ M_{RNA}] \Rightarrow \mu_{NA}(\mu_{RLA}(m_{LA})) = [m_{RNA}\ m_{TNA}]$ | | (1.1.17) |
| $k_{TNA}(m_{frame}) =$ | Adapt bin used by TNA $m_{TNA}$ (same for all links emanating from $m_{TNA}$) over frame $m_{frame}$. Same for all links emanating from $m_{TNA}$. | | (1.1.18) |

Datalink Parameters:

| | Address-independent datalink parameters: | Default | |
|---|---|---|---|
| $N_{codec} =$ | Maximum data encoding rate (can be noninteger) | 8 | (1.2.01) |
| $N_{FHT} =$ | Hadamard bins per frame | 256 | (1.2.02) |
| $N_{embed} =$ | Hadamard bins reserved for adaptation ($\leq N_{FHT}$) | 16 | (1.2.04) |
| $M_{embed} =$ | Modulated bins per port ($\leq N_{embed}/N_{port}$) | 16 | (1.2.05) |
| $N_{data} =$ | Hadamard bins reserved for data ($\leq N_{FHT} - N_{embed}$) | 240 | (1.2.03) |
| $M_{data} =$ | Hadamard bins modulated by data ($\leq N_{data}$) | 240 | (1.2.03a) |
| $N_{sub} =$ | Subcarriers per OFDM symbol | 64 | (1.2.06) |
| $M_{sub} =$ | Modulated subcarriers per OFDM symbol | 52 | (1.2.07) |
| $M_{QAM} =$ | QAM data symbols per physical data frame | 12,480 | (1.2.08) |
| $N_{OFDM} =$ | OFDM symbols per physical data frame | 312 | (1.2.09) |
| $M_{OFDM} =$ | Modulated OFDM symbols per PPDU | 256 | (1.2.10) |
| $N_{TDD} =$ | Data frames (TDD subframes) per TDD frame | 2 | (1.2.11) |
| $T_{FFT}(\mu s) =$ | Duration of OFDM FFT in microseconds (μs) | 3.2 μs | (1.2.12) |
| $T_{symbol}(\mu s) =$ | Duration of OFDM symbol in μs | 4 μs | (1.2.13) |
| $T_{prefix}(\mu s) =$ | Duration of OFDM cyclic prefix (guard interval) in μs | 0.8 μs | (1.2.14) |
| $T_{PPDU}(\mu s) =$ | Duration of data PPDU in μs | 1,024 μs | (1.2.15) |
| $T_{frame}(\mu s) =$ | Duration of data frame in μs | 1,250 μs | (1.2.16) |
| $T_{TxRx}(\mu s) =$ | Duration of TxRx turnaround time in μs | 2 μs | (1.2.17) |
| $T_{IFS}(\mu s) =$ | Duration of interframe space (guard time interval) in μs, inclusive of $T_{TxRx}$ | 226 μs | (1.2.18) |
| $T_{TDD}(\mu s) =$ | Duration of OFDM cyclic prefix (guard interval) μs | 2,500 μs | (1.2.19) |
| $f_{sub}(MHz) =$ | Subcarriers spacing in MHz (OFDM LPHY) | 0.3125 MHz | (1.2.20) |
| $W_{active}(MHz) =$ | Active bandwith of signal in MHz | 16.25 MHz | (1.2.21) |

| Node-address dependent datalink parameters: | | Default | |
|---|---|---|---|
| $N_{ant} =$ | Antennas available at node | Variable | (1.2.22) |
| $M_{ant} =$ | Antennas used at node ($\leq N_{ant}$) | Variable | (1.2.23) |
| $N_{port} =$ | Physical ports supportable at node ($\leq N_{ant}$) | Variable | (1.2.24) |
| $M_{port} =$ | Physical ports used at node ($\leq N_{port}$) | Variable | (1.2.25) |

| Link-address dependent datalink parameters: | | Default | |
|---|---|---|---|
| $M_{codec} =$ | Codec rate employed on link (0 $\Rightarrow$ no data transported) | Variable | (1.2.26) |
| $M_{bit} =$ | Bits/frame Tx"d over the link ($M_{bit} * M_{codec}$), 0 $\Rightarrow$ none | Variable | (1.2.27) |

| Node-address independent datalink indices: | | Range | |
|---|---|---|---|
| $n_{FHT} =$ | Physical FHT input bin index | $1:N_{FHT}$ | (1.2.28) |
| $m_{FHT} =$ | Logical FHT input bin index | $1:M_{FHT}$ | (1.2.29) |
| $m_{data} =$ | Logical data bin index | $1:M_{data}$ | (1.2.30) |
| $m_{embed} =$ | Logical adaptation bin index | $1:M_{embed}$ | (1.2.31) |
| $n_{sub} =$ | Physical subcarrier index | $1:N_{sub}$ | (1.2.32) |
| $m_{sub} =$ | Logical subcarrier index | $1:M_{sub}$ | (1.2.33) |
| $m_{QAM} =$ | Logical QAM data index | $1:M_{QAM}$ | (1.2.34) |
| $n_{OFDM} =$ | Physical OFDM symbol index | $1:N_{OFDM}$ | (1.2.35) |
| $m_{OFDM} =$ | Logical OFDM symbol index | $1:M_{OFDM}$ | (1.2.36) |
| $n_{TDD} =$ | TDD subframe index (TDD instantiations) | $1:N_{TDD}$ | (1.2.37) |
| $n_{frame} =$ | Data frame index (ignores TDD framing) | — | (1.2.38) |

| Node-address dependent datalink indices: | | Range | |
|---|---|---|---|
| $n_{ant} =$ | Physical antenna index | $1:N_{ant}$ | (1.2.39) |
| $m_{ant} =$ | Logical antenna index | $1:M_{ant}$ | (1.2.40) |
| $n_{port} =$ | Physical port index | $1:N_{port}$ | (1.2.41) |
| $m_{port} =$ | Logical port index | $1:M_{port}$ | (1.2.42) |
| $m_{frame} =$ | Logical frame index, shared by consecutive node receive and transmit frames | $\geq 0$ | (1.2.43) |

| Link-address dependent datalink indices: | | Range | |
|---|---|---|---|
| $m_{bit} =$ | Logical data bit (codes input) index | $1:M_{bit}$ | (1.2.44) |

| Datalink mappings: | | | |
|---|---|---|---|
| $v_{embed}(m_{embed}) =$ | Physical Hadamard bin modulated by logical transmit pilot bin $m_{embed}$ | | (1.2.45) |
| $v_{data}(m_{data}) =$ | Physical Hadamard bin modulated by logical data bin $m_{data}$ | | (1.2.46) |
| $v_{sub}(m_{sub}) =$ | Physical subcarrier modulated by logical subcarrier $m_{sub}$ | | (1.2.47) |
| $f_{sub}(m_{sub}) =$ | Physical baseband link frequency of logical subcarrier $m_{sub}$ | | (1.2.48) |
| $v_{frame}(m_{frame}, m_{TDD}) =$ | Physical frame carrying PPDU with frame index $m_{frame}$, TDD subframe index $m_{frame}$. | | (1.2.49) |
| $\mu_{port}(m_{LA}) =$ | Logical transmit or receive port (as appropriate) providing data for link address $m_{LA}$. By convention, the same logical port is used on the return path, $m_{port}(m_{LA}) = v_{port}(m_{RLA})$, $m_{RLA} = \mu_{RLA}(m_{LA})$. | | (1.2.50) |
| $\mu_{LA}(m_{port}) =$ | LA serviced by port $m_{port}$. Inverse of $\mu_{port}(m_{LA})$. | | (1.2.51) |

Data and Parameter Arrays:

| Transmit data arrays: | | Dimensions | |
|---|---|---|---|
| $B_{TNA}(m_{frame}) =$ | Transmitted bits transmitted, frame $m_{frame}$, $B_{TNA}(m_{frame}) = [b_{TNA}(1;m_{frame}) \dots b_{TNA}(M_{port}, m_{frame})]$, $b_{TNA}(m_{port}, m_{frame}) =$ bits Tx'd from node $m_{TNA}$ over port $m_{port}$ $m_{port} = \mu_{port}(m_{LA})$, where $\mu_{TNA}(m_{LA}) = m_{TNA}$ | $M_{bit} \times M_{port}$ | (1.3.1) |
| $Q_{TNA}(m_{sub}, m_{frame}) =$ | QAM data transmitted, subcarrier $m_{sub}$, frame $m_{frame}$, $Q_{TNA}(m_{sub}, m_{frame}) = \begin{bmatrix} q_{TNA}^H(1; m_{sub}, m_{frame}) \\ \vdots \\ q_{TNA}^H(M_{data}; m_{sub}, m_{frame}) \end{bmatrix}$ $q_{TNA}(m_{data}; m_{sub}, m_{frame}) =$ QAM data Tx'd on data bin $m_{data}$ | $M_{data} \times M_{port}$ | (1.3.2) |
| $D_{TNA}(m_{sub}, m_{frame}) =$ | FHT input data, subcarrier $m_{sub}$, frame $m_{frame}$, $D_{TNA}(m_{sub}, m_{frame}) = \begin{bmatrix} d_{TNA}^H(1; m_{sub}, m_{frame}) \\ \vdots \\ d_{TNA}^H(M_{FHT}; m_{sub}, m_{frame}) \end{bmatrix}$ | $M_{OFDM} \times M_{port}$ | (1.3.3) |
| $C_{TNA}(m_{sub}, m_{frame}) =$ | TRANSEC-scrambled FHT output data, subcarrier $m_{sub}$, frame $m_{frame}$, $C_{TNA}(m_{sub}, m_{frame}) = \begin{bmatrix} c_{TNA}^H(1; m_{sub}, m_{frame}) \\ \vdots \\ c_{TNA}^H(M_{OFDM}; m_{sub}, m_{frame}) \end{bmatrix}$ | $M_{OFDM} \times M_{port}$ | (1.3.4) |
| $S_{TNA}(m_{sub}, m_{frame}) =$ | OFDM modulator input data, subcarrier $m_{sub}$, frame $m_{frame}$, | $M_{OFDM} \times M_{ant}$ | (1.3.5) |

-continued

| Transmit data arrays: | Dimensions |
|---|---|
| $S_{TNA}(m_{sub}, m_{frame}) = \begin{bmatrix} s_{TNA}^H(1; m_{sub}, m_{frame}) \\ \vdots \\ s_{TNA}^H(M_{OFDM}; m_{sub}, m_{frame}) \end{bmatrix}$ | |

| Transmit parameter arrays: | | Dimensions | |
|---|---|---|---|
| $R_{RNA}(m_{sub}, m_{frame}) =$ | RNA TRANSEC code, subcarrier $m_{sub}$, frame $m_{frame}$; row $m_{port}$ = receive code for node $m_{RNA}$ = $\mu RNA(\mu_{LA}(m_{port}))$ $r_{RNA}(m_{port}; m_{sub}, m_{frame}) = r(m_{sub}, m_{frame}; \mu_{RNA}(\mu_{LA}(m_{port})))$, | $M_{OFDM} \times M_{port}$ | (1.3.6) |
| $G_{TNA}(m_{sub}, m_{frame}) =$ | TNA distribution weights, subcarrier $m_{sub}$, frame $m_{frame}$. | $M_{ant} \times M_{port}$ | (1.3.7) |
| $\gamma_{RLA}(m_{frame}) =$ | Target return-link SINR's, frame $m_{frame}$. | $1 \times M_{port}$ | (1.3.8) |
| $h_{Tx}(m_{sub}) =$ | Transmit subcarrier mask (OFDM LPHY), $h_{TX}(m_{sub}) = \left(\frac{\pi f_{sub}(m_{sub}) T_{DAC}}{\sin(\pi f_{sub}(m_{sub}) T_{DAC})}\right) h_{TRC}(m_{sub})$ where $T_{DAC} = 1/f_{DAC}$ is the (node-specific) DAC output sample period. | $M_{ant} \times 1$ | (1.3.9) |
| $h_{TRC}(m_{sub}) =$ | Transmit-receive compensation weights, equalizes path differences between the RF switch and the DAC (transmit path) and ADC (receive path) at each node in the network. Computed during scheduled Transmit/receive compensation events. | $M_{ant} \times 1$ | (1.3.10) |

| Receive data arrays: | | Dimensions | |
|---|---|---|---|
| $X_{RNA}(m_{sub}, m_{frame}) =$ | OFDM demod output data, subcarrier $m_{sub}$, frame $m_{frame}$. | $M_{OFDM} \times M_{ant}$ | (1.3.11) |
| $Y_{RNA}(m_{sub}, m_{frame}) =$ | TRANSEC-descrambled FHT output data, subcarrier $m_{sub}$, frame $m_{frame}$. $Y_{RNA}(m_{sub}, m_{frame}) = \begin{bmatrix} y_{RNA}^H(1; m_{sub}, m_{frame}) \\ \vdots \\ y_{RNA}^H(M_{OFDM}; m_{sub}, m_{frame}) \end{bmatrix}$ | $M_{FHT} \times M_{ant}$ | (1.3.12) |
| $P_{RNA}(m_{sub}, m_{frame}) =$ | Deembeded pilot data, subcarrier $m_{sub}$, frame $m_{frame}$. $P_{RNA}(m_{sub}, m_{frame}) = \begin{bmatrix} p_{RNA}^H(1; m_{sub}, m_{frame}) \\ \vdots \\ p_{RNA}^H(M_{embed}; m_{sub}, m_{frame}) \end{bmatrix}$ | $M_{embed} \times M_{ant}$ | (1.3.13) |
| $Z_{RNA}(m_{sub}, m_{frame}) =$ | Deembeded QAM data, subcarrier $m_{sub}$, frame $m_{frame}$. | $M_{data} \times M_{ant}$ | (1.3.14) |
| $Q_{RNA}(m_{sub}, m_{frame}) =$ | Demodulated QAM data, subcarrier $m_{sub}$, frame $m_{frame}$. | $M_{data} \times M_{port}$ | (1.3.15) |
| $B_{RNA}(m_{frame}) =$ | Decoded bits, frame $m_{frame}$ | $M_{bit} \times M_{port}$ | (1.3.16) |

| Receive parameter arrays: | | Dimensions | |
|---|---|---|---|
| $r_{RNA}(m_{sub}, m_{frame}) =$ | NA TRANSEC code, subcarrier $m_{sub}$, frame $m_{frame}$. Used at node $m_{RNA}$ during receive operations, and at nodes attempting to communicate with node $m_{RNA}$ during their transmit operations. | $M_{OFDM} \times 1$ | (1.3.17) |

-continued

| Receive parameter arrays: | | Dimensions | |
|---|---|---|---|
| $W_{RNA}(m_{sub}, m_{frame}) =$ | Rx combiner weights, subcarrier $m_{sub}$, frame $m_{frame}$. | $M_{ant} \times M_{port}$ | (1.3.18) |
| $A_{Rx}(m_{sub}, m_{frame}) =$ | Rx spatial signature estimates, subcarrier $m_{sub}$, frame $m_{frame}$. | $M_{ant} \times M_{port}$ | (1.3.19) |
| $\gamma_{LA}(m_{sub}, m_{frame}) =$ | Estimated link SINR's, subcarrier $m_{sub}$, frame $m_{frame}$. | $1 \times M_{port}$ | (1.3.20) |

| Conceptual parameter arrays (not generated, but referred to in operations): | | Dimensions | |
|---|---|---|---|
| $t_{TNA}(m_{frame}) =$ | [Sparse] NA transmit pilot, subcarrier $m_{sub}$, frame $m_{frame}$. $t_{TNA}(m_{frame}) = \sqrt{M_{embed}} e(k_{TNA}(m_{frame}))$ | $M_{embed} \times 1$ | (1.3.21) |
| $C_{FHT} =$ | Unitary Walsh transformation matrix | $M_{FHT} \times M_{FHT}$ | (1.3.22) |
| $S_{data} =$ | Shift matrix, maps logical data bins to FHT input bins | $M_{FHT} \times M_{data}$ | (1.3.23) |
| $S_{pilot} =$ | Shift matrix, maps logical pilot bins to FHT input bins | $M_{FHT} \times M_{pilot}$ | (1.3.24) |
| $S_{FHT} =$ | Shift matrix, maps logical bins to physical FHT input bins, $S_{FHT} = [S_{pilot} \; S_{data}]$ | $M_{FHT} \times M_{FHT}$ | (1.3.25) |

Upper-PHY Signal Processing Operations:

Transmit Operations

Starting with the transmit bits $B_{TNA}(m_{frame})$ to be transmitted over logical subcarrier $m_{sub}$ and logical frame $m_{frame}$, perform the following operations.

Step TP1: Separately encode each row of transmitted bits $B_{TNA}(m_{frame})$ into QAM symbols, and map to subcarriers to form QAM transmit data $Q_{TNA}(m_{sub}, m_{frame})$. The bit-to-QAM encoder is not specified here. However, the default encoder will be operations cited in the 802.11a standards specification.

Step TP2: Embed the transmit pilot, and map pilot & data to FHT input bins $$D_{TNA}(m_{sub}, m_{frame}) = S_{FHT} \begin{bmatrix} t_{TNA}(m_{frame}) 1^T_{M_{port}} \\ Q_{TNA}(m_{sub}, m_{frame}) \end{bmatrix} \quad (2.1.1)$$

$$= S_{pilot}(t_{TNA}(m_{frame}) 1^T_{M_{port}}) + s_{data} Q_{Tx}(m_{sub}, m_{frame}) \quad (2.1.2)$$

Step TP3: Embed receive pilot for RNA's communicating with the node.

$$C_{TNA}(m_{sub}, m_{frame}) = R_{RNA}(m_{sub}, m_{frame}) \cdot (C_{FHT} D_{TNA}(m_{sub}, m_{frame})) \quad (2.1.3)$$

Step TP4: Distribute the embedded data over the output antennas.

$$S_{TNA}(m_{sub}, m_{frame}) = (1_{M_{OFDM}}(m_{sub})) \cdot (C_{TNA}(m_{sub}, m_{frame}) G_{TNA}^T(m_{sub}, m_{frame})), \quad (2.1.4)$$

where ".*" denotes the element-wise multiply operation, and $1_M$ is the M×1 all-ones vector.

Two algorithms are specified here to adapt transmit distribution weights $\{G_{TNA}(m_{sub}, m_{frame})\}$, A retrodirective max-SINR approach that sets $\{G_{TNA}(m_{sub}, m_{frame})\}$ proportional to the receive weights that maximize signal-to-interference-and-noise ratio (SINR) on the return path, and A retrodirective mar-SIR approach that sets $\{G_{TNA}(m_{sub}, m_{frame})\}$ proportional to the receive weights that maximize signal-to-interference ratio (SIR), i.e., that provide hard transmit nulls, on the return path.

The max-SIR approach is recommended for initialization of new links; the max-SINR approach is recommended for steady state operation and tracking. The max-SINR transmit weight adaptation algorithm is described in Section 3.2. The max-SIR transmit weight adaptation algorithm is described in Section 4.2.

Receive Processing Operations

Starting with the multiantenna data $X_{RNA}(m_{sub}, m_{frame})$ received and OFDM-demodulated over logical subcarrier $m_{sub}$ and logical frame $m_{frame}$, perform the following operations.

Step RP1: Remove the receive pilot, and inverse-FHT descrambled data $$Y_{RNA}(m_{sub}, m_{frame}) = C_{FHT}^H((r^*_{RNA}(m_{sub}, m_{frame}) 1_{M_{ant}}^T (m_{RNA})) \cdot X_{RNA}(m_{sub}, m_{frame})) \quad (2.2.1)$$

Step RP2: Separate pilot & data components $$P_{RNA}(m_{sub}, m_{frame}) = S_{pilot}^T Y_{RNA}(m_{sub}, m_{frame}) \quad (2.2.2)$$

$$X_{RNA}(m_{sub}, m_{frame}) = S_{data}^T Y_{RNA}(m_{sub}, m_{frame}) \quad (2.2.3)$$

Steps RA, TA:

Detect transmit pilots and estimate their SINR's $\gamma_{LA}(m_{sub}, m_{frame})$ (Sections 3.1, 4.1).

Compute combiner weights $\{W_{RNA}(m_{sub}, m_{frame})\}$ (Sections 3.1, 4.1).

Compute distribution weights $\{G_{TNA}(m_{sub}, m_{frame})\}$ to be used on the return path (Sections 3.2, 4.2).

Step RP3: Recover the QAM link data:

$$Q_{RNA}(m_{sub}, m_{frame}) = Z_{RNA}(m_{sub}, m_{frame}) W_{RNA}(m_{sub}, m_{frame}) \quad (2.2.4)$$

Two algorithms are specified here to adapt receive combiner weights $\{W_{RNA}(m_{sub}, m_{frame})\}$ A retrodirective max-SINR approach that adapts $\{W_{RNA}(m_{sub}, m_{frame})\}$ to maximize signal-to-interference-and-noise ratio (SINR) of the received pilot data, and A retrodirective max-SIR approach that adapts $\{W_{RNA}(m_{sub}, m_{frame})\}$ to maximize signal-to-interference ratio (SIR) of the received pilot data, i.e., that provide hard receive nulls to separate the signals of interest to the node.

The max-SIR approach is recommended for initialization of new links; the max-SINR approach is recommended for steady state operation and tracking. The max-SINR transmit weight adaptation algorithm is described in Section 3.2. The max-SIR transmit weight adaptation algorithm is described in Section 4.2.

Max-SINR Adaptation Algorithm

Adaptive Receive Algorithm

Starting with the multiantenna received and deembedded pilot data (referred to as $P_{RNA}(m_{sub})$ or $P_{RNA}$ as appropriate to simplify arguments) received and OFDM-demodulated over logical subcarrier $m_{sub}$ and logical frame $m_{frame}$, perform the following operations Step RA1: Compute QRD of $P_{RNA}(m_{sub}, m_{frame})$ $$\{Q(m_{sub}), R(m_{sub})\} = QRD\{P_{RNA}(m_{sub}, m_{frame})\}, \text{ such that} \quad (3.1.1)$$

$$R(m_{sub})\} = chol\{P_{RNA}^H(m_{sub}, m_{frame}) P_{RNA}(m_{sub}, m_{frame})\} \quad (3.1.2)$$

$$= chol\{P_{RNA}^H P_{RNA}(m_{sub}, m_{frame})\} \quad (3.1.3)$$

$$C(m_{sub}) = R^{-1}(m_{sub}) \quad (3.1.4)$$

$$Q(m_{sub}) = P_{RNA}(m_{sub}, m_{frame}) C(m_{sub}), (Q^H(m_{sub}) Q(m_{sub}) = I_{M_{ant}}) \quad (3.1.5)$$

$$= \begin{bmatrix} q^H(1; m_{sub}) \\ \vdots \\ q^H(M_{embed}; m_{sub}) \end{bmatrix} \quad (3.1.6)$$

Step RA2: Detect candidate TNA transmit pilots and spatially whitened adaptation weights $$\eta(m_{embed}; m_{sub}) = \|q(m_{embed}; m_{sub})\|^2 \quad (3.1.7)$$

$$\gamma(m_{embed}, m_{sub}) = \frac{\eta(m_{embed}; m_{sub})}{1 - \eta(m_{embed}; m_{sub})} \quad (3.1.8)$$

$$c_{det}(m_{embed}) = \frac{1}{M_{sub}} \sum_{m_{sub}=1}^{M_{sub}} \log_2(1 + \gamma(m_{embed}; m_{sub})) \quad (3.1.9)$$

$$\{m_{embed}(m)\}_{m=1}^{M_{det}} = \quad (3.1.10)$$

$$m_{embed}(m) \text{ satisfying} \begin{cases} c_{det}(m_{embed}(m)) \geq c_{thresh}, \text{ and} \\ c_{det}(m_{embed}(m)) \geq c_{det}(m_{embed}(m+1)) \end{cases}$$

$$U_{det}(m_{sub}) = \sqrt{M_{embed}}[q(m_{embed}(1); m_{sub}) \ldots q(m_{embed}(m_{det}); m_{sub})] \quad (3.1.11)$$

$$\eta_{det}(m_{sub}) = [\eta(m_{embed}(1); m_{sub}) \ldots \eta(m_{embed}(m_{det}); m_{sub})] \quad (3.1.12)$$

$$\gamma_{det}(m_{sub}) = [\gamma(m_{embed}(1); m_{sub}) \ldots \gamma(m_{embed}(m_{det}); m_{sub})] \quad (3.1.13)$$

Step RA3: If spatial signature estimates $A_{port}(m_{sub})$ are available, where $A_{port}(m_{sub})$ is the import column of $A_{RNA}(m_{sub})$ (see Step RA6), associate detected transmit pilots with receive ports and link addresses.

$$U_{port}(m_{det}; m_{sub}) = C^H(m_{sub})a_{port}(m_{port}; m_{sub}) \quad (3.1.14)$$

$$\rho(m_{det}, m_{post}; m_{sub}) = \quad (3.1.15)$$

$$\frac{|u_{det}^H(m_{det}; m_{sub})u_{port}(m_{port}; m_{sub})|^2}{M_{embed}; \eta_{det}(m_{det}; m_{sub})\|u_{port}(m_{port}; m_{sub})\|^2} \leq 1$$

$$c_{match}(m_{det}, m_{port}) = \quad (3.1.16)$$

$$\frac{1}{M_{sub}} \sum_{m_{sub}=1}^{M_{sub}} \log_2(1 + \gamma(m_{det}; m_{sub})\rho(m_{det}, m_{port}; m_{sub}))$$

$$\{m_{det}(m_{port})\}_{m_{port}=1}^{M_{port}} = \underset{m_{det}}{\arg\max}\{c_{match}(m_{det}; m_{port})\} \quad (3.1.17)$$

Step RA4: Drop and add ports, based on the port matching statistic $c_{match}(m_{det}, m_{port})$.

$$\{m_{drop}\}_1^{M_{drop}} = \underset{m_{port}}{\arg\max}\left\{\underset{m_{det}}{\max}\{c_{match}(m_{det}; m_{port})\} < c_{thresh}\right\} \quad (3.1.18)$$

$$\{m_{add}\}_1^{M_{add}} = m_{det} \notin \{m_{det}(m_{port})\}_{m_{port}=1}^{M_{port}} \quad (3.1.19)$$

$$M_{port} \leftarrow M_{port} - M_{drop} + M_{add} \quad (3.1.20)$$

$$\{m_{det}(m_{port})\}_{m_{port}=1}^{M_{port}} \leftarrow (\{m_{det}(m_{port})\} \setminus \{m_{det}(m_{drop})\}) \cup \{m_{add}\} \quad (3.1.21)$$

Step RA5: Assign receive ports and link statistics $\eta_{LA}(m_{sub})$ and $\gamma_{LA}(m_{sub})$.

$$\eta_{LA}(m_{port}; m_{sub}) = \eta_{det}(m_{det}(m_{port}); m_{sub}) \quad (3.1.22)$$

$$\gamma_{LA}(m_{port}; m_{sub}) = \gamma_{det}(m_{det}(m_{port}); m_{sub}) \quad (3.1.23)$$

$$u(m_{port}; m_{sub}) = u_{det}(m_{det}(m_{port}); m_{sub}) \quad (3.1.24)$$

$$U(m_{sub}) = [u(1; m_{sub}) \ldots u(M_{port}; m_{sub})] \quad (3.1.25)$$

Step RA6: Estimate spatial steering matrices $\{A_{RNA}(m_{sub}, m_{frame})\}$.

$$A_{RNA}(m_{sub}, m_{frame}) = C^H(m_{sub})U(m_{sub}) \quad (3.1.26)$$

Step RA7: Compute combiner weights $\{W_{RNA}(m_{sub}, m_{frame})\}$.

$$W_{RNA}(m_{sub}, m_{frame}) = C(m_{sub})U(m_{sub}) \quad (3.1.27)$$

Adaptive Transmit Algorithm

Starting with the receive weights $W_{RNA}(m_{sub}, m_{frame})$ given in (3.1.27) and target SINR's $\gamma_{RLA}$ for the return link, perform the following operations.

Step TA1: Scale whitened transmit weights.

$$\eta_{RLA}(m_{port}) = \frac{\gamma_{RLA}(m_{RLA})}{1 + \gamma_{RLA}(m_{RLA})}, \quad m_{port} = \mu_{port}(m_{RLA}) = \mu_{port}(m_{RLA}) \quad (3.2.1)$$

$$\pi_{RLA}(m_{port}; m_{sub}) \leftarrow \frac{\eta_{RLA}(m_{port})}{\eta_{LA}(m_{port}; m_{sub})}, \quad (3.2.2)$$

$$(\eta_{LA}(m_{port}; m_{sub}) \text{ given in } (3.1.22))$$

Step TA2: Compute distribution weights $\{G_{TNA}(m_{sub}, m_{frame})\}$.

$$G_{TNA}(m_{sub}, m_{frame}) = [\sqrt{\pi(1, m_{sub})}w_{RNA}(1, m_{sub}) \ldots \sqrt{\pi(M_{port}, m_{sub})}w_{RNA}(M_{port}, m_{sub})] \quad (3.2.3)$$

The target SINR's can also be derived from rate targets based on performance of the codec's used in the system, or from capacity targets $\{C_{RLA}(M_{RLA})\}$ or spectral efficiency targets $\{c_{RLA}(m_{RLA})\}$, via the formula $$c_{RLA}(m_{RLA}) = 1.63 C_{RLA}(m_{RLA})/W_{active} \quad (3.2.4)$$

$$\gamma_{RLA}(m_{RLA}) = \lambda_{gap}(2^{c_{RLA}(m_{RLA})} - 1)c_{RLA}(m_{RLA}) \quad (3.2.5)$$

Where 1.63=1/0.6144 is the inverse efficiency of the airlink, which includes overhead for transmit pilots (0.9375 efficiency), the OFDM cyclic prefix (0.80 efficiency) and TDD framing (0.8192 efficiency), and where $\lambda_{gap}$ is the SNR coding gap of the QAM codec. Target SINR, rate, or capacity can be set at either end of the link. i.e., as a transmitter design goal or as a control parameter passed from the link or network. In the first two cases, this adaptation is referred to here as locally enabled network optimization (LEGO).

Note that steps (3.2.1)-(3.2.3) adjust output power to meet a link SINR (or link rate or capacity) criterion. That is, the system will attempt to adjust transmit power at each node to meet this criterion. Also note that steps (3.2.1)-(3.2.3) require no information from other links in the network, including links originating from the same node. While this can be a highly desirable attribute in many applications, it has some drawbacks in practice. In particular, if the target SINR's are set too high, the resultant network can fail to converge and drive its transmitters into saturation. This event can be detected by computing the conducted power into each antenna, $$P_{RLA}(m_{ant}) = M_{sub} \sum_{m_{port}=1}^{M_{port}} |g(m_{ant}, m_{port})|^2 \quad (3.2.6)$$

and monitoring $P_{RLA}(m_{ant})$ to ensure compliance with conducted power requirements.

In addition, the convergence time of the LEGO algorithm can be slow, especially during initial acquisition of multiple links. This performance can be improved by employing a max-SIR algorithm that forms hard nulls during the initial link acquisition period. This algorithm is easily implemented as an extension of the max-SINR algorithm described above.

Max-SIR Adaptation Algorithm
Adaptive Receive Algorithm

Starting with the multiantenna received and deembedded pilot data $X_{P_x}(m_{sub},m_{frame})$ (referred to as $X_{P_x}(m_{sub})$ or $X_{P_x}$ as appropriate to simplify arguments) received and OFDM-demodulated over logical subcarrier $m_{sub}$ and logical frame $m_{frame}$, perform the following operations.

Step RA1: Compute QRD of $P_{RNA}(m_{sub},m_{frame})$, using (3.1.1)-(3.1.6).

Step RA2: Detect candidate TNA transmit pilots and spatially-whitened max-SINR adaptation weights using (3.1.7)-(3.1.13).

Step RA3: If spatial signature estimates $A_{RNA}(m_{sub})$ are available (see Step RA7), associate detected transmit pilots with receive ports and link addresses, using (3.1.14)-(3.1.17).

Step RA4: Drop and add ports using (3.1.18)-(3.1.21).

Step RA5: Assign max-SINR whitened transmit/receive weights and link statistics using (3.1.22)-(3.1.25).

Step RA6: Estimate spatial steering matrices $\{A_{RNA}(m_{sub}, m_{frame})\}$ using 3.1.26.

Step RA7: Compute combiner weights $\{W_{RNA}(m_{sub},m_{frame})\}$, using (3.1.27).

Step RA7.1: Compute null-steering receive weights and SINR's $$C_\perp(m_{sub}) = (U^H(m_{sub})U(m_{sub}))^{-1} \quad (4.1.1)$$

$$\eta_{LA}(m_{posrt},m_{sub}) \leftarrow 1/\text{diag}\{C_\perp(m_{sub})\} \text{ (replaces } \eta_{LA}(m_{posrt},m_{sub}) \text{ provided by}(3.1.22)) \quad (4.1.2)$$

$$\gamma_{LA}(m_{posrt}, m_{sub}) \leftarrow \frac{\eta_{LA}(m_{port}; m_{sub})}{1 - \eta_{LA}(m_{port}; m_{sub})} \quad (4.1.3)$$

(replaces $\gamma_{LA}(m_{port}, m_{sub})$ provided by (3.1.22))

$$W_{RNA}(m_{sub},m_{frame}) \leftarrow W_{RNA}(m_{sub},m_{sub})C_\perp(m_{sub}) \quad (4.1.4)$$

Adaptive Transmit Algorithm

Starting with the transmit weights $W_{RNA}(m_{sub},m_{frame})$ given in (4.1.4) and target SINR's $\gamma_{RLA}$ for the return link, perform the following operations.

Step TA1: Compute $\eta_{RLA}(m_{port})$ using (3.2.1).

Step TA1.1: Compute power scaling $\pi(m_{port}; m_{sub})$ using $$\pi(m_{port};m_{sub}) = \eta_{RLA}(m_{port})\eta_{LA}(m_{port};m_{sub}),(\eta_{LA}(m_{port}; m_{sub}) \text{ given in (3.1.22)}) \quad (4.2.1)$$

Step TA2: Compute combiner weights $\{G_{RNA}(m_{sub},m_{frame})\}$ using 3.2.3

The target SINR's can also be derived from rate targets based on performance of the codec's used in the system, or from capacity targets $\{C_{RLA}(m_{RLA})\}$ or spectral efficiency targets $\{c_{RLA}(m_{RLA})\}$ using (3.2.4)-(3.2.5), and conducted power can be monitored using (3.2.6). In addition, the SINR and SIR estimates given by (3.1.23 and 4.1.3) can be used to detect "overloaded network" conditions where the max-SIR solution is misadjusting significantly from the max-SINR result.

While this invention has been described with reference to one or more illustrative embodiments, this description is not to be construed in a limiting sense. Various modifications and combinations of the illustrative embodiments, differing order of the sub-steps (including parallel and partial processing for one or more operations thereof), as well as other embodiments of the invention will be apparent to those skilled in the art upon referencing this disclosure. It is therefore intended this disclosure encompass any combination of the specifics described here and such modifications or embodiments. Furthermore, the scope of this invention includes any combination of the subordinate parts from the different embodiments disclosed in this specification, and is not limited to the specifics of the preferred embodiment or any of the alternative embodiments mentioned above. Individual configurations and embodiments of this invention may contain all, or less than all, of those disclosed in the specification according to the needs and desires of that user. The claims stated herein should further be read as including those elements which are not necessary to the invention yet are in the prior art, particularly that referenced and incorporated herein thereby, and are necessary to the overall function of that particular claim, and should be read as including, to the maximum extent permissible by law, known functional equivalents to the specification's disclosure, even though those functional equivalents are not exhaustively detailed herein or individually claimed below due to the legal preferences for limiting the number of claims and the law's intent to negate any requirement for combinatorial explosion for overly-detailed description and claiming of known and foreseeable alternatives.

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features which are already known in the design, manufacture and use of adaptive and transitional MIMO systems, both hardware and associated software therefore, and which may be used instead of or in addition to features already described herein. The examples herein are not limiting but instructive of the embodiment of the invention, and variations which are readily derived through programming or embedded hardware transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived there from.

The invention claimed is:

1. A method comprising:
causing orthogonal frequency division multiplexing (OFDM) transmission of a first portion of data, via at least one antenna of a first node, to at least a second node;
determining, based at least in part on one or more observed capacities associated with one or both of the first node and a third node, to route a second portion of the data via the third node for transmission; and
causing OFDM transmission of the second portion of the data, via at least one antenna of the third node, to at least the second node.

2. The method of claim 1, wherein the determining comprises determining, based at least in part on a difference between an observed capacity associated with the first node and an observed capacity associated with the third node, to route the second portion of the data via the third node for transmission.

3. The method of claim 1, wherein the causing OFDM transmission of the first portion of the data comprises causing OFDM transmission of the first portion of the data using one or more transmit powers that are based at least in part on a target capacity objective, wherein the target capacity objective is based at least in part on one or more transmissions received via the first node.

4. The method of claim 1, further comprising indicating at least one control parameter to the first node and the third node, wherein the causing OFDM transmission of the first portion of the data comprises causing OFDM transmission of the first portion of the data in accordance with the at least one control parameter, and the causing OFDM transmission of the second portion of the data comprises causing OFDM transmission of the second portion of the data in accordance with the at least one control parameter.

5. The method of claim 1, wherein the first node comprises a multiple-input multiple-output (MIMO)-capable node that comprises a plurality of antennas.

6. The method of claim 5, wherein the third node comprises a MIMO-capable node that comprises a plurality of antennas.

7. The method of claim 1, wherein:
the causing the OFDM transmission of the first portion of the data comprises causing the OFDM transmission of the first portion of the data via a first plurality of frequency channels that are determined based at least in part on an observed capacity associated with the first node; and
the causing the OFDM transmission of the second portion of the data comprises causing the OFDM transmission of the second portion of the data via a second plurality of frequency channels that are determined based at least in part on an observed capacity associated with the second node.

8. The method of claim 1, wherein the determining is performed responsive to a change in an observed capacity associated with the first node.

9. A system comprising:
a controller; and
a plurality of nodes comprising:
a first node comprising:
at least one antenna; and
circuitry configured to cause orthogonal frequency division multiplexing (OFDM) transmission of a first portion of data, via the at least one antenna of the first node, to at least a second node; and
a third node comprising:
at least one antenna; and
circuitry configured to cause OFDM transmission of a second portion of the data, via the at least one antenna of the third node, to at least the second node,
wherein the controller is configured to cause, based at least in part on one or more observed capacities associated with one or more of the plurality of nodes, the first portion of the data to be routed for transmission via the first node and to cause the second portion of the data to be routed for transmission via the third node.

10. The system of claim 9, wherein the controller is further configured to select the first node and the third node based at least in part on the one or more observed capacities.

11. The system of claim 9, wherein the circuitry of the first node is configured to cause the OFDM transmission of the first portion of the data using one or more transmit powers that are based at least in part on a target capacity objective, wherein the target capacity objective is based at least in part on one or more transmissions that the first node is configured to receive.

12. The system of claim 9, wherein:
the controller is further configured to indicate at least one control parameter to the first node and the third node;
the circuitry of the first node is configured to cause the OFDM transmission of the first portion of the data in accordance with the at least one control parameter; and
the circuitry of the second node is configured to cause the OFDM transmission of the second portion of the data in accordance with the at least one control parameter.

13. The system of claim 9, wherein the first node comprises a multiple-input multiple-output (MIMO)-capable node that comprises a plurality of antennas.

14. The system of claim 13, wherein the third node comprises a MIMO-capable node that comprises a plurality of antennas.

15. The system of claim 9, wherein:
the circuitry of the first node is configured to cause the OFDM transmission of the first portion of the data via a first plurality of frequency channels that are determined based at least in part on an observed capacity associated with the first node; and
the circuitry of the third node is configured to cause the OFDM transmission of the second portion of the data via a second plurality of frequency channels that are determined based at least in part on an observed capacity associated with the third node.

16. The system of claim 9, wherein the controller is configured to cause the second portion of the data to be routed for transmission via the third node responsive to a change in an observed capacity associated with the first node.

17. The system of claim 9, wherein the circuitry of the first node and the circuitry of the third node each comprises a processor.

18. A method comprising:
causing orthogonal frequency division multiplexing (OFDM) transmission of a first portion of data, via at least one antenna of a first node, to at least a second node;
selecting, based at least in part on one or more observed capacities associated with one or more of a plurality of nodes, a third node of the plurality of nodes, wherein the plurality of nodes comprises the first node and the third node;
routing a second portion of the data via the third node for transmission to a second node; and causing orthogonal frequency division multiplexing (OFDM) transmission of the second portion of the data, via at least one antenna of the third node, to at least the second node.

19. The method of claim 18, further comprising:

causing, based at least in part on an observed capacity associated with the first node, a first link between the first node and the second node to be dropped; and causing a second link between the third node and the second node to be added, wherein the causing the OFDM transmission of the second portion of the data comprises causing the OFDM transmission via the second link.

20. The method of claim 18, wherein each of the first node and the third node comprises a multiple-input multiple-output (MIMO)-capable node that comprises a plurality of antennas.

* * * * *